United States Patent
Smith et al.

(10) Patent No.: US 12,344,057 B2
(45) Date of Patent: Jul. 1, 2025

(54) SYSTEMS AND METHODS FOR AUTOMATED OPERATION AND HANDLING OF AUTONOMOUS TRUCKS AND TRAILERS HAULED THEREBY

(71) Applicant: Outrider Technologies, Inc., Brighton, CO (US)

(72) Inventors: Andrew F. Smith, Bend, OR (US); Lawrence S. Klein, Bend, OR (US); Stephen A. Langenderfer, Bend, OR (US); Martin E. Sotola, Boulder, CO (US); Vikas Bahl, Highlands Ranch, CO (US); Mark H. Rosenblum, Denver, CO (US); Peter James, Denver, CO (US); Dale Dee Rowley, Highlands Ranch, CO (US); Matthew S. Johannes, Arvada, CO (US); Gary Michael Seminara, Golden, CO (US); Jeremy M. Nett, Littleton, CO (US); Christopher T. Bate, Westminster, CO (US); Michael Patrick Cutter, Golden, CO (US)

(73) Assignee: Outrider Technologies, Inc., Brighton, CO (US)

( * ) Notice: Subject to any disclaimer, the term of this patent is extended or adjusted under 35 U.S.C. 154(b) by 0 days.

(21) Appl. No.: 18/225,552

(22) Filed: Jul. 24, 2023

(65) Prior Publication Data
US 2024/0131886 A1 Apr. 25, 2024
US 2024/0227476 A9 Jul. 11, 2024

Related U.S. Application Data

(63) Continuation of application No. 17/009,620, filed on Sep. 1, 2020, now Pat. No. 11,707,955, which is a
(Continued)

(51) Int. Cl.
*B60D 1/64* (2006.01)
*B25J 9/16* (2006.01)

(52) U.S. Cl.
CPC ............... *B60D 1/64* (2013.01); *B25J 9/163* (2013.01); *B25J 9/1669* (2013.01); *B25J 9/1697* (2013.01)

(58) Field of Classification Search
CPC . B60D 1/64; B25J 9/163; B25J 9/1669; B25J 9/1697
See application file for complete search history.

(56) References Cited

U.S. PATENT DOCUMENTS

| 3,881,748 A | 5/1975 | Donaldson |
| 4,366,965 A | 1/1983 | Rhodes |

(Continued)

FOREIGN PATENT DOCUMENTS

| CA | 2555212 A1 | 9/2005 |
| CN | 106741239 | 5/2017 |

(Continued)

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose ,28023/post-292796>. (Year: 2008).

(Continued)

*Primary Examiner* — Gertrude Arthur Jeanglaude
(74) *Attorney, Agent, or Firm* — Loginov & Associates, PLLC; William A. Loginov

(57) ABSTRACT

A system and method for operation of an autonomous vehicle (AV) yard truck is provided. A processor facilitates autonomous movement of the AV yard truck, and connection to and disconnection from trailers. A plurality of sensors are
(Continued)

interconnected with the processor that sense terrain/objects and assist in automatically connecting/disconnecting trailers. A server, interconnected, wirelessly with the processor, that tracks movement of the truck around and determines locations for trailer connection and disconnection. A door station unlatches/opens rear doors of the trailer when adjacent thereto, securing them in an opened position via clamps, etc. The system computes a height of the trailer, and/or if landing gear of the trailer is on the ground and interoperates with the fifth wheel to change height, and whether docking is safe, allowing a user to take manual control, and optimum charge time(s). Reversing sensors/safety, automated chocking, and intermodal container organization are also provided.

20 Claims, 130 Drawing Sheets

Related U.S. Application Data continuation-in-part of application No. 16/282,279, filed on Feb. 21, 2019, now Pat. No. 11,099,560.

(60) Provisional application No. 62/715,757, filed on Aug. 7, 2018, provisional application No. 62/681,044, filed on Jun. 5, 2018, provisional application No. 62/633,185, filed on Feb. 21, 2018.

(56) References Cited

U.S. PATENT DOCUMENTS

| | | | |
|---|---|---|---|
| 4,448,447 | A | 5/1984 | Funk |
| 4,548,783 | A | 10/1985 | Dalke |
| 5,305,427 | A | 4/1994 | Nagata |
| 5,607,221 | A | 3/1997 | Justus |
| 6,179,319 | B1 | 1/2001 | Malisch |
| 6,863,538 | B2 | 3/2005 | Mattern |
| 7,562,918 | B2 | 7/2009 | Toma |
| 7,669,875 | B2 | 3/2010 | Halverson |
| 7,748,549 | B1 | 7/2010 | Browning |
| 8,187,020 | B2 | 5/2012 | Algueera Gallego et al. |
| 8,301,318 | B2 | 10/2012 | Lacaze |
| 8,532,862 | B2 | 9/2013 | Neff |
| 8,727,084 | B1 | 5/2014 | Kuker |
| 8,806,689 | B2 | 8/2014 | Riviere |
| 8,888,121 | B2 | 11/2014 | Trevino |
| 9,068,668 | B2 | 6/2015 | Grover |
| 9,211,889 | B1 | 12/2015 | Hoetzer |
| 9,302,678 | B2 | 4/2016 | Murphy |
| 9,592,964 | B2 | 3/2017 | Göllü |
| 9,688,489 | B1 | 6/2017 | Zevenbergen |
| 10,081,504 | B2 | 9/2018 | Walford |
| 10,399,477 | B2 | 9/2019 | Obermeyer |
| 10,556,473 | B2 | 2/2020 | Strand |
| 11,099,560 | B2 | 8/2021 | Smith |
| 11,429,099 | B2 | 8/2022 | Smith |
| 11,560,188 | B2 * | 1/2023 | Moore ................ B60D 1/64 |
| 11,834,111 | B2 | 12/2023 | Moore |
| 2003/0233189 | A1 | 12/2003 | Hsiao |
| 2004/0146384 | A1 | 7/2004 | Whelan |
| 2005/0017506 | A1 | 1/2005 | Caldwell |
| 2005/0103541 | A1 | 5/2005 | Nelson |
| 2006/0071447 | A1 | 4/2006 | Gehring |
| 2007/0030349 | A1 | 2/2007 | Riley |
| 2008/0012695 | A1 | 1/2008 | Herschell |
| 2008/0223630 | A1 | 9/2008 | Couture |
| 2008/0262654 | A1 | 10/2008 | Omori |
| 2010/0025964 | A1 | 2/2010 | Fisk |
| 2011/0037241 | A1 | 2/2011 | Temple |
| 2011/0254504 | A1 | 10/2011 | Haddad |
| 2012/0248167 | A1 | 10/2012 | Flanagan |
| 2014/0007386 | A1 | 1/2014 | Liao |
| 2014/0251556 | A1 | 9/2014 | Orton |
| 2014/0268095 | A1 | 9/2014 | Petkov |
| 2015/0251366 | A1 | 9/2015 | Voth |
| 2015/0258908 | A1 | 9/2015 | Fukui |
| 2015/0263541 | A1 | 9/2015 | Fukui |
| 2015/0328655 | A1 | 11/2015 | Reichler |
| 2015/0352721 | A1 | 12/2015 | Wicks |
| 2015/0360882 | A1 | 12/2015 | Girtman |
| 2016/0039456 | A1 | 2/2016 | Lavoie |
| 2016/0054143 | A1 | 2/2016 | Abuelsaad |
| 2016/0075526 | A1 | 3/2016 | Avalos |
| 2016/0260328 | A1 | 9/2016 | Mishra |
| 2016/0304122 | A1 | 10/2016 | Herzog |
| 2016/0318490 | A1 | 11/2016 | Ben Shalom |
| 2017/0031356 | A1 | 2/2017 | Bell |
| 2017/0050526 | A1 | 2/2017 | Sommarström |
| 2017/0146168 | A1 | 5/2017 | Caprio |
| 2017/0165839 | A1 | 6/2017 | Tan |
| 2017/0174019 | A1 | 6/2017 | Lurie |
| 2017/0185082 | A1 | 6/2017 | Matos |
| 2017/0186124 | A1 | 6/2017 | Jones |
| 2017/0305694 | A1 | 10/2017 | McMurrough |
| 2017/0361844 | A1 | 12/2017 | Kahn |
| 2017/0364070 | A1 | 12/2017 | Oba |
| 2017/0369260 | A1 | 12/2017 | Hoofard |
| 2018/0050573 | A1 | 2/2018 | Strand |
| 2018/0202822 | A1 | 7/2018 | Delizio |
| 2018/0250833 | A1 | 9/2018 | Boria |
| 2018/0264963 | A1 | 9/2018 | Dudar |
| 2018/0265076 | A1 | 9/2018 | Hall |
| 2018/0265296 | A1 | 9/2018 | Beckman |
| 2018/0281178 | A1 | 10/2018 | Jacobsen |
| 2018/0346029 | A1 | 12/2018 | Kabos |
| 2018/0362270 | A1 | 12/2018 | Clucas |
| 2019/0002216 | A1 | 1/2019 | Walford |
| 2019/0064828 | A1 | 2/2019 | Meredith |
| 2019/0064835 | A1 | 2/2019 | Hoofard |
| 2019/0077600 | A1 | 3/2019 | Watts |
| 2019/0095861 | A1 | 3/2019 | Baldwin |
| 2019/0129429 | A1 | 5/2019 | Juelsgaard |
| 2019/0187716 | A1 | 6/2019 | Cantrell |
| 2019/0197786 | A1 | 6/2019 | Molyneaux |
| 2019/0235504 | A1 | 8/2019 | Carter |
| 2020/0239242 | A1 | 7/2020 | Hoofard |
| 2020/0338942 | A1 | 10/2020 | Winograd |
| 2020/0387166 | A1 | 12/2020 | Lacaze |
| 2020/0387168 | A1 | 12/2020 | Lacaze |
| 2021/0053407 | A1 | 2/2021 | Smith |
| 2021/0061034 | A1 | 3/2021 | Moore |
| 2021/0061304 | A1 | 3/2021 | Braunstein |
| 2021/0141384 | A1 | 5/2021 | Lacaze |
| 2021/0192784 | A1 | 6/2021 | Taylor |
| 2021/0238908 | A1 | 8/2021 | Ramage |
| 2021/0316761 | A1 | 10/2021 | Torrie |
| 2021/0380182 | A1 | 12/2021 | Delizo |
| 2022/0080584 | A1 | 3/2022 | Wicks |
| 2022/0371199 | A1 | 11/2022 | Schultz |
| 2023/0391243 | A1 | 12/2023 | Duong |
| 2024/0043075 | A1 | 2/2024 | Johannes |
| 2024/0294044 | A1 | 9/2024 | Lacaze |

FOREIGN PATENT DOCUMENTS

| | | |
|---|---|---|
| CN | 107380002 | 11/2017 |
| DE | 102012102648 B4 | 9/2012 |
| DE | 102012023999 A1 | 1/2014 |
| EP | 2886497 B1 | 6/2015 |
| JP | S5885702 A | 5/1983 |
| JP | 3215916 B2 | 10/2001 |
| WO | 2010118420 A2 | 10/2010 |
| WO | 2013180622 A1 | 12/2013 |
| WO | 2016205559 A1 | 12/2016 |
| WO | 2017100716 A1 | 6/2017 |
| WO | 2018001915 A1 | 1/2018 |
| WO | 2019042958 A1 | 3/2019 |
| WO | 2019046383 A1 | 3/2019 |
| WO | 2019118848 A1 | 6/2019 |

(56) References Cited

FOREIGN PATENT DOCUMENTS

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016] p. 109-p. 112.

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/?action =repository action common download&item id=20956 &item- -no=l&attribute- id=17&file- no=2 [retrieved on Nov. 27, 2018] Chapter 9.

\* cited by examiner

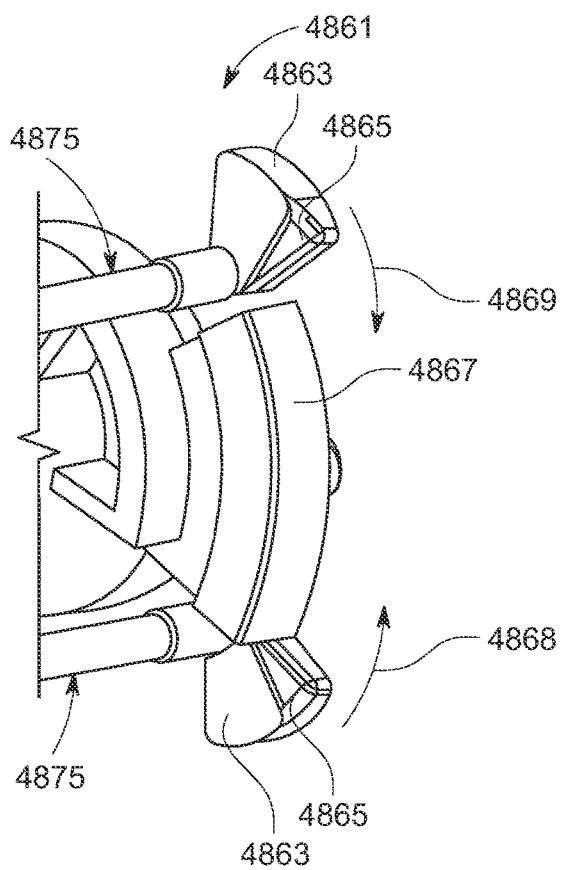
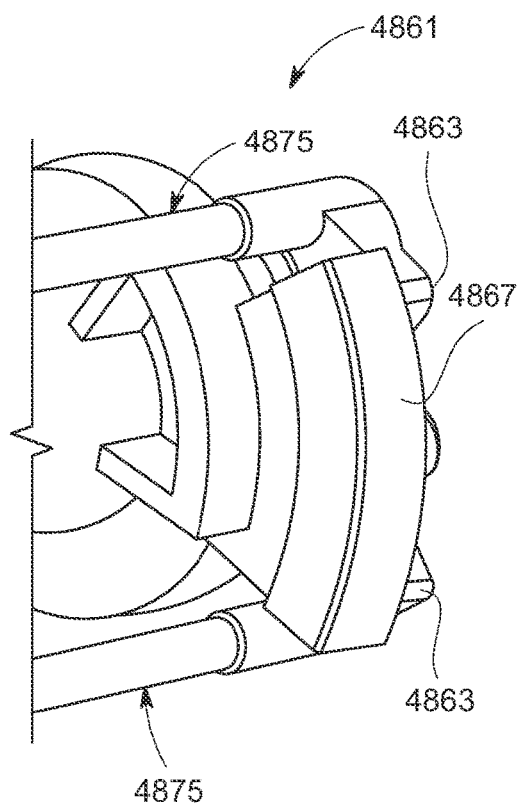
FIG. 48K
FIG. 48L
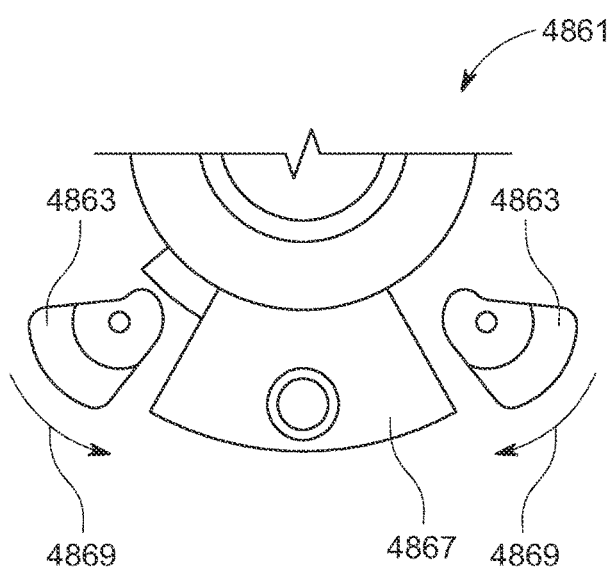
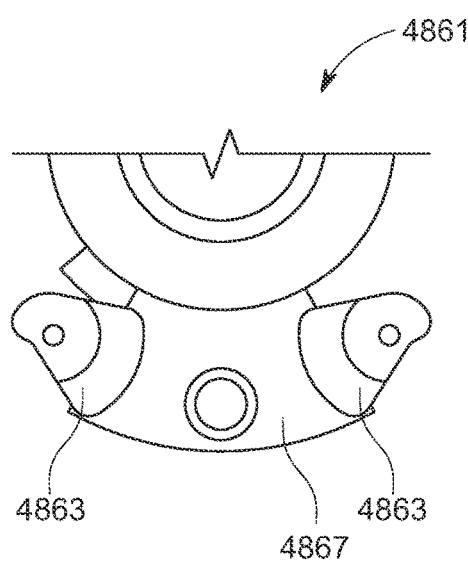
FIG. 48M
FIG. 48N

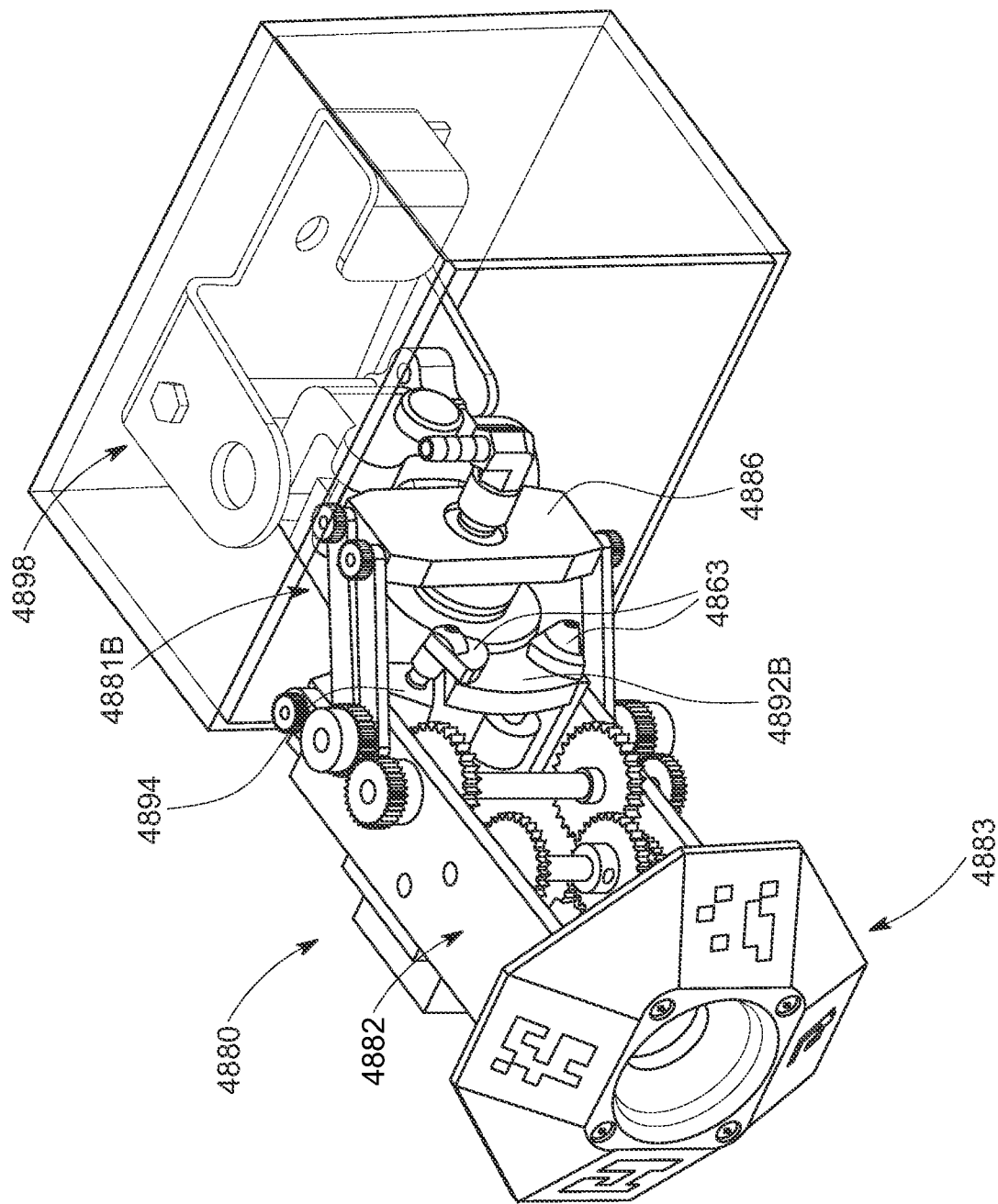

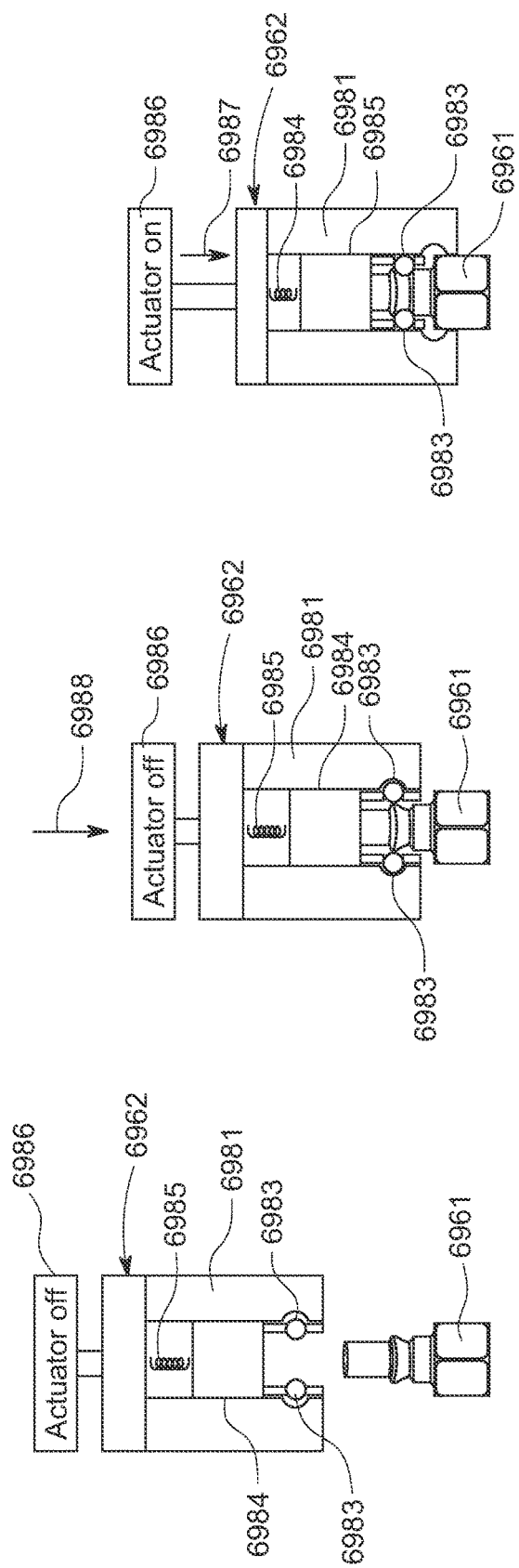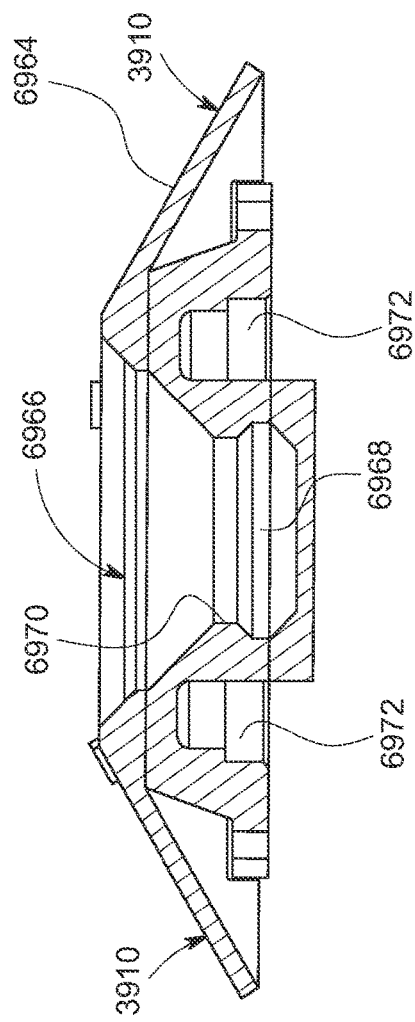

SYSTEMS AND METHODS FOR AUTOMATED OPERATION AND HANDLING OF AUTONOMOUS TRUCKS AND TRAILERS HAULED THEREBY

RELATED APPLICATIONS

This application is a continuation of co-pending U.S. patent application Ser. No. 17/009,620, entitled SYSTEMS AND METHODS FOR AUTOMATED OPERATION AND HANDLING OF AUTONOMOUS TRUCKS AND TRAILERS HAULED THEREBY, filed Sep. 1, 2020, which is a continuation-in-part of co-pending U.S. patent application Ser. No. 16/282,279, filed Feb. 21, 2019, entitled SYSTEMS AND METHODS FOR AUTOMATED OPERATION AND HANDLING OF AUTONOMOUS TRUCKS AND TRAILERS HAULED THEREBY, now U.S. Pat. No. 11,099,560, issued Aug. 24, 2021, which claims the benefit of U.S. Provisional Application Ser. No. 62/633,185, entitled SYSTEMS AND METHODS FOR AUTOMATED OPERATION AND HANDLING OF AUTONOMOUS TRUCKS AND TRAILERS HAULED THEREBY, filed Feb. 21, 2018, U.S. Provisional Application Ser. No. 62/681,044, entitled SYSTEMS AND METHODS FOR AUTOMATED OPERATION AND HANDLING OF AUTONOMOUS TRUCKS AND TRAILERS HAULED THEREBY, filed Jun. 5, 2018, and U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, filed Aug. 7, 2018, the entire disclosure of each of which applications is herein incorporated by reference.

FIELD OF THE INVENTION

This invention relates to autonomous vehicles and more particularly to autonomous trucks and trailers therefor, for example, as used to haul cargo around a shipping facility, a production facility or yard, or to transport cargo to and from a shipping facility, a production facility or yard.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting of a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer. Thus, a plurality of removable connections are made between the cab and trailer to deliver both electric power and pneumatic pressure. The pressure is used to operate emergency and service brakes, typically in conjunction with the cab's own (respective) brake system. The electrical power is used to power (e.g.) interior lighting, exterior signal and running lights, lift gate motors, landing gear motors (if fitted), etc.

Throughout the era of modern transport trucking, the connection of such electrical and pneumatic lines, the raising and lowering of landing gear, the operation of rear swing doors associated with trailers, and vehicle inspections have been tasks that have typically been performed manually by a driver. For example, when connecting to a trailer with the cab, after having backed into the trailer so as to couple the truck's fifth wheel to the trailer's kingpin, these operations all require a driver to then exit his or her cab. More particularly, a driver must crank the landing gear to drop the kingpin into full engagement with the fifth wheel, climb onto the back of the cab chassis to manually grasp a set of extendable hoses and cables (carrying air and electric power) from the rear of the cab, and affix them to a corresponding set onto related connections at the front of the trailer body. This process is reversed when uncoupling the trailer from the cab. That is, the operator must climb up and disconnect the hoses/cables, placing them in a proper location, and then crank down the landing gear to raise the kingpin out of engagement with the fifth wheel. Assuming the trailer is to be unloaded (e.g. after backing it into a loading dock), the driver also walks to the rear of the trailer to unlatch the trailer swing doors, rotate them back 270 degrees, and (typically) affix each door to the side of the trailer. With some trailer variations, rear doors are rolled up (rather than swung), and/or other action is taken to allow access to cargo. Other facilities, such as loading dock warning systems, chocks which prevent trailers from rolling unexpectedly and trailer-to-dock locking mechanisms rely upon human activation and monitoring to ensure proper function and safety. Similar safety concerns exist when trucks and trailers are backing up, as they exhibit a substantial blind spot due to their long length and large width and height.

Further challenges in trucking relate to intermodal operations, where yard trucks are used to ferry containers between various transportation modalities. More particularly, containers must be moved between railcars and trailers in a railyard in a particular order and orientation (front-to-rear facing, with doors at the rear). Likewise, order and orientation is a concern in dockyard operations where containers are removed from a ship.

A wide range of solutions have been proposed over the years to automate one or more of the above processes, thereby reducing the labor needed by the driver. However, no matter how effective such solutions have appeared in theory, the trucking industry still relies upon the above-described manual approach(es) to connecting and disconnecting a trailer to/from a truck tractor/cab.

With the advent of autonomous vehicles, it is desirable to provide further automation of a variety of functions that have been provided manually out of tradition or reasonable convenience.

SUMMARY OF THE INVENTION

This invention overcomes disadvantages of the prior art by providing systems and methods for connecting and disconnecting trailers from truck cabs (tractors) that enhance the overall automation of the process and reduce the need for human intervention therewith. These systems and methods are particularly desirable for use in an autonomous trucking environment, such as a shipping yard, port, manufacturing center, fulfillment center and/or general warehouse complex, where the operational range and routes taken by hauling vehicles are limited and a high density of are moved into, out of and around the facility. Such trailers typically originate from, and are dispatched to, locations using over-the-road cabs or trucks (that can be powered by diesel, gasoline, compressed gas other internal-combustion-based fuels, and/or electricity in a plug-in-charged and/or fuel/electric hybrid arrangement). Cabs or trucks within the facility (termed "yard trucks") can be powered by electricity or another desirable (e.g. internal combustion) fuel source—which can be, but is not limited to, clean-burning fuel, in various implementations.

In order to facilitate substantially autonomous operation of yard trucks (herein referred to as "autonomous vehicle", or "AV" yard trucks), as well as other AV trucks and hauling vehicles, various systems are automated. The systems and methods herein address such automation. By way of non-limiting example, the operation of hitching, including the connection of brake/electrical service to a trailer by the truck is automated. Additionally, unlatching and opening of trailer (e.g. swing) doors is automated. Identification of trailers in a yard and navigation with respect to such trailers is automated, and safety mechanisms and operations when docking and undocking a trailer are automated. Access to the truck by a user can be controlled, and safety tests can be performed in an automated manner—including but not limited to a tug test that ensures a secure hitch. Likewise, the raising of the fifth wheel and verification that the trailer landing gear has disengaged the ground is automated.

In an illustrative embodiment, a system and method for automatically connecting at least one service line on a truck to a trailer is provided, and includes a receiver on the trailer that is permanently or temporarily affixed thereto, the receiver interconnected with at least one of a pneumatic line and an electrical line. A coupling is manipulated by an end effector of a robotic manipulator to find and engage the receiver when the trailer is brought into proximity with, or hitched to, the truck. A processor operates in response to a position of the receiver to move the manipulator to, thereby, align and engage the coupling with the receiver so as to complete a circuit between the truck and the trailer. Illustratively, the processor can track the position of the at least one service line and limits movements of the manipulator in order to prevent tangling, pinching, or other damage to the service line. The coupling can further comprise a trailer interface end that rotates freely relative to the end effector.

In an illustrative embodiment, a system and method for locating a glad hand connector on a front face of a trailer comprises a gross sensing system that acquires at least one of a 2D and a 3D image of the front face and searches for glad hand-related image features. Illustratively, a process (or) can uses at least one of the 2D and the 3D image(s) to identify glad hand positioning and/or identify the glad hand mating features and determine if the glad hand is a rotational glad hand. The process(or) can also further determine the rotational axis of the rotational glad hands. Illustratively, the gross sensing system can further comprise at least one camera, in which the processor can control exposure parameters, contrast, or brightness for the at least one camera to offset environmental factors such as direct sunlight incident on the at least one camera, or extreme exposure deltas across a 2D image, in order to improve the accuracy of connection point detection. Illustratively, a process(or) can use at least one of the 2D and the 3D image(s) to scan the nearby surroundings for trailer features and other environmental constraints in order to prevent collision of the manipulator system with objects in the environment. The processor can be adapted to store scanned information in a database to improve future connections. Additionally, a process(or) can use at least one of the 2D and the 3D image(s) that contain at least one fiducial marker to verify a stored tool position. The gross sensing system can further comprise at least one sensor having a sensor lens, wherein the sensor lens has a hydrophobic surfactant coating to mitigate the accumulation of distorting water droplets and other precipitate. The system and method can provide at least one fiducial marker, in which the fiducial marker can have a (e.g.) hydrophobic surfactant coating to mitigate the accumulation of distorting water droplets and other precipitate, thereby avoiding potential optical distortion by a vision system acquiring images of the scene.

In an illustrative embodiment, a system and method for attaching a truck-based pneumatic line connector to a glad hand on a trailer using a manipulator with an end effector that selectively engages and releases the connector includes a clamping assembly that selectively overlies an annular seal of the glad hand and that sealingly clamps the connector to the annular seal. Illustratively, the clamping assembly includes a spring-loaded clamp that is normally closed and is opened by a gripping action of the end effector, in which the clamping assembly is passively clamped onto the glad hand when the glad hand is positioned in the clamp. A distal end of the connector can further comprise an electromagnet, in which the connector can magnetically attach to a ferrous wedge on a spring-loaded rotational glad hand, and can pull out on the spring-loaded rotational glad hand. The connector can further comprise a passive rotational axis, in which the passive rotational axis of the connector can be parallel to the glad hand rotational axis. Illustratively, a distal end of the connector further comprises rotational gripper fingers, in which the rotational gripper fingers can grasp a wedge on a spring-loaded rotational glad hand, and can pull out on the spring-loaded rotational glad hand. The system and method can include at least two overlapping actuated clamping arms that seal the glad hand and provide air to the trailer. The overlapping actuated clamping arms can further comprise an air delivery arm and a reaction force arm. The clamping assembly can be passive, and can be triggered by contact with the glad hand to clamp around the glad hand under the force of a spring. The connector can be configured to connect to a rotary glad hand, so as to rotate the rotary glad hand out from the trailer into a position where the connector can connect to the glad hand. The manipulator can be constructed and arranged to disconnect from the tool after the tool has contacted the glad hand via magnet or gripper. Additionally, an actuated rotational or telescoping device on the tool can be provided, which can be driven by a motor or similar system, and set around the free axis of the tool, to allow for the tool to extract the glad hand through reaction against trailer faces, recessed walls, and thereby provide space for a clamping assembly to seal the glad hand. The system and method can provide a stand-alone tool that is separate from the connector, in which the stand-alone tool can be configured to capture a wedge on a trailer glad hand and pull the trailer glad hand out into position for the connector to connect to the air line. The system and method can further include an inflatable O-ring on the connector, in which the inflatable O-ring can be configured to be positioned against the annular gasket of the trailer glad hand, and can be inflated to create an air tight seal. A rotary connector wedge can be provided, in which the rotary connector wedge is configured to rotate into engagement with a flange of the trailer glad hand, thereby sealing the connector tool to the trailer glad hand. Illustratively, a flexible sealing sleeve can be provided, which is moved by a manipulator to overlap and encompass the trailer glad hand, and can thereby selectively form a seal using a movable sealing ring that resiliently seals in an airtight manner against a portion of the glad hand remote from the annular seal. In this manner, air pressure provided to an inner volume of the sleeve is transmitted to the glad hand. The system and method can further provide a caliper that can slide over the trailer glad hand, in which air pressure can be applied to the caliper to activate the caliper, and thereby close and seal around the glad hand so that air can be conveyed into the trailer. Illustratively, the manipulator, the end effector, and/or the connector can have a sensor and/or a feedback system that can create active compliance to overcome misalignment during connection. Additionally, the manipulator, the end effector, and/or the connector can have elasticity that can create passive compliance to overcome misalignment during connection. Illustratively, the clamping assembly can be located in a tool cradle that allows for selection from one of a plurality of clamping assemblies, which are adapted to discrete glad hand types. The clamping assembly can comprise a connection tool having an end adapter that removably receives an end effector of a manipulator. The connection tool further can further include a pivoting grasping subassembly with rotatable locking fingers for selectively gripping the glad hand, and thereby manipulating the glad hand into a desired orientation. A movable connection plate with attached airline can also be provided to sealingly engage the annular seal when the glad hand is in the desirable orientation. The end adapter can further comprise an end cap having a plurality of discrete fiducials arranges at differing orientations, which can be adapted for tracking by a machine vision system.

In an illustrative embodiment, a system and method for interconnecting an airline between an autonomous truck and a trailer can include an adapter that is mounted with respect to a trailer-side airline and directs pressurized air therethrough. The adapter can have at least one glad hand connection thereon. A manipulator carries and moves a connection tool into and out of engagement with the adapter. The connection tool can be interconnected with a truck-side airline to thereby deliver the pressurized air to the adapter when engaged therewith. The manipulator can be further arranged to selectively release from the tool when the tool is engaged to the adapter. Illustratively, the system and method can provide a teleoperations system that can use teleoperation to connect the airline via a remote operator, who controls the connection process over a network using appropriate, sensor, visual and/or tactile feedback in conjunction with a controller (e.g. a joystick, etc.).

In an illustrative embodiment, a system and for interconnecting an airline, having a connection tool to a trailer mounted glad hand, which uses a robot manipulator to direct the glad hand includes a machine vision system. The machine vision system includes a camera assembly that generates at least 2D images of the glad hand. A pose and recognition process is arranged to determine a six-degree-of-freedom (6DOF) pose of the glad hand based upon a combination of stored classes of glad hands of differing types and orientations and identified keypoint features. A position control process(or) then maps the 6DOF pose information into motion control data to move the manipulator with respect to the glad hand. Illustratively, the pose and recognition process(or) employs a deep learning processor, such as a trained convolutional neural network (CNN) or similarly functioning computing arrangement. The camera assembly can comprises a stereoscopic RGBD camera assembly that generates both depth images and RGB images, or any other acceptable 3D camera assembly capable of providing (e.g.) both 2D image data and 3D depth images.

BRIEF DESCRIPTION OF THE DRAWINGS

The invention description below refers to the accompanying drawings, of which:

FIG. 48K is a partial perspective view of a connection tool having spring-loaded, rotating locking fingers/wedges or fingers that engage a glad hand flange, shown in an unlocked orientation;

FIG. 48L is a partial perspective view of the connection tool of FIG. 48K, shown in a locked orientation; FIG. 48M is a partial top view of the connection tool of FIG. 48K, shown in an locked orientation;

FIG. 48N is a partial top view of the connection tool of FIG. 48K, shown in an unlocked orientation;

FIG. 48X is a perspective is a perspective view of the glad hand connection tool of FIG. 48U, shown with the airline connection plate swung into a sealed relationship with the outwardly rotated glad hand to complete the pressure circuit therebetween;

FIG. 48AA is a perspective is a perspective view of the glad hand connection tool of FIG. 48Y, shown with the airline connection plate swung into a sealed relationship with the outwardly rotated glad hand to complete the pressure circuit therebetween;

FIG. 60 is a perspective view of an autonomous-operation-favored glad hand adapter that also allows for manual interconnection of a truck-side glad hand connector, according to an embodiment;

FIG. 61 is a perspective view of the autonomous-operation-favored glad hand adapter of FIG. 60, shown engaged with a gripper manipulated clamping tool, according to an embodiment;

FIG. 62 is a perspective view of an autonomous-operation-favored glad hand adapter that also allows for manual interconnection of a truck-side glad hand connector using a shuttle valve and dual-port, truck side connectors, according to an embodiment;

FIG. 63 is a perspective view of an autonomous-operation-favored glad hand adapter that also allows for manual interconnection of a truck-side glad hand connector, using a shuttle valve and 90-degree-attached dual-port-truck side connectors according to an embodiment;

FIG. 64 is a perspective view of an autonomous-operation-favored glad hand adapter for direct connection to the trailer-side airline, that also allows for manual interconnection of a truck-side glad hand connector and employs an integrated shuttle valve with dual-port, truck-side connectors, according to an embodiment;

FIG. 65 is a perspective view of an autonomous-operation-favored glad hand adapter for connection to the trailer-side glad hand connection, that also allows for manual interconnection of a truck-side glad hand connector and employs an integrated shuttle valve with dual-port, truck-side connectors, according to an embodiment;

FIG. 66 is a perspective view of an autonomous-operation-favored glad hand adapter for connection to the trailer-side glad hand connection, that also allows for manual interconnection of a truck-side glad hand connector and employs an integrated shuttle valve in a machinable housing with dual-port, truck-side connectors, according to an embodiment;

Figure 67:
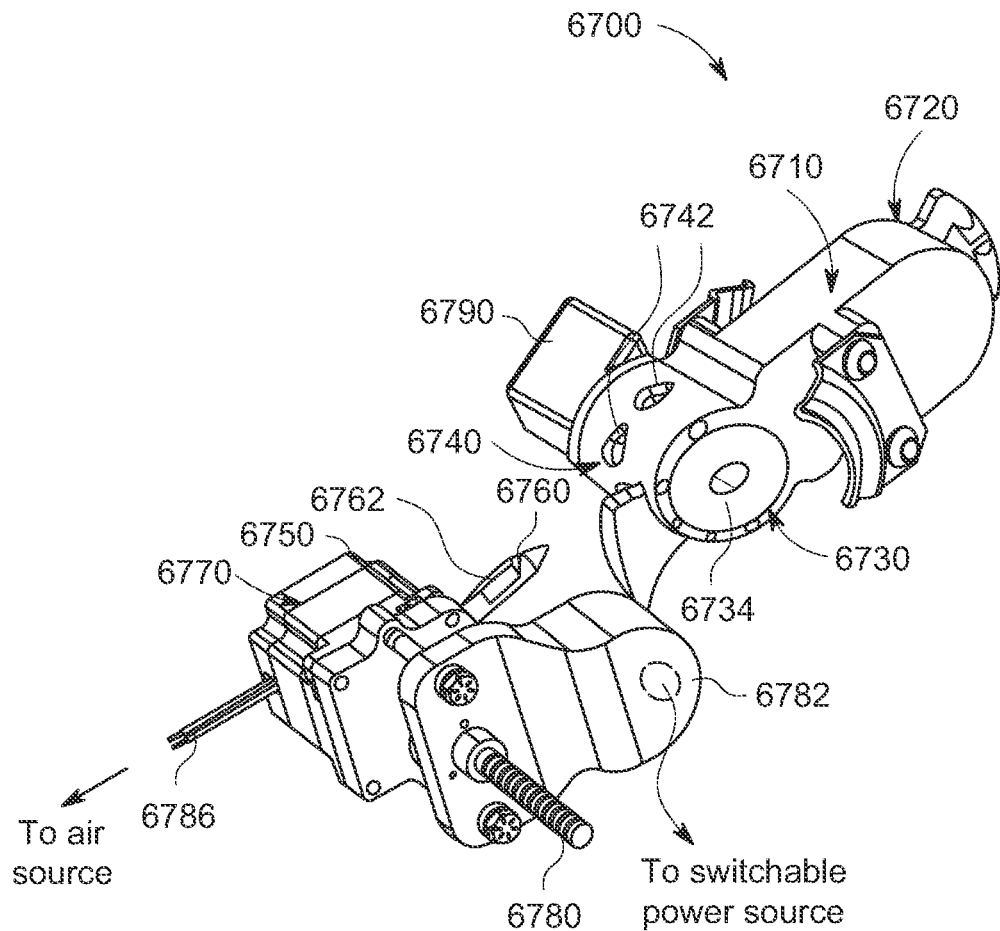
Figure 68:
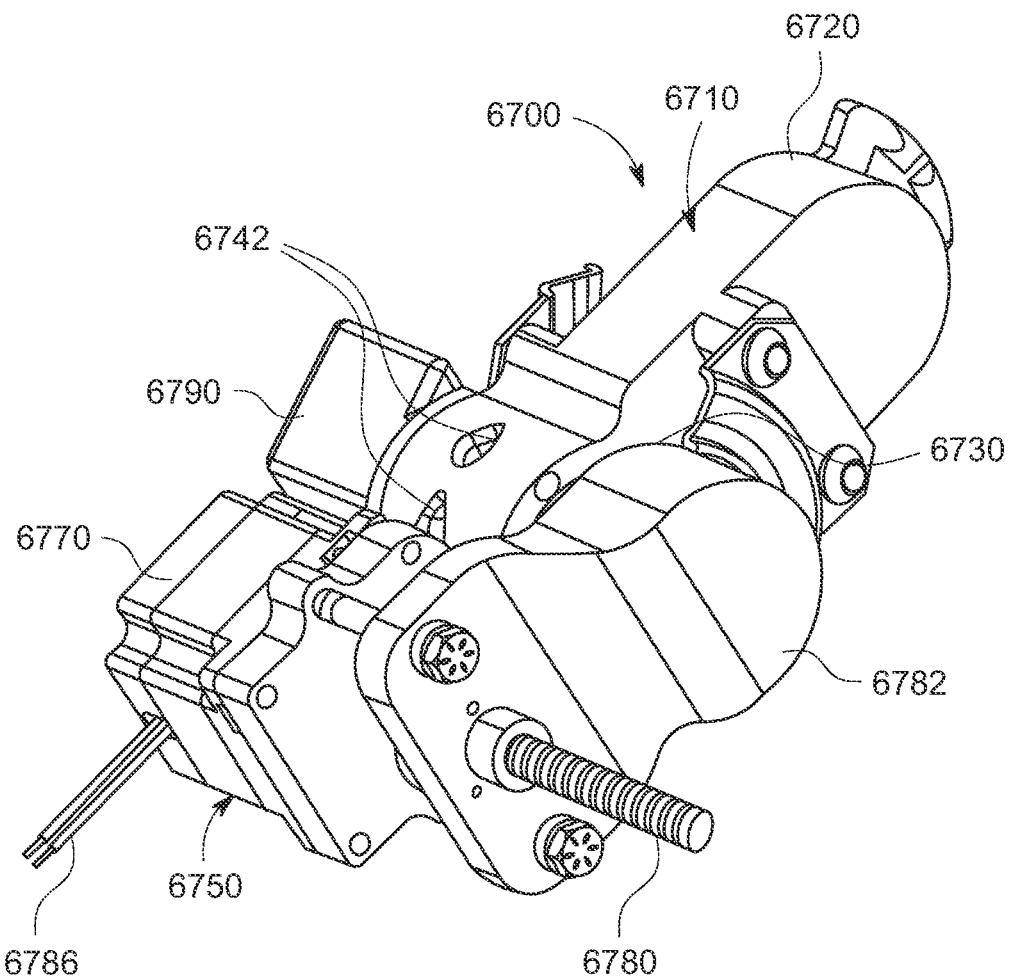
Figure 69:
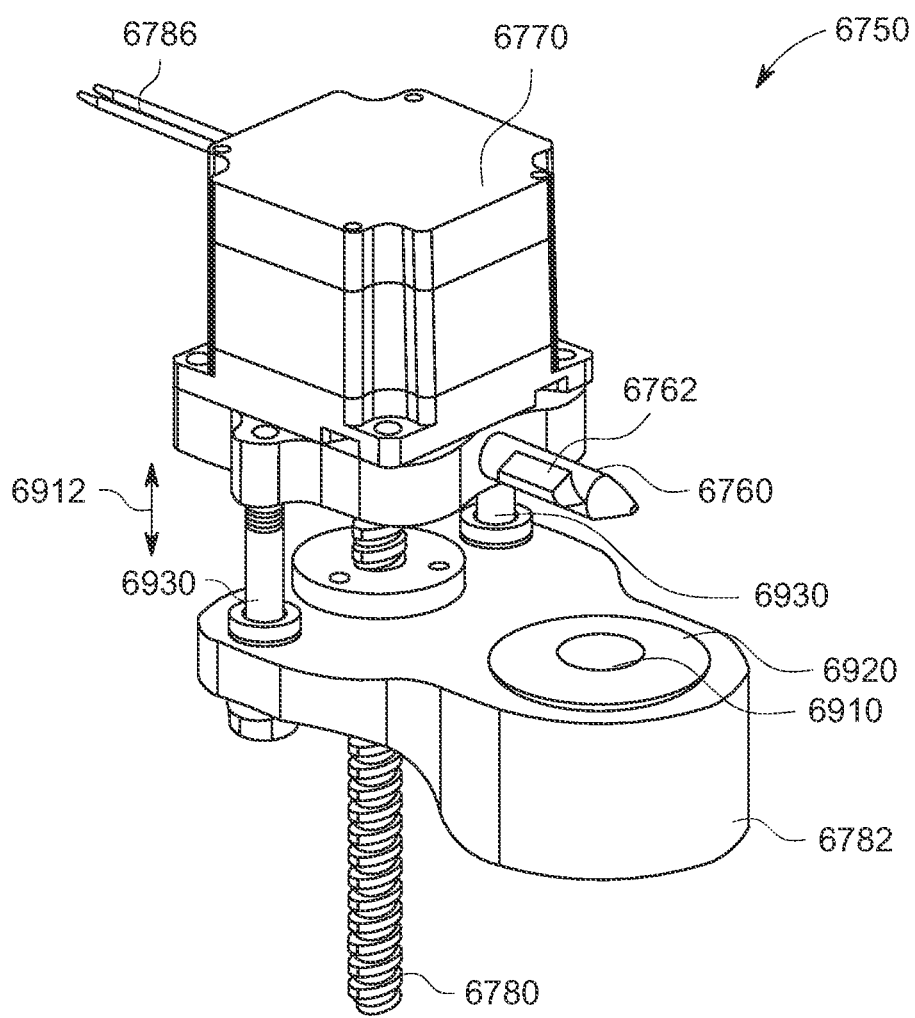
Figure 69A:
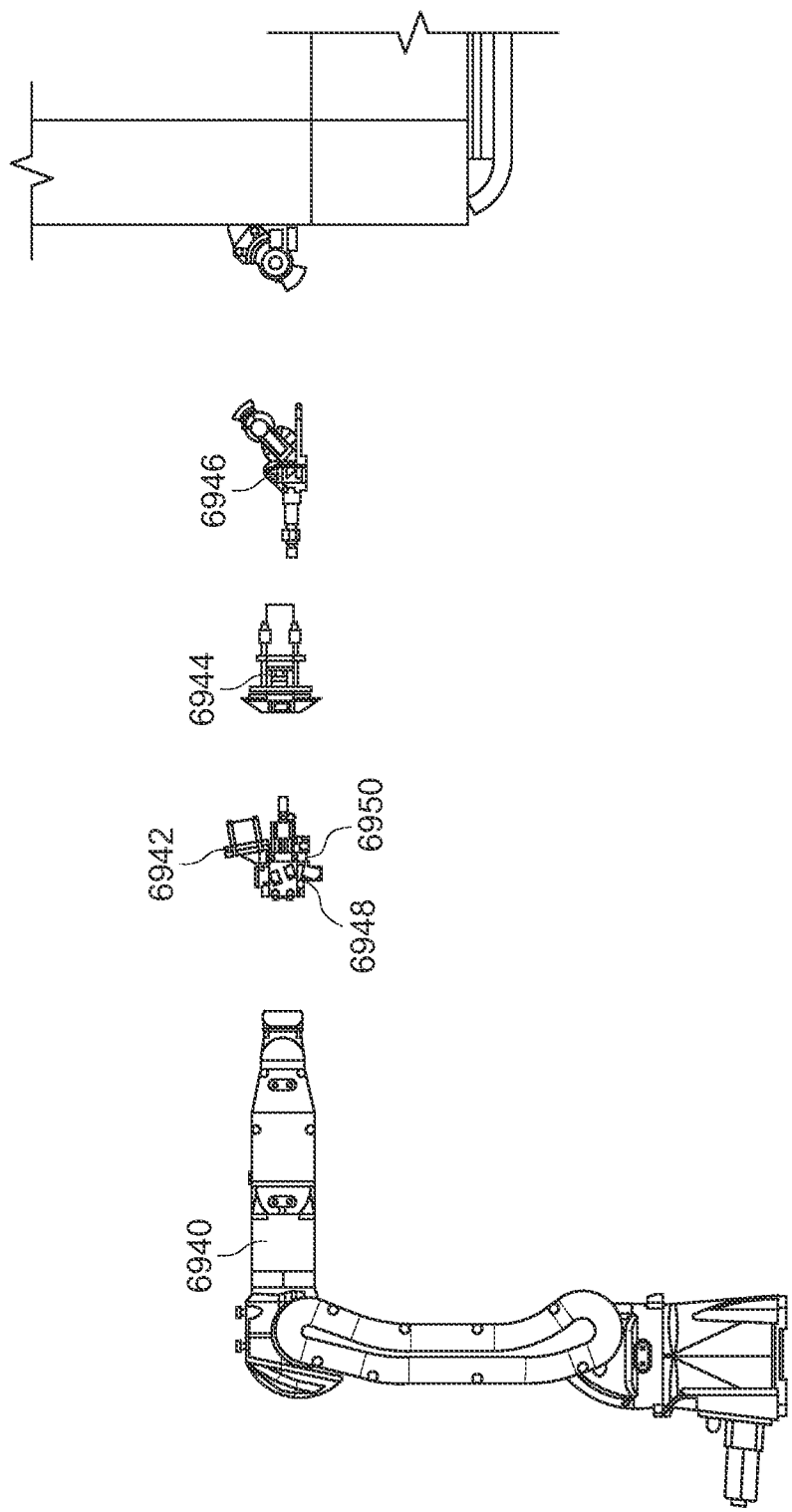
Figure 69B:
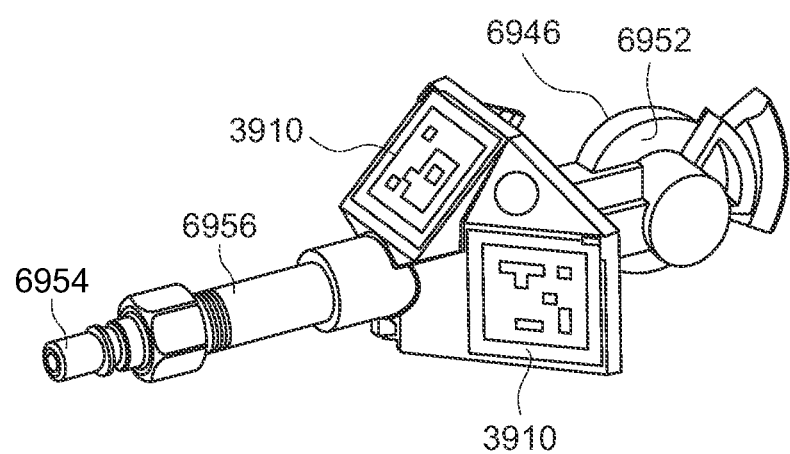
Figure 69C:
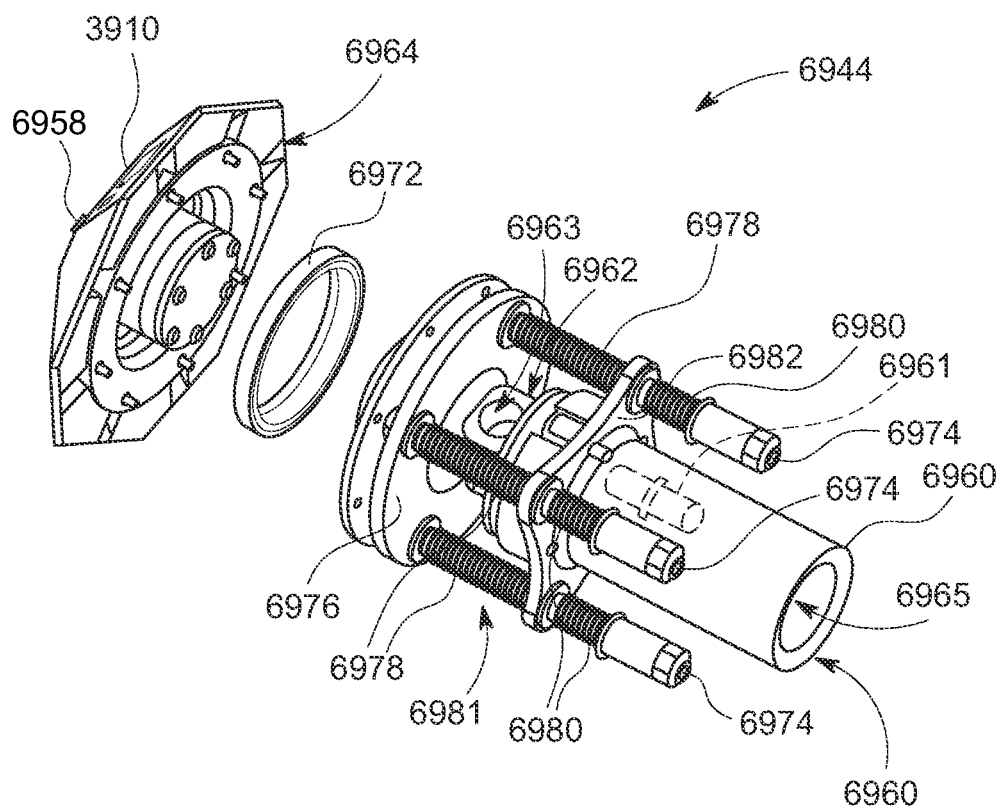
Figure 69D:
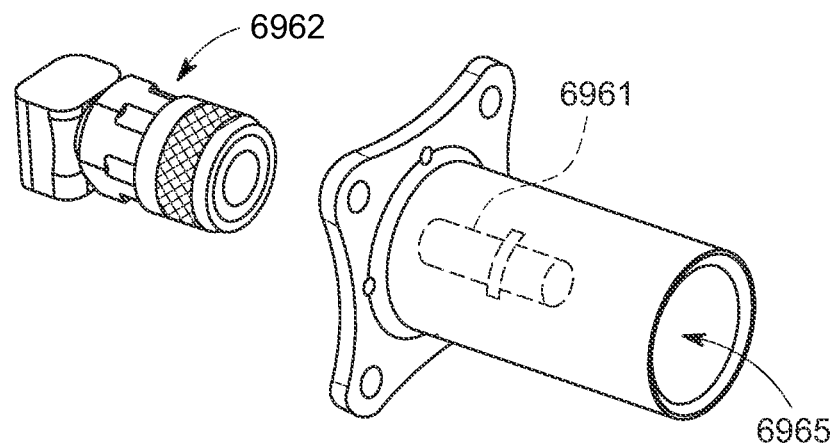
Figure 69E:
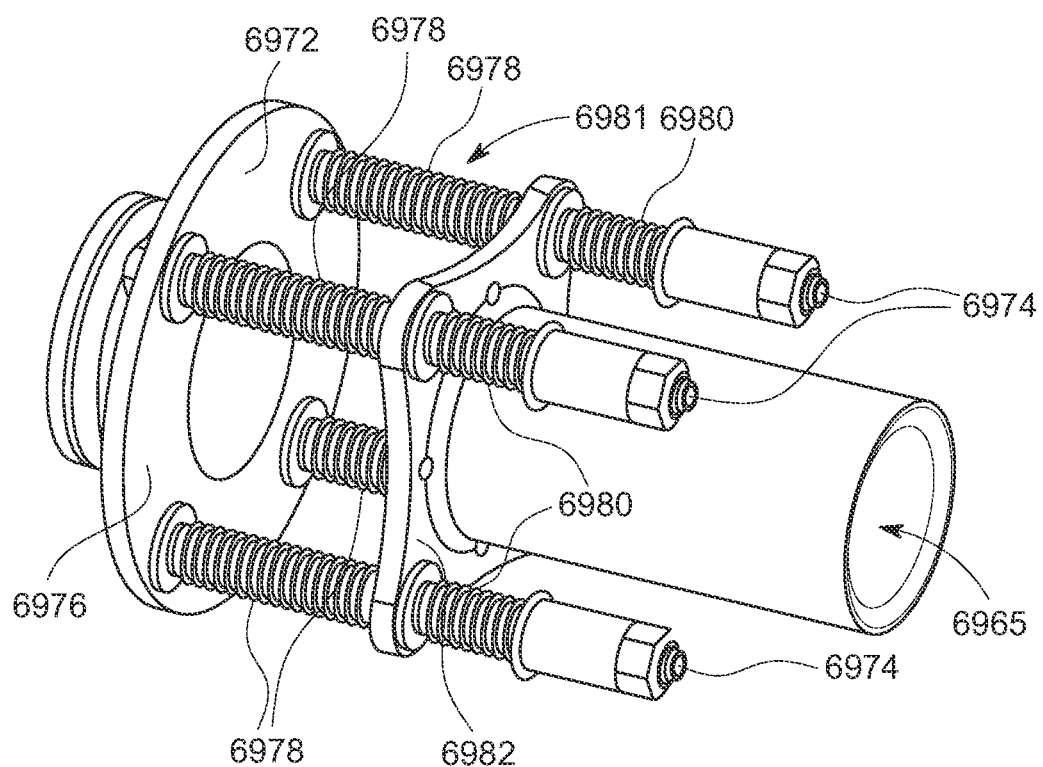
Figure 69J:
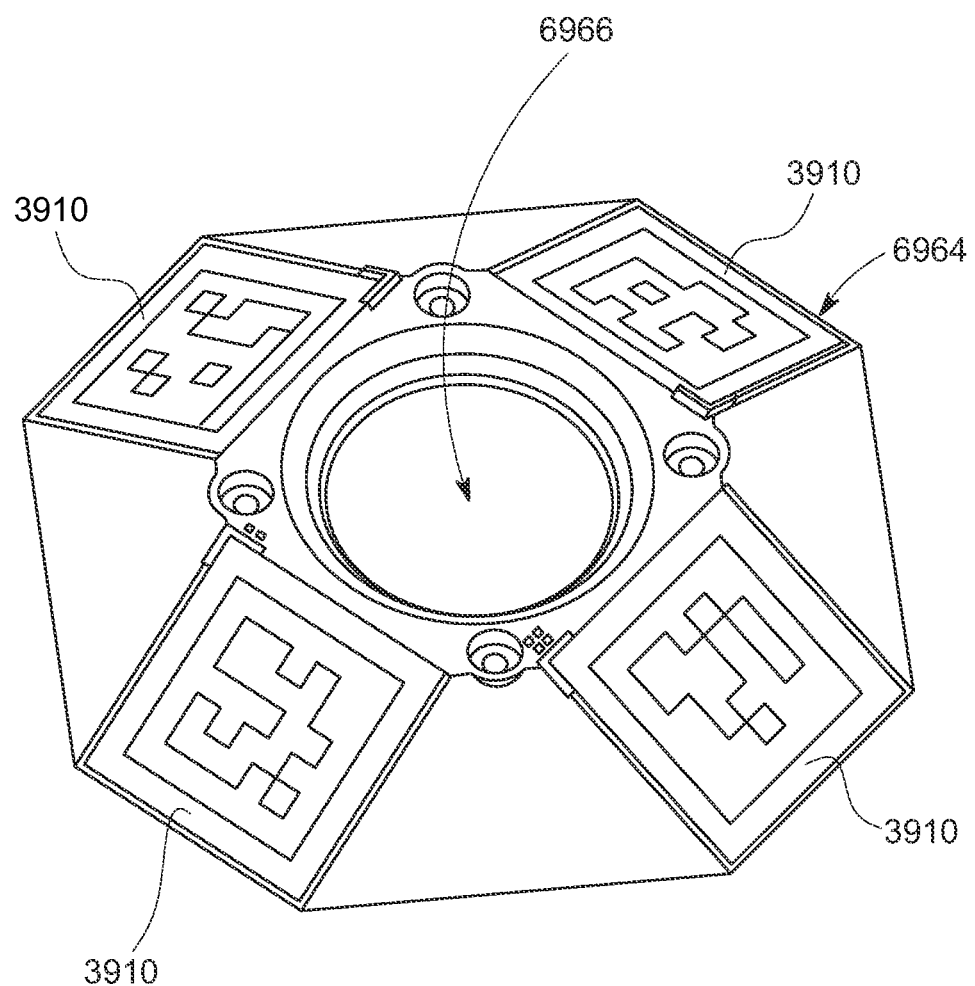
Figure 70:
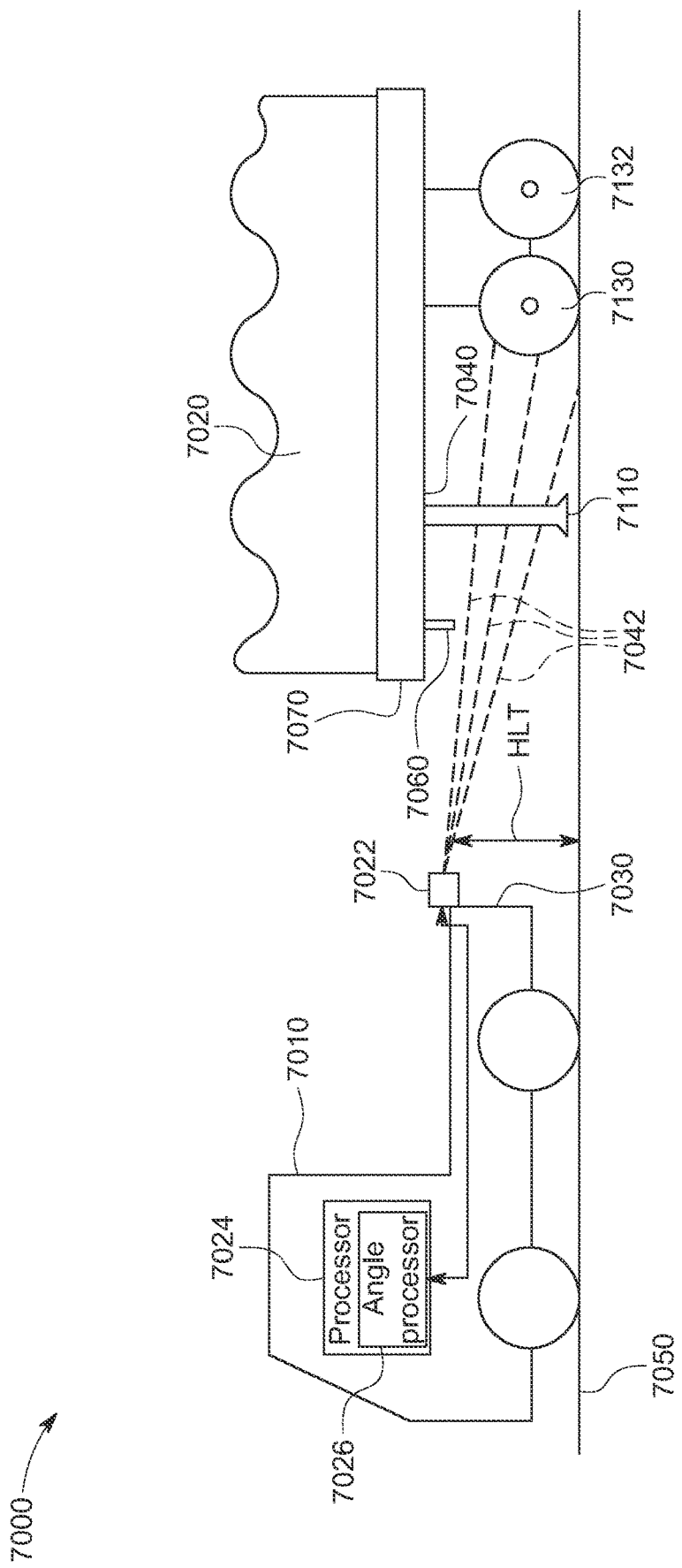
Figure 71:
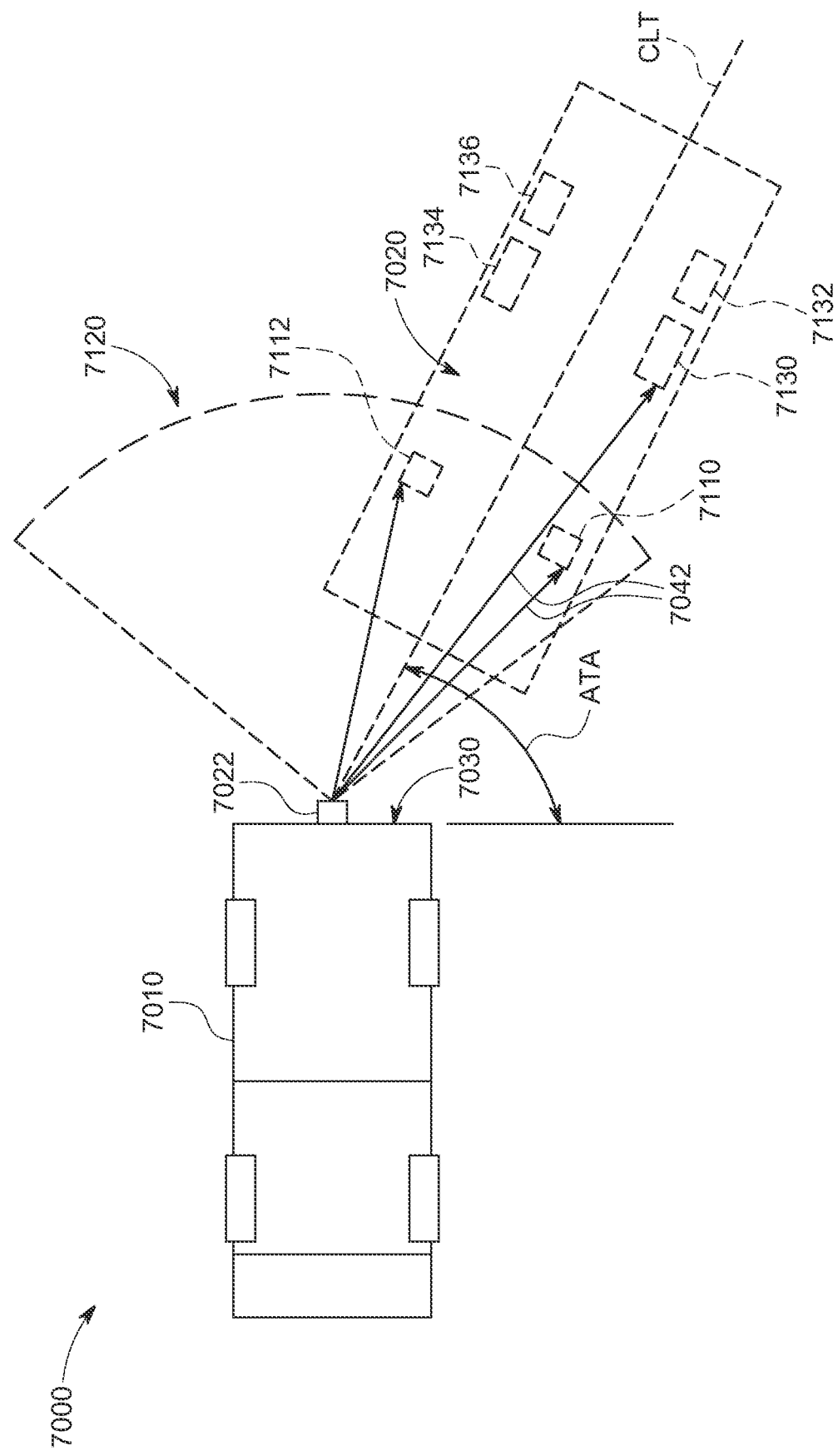
Figure 72:
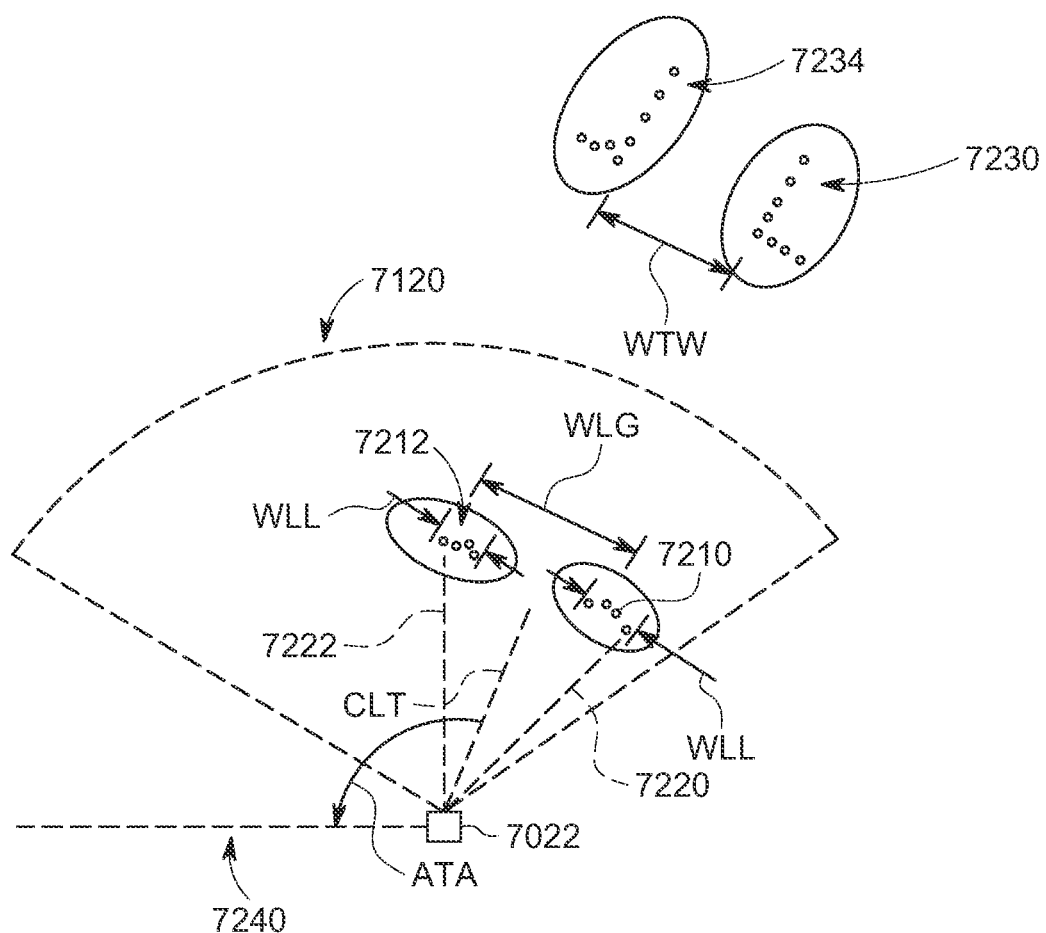
Figure 73:
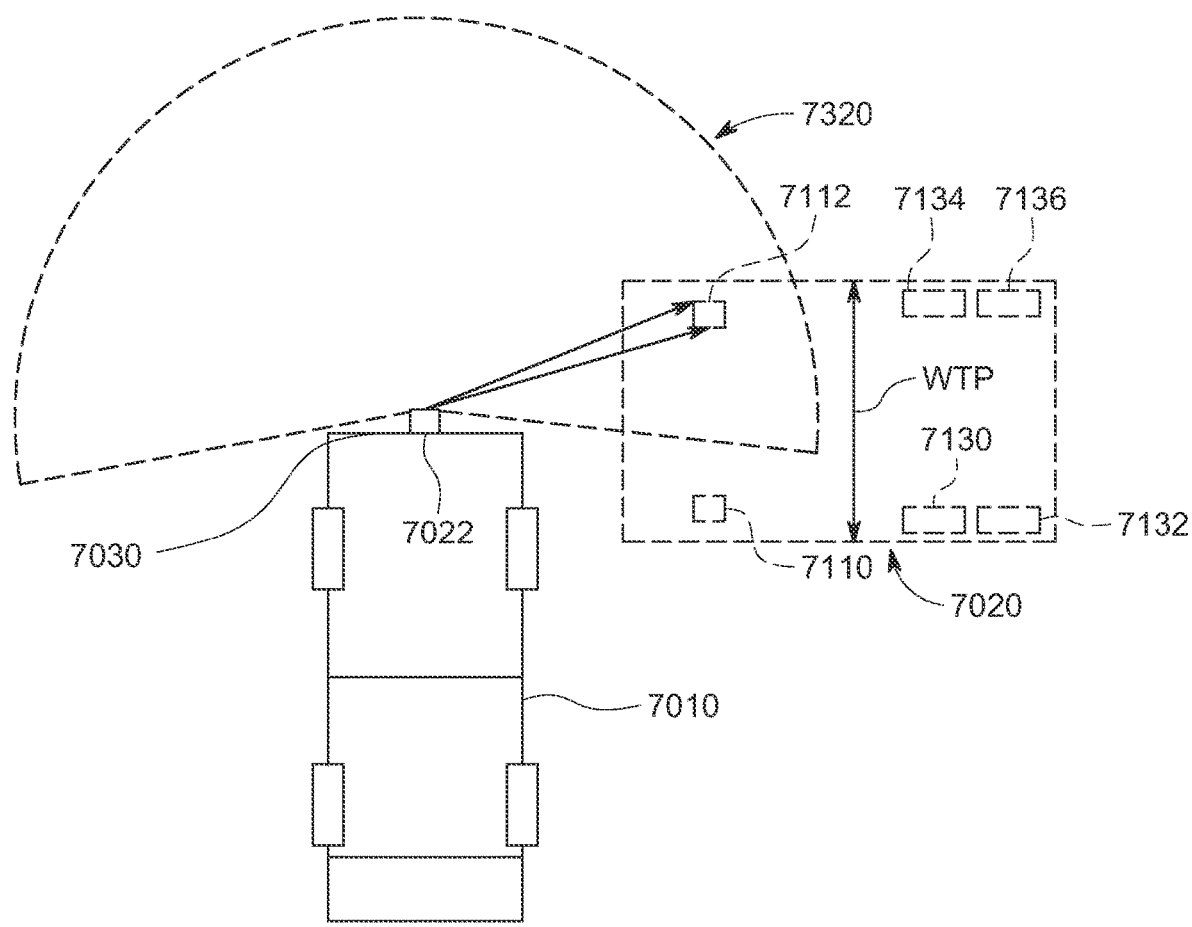
Figure 74:
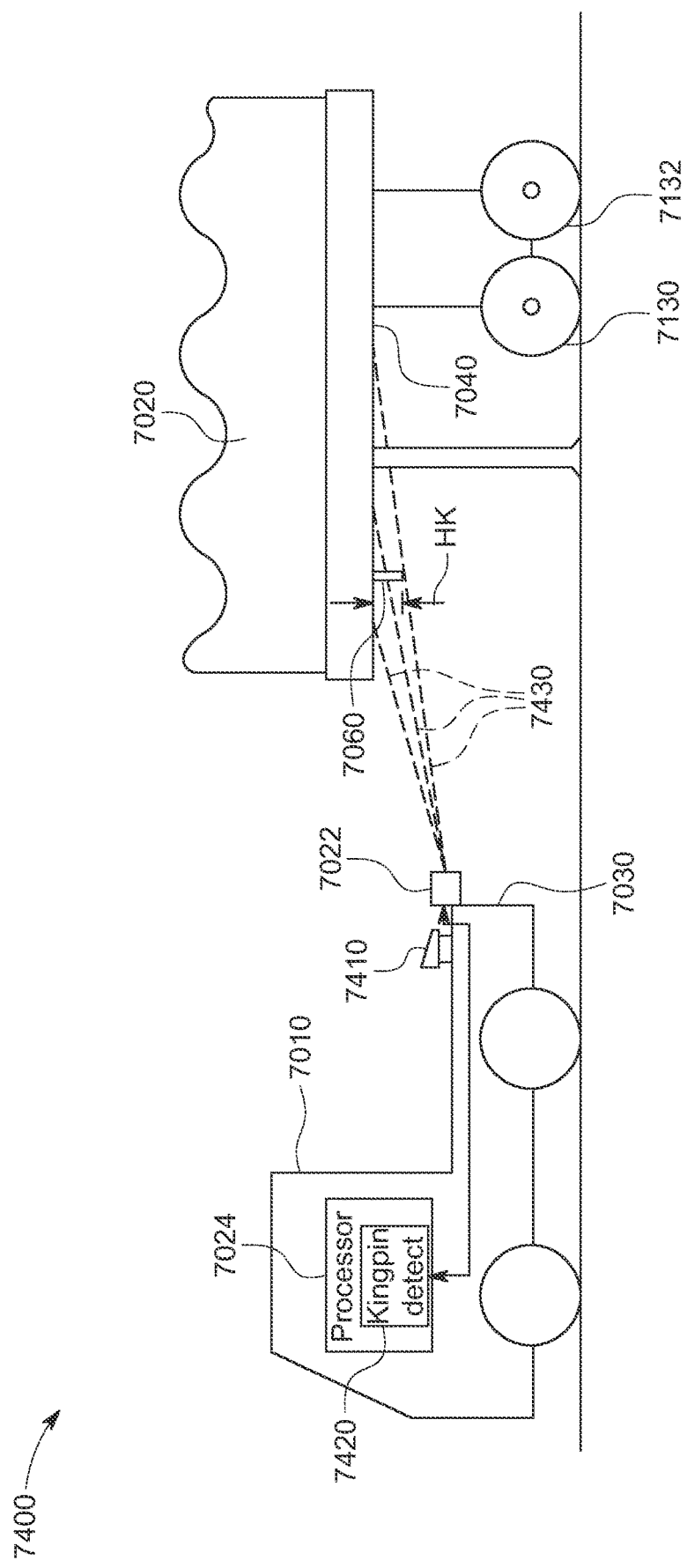
Figure 75:
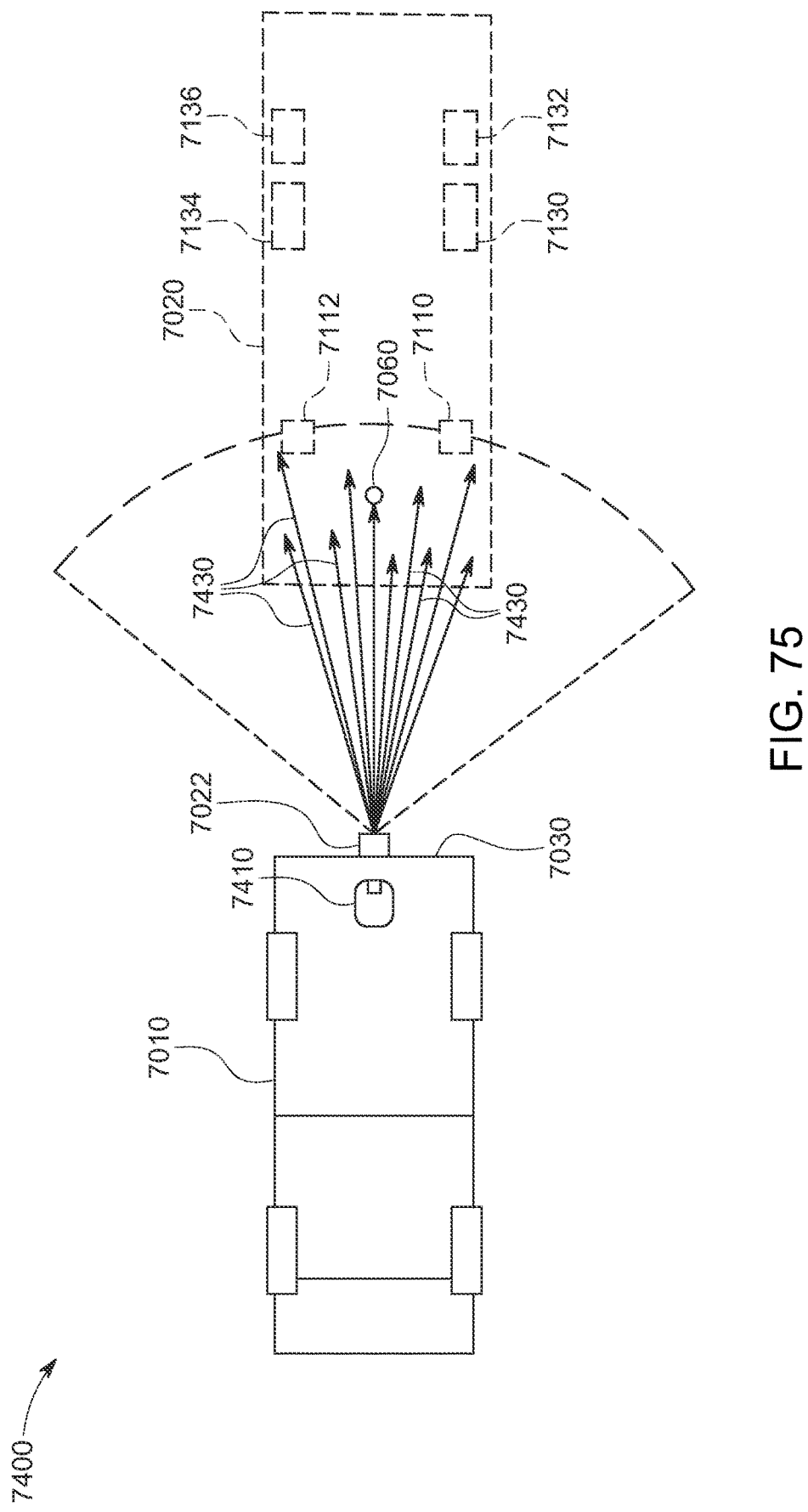
Figure 76:
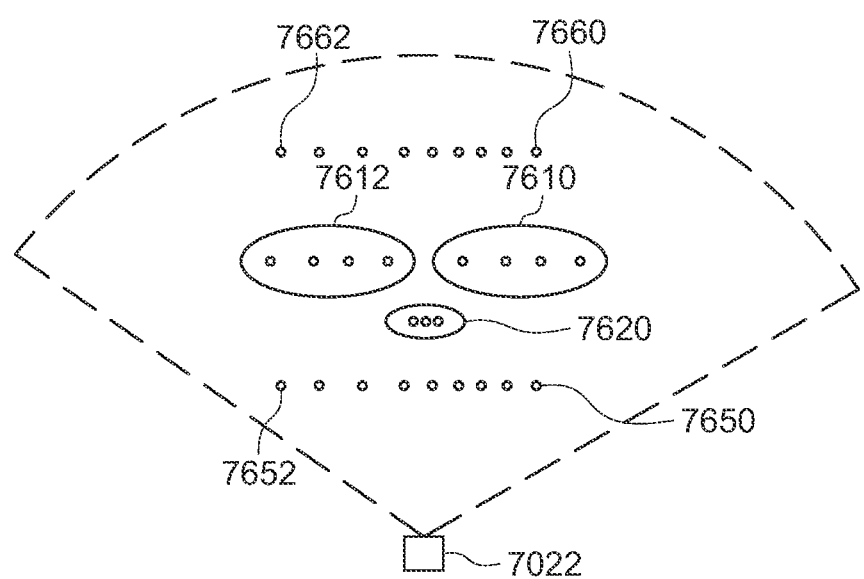
Figure 77:
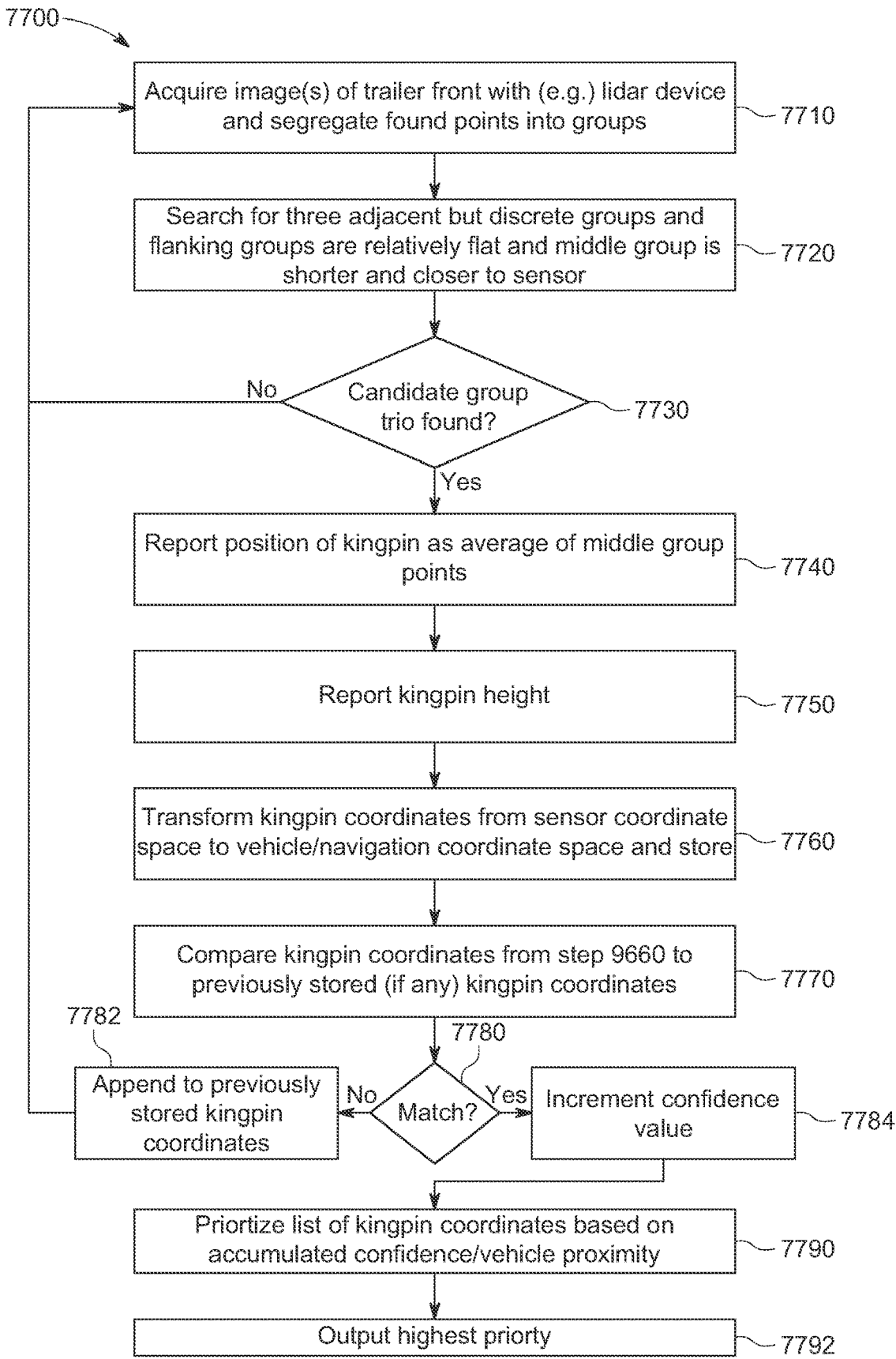
Figure 78:
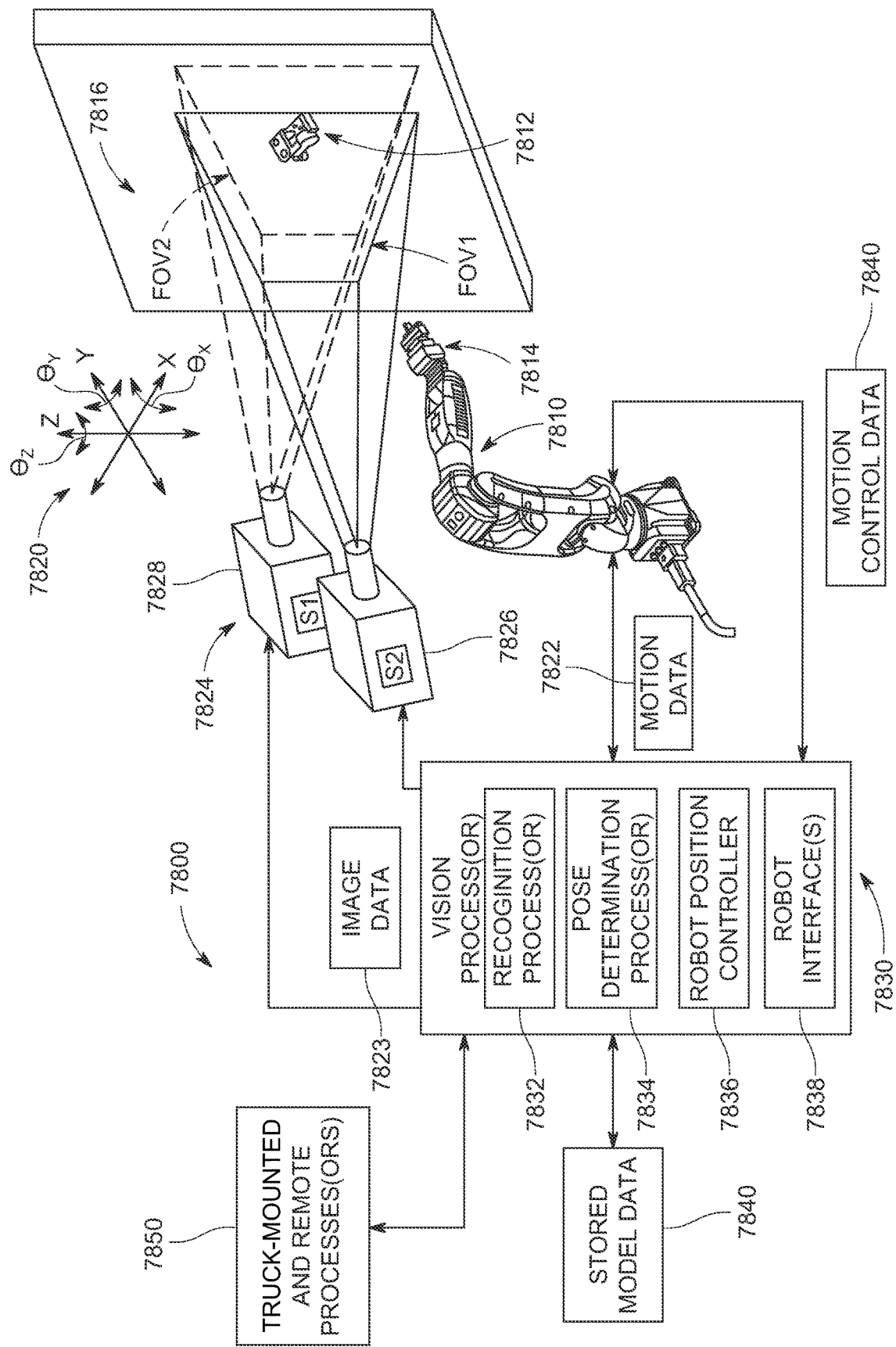
Figure 79:
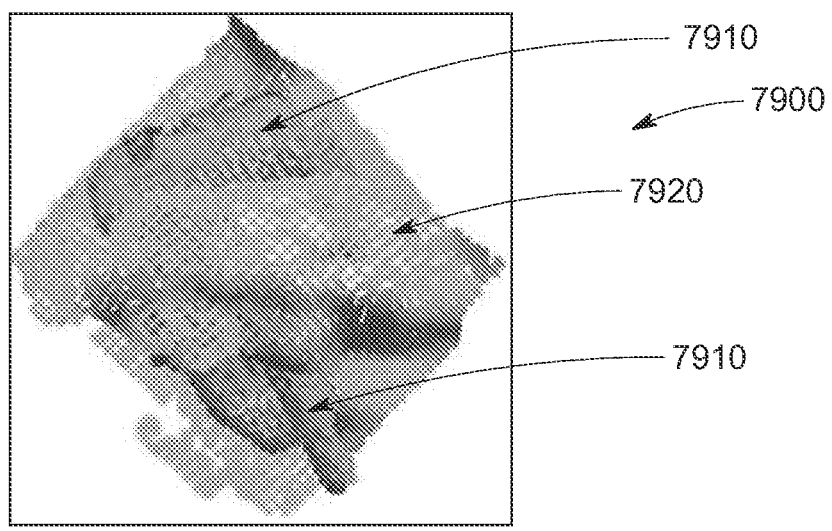
Figure 80:
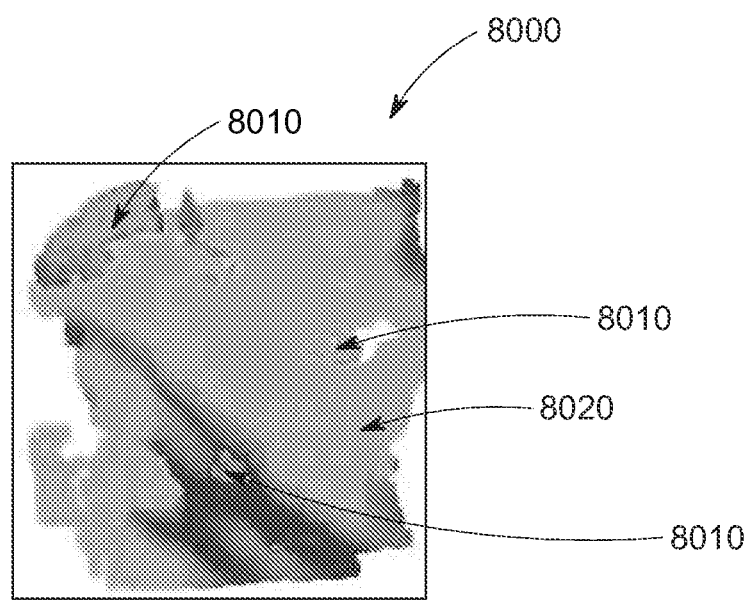
Figure 81:
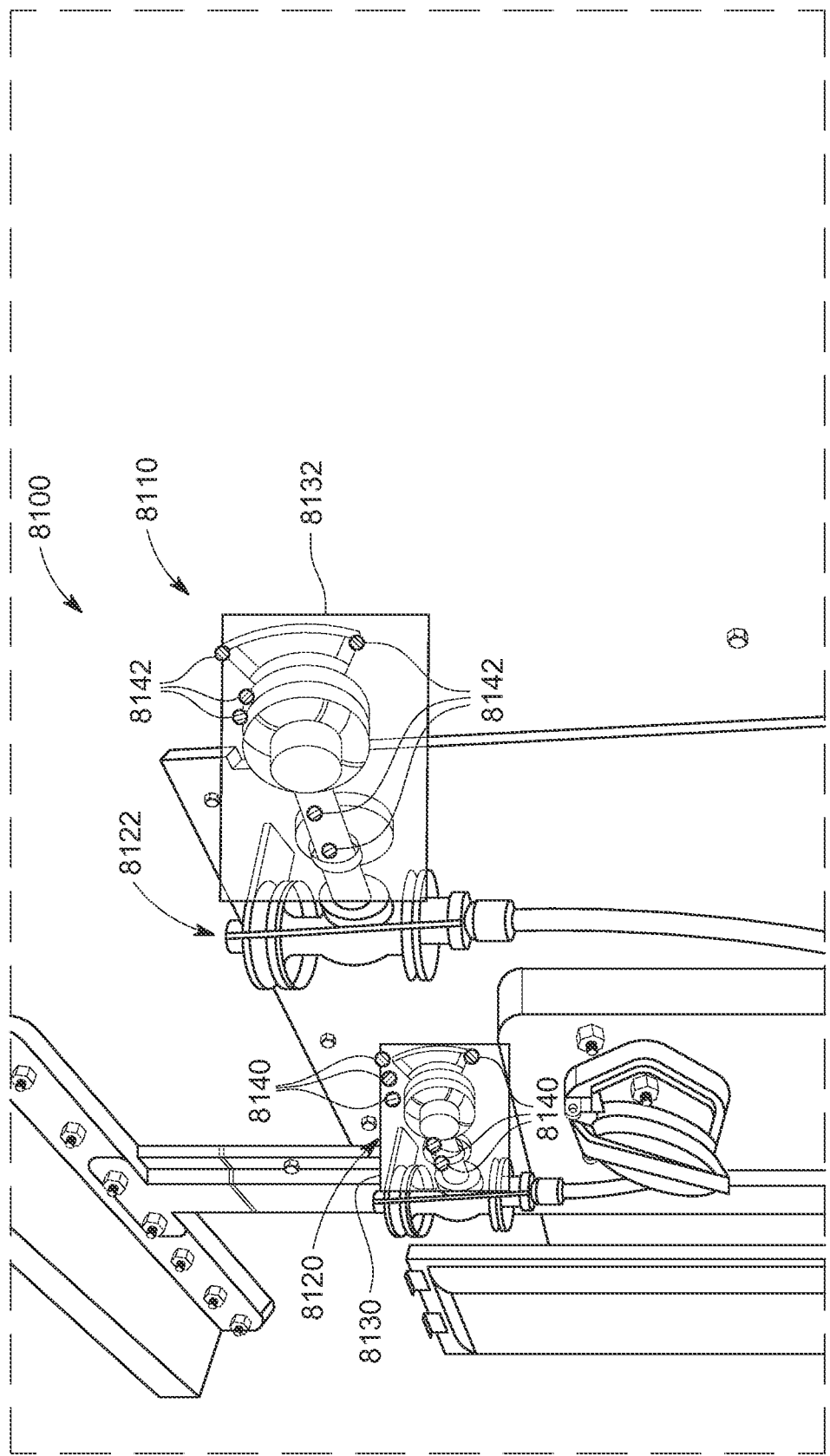
Figure 82:
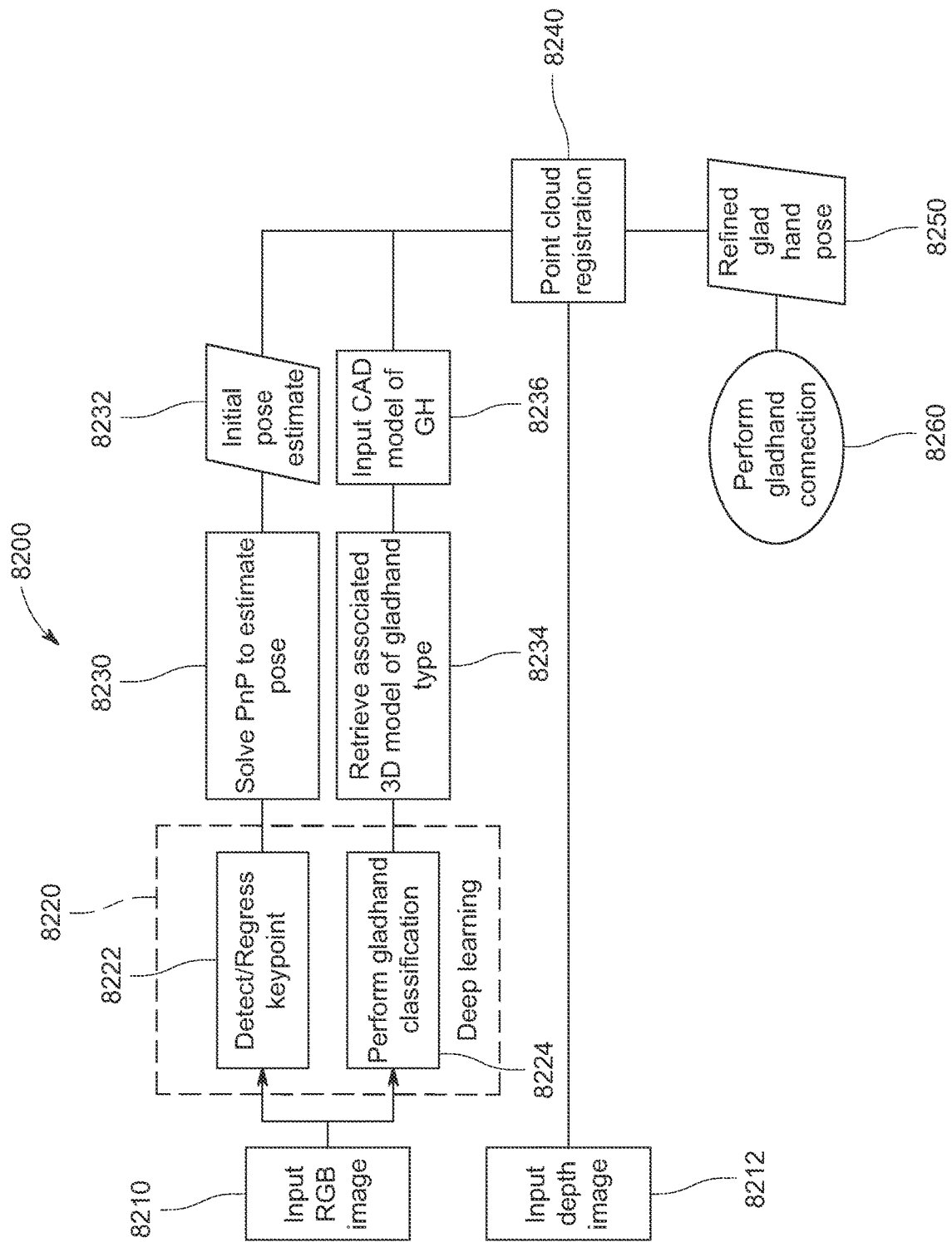
Figure 83:
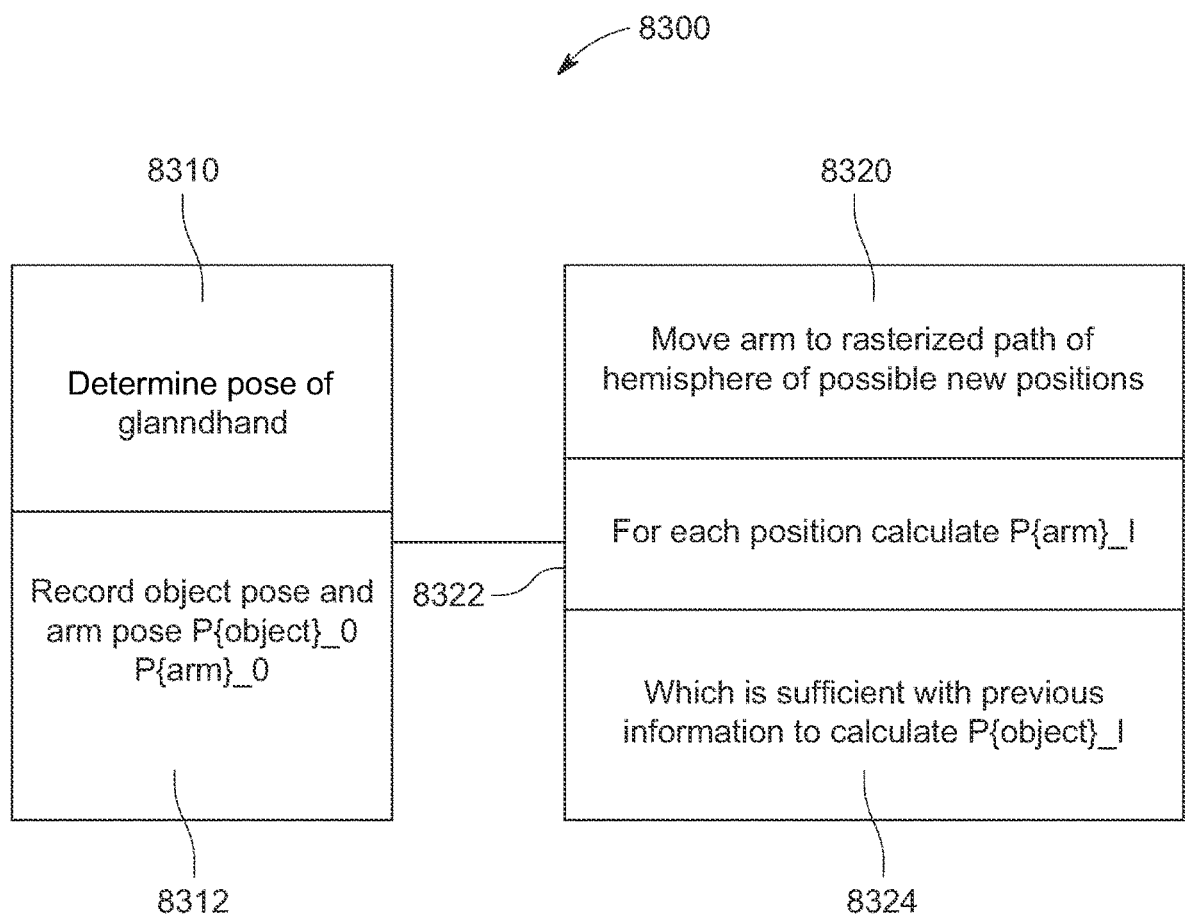
Figure 84:
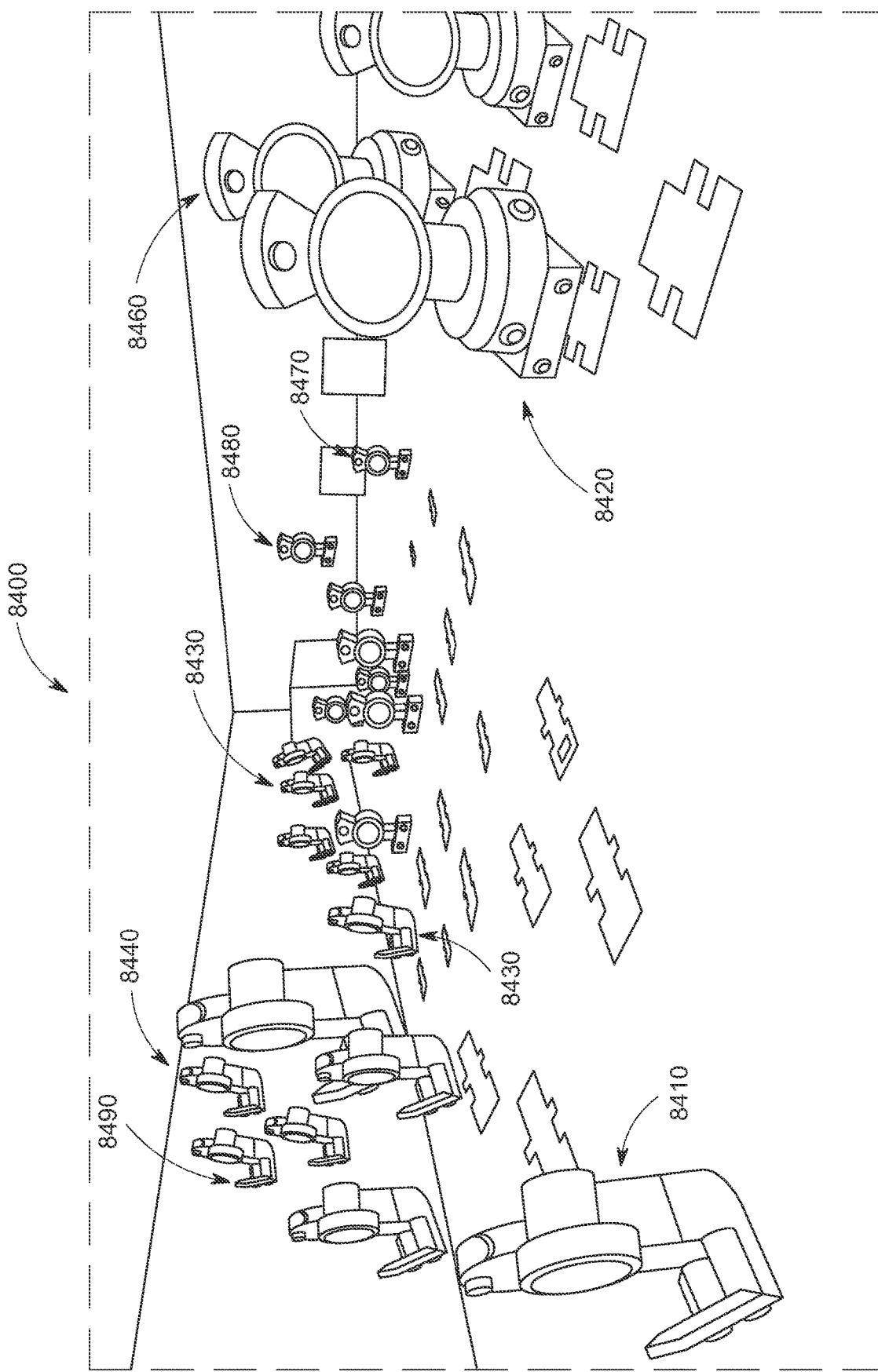
Figure 85:
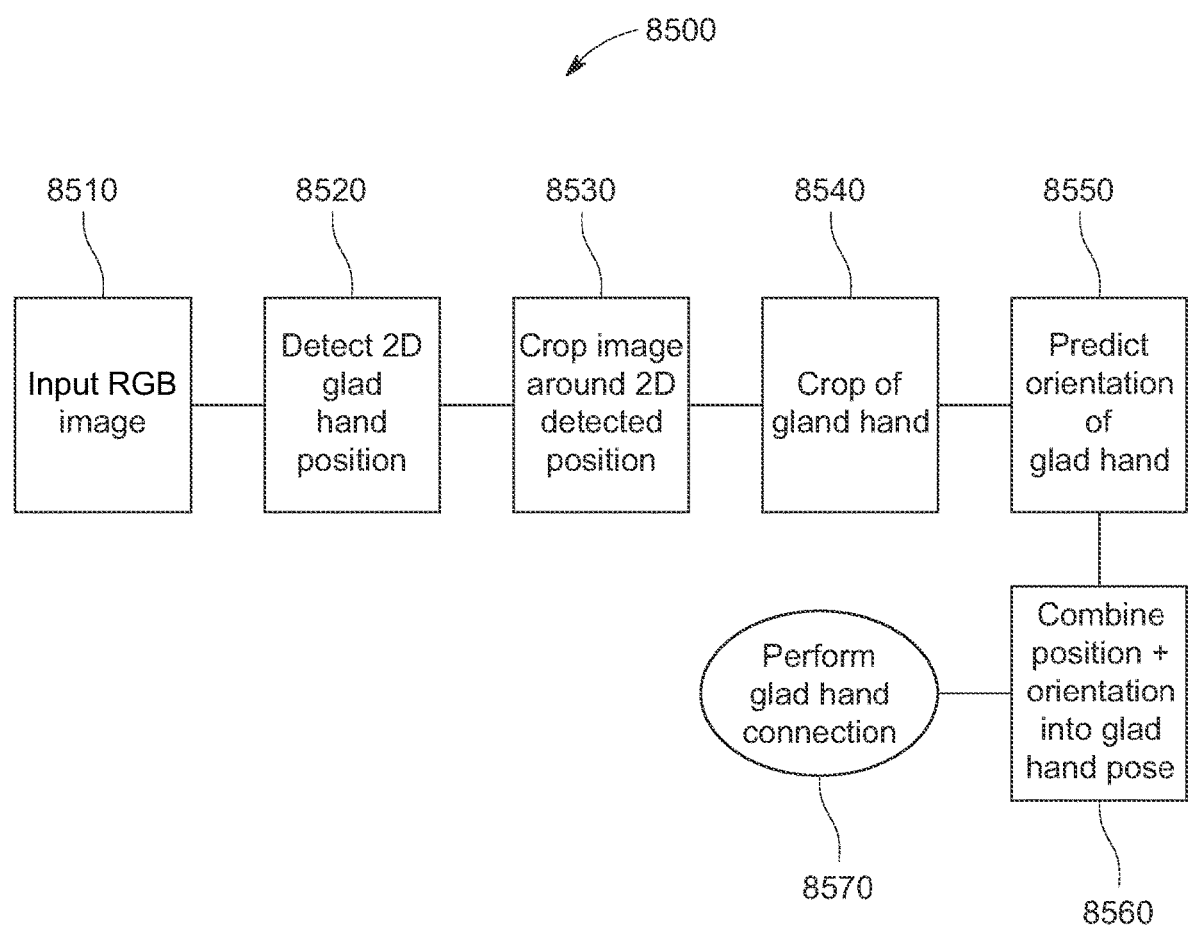

FIG. 67 is a perspective view of an autonomous-operation-favored glad hand adapter for connection to the trailer-side glad hand connection, that also allows for manual interconnection of a truck-side glad hand connector, and that employs a key-guided clamping tool having a lead screw driven clamping member for sealing against the truck-side glad hand connector, according to an embodiment, shown prior to engagement;

FIG. 68 is a perspective view of the arrangement of FIG. 67 shown after engagement;

FIG. 69 is a perspective view of the clamping tool of FIG. 67 shown in a opened, un-clamped position;

FIG. 69A is an exploded view of a multi-axis fine manipulation robotic arm with an end effector, a connection tool, an adaptor, and a trailer glad hand;

FIG. 69B is a perspective view of an adaptor tool with fiducial markings and a compliant tube for receiving a trailed based, male, quick-disconnect stem;

FIG. 69C is an exploded perspective view of a compliant connection tool with a fiducial-carrying end capo and a tube/funnel for receiving a trailer-mounted male quick-disconnect fitting;

FIG. 69D is an exploded perspective view of the funnel and female quick-disconnect fitting confronting the funnel, in line therewith for the connection tool of FIG. 69C;

FIG. 69E is a perspective view of the funnel and surrounding spring-based compliance structure for the connection tool of FIG. 69C;

FIG. 69F is a side cross section showing operation of the actuable, female quick-disconnect for the connection tool of FIG. 69C, shown approaching a male quick-disconnect fitting to make an airline connection therewith;

FIG. 69G is a side cross section of the quick-disconnect arrangement of FIG. 69F, showing the female and male quick-disconnects engaged, and the actuator de-energized;

FIG. 69H is side cross section of the quick-disconnect arrangement of FIG. 69F, showing the female and male quick-disconnects engaged, and the actuator energized to lock the quick-disconnects together and complete the airline pressure circuit;

FIG. 69I is a side cross section of the fiducial-carrying end cap for the connection tool of FIG. 69C;

FIG. 69J is a perspective view of the fiducial-carrying end cap of FIG. 69I;

FIG. 70 is a side view of an autonomous (e.g. yard) truck and trailer, arranged to allow hitching thereof together using a truck-rear-mounted high-resolution LIDAR device and associated process(or) that locates and determines the relative angle of the trailer (centerline) with respect to the truck;

FIG. 71 is a top view of the truck and trailer arrangement of FIG. 69 showing locations of trailer landing gear and wheel sets with respect to the beam pattern of the rear-mounted LIDAR device;

FIG. 72 is a top view of the LIDAR-device-scanned area of the trailer of FIGS. 70 and 71, showing point groups representative of landing gear legs and wheels, used in determining the relative trailer angle;

FIG. 73 is a top view of the truck and trailer arrangement of FIGS. 70 and 71 being scanned by the LIDAR device beams where the trailer centerline is oriented at an approximate right angle to the central axis of the beam cone/truck centerline, in which one trailer landing gear leg is occluded from view;

FIG. 74 is a side view of an autonomous (e.g. yard) truck and trailer, arranged to allow hitching thereof together using a truck-rear-mounted high-resolution LIDAR device and associated process(or) that locates and determines the position of the trailer kingpin used to hitch to the truck fifth wheel;

FIG. 75 is a top view of the truck and trailer arrangement of FIG. 74 showing locations of trailer kingpin, landing gear and wheel sets with respect to the beam pattern of the rear-mounted LIDAR device;

FIG. 76 is a top view of the LIDAR-device-scanned area of the trailer of FIGS. 74 and 75, showing point groups representative of the kingpin and landing gear legs, used in determining the position of the kingpin within the vehicle/navigation coordinate space;

FIG. 77 is a flow diagram showing a procedure for identifying and determining the position of the trailer kingpin using the LIDAR device in accordance with FIGS. 74-76;

FIG. 78 is a diagram showing an overview of a machine vision system for recognizing/classifying and determining the pose of a trailer-mounted glad hand to guide a robot manipulator for performing an airline connection thereto;

FIG. 79 is a diagram showing a representation of a 3D point cloud of an exemplary glad hand undergoing an iterative closest point registration technique, in an unaligned state;

FIG. 80 is a diagram showing a representation of a 3D point cloud of an exemplary glad hand undergoing an iterative closest point registration technique, in an aligned state;

FIG. 81 is a diagram showing an exemplary image of a trailer front face as acquired by the vision system of FIG. 78, and showing glad hands with keypoints established at resolvable features thereon;

FIG. 82 is a flow diagram showing a hybrid technique for determining six degree of freedom (6DOF) pose through use of deep learning to detect keypoints and classify a type of glad hand;

FIG. 83 is a block diagram showing a process for guiding a robotic manipulator arm using an alternate vision system process for finding a (6DOF) glad hand pose, which includes determining a ground truth glad hand pose, and then using the manipulator arm while keeping track of arm position;

FIG. 84 is an exemplary image of a multiplicity of glad hands in differing poses rendered in a virtual environment for use in guiding a robotic manipulator arm in conjunction with a vision system; and FIG. 85 is an exemplary embodiment of one of a variety of possible techniques for determining a 6DOF pose of a glad hand, for use in guiding a manipulator arm, which employs 2D imaging and an autoencoder approach.

DETAILED DESCRIPTION

I. Overview

Figure 1:
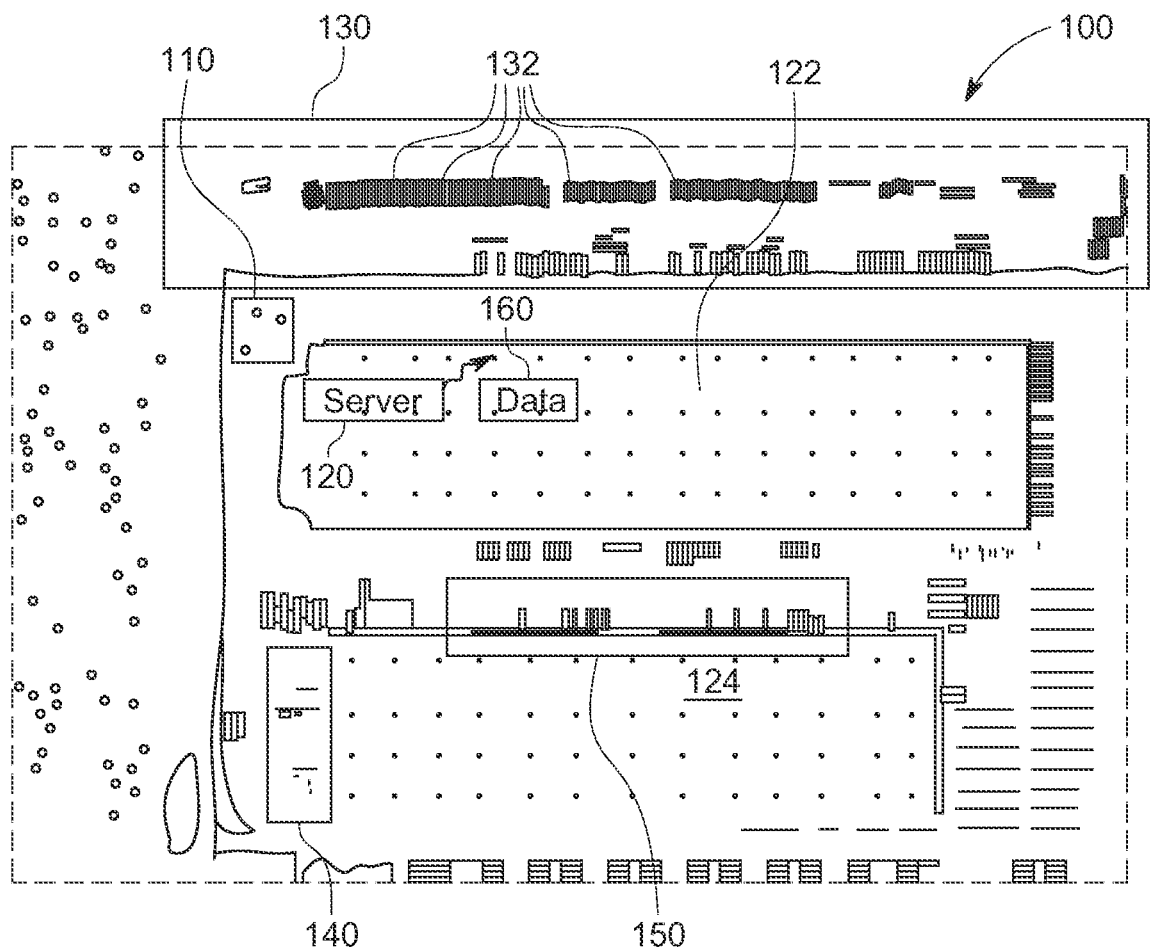
FIG. 1 is a diagram showing an aerial view of an exemplary shipping facility with locations for storing, loading and unloading trailers used in conjunction with the AV yard truck arrangements provided according to a system and method for handling trailers within a yard.

FIG. 1 shows an aerial view of an exemplary shipping facility 100, in which over-the-road (OTR) trucks (tractor trailers) deliver goods-laden trailers from remote locations and retrieve trailers for return to such locations (or elsewhere—such as a storage depot). In a standard operational procedure, the OTR transporter arrives with a trailer at a destination's guard shack (or similar facility entrance checkpoint) 110. The guard/attendant enters the trailer information (trailer number and QR (ID) code scan-imbedded information already in the system, which would typically include: trailer make/model/year/service connection location, etc.) into the facility software system, which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant would then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (YMS), which can reside of the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its marked parking space in order to retrieve the trailer. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth ($5^{th}$) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage, confirming tire inflation levels, and verifying other safety criteria.

The hitched trailer is hauled by the AV yard truck to an unloading area 140 of the facility 124. It is backed into a loading bay in this area, and the opened rear is brought into close proximity with the portal and cargo doors of the facility. Manual and automated techniques are then employed to offload the cargo from the trailer for placement within the facility 124. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 124. The trailer, with rear swing (or other type of door(s)) open, is backed into a loading bay and loaded with goods from the facility 124 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors on the AV yard truck and/or other manual or automated data collection devices—for example, terrestrial and/or aerial camera drones.

Having described a generalized technique for handling trailers within a facility reference is now made to FIGS. 2-4, which show exemplary yard trucks 200 and 300 for use with the various embodiments described hereinbelow. The yard truck 200 (FIG. 2) is powered by diesel or another internal combustion fuel, and the yard truck 300 (FIGS. 3 and 4) electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200, 300 of each example respectively includes at least a driver's cab section 210, 310 (which can be omitted in a fully autonomous version) and steering wheel (along with other manual controls) 212, 412 and a chassis 220, 320, 420 containing front steerable wheels 222, 322, and at least one pair of rear, driven wheels 224, 324 (shown herein as a double-wheel arrangement for greater load-bearing capacity). The respective chassis 220, 320 also includes a so-called fifth ($5^{th}$) wheel 240, 340, that (with particular reference to the truck 300 in FIGS. 3 and 4) is arranged as a horseshoe-shaped pad 342, 442 with a rear-facing slot 344 (FIG. 3), which is sized and arranged to receive the kingpin hitch (shown and described further below) located at the bottom of a standard trailer (not shown). The fifth wheel 240, 340, 440 is shown tilted downwardly in a rearward direction so as to facilitate a ramping action when the truck is backed onto the trailer in FIG. 2. In FIG. 4, the fifth wheel 440 is shown raised by a lever arm assembly 442, which, as described below, allows the landing gear of the trailer (when attached) to clear the ground during hauling by the truck 400. The lever assembly 442 or other fifth wheel-lifting mechanisms can employ appropriate hydraulic lifting actuators/mechanisms known to those of skill so that the hitched trailer is raised at its front end. In this raised orientation, the hitch between the truck and trailer is secured.

The AV yard truck can include a variety of sensors as described generally above, that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.).

Figure 2:
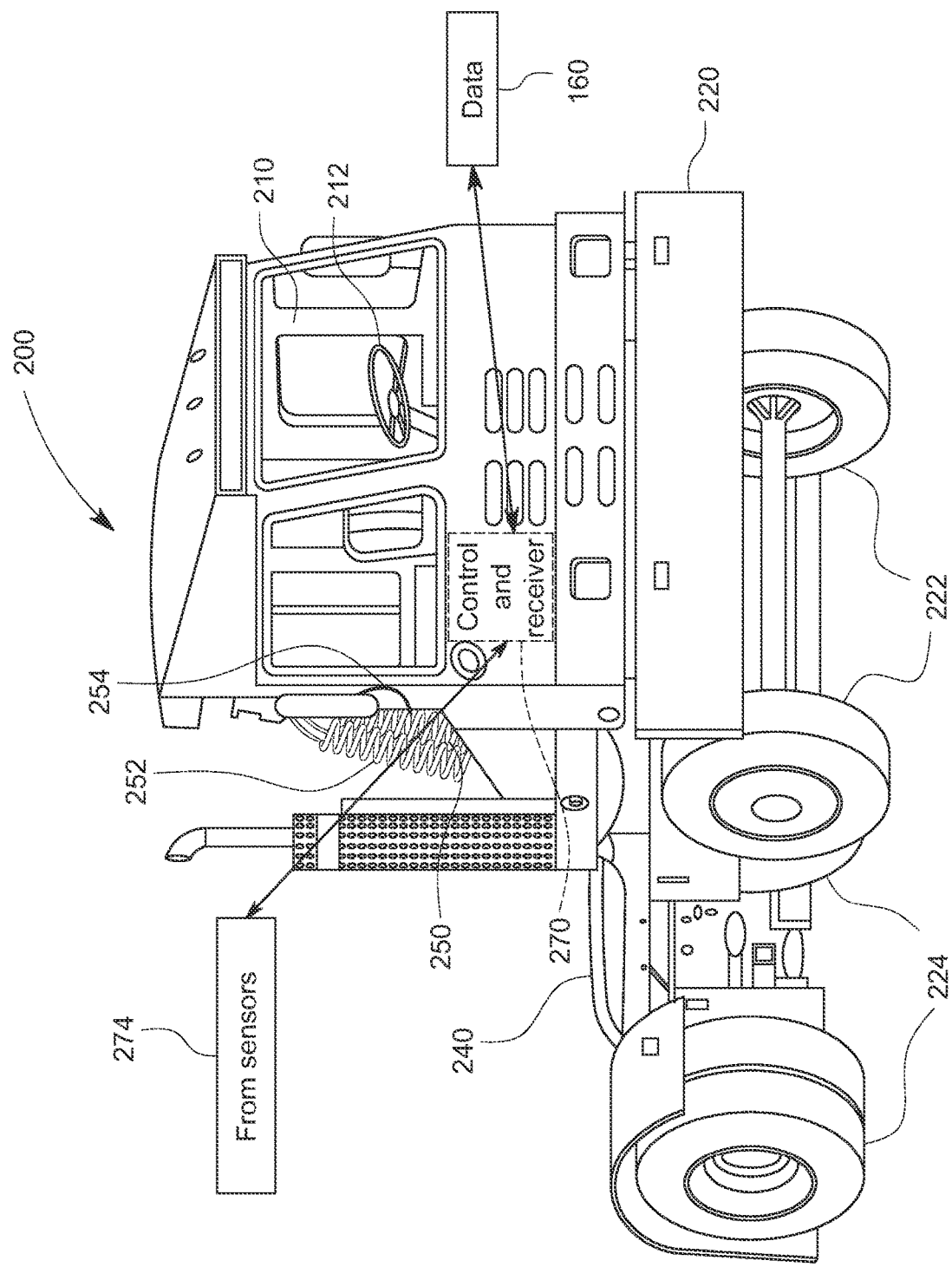
FIG. 2 is a perspective view of a fuel-powered AV yard truck for use in association with the system and method herein.
Figure 3:
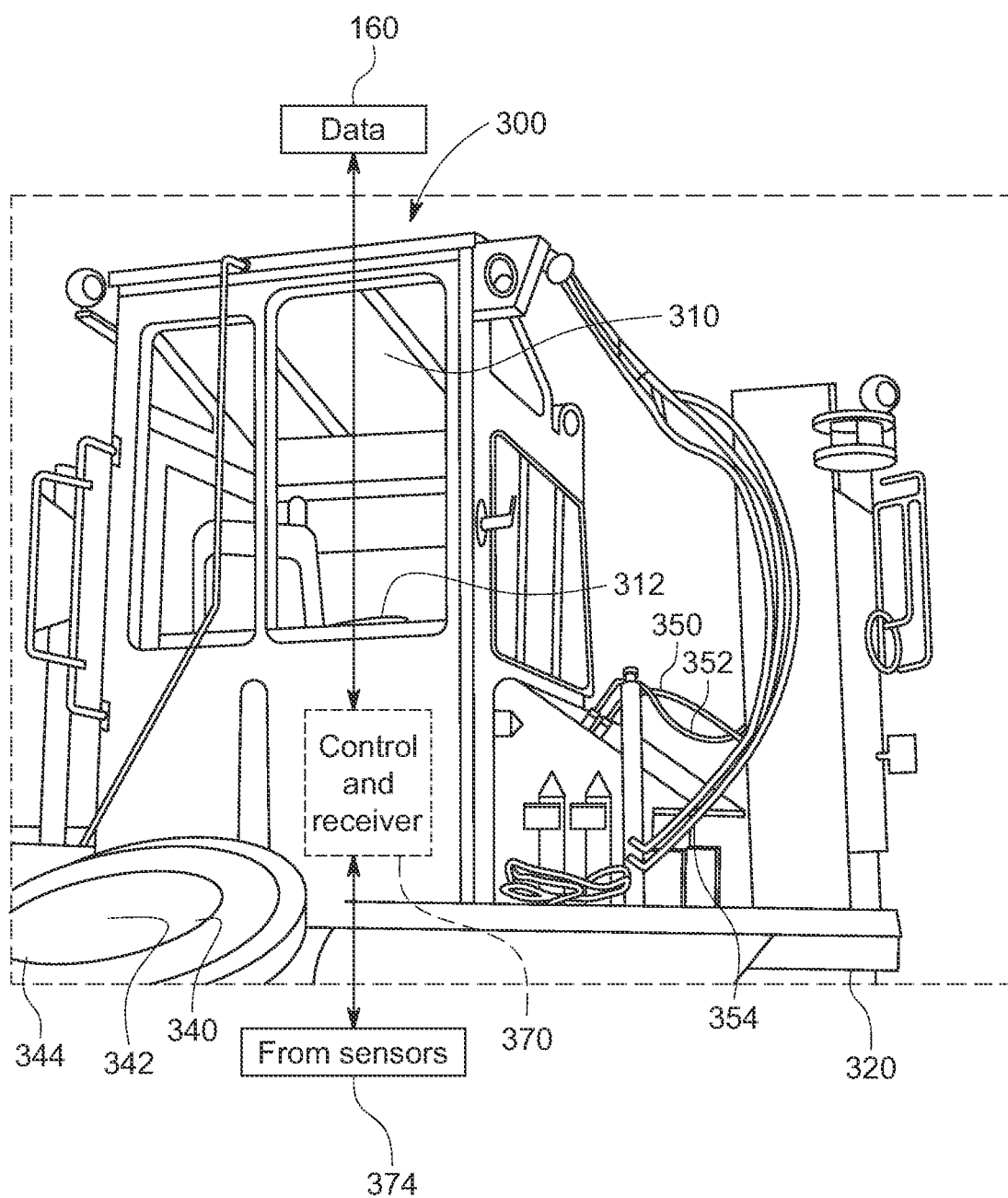
FIG. 3 is a rear-oriented perspective view of an electrically powered AV yard truck for use in association with the system and method herein, showing service connections (e.g. pneumatic braking and electrical) thereof.
Figure 4:
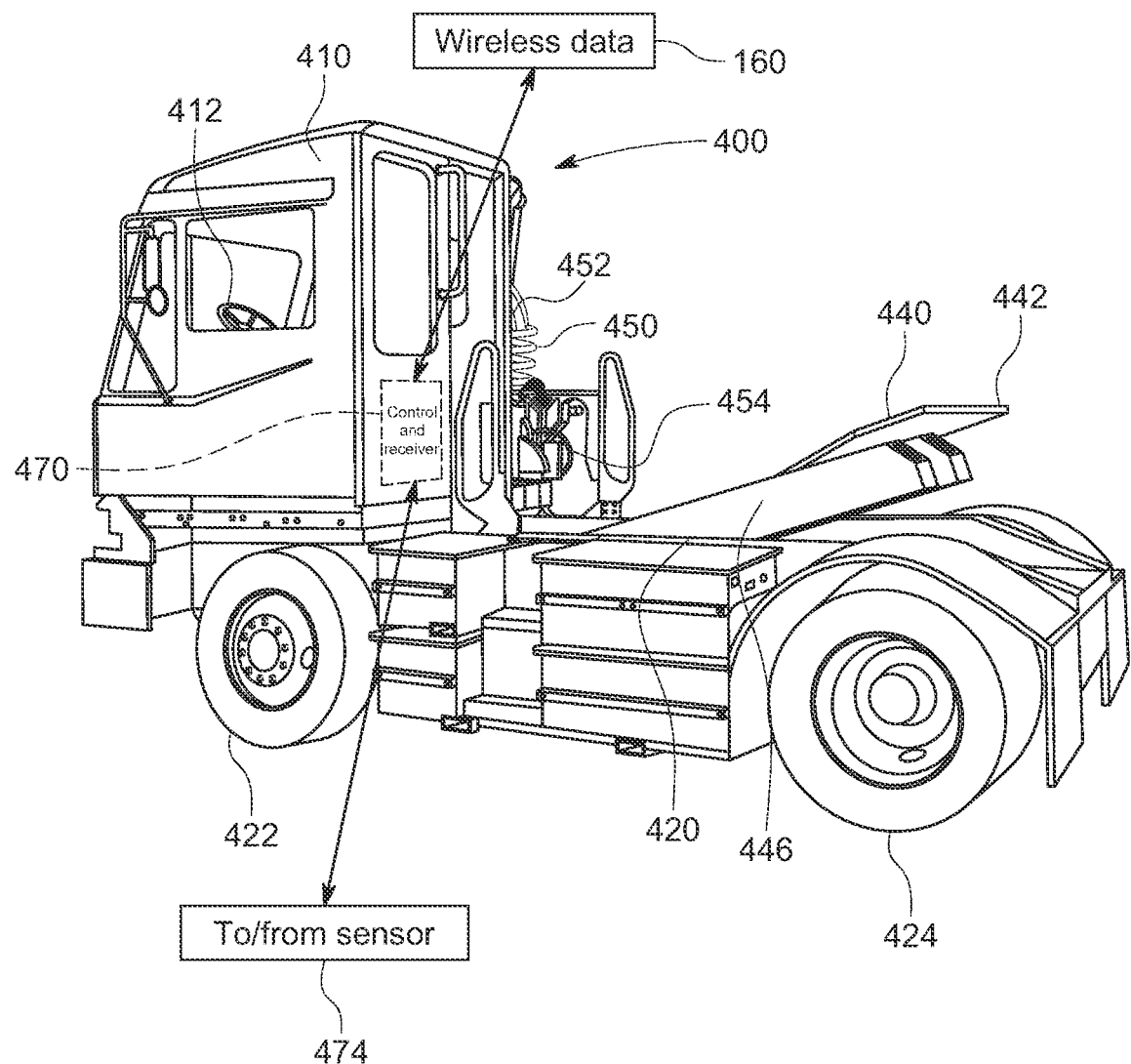
FIG. 4 is a rear-oriented perspective view of another electrically powered AV yard truck, showing a truck chassis raised fifth wheel thereof.
Figure 5:
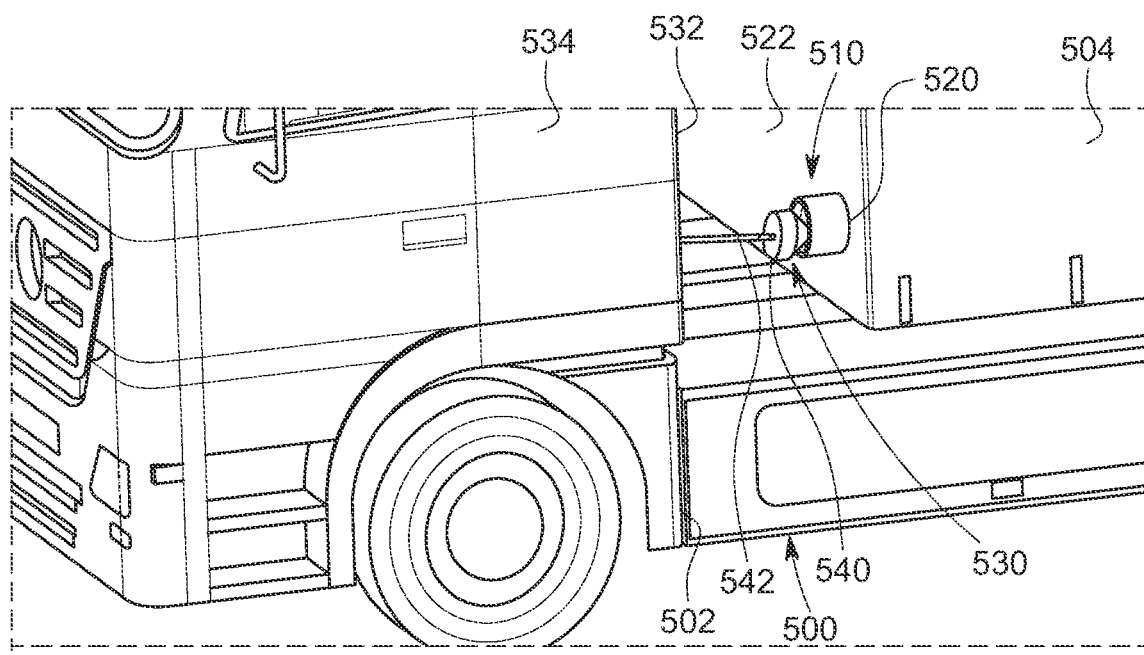
FIG. 5 is a partial, side-oriented perspective view of a hitched AV yard truck and trailer showing a pneumatic connection consisting of a truck-mounted probe and a trailer-mounted receptacle according to an embodiment.

Notably, the AV yard truck 200, 300 and 400 of FIGS. 2, 3 and 4, respectively, includes an emergency brake pneumatic hose 250, 350, 450 (typically red), service brake pneumatic hose 252, 352, 452 (typically blue) and an electrical line 254, 354, 454 (often black), that extend from the rear of the cab 210, 310, 410 and in this example, are suspended front the side thereof in a conventional (manually connected) arrangement. This allows for access by yard personnel when connecting and disconnecting the hoses/lines from a trailer during the maneuvers described above. The AV yard truck 200, 300, 400 includes a controller assembly 270, 370 and 470, respectively, shown as a dashed box. The controller 270, 370, 470 can reside at any acceptable location on the truck, or a variety of locations. The controller 270, 370, 470 interconnects with one or more sensors 274, 374, 474, respectively, that sense and measure the operating environment in the yard, and provides data 160 to and from the facility (e.g. the YMS, server 120 etc.) via a transceiver. Control of the truck 200, 300, 400 can be implemented in a self-contained manner, entirely within the controller 270, 370, 470 whereby the controller receives mission plans and decides on appropriate maneuvers (e.g. start, stop, turn accelerate, brake, move forward, reverse, etc.). Alternatively, control decisions/functions can be distributed between the controller and a remote-control computer—e.g. server 120, that computes control operations for the truck and transmits them back as data to be operated upon by the truck's local control system. In general, control of the truck's operation, based on a desired outcome, can be distributed appropriately between the local controller 270, 370, 470 and the facility system server 120.

II. Pneumatic Line Connection Between Yard Truck and Trailer

A. Probe and Receptacle Assemblies

A particular challenge in creating an AV yard truck and trailer system, which is substantially or fully free of human intervention in its ground operations, is automating the connections/disconnections of such hoses and electrical leads between the truck and the trailer in a manner that is reliable and accurate. FIGS. 5-8 show a basic arrangement 500 consisting of an AV yard truck 502 and trailer 504. The trailer can be conventional in arrangement with additions and/or modifications as described below, which allow it to function in an AV yard environment. The truck 502 and trailer 504, shown hitched together in this arrangement with at least one connection (e.g. the pneumatic emergency brake line) 510 to be made. It is common for yard trucks to make only the emergency brake connection when hauling trailers around a yard—however it is expressly contemplated that additional connections can be made for e.g. the service brakes, as well as the electrical leads. The connection arrangement 510 for a single pneumatic line herein comprises a receptacle assembly 520, mounted permanently or temporarily on the front 522 of the trailer 504, and a probe assembly 530 that extends from the rear face 532 of the truck cab 534. The connection arrangement 510 in this embodiment provides a positive, sealed pressurized coupling between one of the source pneumatic lines (e.g. the emergency brakes) from the truck to the trailer. Pressure is generated at the truck side (via a pump, pressure tank, etc.), and delivered to components that drive the trailer brakes when actuated by the truck control system 270, 370.

Figure 8:
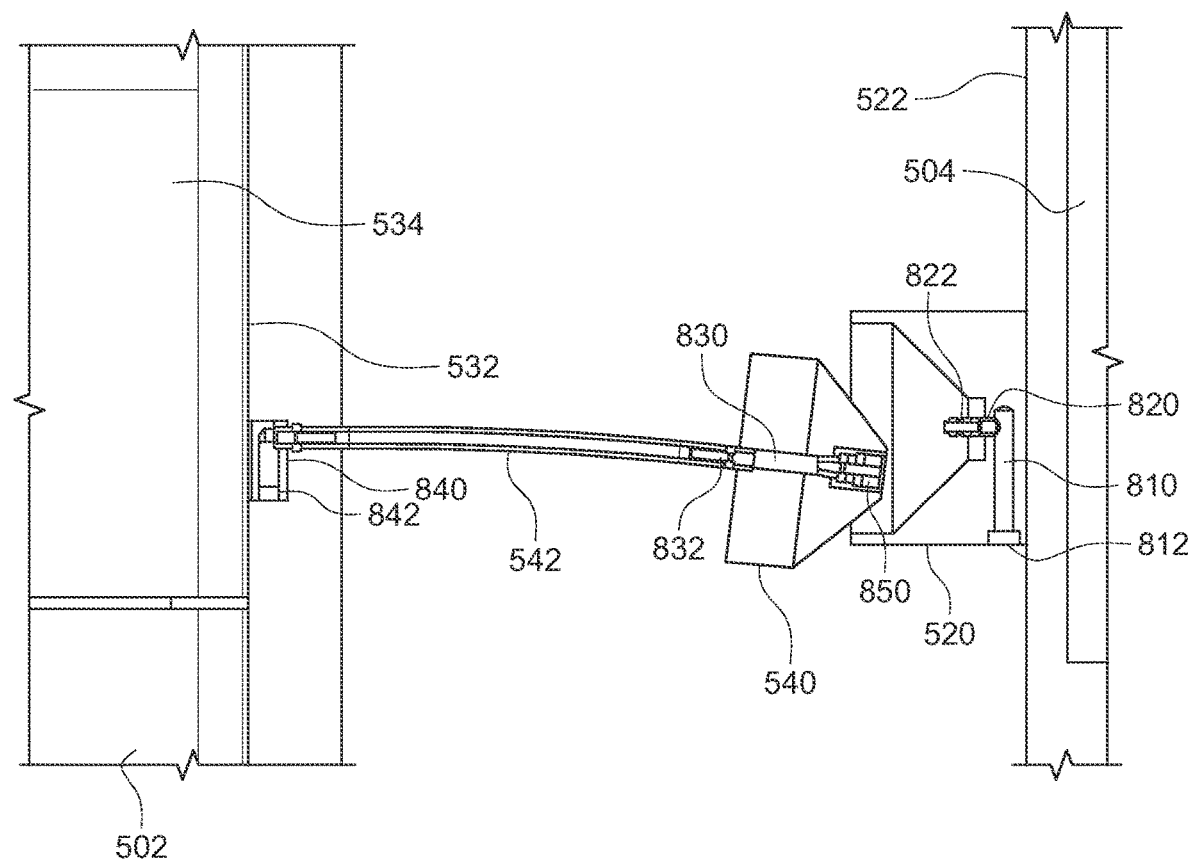
FIG. 8 is an exposed side view of the probe and receptacle arrangement of FIG. 5 showing exemplary pneumatic connections for, e.g. the emergency braking circuit between the AV yard truck and the trailer.

The receptacle assembly 520 and probe assembly 530 consist of interengaging, frustoconical shapes, wherein the probe head 540 is mounted on the end of a semi-rigid hose member 542 (e.g. approximately 1.5-4.5 feet), which can be supported by one or more guy wires mounted higher up on the back of the truck cab. The cone shape is sufficient to allow for a connection between the head 540 and receptacle 520 when the truck is backed straight onto the trailer. With reference particularly to FIG. 8, the receptacle of this embodiment is attached directly to the front face 522 of the trailer 504, and includes a central bore 810 that extends between a side-mounted port (that can be threaded or otherwise adapted to interconnect a standard trailer pressure line) and a pressure (e.g. male) quick-disconnect fitting 822. The geometry of such a fitting should be clear to those of skill. The probe head 540 also include a bore 830 that joins to a proximal fitting 832 that couples the semi-rigid hose member 542 to the head 540. The proximal end of the semi-rigid hose member 542, in this embodiment, is attached to a base 840 affixed to the rear face 532 of the truck cab 534. The location of the base 840 is selected to align with the receptacle 520 when the trailer and truck are in a straight front-to-rear alignment. As described below, a variety of mechanisms can be employed to align and direct the head 540 into the receptacle. The base 840 also includes a side port 842 that interconnects with the AV trucks braking pressure source/circuit, and is selectively pressurized when brakes are actuated. The conical probe head 540 includes, at its distal end, a (e.g. female) quick-disconnect pressure connector 850 that is adapted to sealingly mate with the receptacle connector 822. The probe connector 850 can be arranged to lock onto the receptacle connector 822 when driven axially a sufficient distance onto the receptacle connector. The receptacle connector can include one or more circumferential detents and appropriate internal springs, collars and ball bearings can be used in the construction of the probe connector to engage the detent(s) and thereby effect this interlocked seal between the connectors 822, 850. Alternatively, or additionally, pneumatic and/or electromechanical locking mechanisms can be used to lock the connectors together. Unlocking of the connectors 822, 850 during disconnection can be effected by simply pulling the arrangement apart—thereby overcoming axial resistance the locking force, activating a pneumatic and/or electromechanical unlocking mechanism or any other mechanical action that allows the mechanism to unlock. The diameter and angle of the probe and receptacle cones are variable. In an embodiment, the ports 812 and 842 of the receptacle 520 and probe 540 are connected to hoses that can be directly tapped into the pneumatic lines on each of the trailer and the truck. Alternatively, the ports 812, 842 can each be connected to hoses that each include a conventional or modified (described below) glad hand connector. That glad hand interconnects permanently or temporarily (in the case of the trailer) with the standard pneumatic line glad hand.

The probe 540 and receptacle 520 can be constructed from variety of materials, such as a durable polymer, aluminum alloy, steel or a combination thereof. The connectors 822 and 850 can be constructed from brass, steel, polymer or a combination thereof. They typically include one or more (e.g.) O-ring seals constructed from polyurethane or another durable elastomer. The semi-rigid hose 542 can be constructed from a polymer (polyethylene, polypropylene, etc.), or a natural or synthetic rubber with a fiber or steel reinforcing sheath.

Figure 8A:
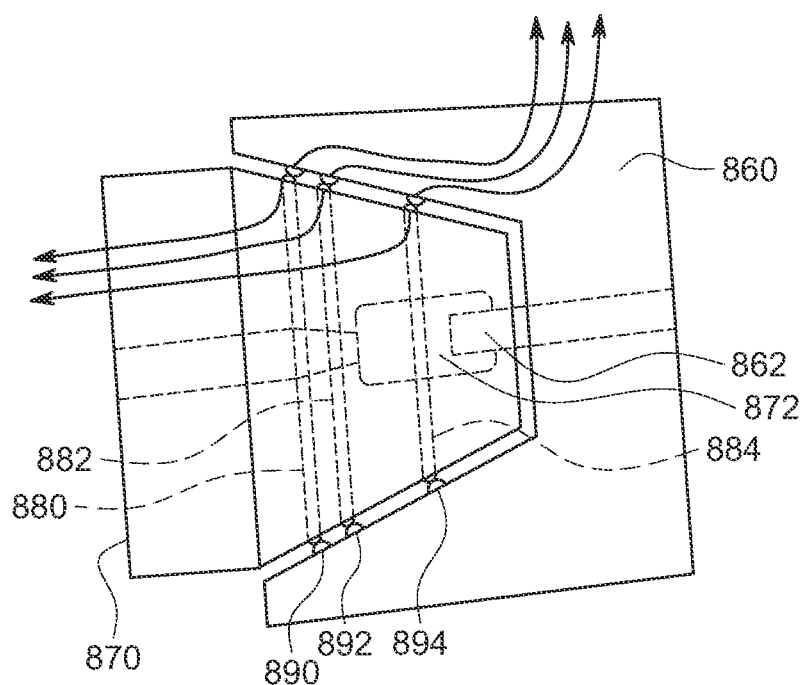
FIG. 8A is an exposed side view of an exemplary probe and receptacle arrangement similar to that of the arrangement of FIG. 5, including a plurality of electrical contacts for interconnecting electrical service between the AV yard truck and the receptacle when the pneumatic service is connected.
Figure 8B:
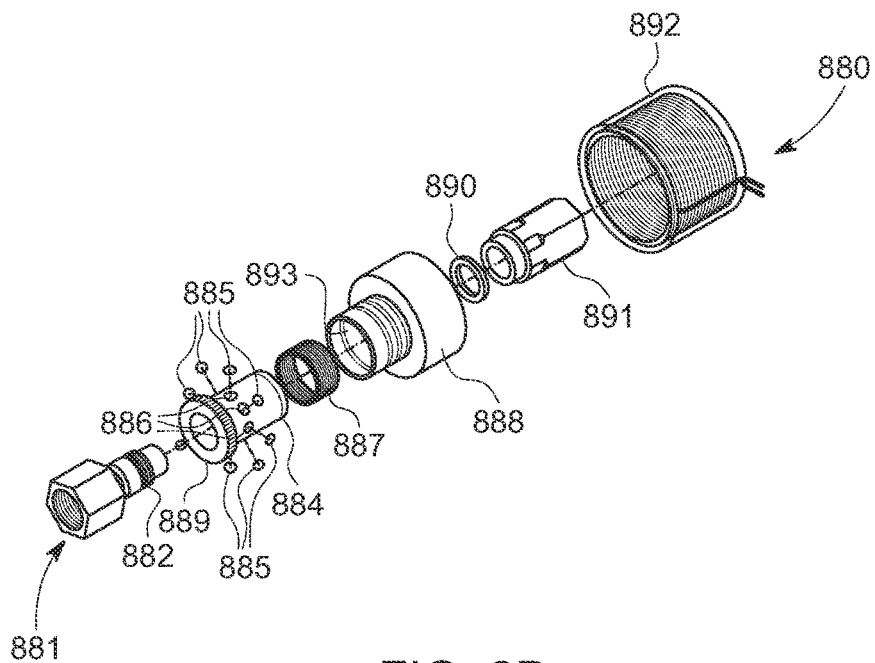
FIG. 8B is an exploded perspective view of an air-connecting mechanism with actuating collar to lock the female connector (truck/coupling side) to the male connector (trailer/receiving side), according to another embodiment.

As shown briefly in an embodiment in FIG. 8A, the receptacle 860 and probe 870 (which operate similarly to the probe 540 and receptacle 520 described above) can be adapted to include electrical contacts—for example a plurality of axially spaced-apart concentric rings 880, 882, 884 on the outer, conical surface of the probe 870—that make contact with corresponding rings or contacts 890, 892, 894 on the inner, conical surface of the receptacle 860 when the probe and receptacle connectors (862 and 872, shown in phantom) are fully engaged. This can complete the electrical connection between the trailer electrical components (lights, signals, etc.) and the switched power feeds on the truck. Appropriate plugs and sockets can extend from the probe and receptacle to interconnect standard truck and trailer electrical leads. Note that a variety of alternate electric connection arrangements can be employed in alternate embodiments in conjunction with, or separate from the pneumatic probe and receptacle.

With reference to the embodiment of FIGS. 8B-8E, a connector/coupling assembly 880 capable of electrical actuation to selectively change it between a locked and unlocked state is shown. This assembly 880 can be adapted to interoperate with the probe and receptacle assemblies described above, or other coupling and receiver arrangements, as described in embodiments hereinbelow. The coupling assembly 880 consists of a male coupling 881, which can be part of a receiver or probe as appropriate. In this embodiment, it comprises a conventional (e.g.) ½-inch NPT, threaded pipe, airline quick-disconnect fitting with one or more, unitary, annular locking trough 882. The trough 882 can define a semicircular cross section shape. The female portion of the overall assembly 880, adapted to releasably connect and lock-to, the male fitting 881 is formed as a sliding quick-disconnect fitting as well. In this embodiment, the inner sleeve 884 is sized to slide over the male fitting 881 when coupled together. A set of circumferential (e.g.) ball bearings 885 reside in holes 886 formed about the circumference of the sleeve 884. The ball bearings 885 are sized to engage the trough 882 when fully seated in the sleeve's circumferential holes 886. Thus, this forms a locking engagement. A spring 887 resides behind the inner sleeve 884. The ball bearings 885 are forced into the engaged position when an overlying, iron or steel (magnetic) sleeve 888 is located fully forward against a front shoulder 889 on the inner sleeve 884 (see FIG. 8E). This locking bias is provided by the spring, which also bears on a rear pipe fitting 891. In this position, the inner surface of the magnetic sleeve 888 is arranged to force the balls 884 inwardly against the mail fitting's trough 882. Thus, a positive lock between male and female components is formed. An O-ring seal 890, which is part of the female coupling seals this locked arrangement against air leakage (and thereby allows a pressurized connection to form).

Figure 8C:
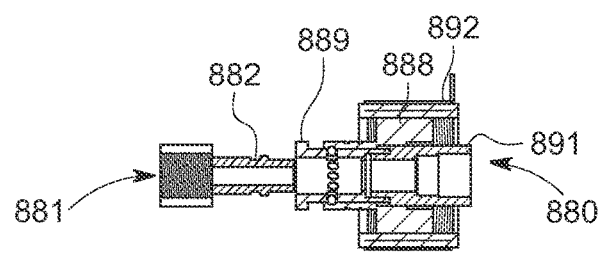
FIGS. 8C-8E are side cross sections of the mechanism of FIG. 8B showing a connection process for the connecting and locking the female connector to the male connector, respectively in a disconnected, connected and locked state.
Figure 8D:
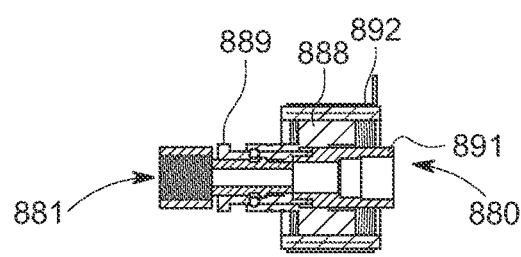

Notably, an outer annular (or other shape) sleeve 892 comprises an electromagnetic coil (e.g.) a solenoid. This coil, when energized forces the magnetic sleeve 888 axially rearwardly (against the bias of the spring 887), and places the ball bearings 885 in alignment with an annular trough 893 within the front, inner surface of the magnetic sleeve 888. This trough allows the ball bearings 885 to float radially outwardly from the holes 886 sufficiently to disengage them from the male fitting trough 882, thereby allowing axial movement of the male fitting relative to the female coupling. This unlocked state is shown in FIGS. 8C and 8D.

Figure 8E:
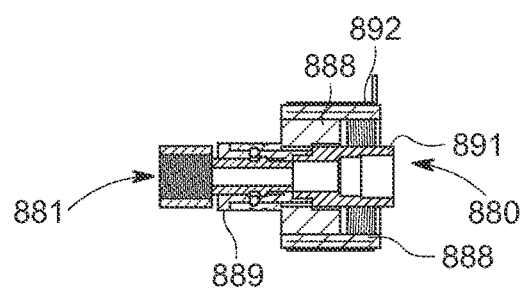

In operation, an electrical current is delivered to the outer sleeve/solenoid 892 via a relay or other switch that receives a signal from (e.g. the AV yard truck controller). An onboard battery (not shown) of sufficient power can be included in the female coupling assembly. Alternatively, power can be supplied by the AV Yard truck's electrical system. The magnetic sleeve, thus, moves axially rearwardly as shown in FIG. 8C. This position allows the ball bearings 885 to move radially inwardly as the make fitting move axially inwardly relative to the inner sleeve 884 (shown in FIG. 8D). During this step, the outer sleeve/solenoid 892 remains energized by the switch and battery. Once fully engaged, the switch disconnects the battery and the spring 887 drives the magnetic sleeve forwardly (as it is now free of bias by the magnetic solenoid). The ball bearings 885, thus encounter the non-indented part of the magnetic sleeve's (884) inner surface and are driven radially into the male fitting's trough 882, thereby forming a sealed lock as shown in FIG. 8E.

Disconnection of the male fitting 881 occurs when the outer sleeve/solenoid 892 is again energized by the switch/battery (typically based on a signal from the controller). In various embodiments, the male fitting 881, inner sleeve 884 and rear base fitting 891 can be constructed from a non-magnetic material, such as a durable polymer, brass, aluminum, titanium, nickel, etc. It should also be clear to those of skill that a range of variations of the assembly of FIGS. 8B-8E can be implemented, in which (e.g.) the solenoid is normally locked and the spring causes an unlocked state, the arrangement of components can be varied, etc. In an embodiment, the male fitting (which is not energized) can be part of the trailer's receptacle and the female coupling (which is energized) can be part of the AV yard truck's pneumatic line. Hence, the female coupling is brought into engagement with the male fitting by one of the various techniques described herein (e.g. a robotic arm, manipulator, framework, etc.).

B. Reel-Connected Probe

Figure 6:
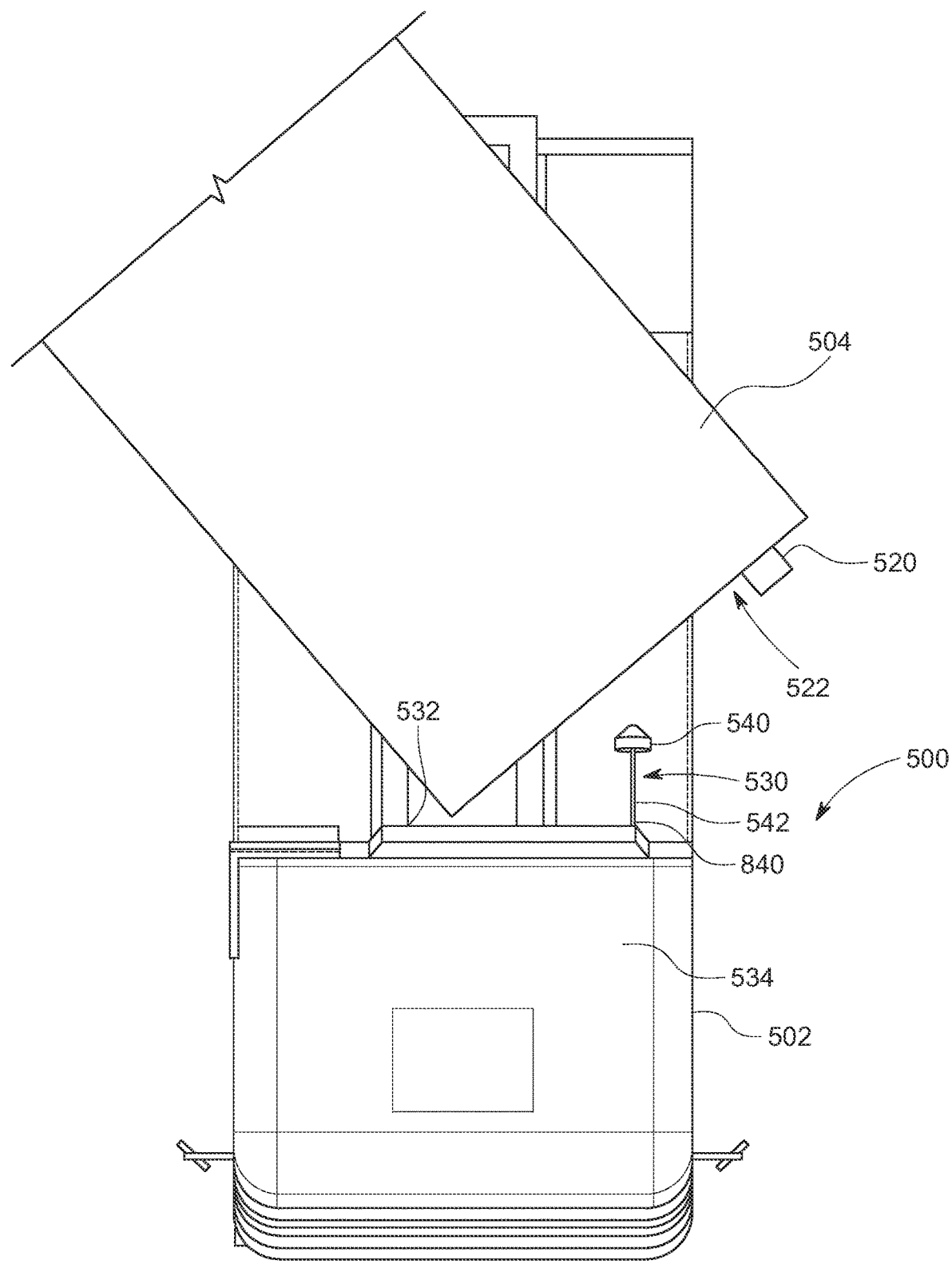
FIG. 6 is a partial top view of the hitched AV yard truck and trailer of FIG. 5 showing the trailer turned at an angle with respect to the truck so that the receptacle and the probe located remote from each other.
Figure 7:
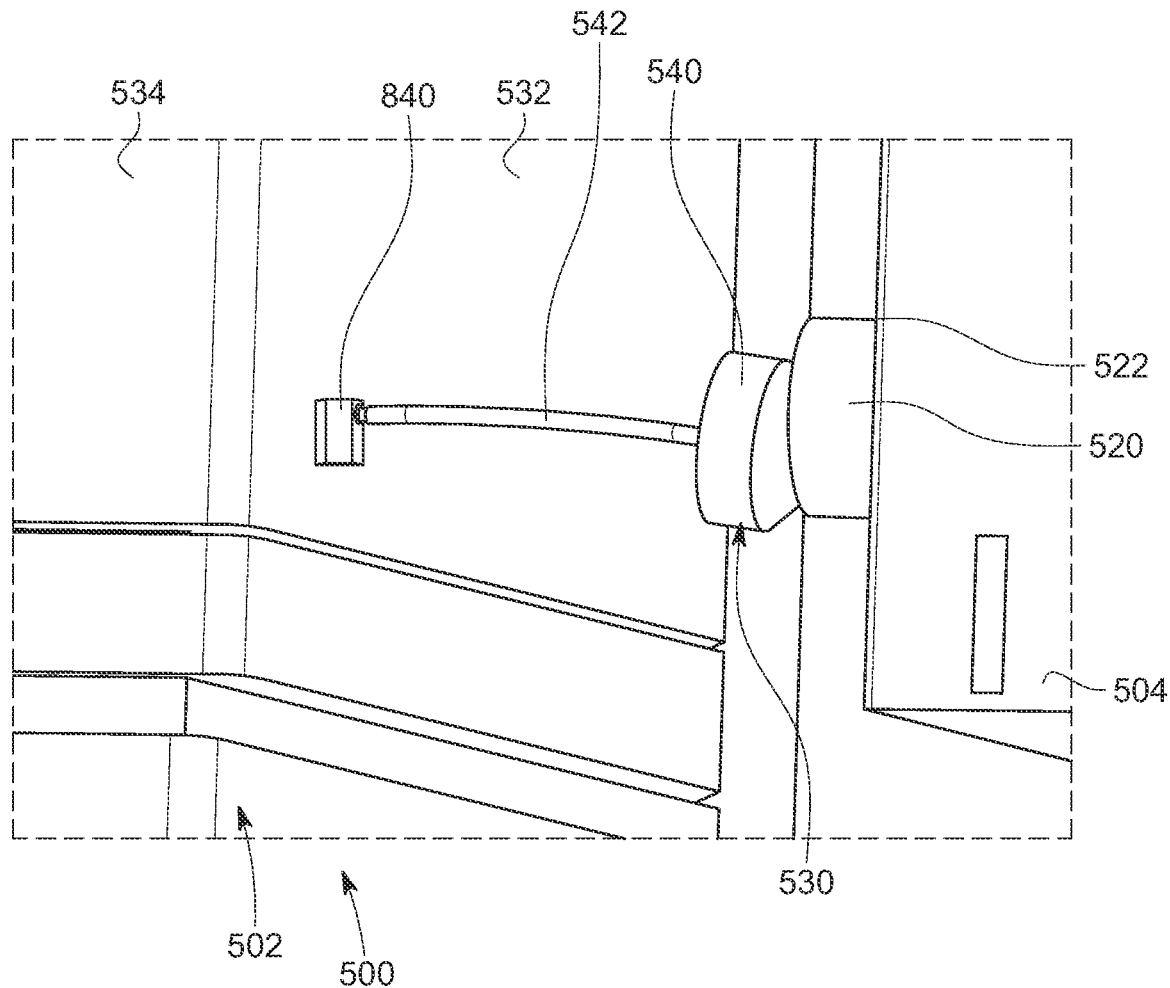
FIG. 7 is a more detailed perspective view of the probe and receptacle arrangement of FIG. 5, showing the probe guided into the receptacle during a connection process.
Figure 9:
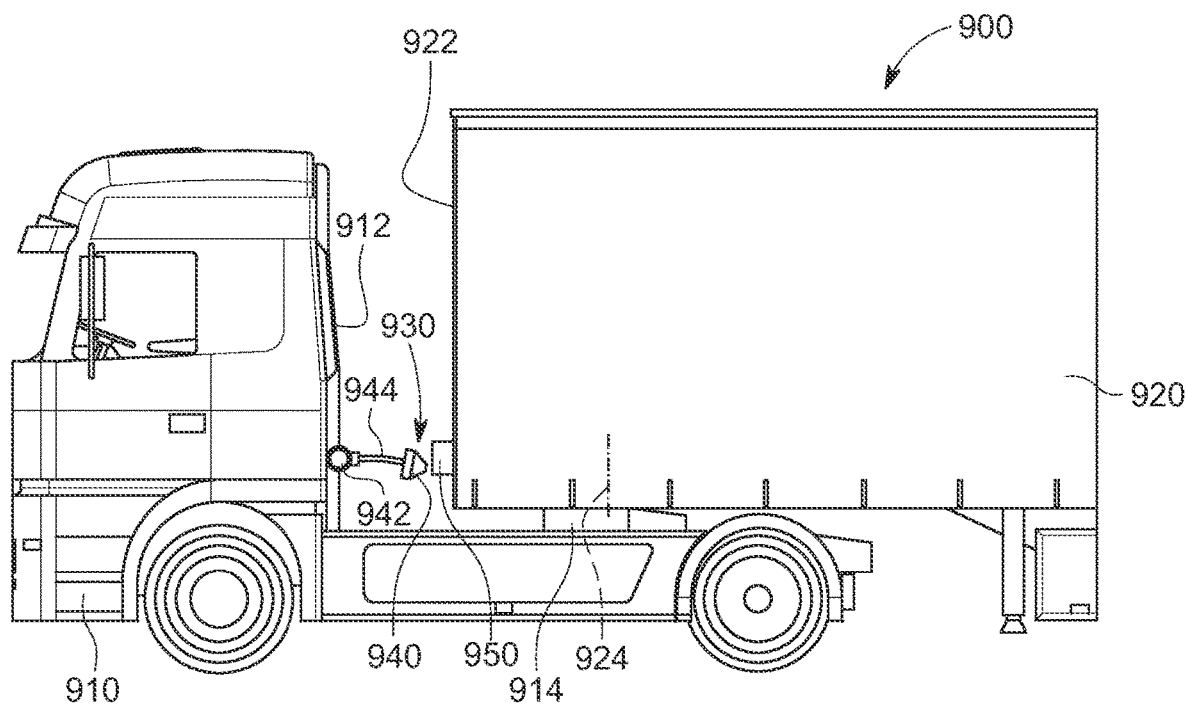
FIG. 9 is a side view of an exemplary AV yard truck and trailer having a truck-mounted probe and trailer-mounted receptacle for connecting (e.g.) pneumatic emergency brake service, in which the probe is mounted on a tensioned cable and spool assembly to allow for turning of the trailer with respect to the truck, according to an embodiment.
Figure 10:
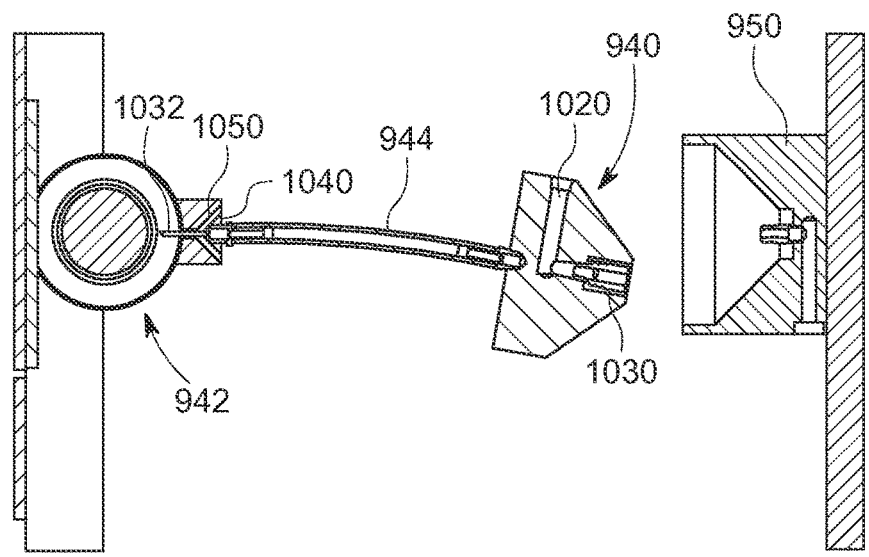
FIG. 10 is a more detailed side cross section of the probe and receptacle arrangement, including cable and spool assembly of FIG. 9.

Reference is now made to FIGS. 9 and 10 that show an arrangement 900 having a pneumatic connection 930 for use with an AV yard truck 910 and trailer 920 according to another embodiment, in which the probe assembly 940 is attached to a reel or spool 942. This arrangement recognizes that the trailer front face 922 often moves away from the cab rear face 912 during turns (i.e. where the kingpin pivots on dashed-line axis 924 about the fifth wheel 914). This condition is also shown in FIG. 6, where the receptacle 520 is spaced at a significant distance from the probe 540. To address the variability of spacing between the receptacle 950 and probe 940 (of the present embodiment of FIGS. 9 and 10) during turning motion, and more generally deal with shifting of position between the truck and trailer, the probe 940 is mounted on a semi-rigid tube 944, that is (in this embodiment) free of any air conduit. The illustrative, frustoconical probe 940 includes a side port 1020 (FIG. 10) that routes air to the (e.g. female) pressure connector 1030 at the probe's proximal end. The probe side port 1020 interconnects to the truck pressure line in a manner similar to that described above for probe 540. This connector and the associated receptacle (950) components are otherwise similar to the embodiment of FIGS. 5-8 described above and interconnection is made according to a similar operation. That is, the truck is backed into the trailer with the probe 940 and receptacle 950 in relatively straight-line alignment. Then, the probe 940 is guided into the receptacle 950 by interengagement between respective frustoconical surfaces until a positive lock between associated pressure connectors occurs. As in the embodiment of FIGS. 5-8, the rigidity of the semi-rigid tube 944 is sufficient to prevent buckling as the connectors are biased together to create a lock. Once locked, as the probe 940 is tensioned by movement of the trailer 920 relative to the truck 910, the tension is relieved by paying out a cable from the spool 942 that is attached to the proximal end of the tube 944. The spool 942 can be spring-loaded so that it maintains a mild tension on the tube 944, and associated probe head, at all times. The hose attached from the pneumatic source to the probe side port 1020 can be flexible (e.g. contain spring coils as shown generally in FIG. 2), or can otherwise absorb stretching and contraction. Note that the proximal end of the tube includes a (positive) frustoconical end member 1040 that mates with a (negative) frustoconical receiver 1050 on the spool 942. This assembly forms a backstop for the tube 944 when the probe head is biased into the receptacle 950 and ensures that the spool cable 1032, when fully retracted, draws the cable fully back into the spool 942, free of any kinks near the base of the tube 944. The spool can be constructed in a variety of ways, such as a wrapped/wound clockwork-style spring, and appropriate gearing to generate a predetermined torque over a predetermined number of revolutions (which should be clear to those of skill). The spool 942 can alternatively be motorized, paying out cable and drawing it in, based on prevailing tension. In this embodiment, the spool 942 acts as both a cable (1032) winding device, and a base for the probe assembly 940 in a single unit. Note the cable spool can be a commercially available component. In addition, the pressure connectors can be commercially available components, such as those used in standard pneumatic hose applications.

Figure 11:
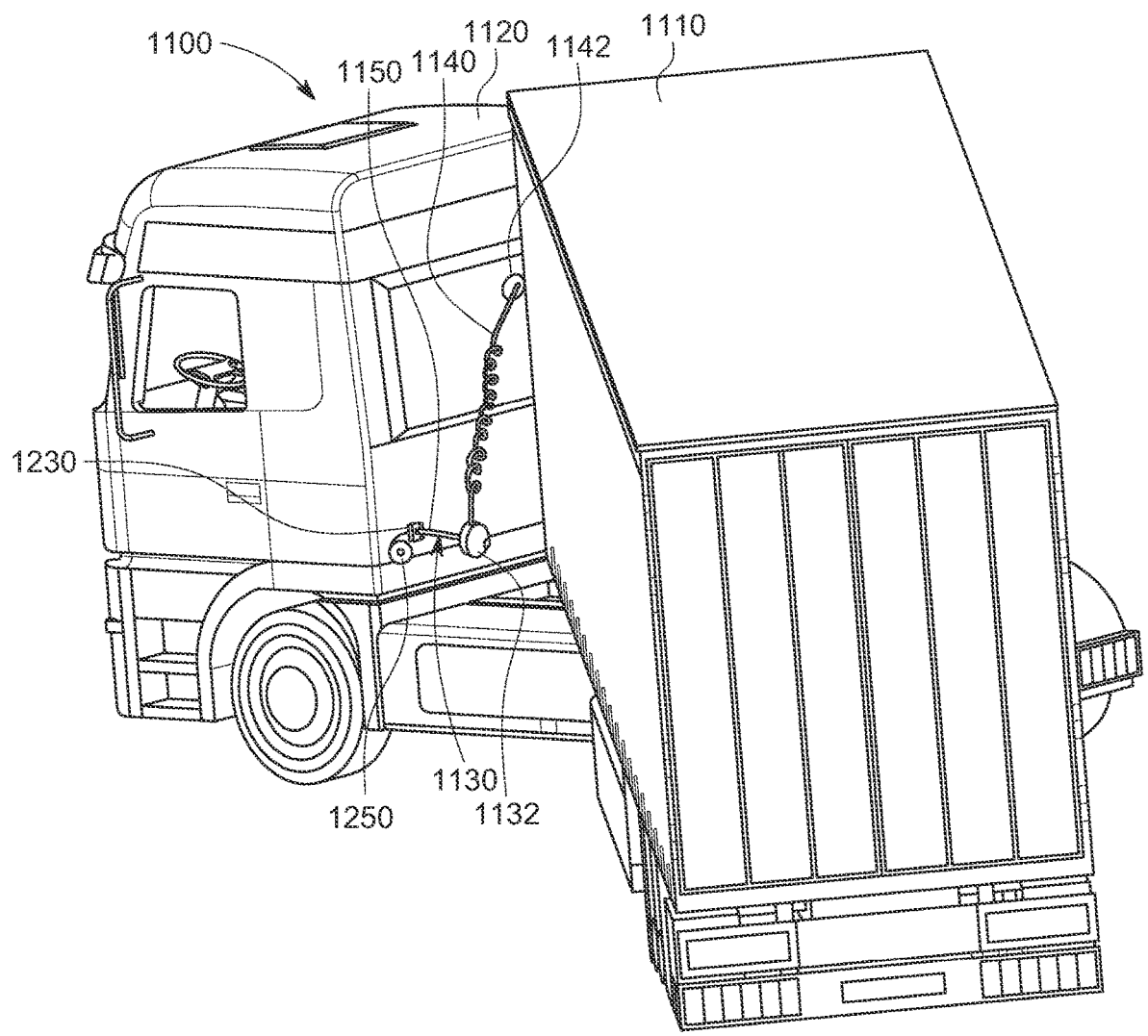
FIG. 11 is a rear-oriented perspective view of an AV yard truck and trailer in a hitched configuration showing a truck-mounted probe and trailer-mounted receptacle for connecting (e.g.) pneumatic emergency brake service, in which the probe is mounted in connection with an adjacent tensioned cable and spool assembly to allow for turning of the trailer with respect to the truck, according to an embodiment.
Figure 12:
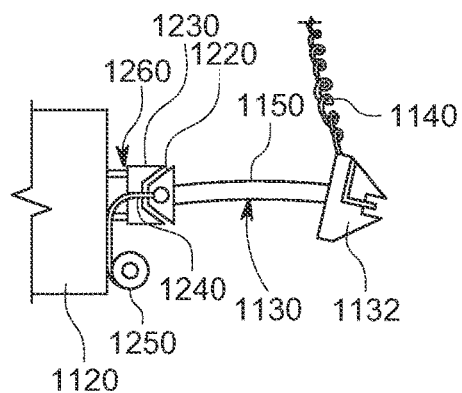
FIG. 12 is a more detailed side cross section of the probe and receptacle arrangement, including cable and spool assembly of FIG. 11.

This arrangement 1100 is further detailed in the embodiment of FIGS. 11 and 12, in which the trailer 1110 contains a receptacle (not shown) as described above or in accordance with another embodiment (described below), and the truck 1120 contains the probe assembly 1130 that is adapted to removably engage the receptacle as described above. The head 1132 of the probe assembly 1130 includes a side-mounted pressure port and associated hose 1140 (e.g. an emergency brake pneumatic line from the truck's (1120) conventional outlet 1142 for such). The probe head 1132 is mounted on a semi-rigid tube 1150, as described above, with a (positive) frustoconical end member 1220, which is adapted to seat in a conforming, (negative) frustoconical receiver 1230, as also described above. The receiver is permanently, or temporarily, affixed to the rear face of the truck 1120. The end member 1220 provides an anchor for a tension cable 1240, and that cable 1240 extends through the receiver 1230 to an external spring-wound spool 1250. The spool exerts a mild tension on the probe assembly 1130 in a manner described above. The spool 1250 can be constructed by any acceptable technique and can be a commercially available component. The spool 1250 is also affixed to the face of the truck at an appropriate location. A chase that allows the cable 1240 to pass from the receiver to the spool 1250 can be provided (e.g. a gap 1260).

C. Removable Receptacle Assemblies/Alternate Pressure Connections

Figure 13:
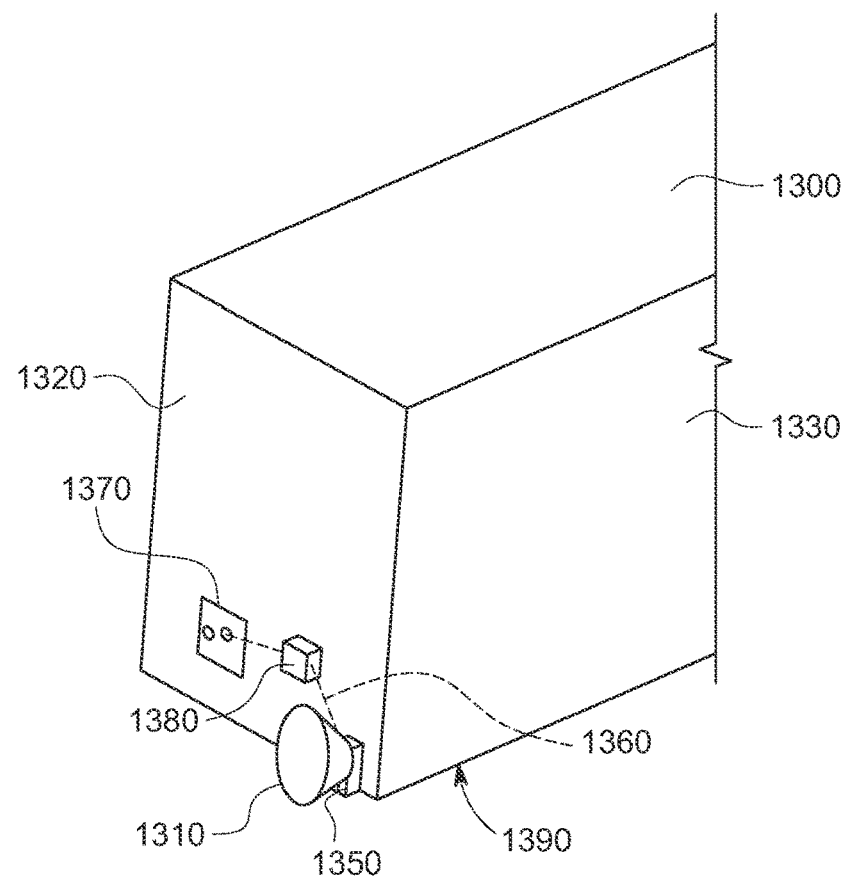
FIG. 13 is a partial rear-oriented perspective view of a trailer having a frustoconical receiver for a pneumatic connection for use with an AV yard truck according to an embodiment.
Figure 14:
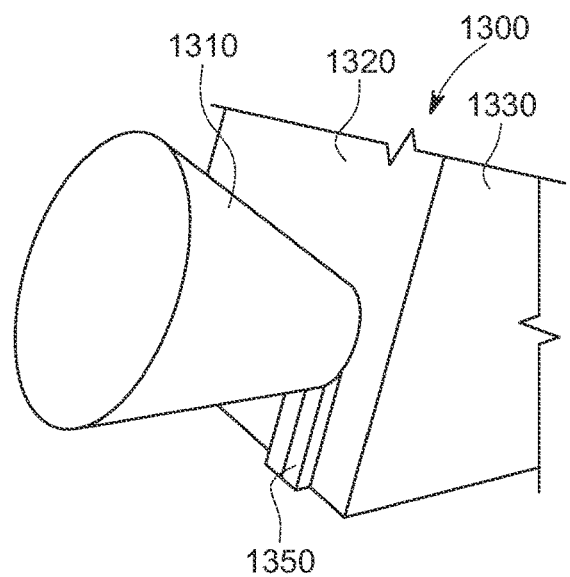
FIG. 14 is a more detailed perspective view of the conical receiver of FIG. 13 showing an interconnected bracket assembly allowing for selective attachment to and detachment of the receiver from the trailer body.
Figure 14A:
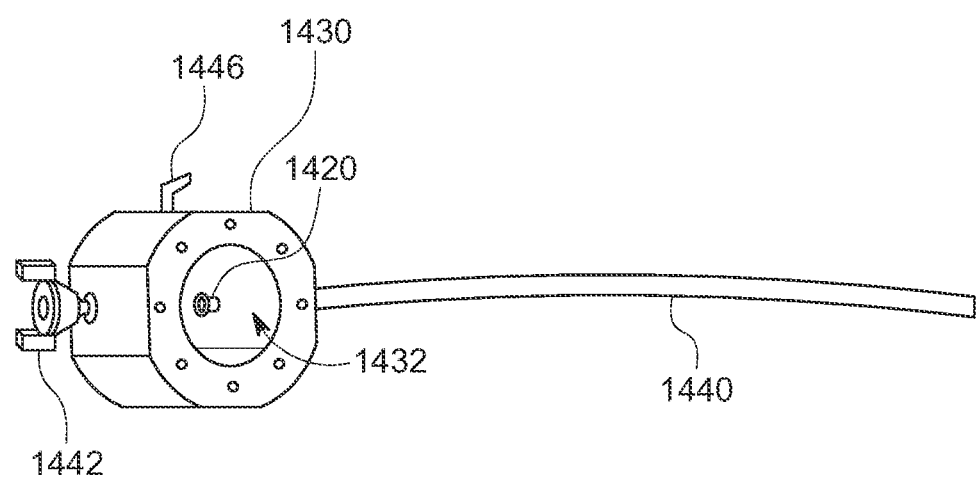
FIG. 14A is perspective view of an illustrative receiving receptacle with an interconnected pneumatic line/air-hose that connects to the trailer pneumatic line's existing glad hand.
Figure 23:
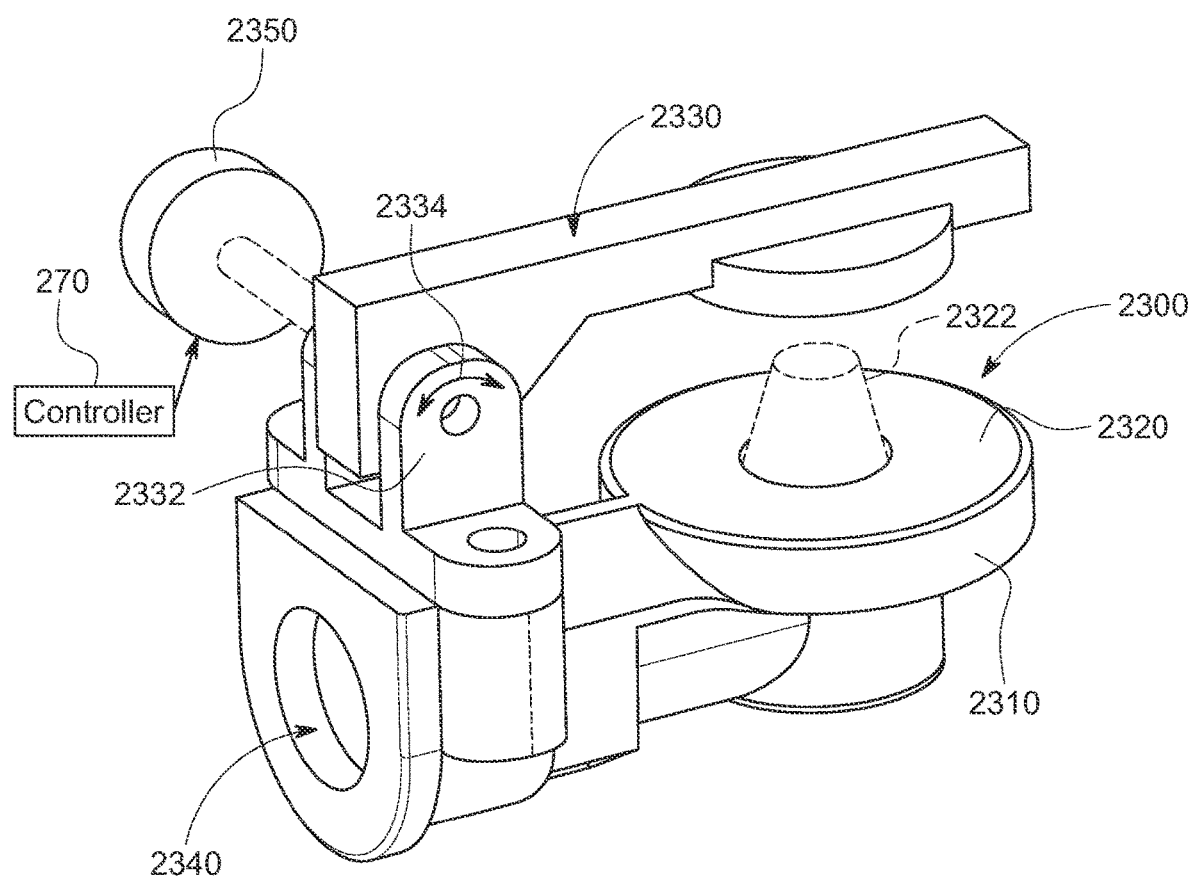
FIG. 23 is a top-rear-oriented perspective view of a modified glad hand connector for use in forming pneumatic connections, according to various embodiments.
Figure 24:
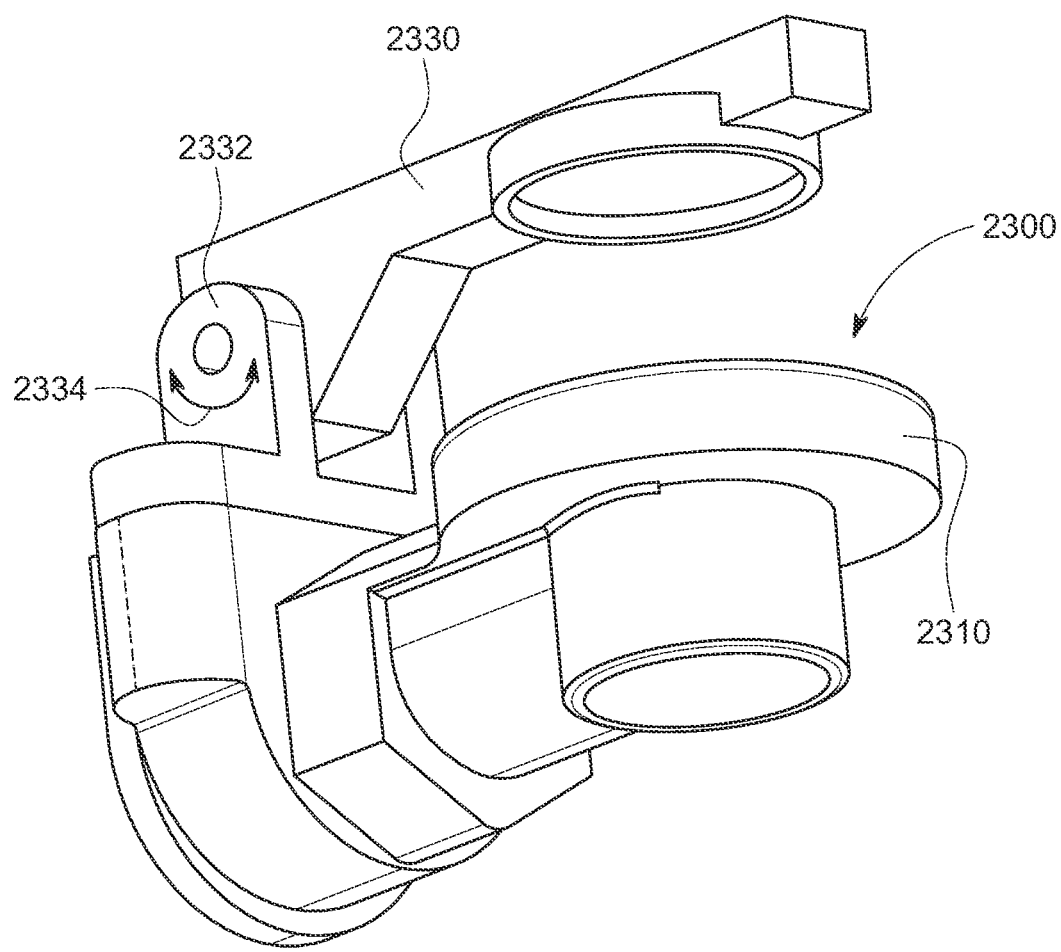
FIG. 24 is a bottom-front-oriented perspective view of the modified glad hand of FIG. 23.
Figure 25:
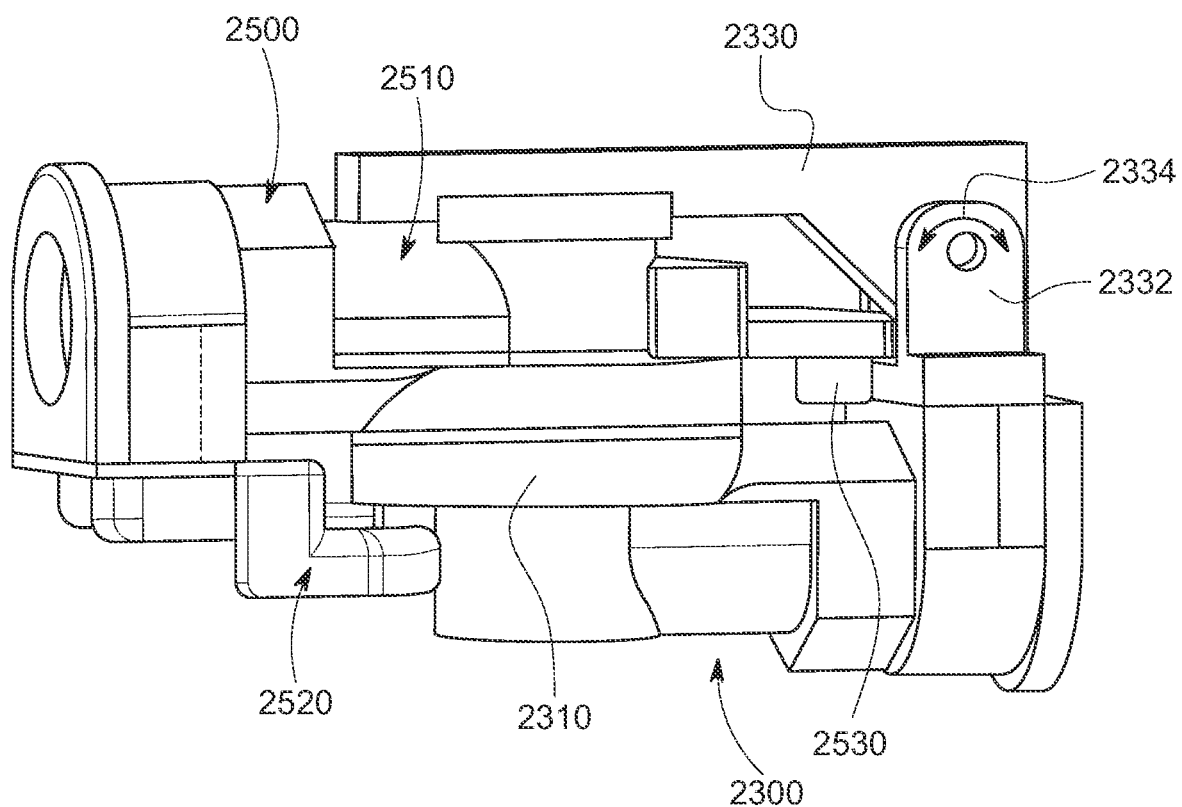
FIG. 25 is a side-oriented perspective view of the modified glad hand of FIG. 23, shown secured to a conventional glad hand (e.g. on trailer emergency brake line) with the movable thumb clamp thereof engaged to the top of the conventional glad hand body.

FIGS. 13, 14 and 14A show and arrangement 1300, consisting of a removable receptacle assembly 1310 that is mounted variably on the front face 1320 of the trailer 1330. As shown, a clamping assembly, or other form of mounting bracket 1350, can be temporarily or permanently fixed to the trailer in a manner that locates the receptacle (in this example, a frustoconical shape) 1310 at a position on the front face 1320 of the trailer 1330. In an operational embodiment, the clamping assembly 1350 can be attached at the guard shack (110 in FIG. 1), at the desired location, so as to provide the needed autonomously operable pneumatic connection. As part of the attachment, a pneumatic hose (dashed line 1360) can be attached to a conventional port 1370 of the trailer 1330. The pneumatic circuit can direct to the port 1370 from a continuous hose extending from the receptacle 1310, or via an intermediate connection (represented as box 1380) between a separate (conventional) trailer pneumatic hose and a receptacle hose. The intermediate connection 1380 can be accomplished using e.g. a conventional or customized glad hand connector arrangement. A modified glad hand arrangement is described in further detail (FIGS. 23-25 below).

As shown further in FIG. 14A, a male, quick-disconnect-style fitting 1420 (for example, similar or identical to fitting 881 in FIG. 8B) is shown located coaxially within the cylindrical or frustoconical well 1432 of a receiver housing 1430. The receiver housing 1430 can be constructed from a variety of materials, such as aluminum alloy, steel, polymer, or combination of materials. The housing can be adapted to be secured directly to the trailer body (e.g. along the front face as described above) or using a mounting plate assembly, as described hereinbelow (see, for example, FIGS. 18-22). The fitting 1820 can be connected directly, or via a port arrangement within the housing, to a trailer pneumatic line 1440—for example, an emergency brake line. A valve knob 1442 or other pressure regulating system (e.g. a safety valve) can be integrated in the housing port system. A variety of attachments, brackets, accessory mounts, switches, can be applied to the receiver housing 1430, represented generally by the handle 1446, which can reside in a threaded well or other structure.

Figure 15:
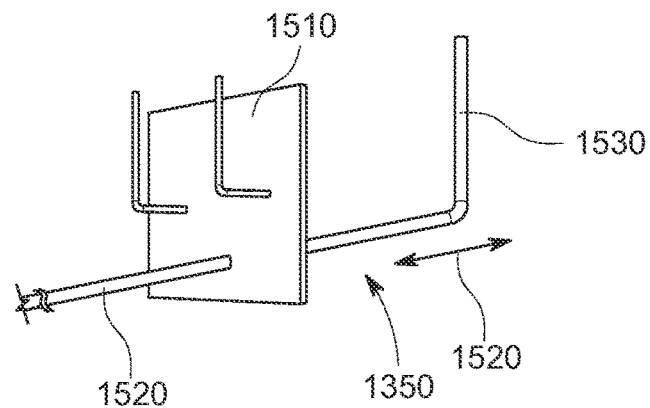
FIG. 15 is a perspective view showing a movable clamp for allowing selective attachment and detachment of the bracket.
Figure 16:
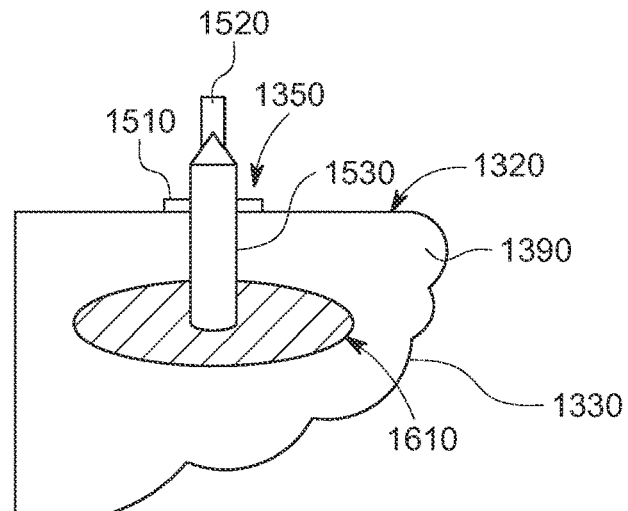
FIG. 16 is a partial bottom view of the trailer of FIG. 13 showing the insertion of the bracket end hook or post into a slot in the trailer bottom.
Figure 17:
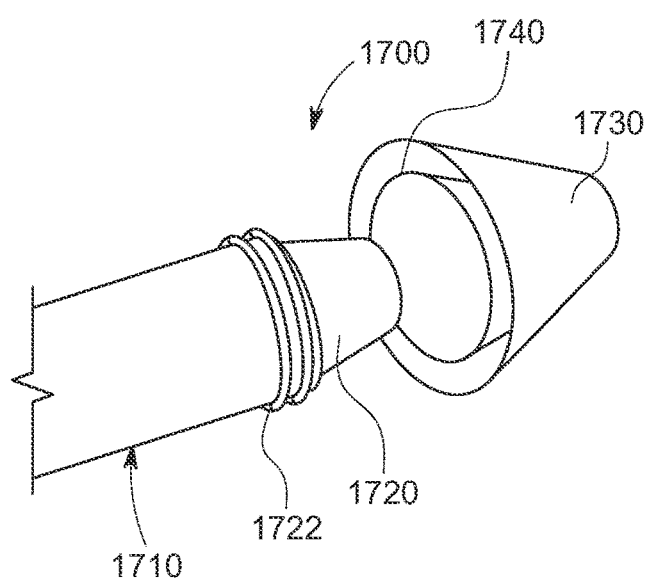
FIG. 17 is a perspective view of a pneumatic connection system for an AV truck and trailer, showing frustoconical receiver or receptacle attached to a trailer and a probe assembly with an inflatable ring for securing the probe and receptacle together with a pressure-tight seal.
Figure 18:
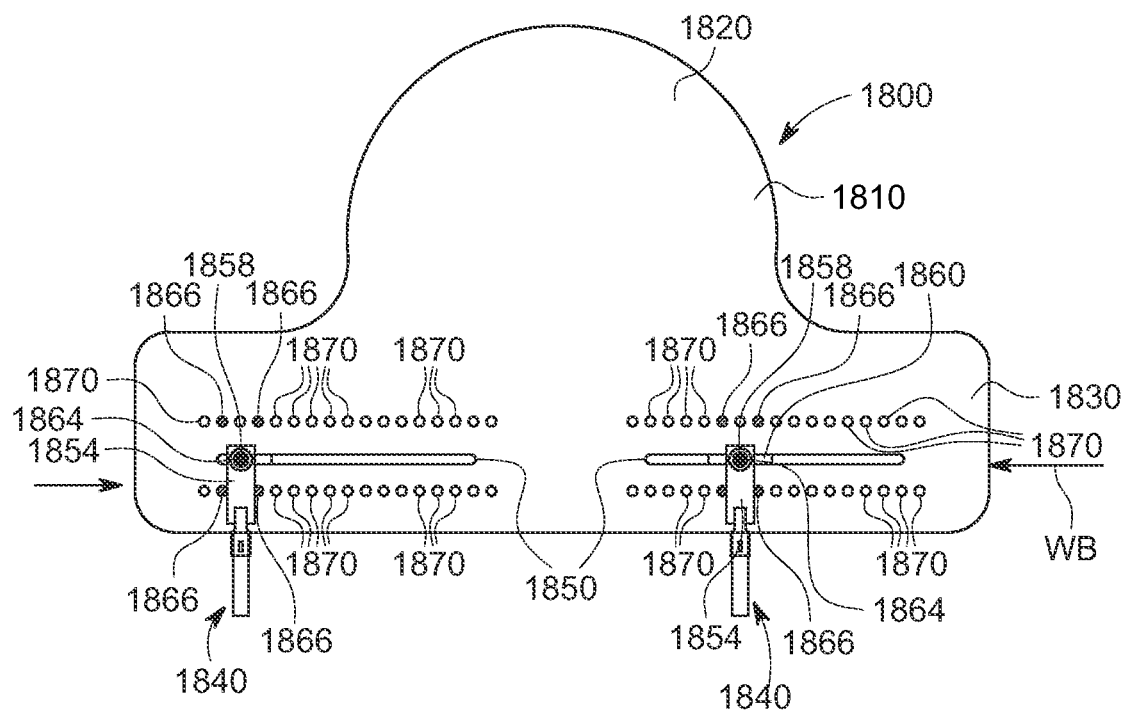
FIG. 18 is a front view of a removable plate for mounting one or more receptacles for connection of pneumatic and/or electrical service on a trailer, including a pair of bar-clamp-like brackets that engage a slot in the bottom/underside of the trailer, according to an embodiment.
Figure 19:
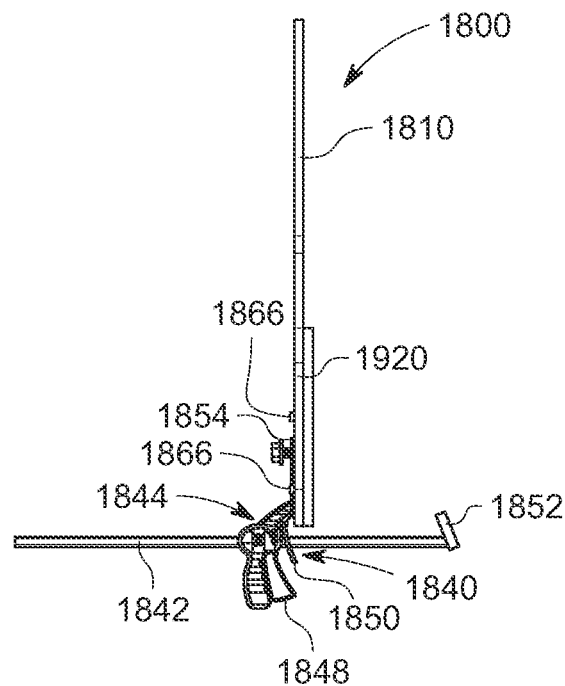
FIG. 19 is a side view of the plate and bracket assembly of FIG. 18.
Figure 20:
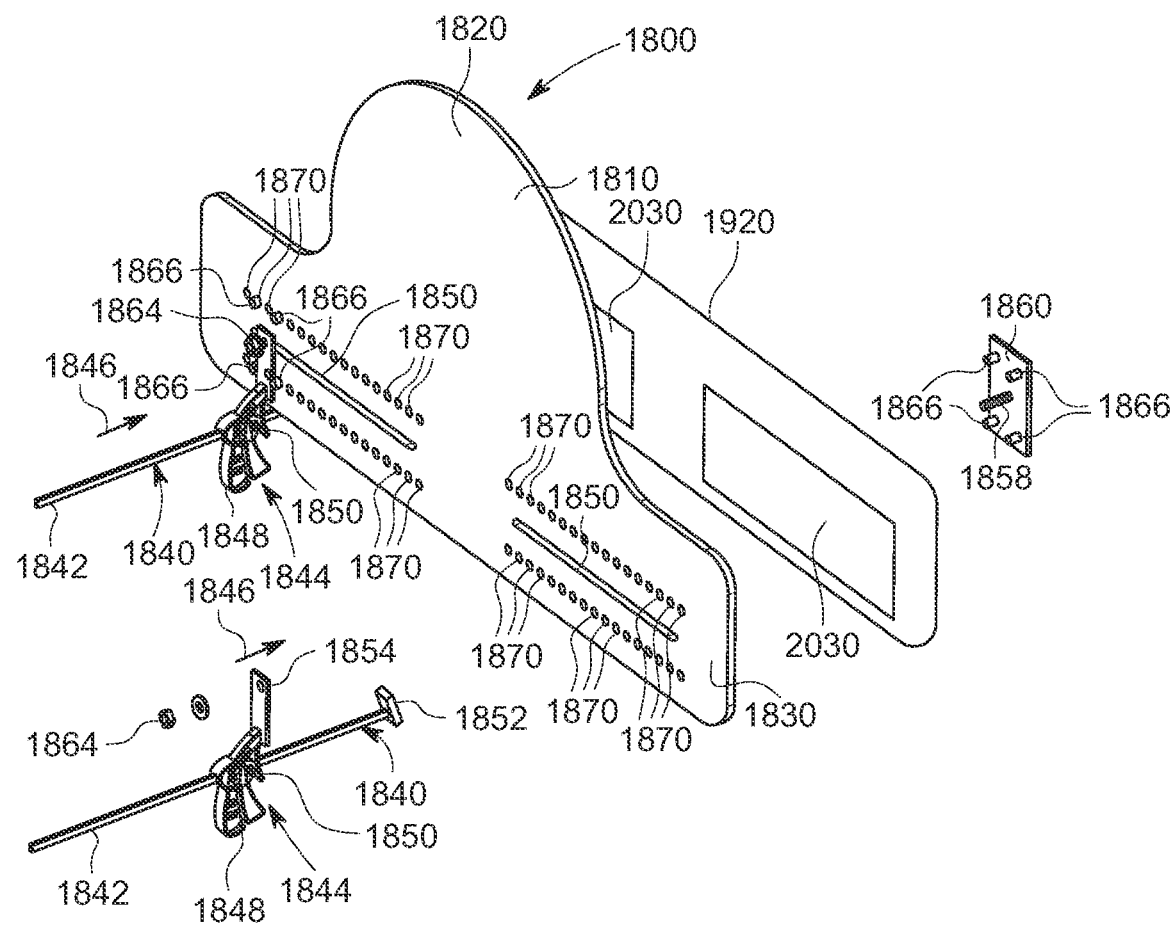
FIG. 20 is an exploded view of the plate and bracket assembly of FIG. 18.

With further reference to FIGS. 15 and 16, the clamping assembly 1350 can consist of a plate 1510 that slides (double-arrow 1522) along a bar 1520, and can be locked relative to the bar using any appropriate mechanism—e.g. a pinch, clamp, turn screw, etc. The bar 1520 terminates in an upright post or hook 1530 located at a rearmost end of the bar 1520. Note that the receptacle in this embodiment can be similar to those described above, containing an internal pressure connector for use with a probe head of appropriate design. Alternatively, the receptacle can be adapted to receive an alternate form of connector, such as that shown in FIG. 17. The post/hook 1530 is adapted to extend upwardly into a slot, step or hole 1610 at the bottom 1390 of the trailer 1330. The post/hook engages a front edge of the slot/step/hole 1610 as shown (FIG. 16) when the clamp is tightened, with the plate 1510 engaged against the front face 1320 of the trailer 1330. In this manner, the plate 1510 and associated receptacle (1310) are firmly attached in a desired position to the trailer front face when located in the yard. The clamping arrangement 1350 can be detached from the trailer 1330 at (e.g.) the guard shack as the trailer is placed into storage, exits the yard, or is hitched to an OTR truck, with conventional connections made to the trailer's pneumatic lines and electrical leads by the truck. The plate 1510 can include a frictional backing (e.g. a silicone, rubber or neoprene layer/sheet) to avoid marring the surface of the trailer and to resist shifting once clamped.

As discussed above, the clamped, or otherwise affixed, receptacle can employ a quick-disconnect-style pressure connector (see, for example FIGS. 8B-8E, above), or an alternate arrangement can be employed. As shown in the arrangement 1700 of FIG. 17, the probe assembly 1710 can define a (positive) frustoconical probe head 1720 constructed from an appropriate material (e.g. metal, polymer, etc.), as described generally above, that mates with a (negative) frustoconical receptacle 1730, with an internal geometry that accommodates an expanding, inflatable locking ring 1722, located at the proximal end of the probe head 1720. When pressure is applied (either tapping the pressure of the pneumatic line or a separate pressure source that is switched on during connection), the ring 1722 expands to bear against (e.g.) an annular shoulder 1740 of the receptacle to sealably lock the probe and receptacle together. In this manner, the arrangement resists pull-out and defines a gas-tight pressure seal. Additional internal pressure connectors can be provided in this arrangement with or without (free-of) a quick-disconnect locking mechanism.

Note that the pressure connection in any of the embodiments herein can also be sealably locked and unlocked using appropriate motorized and/or solenoid operated actuators.

Reference is made to FIGS. 18-22, which show a further embodiment of a detachable receptacle, or other form of removable connection between the truck pneumatic line(s) and the trailer's (2100 in FIG. 21) pneumatic lines, and optionally, its electrical leads (not shown). Note that this arrangement 1800 can be used to carry a plurality of receptacles/connectors for both pneumatic pressure and electricity. In the present embodiment, a single receptacle 2110 is mounted on the plate 1810 of the arrangement 1800, with a single side-mounted port 2210 (the close-up depiction 2200 of FIG. 22) to interconnect with an air hose of the trailer (e.g.) braking system via a standard/conventional port and hose. The plate can be constructed from any acceptable material, such as a metal (e.g. aluminum, steel, etc.), polymer (e.g. polycarbonate, acrylic, PET, POM, etc.), composite (e.g. fiberglass, carbon fiber, aramid fiber, etc.), or a combination of materials. In an exemplary embodiment, the plate includes an upper, semi-circular extension 1820 and a lower rectangular base 1830. The plate's upper extension 1820 and base 1830 are shaped in one of a variety of possible geometries. The upper extension is shaped and sized to accommodate the receptacle (or other connector), which can be mounted to it by adhesives, fasteners, clamps, and/or other attachment mechanisms. The rectangular base 1830 is sized in width WB sufficiently to allow placement of the clamp assemblies 1840 in appropriate slots 2120 that are typically located near the front face 2140 of the trailer bottom 2130. In an embodiment, the width WB of the base 1830 can be between approximately 1 and 2 feet, although a smaller or larger dimension can be defined in alternate embodiment.

The clamp assemblies 1840 are each mounted at an appropriate widthwise location on the base 1830 of the plate 1810, riding within horizontal slots 1850. The clamp assemblies each include a bar 1842 upon which a clamp member 1844 slides. The clamp members 1844 are in the form of conventional bar clamps that progress along a clamping direction (arrow 1846), as the user repetitively squeezes a grip 1848. Clamping pressure is released and the clamps can be moved opposite arrows 1846 to a more open state by toggling releases 1850. The bars include a hook or post 1852 that engages the slot 2120 in the trailer bottom 2130. The upper portion of each clamp member 1844 includes a flange 1854 that interengages a bolt 1858 on a lateral adjustment plate 1860 that bears against an opposing side of the plate 1810 when the flange 1854 is secured to the plate as shown. The 1858 bolt of the lateral adjustment plate 1860 passes through the slot 1850 in the plate 1810, and is secured to the flange 1854 by a nut 1864. The nut can be (e.g.) a standard hex nut, wing nut or threaded lever (for ease of attachment). The lateral adjustment plate 1860 also includes at least four pegs 1866, which surround the bolt 1858. These pegs are adapted to seat in holes 1870 located above and below each slot 1850 on the plate 1810. In this manner the clamp members 1844, of the corresponding assemblies 1840, can be adjusted and secured laterally (horizontally) along the plate 1810 so that each post/hook 1852 is located appropriately to engage a slot 2120 in the trailer bottom 2130. The back of the plate 1810 can include an elastomeric (e.g. neoprene, rubber, foam) backing 1910, which resists sliding friction when the plate 1810 is clamped securely to the trailer front face 2140 and protects the face 2140 form marring and scratching. The backing 1910 can include cutouts 2030, which allow the clamp assemblies 1840 to be adjusted along respective plate slots 1850.

In an alternate embodiment, the forward extension of the rods is mitigated by attaching the plate directly to the forward ends of each rod and providing a separate grippable clamp member that engages the front face of the trailer separately. In such an arrangement, the plate floats forward for the trailer face. Other arrangements in which a clamp engages slots on the trailer bottom and thereby secures an upright plate containing a connector are also expressly contemplated.

In an alternate embodiment, the receiving receptacle/receiver on the trailer can be mounted in a preferred available location on the front face of the trailer by the use of (e.g.) fasteners—such as an interengaging fabric sheet and/or tape fastener, including but not limited to, industrial grade hook-and-loop tape/sheet and/or Dual-Lock™ recloseable fasteners (available from 3M Corporation of Minneapolis, MN), or similar mechanisms, as a removably attached device when onsite (or permanently affixed). In an embodiment, the receiving receptacle is also marked with an identifying bordering pattern that the associated ranging/locating software can use to orient the robotic arm that removably carries the AV yard truck's connector/probe/coupling arm, and align this coupling device.

Figure 21:
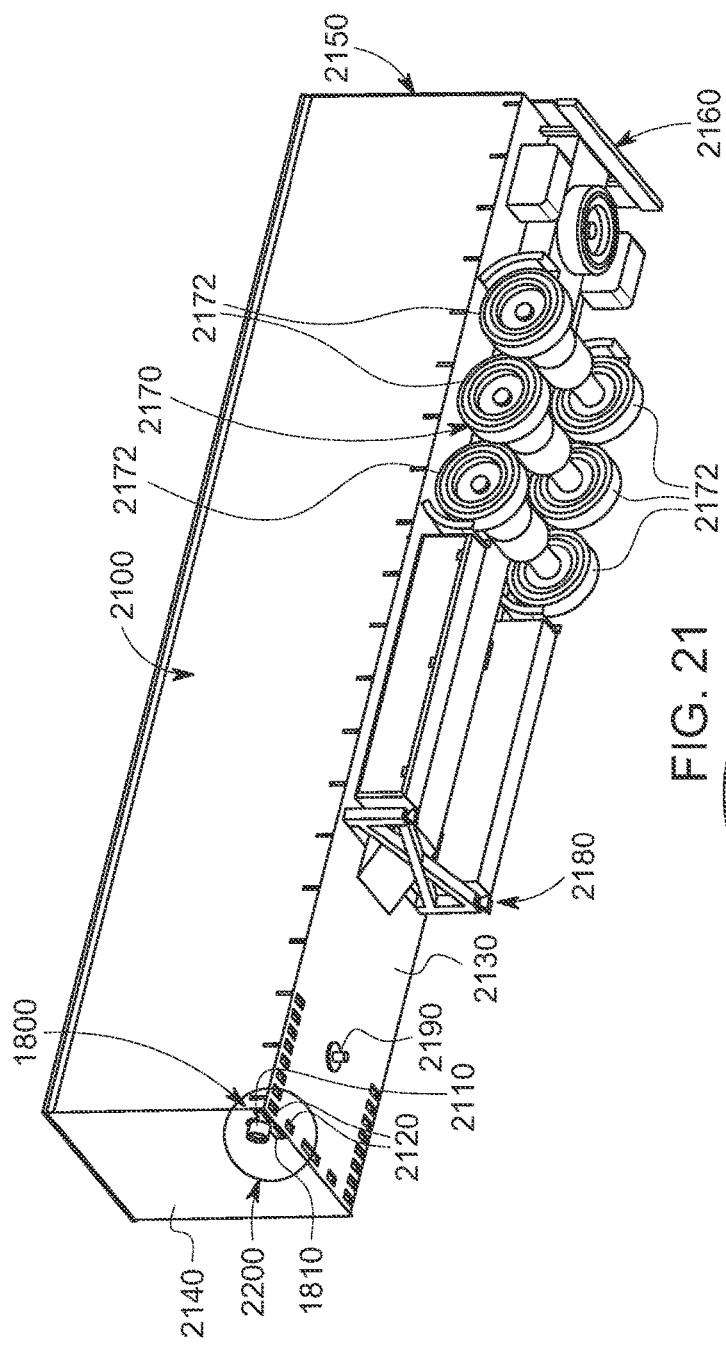
FIG. 21 is a bottom-oriented perspective view of a trailer showing various operational components thereof, including an attached, plate and bracket assembly with receptacle, according to FIG. 18.
Figure 22:
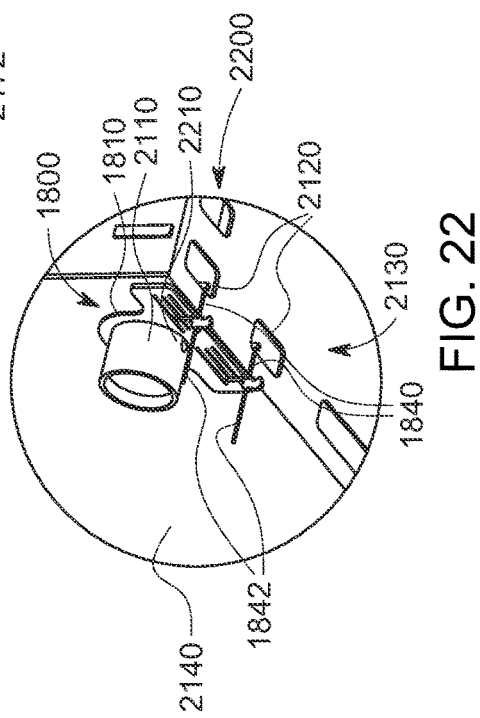
FIG. 22 is a more detailed fragmentary perspective view of the attached, plate and bracket assembly shown in FIG. 21.

For purposes of other sections of this description, the depiction of the trailer 2100 in FIG. 21 is now further described, by way of non-limiting example. The trailer rear 2150 can include swinging or rolling doors—among other types (not shown). An underride protection structure 2160 is provided beneath the rear of the body. A set of wheels 2172—in the form of a bogey arrangement 2170 is shown adjacent to the rear 2150. A movable landing gear assembly 2180 is provided further forward on the trailer bottom 2130. The kingpin 2190 is also depicted near the front face 2140 along the bottom 2130.

D. Modified Glad Hand Connector and Uses

FIGS. 23-25 depict a modified glad hand connector 2300 for use in various embodiments of the pneumatic connection arrangement herein. In general, the glad hand is modified to clamp so as to enable automatic connection to a stock fitted trailer, with a uniformly accepted glad-hand. This allows the vast majority of trailers currently on the road, regardless of model/brand, to avoid the need of a specialty retrofit in order to integrate with an AV yard truck as described herein, and its automated trailer attachment systems. The modified clamp, compatible with conventional glad hands, comprises a base 2310 with a rubber grommet 2320, which can optionally include a hollow central cone (dashed member 2322) protruding from the standard rubber grommet 2320 (to insert, and assist in glad-hand alignment, as well as allow the passage of air). The cone can be omitted in alternate embodiments and a conventional grommet geometry or another modified geometry—for example, a pronounced profile that compresses more when engaging an opposing glad hand grommet.

A thumb-like clamp (or "thumb") 2330 is provided on a pivoting clevis 2332 (double arrow 2334) at the inlet port 2340 of the modified glad hand 2300, to pivot toward the grommet 2320 when locked and pivot away from the grommet 2320 when released. As shown particularly in FIG. 25, the modified glad hand 2300 is interconnected with a standard glad hand fitting 2500, for example, part of the trailer pneumatic system. As shown, the thumb 2330 compresses on the top 2510 of the standard glad hand 2500 while the conventional turn-locked locking shoulder 2530 is unused, as such is omitted from the modified glad hand. Rather, in this embodiment, the seal between opposing glad hand grommets is secured by the pressurable engagement of the thumb 2330. The thumb 2330 is, itself, actuated between an engaged position (as shown) and a released position (not shown, but pivoted out of engagement with the standard glad hand) by an appropriate rotational driving mechanism—for example, a direct-drive or geared rotary solenoid and/or stepper motor 2350, that can include position locks or a rotational pneumatic actuator. Alternatively, a linear actuator, or other force-translation mechanism, can be employed with appropriate links, gearing etc. The actuator 2350 receives signals from an appropriate controller within the vehicle's overall control system when a connection is to be made or released.

In a further embodiment, the glad hand body (or a portion thereof) can be magnetized or provided with (e.g. powerful rare-earth) magnets, thereby allowing for magnetically assisted alignment and a positive pressure seal with the trailer glad hand. Such magnetic connection can also be used to assist in connection and alignment of other types of connectors, such as the above-described probe and receptacle connector assemblies.

In various embodiments, the modified glad hand can be used to interconnect directly from the AV yard truck's pneumatic system to that of the autonomously hitched/unhitched trailer. A variety of mechanisms can be used to perform this operation. Likewise, the connection described above, or another form of connection can be used with an appropriate guiding mechanism/system that can be integrated with various sensor or the rear face of the truck (e.g. cameras, LiDAR, radar, etc.).

In any of the embodiments described herein, it is contemplated that the receptacle can be arranged to coexist with conventional (e.g. glad hand) connectors and/or electrical connectors. A Y-connector (not shown), can be arranged to route to the receptacle(s) and to conventional trailer connectors—e.g. standard or custom glad hands that integrate with the conventional air system on (e.g.) an OTR truck or conventional yard truck. The Y-connector can include appropriate valves and venting so that it seals when needed, but allows escape of air to depressurize the system as appropriate. Battery powered or electrical-system-connected air valves (e.g. linear or rotary solenoid driven valves) of conventional design can be employed. This allows the receptacle assembly to act as a true retrofit kit, that can be mounted upon and stay with the trailer after it leaves the yard, or can be mounted offsite—for example, for trailers that will frequent the automated facility of the present embodiments.

E. Automated Guidance of Trailer Pneumatic and Electrical Connectors

Figure 26:
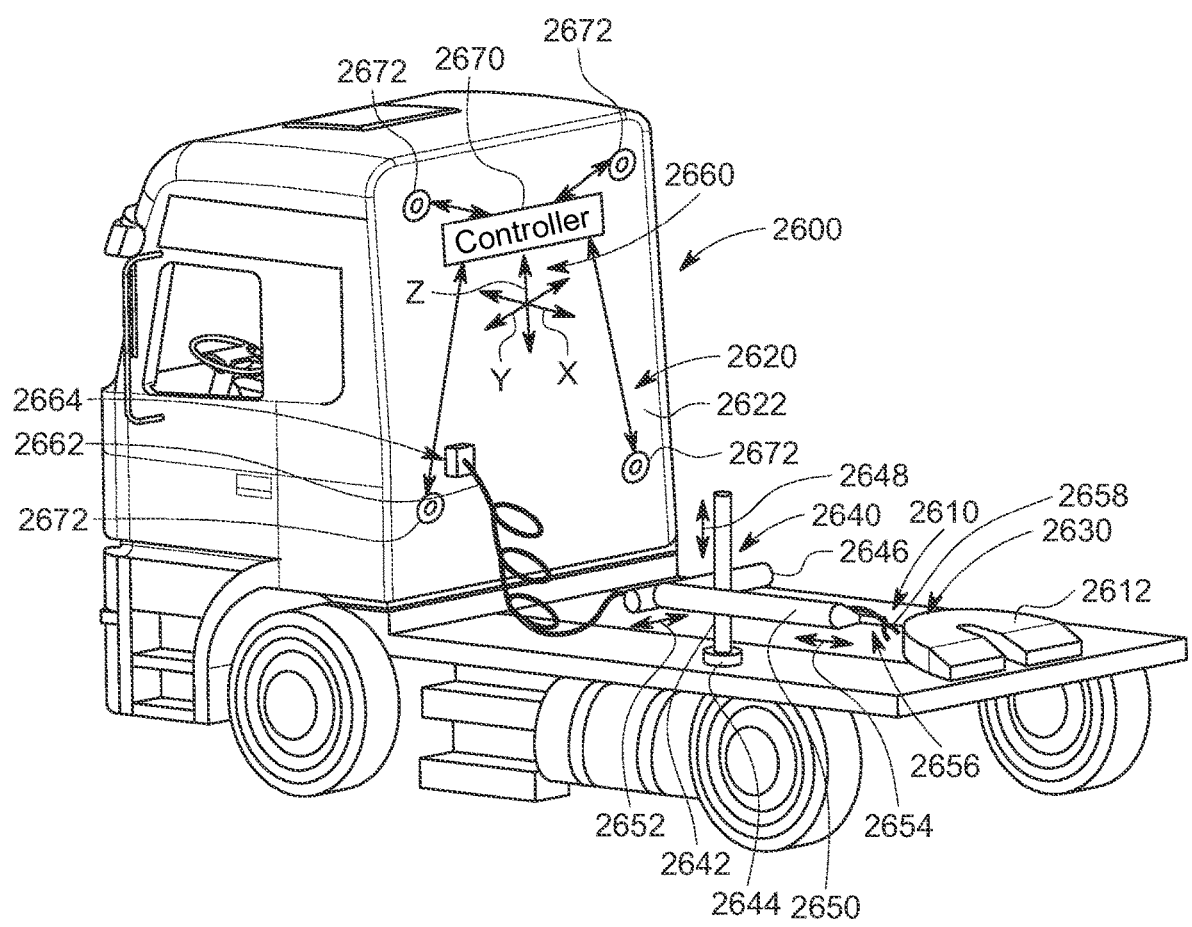
FIG. 26 is a rear perspective view of an AV yard truck showing a multi-axis robot arm assembly for connecting a truck pressure or electrical connector to a trailer receptacle according to an embodiment.

Reference is made to FIG. 26, which shows an AV yard truck 2600 having a conventional chassis bed 2610 with a fifth wheel 2612, and a cab 2620 in front of the chassis bed 2610. The area 2630 in front of the fifth wheel 2612 has sufficient space (between the rear face 2622 of the cab 2620 and the front face of a hitched trailer (not shown)) to accommodate a robotic framework 2640. In this exemplary embodiment, the framework 2640 consists of an upright post 2642 that is secured to the chassis bed 2610 at an appropriate location (for example offset to the left side as shown). The post 2642 can be secured in a variety of ways that ensures stability of the robotic framework 2640—for example, a bolted flange 2644 as shown. The upright post 2642 provides a track for a horizontal bar 2646 to move vertically (double-arrow 2648) therealong. Motion can be provided by drive screws, rack and pinion systems, linear motors, or any appropriate electrical and/or pneumatic mechanism that allows displacement over a predetermined distance (for example, approximately 1-2 feet in each direction). The horizontal bar 2646 could also support a rearwardly directed telescoping arm 2650 so that it can move (double-arrow 2652) horizontally/laterally from left to right (with respect to the truck 2600). The arm can move (double-arrow 2654) horizontally from front-to-rear using a variety of mechanisms that should be clear to those of skill, thereby placing an end effector 2656 ("coupling device") at precise x,y,z-axis coordinates (axis 2660) within a predetermined range of motion. The end effector can carry a modified glad hand or probe head as described above for attachment to the trailer glad hand or (e.g.) receptacle. The end-effector-mounted coupling device 2658 has a side-ported pneumatic hose 2662, that is, itself, linked to the vehicle port 2664 on the rear face 2622 of the cab 2620. In various embodiments, the vehicle port 2664 can also include a line tensioning system, so that slack in the line is pulled through (or in a direction of) the vehicle port 2664, and the port 2664 can maintain a controlled level of tension in the line. This avoids problems from an overly slacked line. That is, the end effector 2656 is moved via the controller 2670, which receives inputs from sensors 2672 of the type(s) and function(s) described above (camera, laser rangefinder, etc.). These sensors determine the position in 3D space of the trailer connector when present (e.g. after hitching is complete). Additionally, one or more vehicle-mounted air sensors 2666 can sense pressure and/or air flow in the airline, and can provide the sensed information to the control system so that the control system can monitor the pressure and/or air flow in the airline 2662.

In operation, using the robotic framework 2640, the alignment of the telescoping end effector 2656, and associated connector 2658 (e.g. the modified glad hand clamp) is directed, in part, by sensors 2672 in the form of 2D or 3D cameras. In various embodiments, one or more of the sensors 2672 can have a coating of a hydrophobic surfactant or surface treatment 2674, or can have a cover 2676 with a coating of a hydrophobic surfactant or surface treatment. It is recognized that, in an outdoor environment, it can be challenging to maintain adequate and consistent performance, particularly in extreme weather conditions. More generally, a desirable technique for mitigating the effect of heavy precipitation in various forms can be to apply coatings, surfactants, or surface treatments to affect the surface energy and wettability properties of various critical surfaces such as at sensor lenses, optical sight lenses, fiducial markers (explained below), and/or other surfaces to mitigate the accumulation of distorting water droplets. By using various treatments and/or chemical modifiers, a surface can have a high contact angle with water (low surface energy, low wettability) by creating a hydrophobic, water repelling surface, which can result in improved visibility in wet weather conditions.

Sensors 2672 can direct, in part, the use and alignment of various autonomous connection hardware, however, more detailed information of the trailer type and precise receptacle location can also be read off of the trailer (e.g.) using a QR/Bar or other appropriate, scannable ID code, RFID or other data-presentation system. This embedded value can provide a precise x,y,z-coordinate location of the receptacle and optionally the rotations, $\theta_x$, $\theta_y$ and $\theta_z$, about the respective x, y and z axes. In an embodiment, the location can be computed in relation to a fixed point, such as the code sticker itself, kingpin, trailer body edge and/or corner, etc. In another embodiment, the receiving connector is surrounded by a specific pattern of passive reflective stickers that can be used to home in on the specific location of the receiving connector.

As described above, a conventional or custom passive or active RFID sticker/transponder, or another trackable signaling device can be placed directly on the trailer connector (e.g. glad hand), to assist the end effector 2656 in delivering the connector(s) 2658 precisely to the alignment position. The sticker can either be placed at the time of the guard shack check-in, or by the driver, as the OTR connectors are disengaged.

A plurality of safety-related lockout systems can be present on the autonomous vehicle. Industrial manipulators are generally used in environments where securing the system against unintended, unsafe operation can be achieved with hard barriers, fixed presence detection systems, and integrated manipulator braking systems. Given the mobile nature of the autonomous trailer connection hardware described herein, various mobile safety components and procedures can be used to ensure the manipulator's safe operation and storage when not in use. The safety components can include a combination of a hardened safety-rated limit switch, switches on vehicle cab ingress/egress areas, robot-controller-carried safety coprocessors for position monitoring, and/or vehicle-carried LIDAR sensors that can ensure secure operation and storage of the manipulator, even when the overall vehicle is moving and operating autonomously. Various safety components can work in collaboration to ensure the safety of human operators and capital equipment on, in, or near the autonomous vehicle when operations are in progress.

Each door into the cab of the truck can have a safety switch 2684 to protect the human operator, in the event that a human operator is required to assist in the operations. The safety switch 2684 can be (e.g.) a non-contact, safety-rated Reed switch, and every door leading into the vehicle cockpit can have a safety switch 2684. These switches can provide immediate feedback if the operator will potentially be entering the workspace, and the switches can be part of a safety interlock chain for enabling and disabling operation of the robotic manipulator.

In various embodiments, the available reach, or workspace, of the robotic manipulator can extend beyond the limits of the vehicle frame. This scenario can pose a hazard for individuals who may be near the vehicle, and can also result in excessive and unnecessary shock loading to the manipulator's electromechanical components during transport. The vehicle can include a stow pedestal 2686 that can have an integrated safety-rated limit switch 2688, so that the control system can verify when the robotic manipulator is properly and safely stored. The limit switch 2688 can be part of the safety interlock chain for enabling vehicle motion, by way of example. The control system can include a lockout function, which requires that the manipulator is in a stowed state before other vehicle operations can occur.

Various safety related electronics, also known as a functional safety unit, 2671 can be integrated into the controller 2670. The functional safety unit 2671 can analyze the position and velocity of the manipulator in order to determine the proximity of the system to programmable safety zones. Safety zones can be programmed to encapsulate the vehicle frame (e.g. vehicle cab, guard rails, sliding access door, etc.) to protect capital equipment against collisions. The functional safety unit 2671 can require that the manipulator must operate outside of volumetric areas defined by coordinates programmed into the functional safety unit in order for the functional safety unit to enable manipulator motion.

Sensors 2672 can include onboard LIDAR hardware, cameras, and other various sensors of appropriate type and/or configuration (that should be clear to those of skill), which can be used for vehicular obstacle detection and avoidance through visual and other object detection/range-finding techniques. The various sensors can also be used to check the area around the vehicle for objects that are on-course to enter the manipulator workspace. The system can use appropriate logic/algorithms to determine that an approaching object is an immediate hazard if an object is closing a predetermined distance to the manipulator at a predetermined or higher velocity. Notably, the determination based on distance and velocity as described herein is a significant improvement over existing and/or prior art systems that determine a potential hazard based only on a distance measurement. Note also that one or more of the safety components described herein can be combined together as part of a safety lockout chain, so that all components in the chain can be required to indicate a safe condition before the manipulator is activated.

Figure 26A:
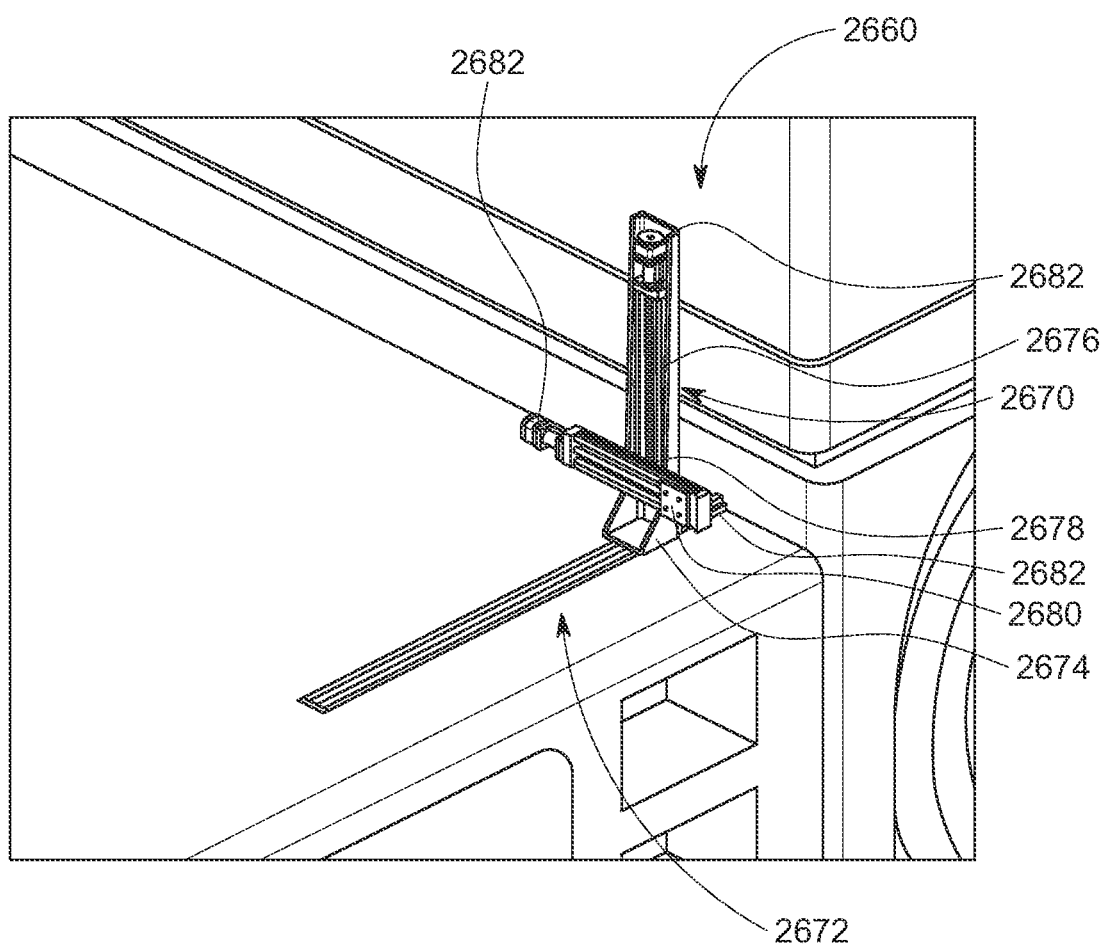
FIG. 26A fragmentary perspective view of the rear of an AV yard truck having a three-axis (triple) linear actuator adapted to deliver a coupler to a receiver according to an embodiment.

Another embodiment of a robotic manipulator 2670, mounted on the rear of an AV yard truck 2660, is shown in FIG. 26A. This manipulator, 2670, also adapted to handle the AV yard truck's service connector (e.g. emergency brake pneumatic line connector) and defines three orthogonal axes of motion. It consists of a horizontal, base linear actuator or motor 2672, arranged to carry a shuttle 2674 forwardly and rearwardly a sufficient distance to reach the receiver on the trailer (not shown) in a rearward orientation and clear the trailer's swing motion in a forward location (e.g. at least approximately 1-4 feet of motion in a typical implementation). The shuttle 2674 supports a perpendicular linear motor 2676 that moves a third, orthogonally arranged horizontal linear motor 2678 upwardly and downwardly (vertically, e.g. approximately 1-3 feet). The third motor 2678 includes a mounting plate 2680 that can hold a gripper or other hand assembly that can move in one or more degrees of freedom (e.g. 1-3 feet) and selectively grip the service connector for insertion into the trailer receiver/coupling. The linear motors can be effectuated by a variety of techniques. For example, each can include a stepper or servo motor 2682 at one end, that drives a lead screw. Other mechanisms, such as a rack and pinion system can be used in alternate arrangements. As with other manipulators herein, the range of motion for each axis or degree of freedom is sufficient to ensure that during transit of the truck, the robot does not interfere with normal operation, including swing of the trailer during turning, and also to ensure that the hand or end effector of the robot can reach and insert a carried connector/coupling into an appropriate receiver/receptacle on the trailer during hitching and hook-up.

Figure 27:
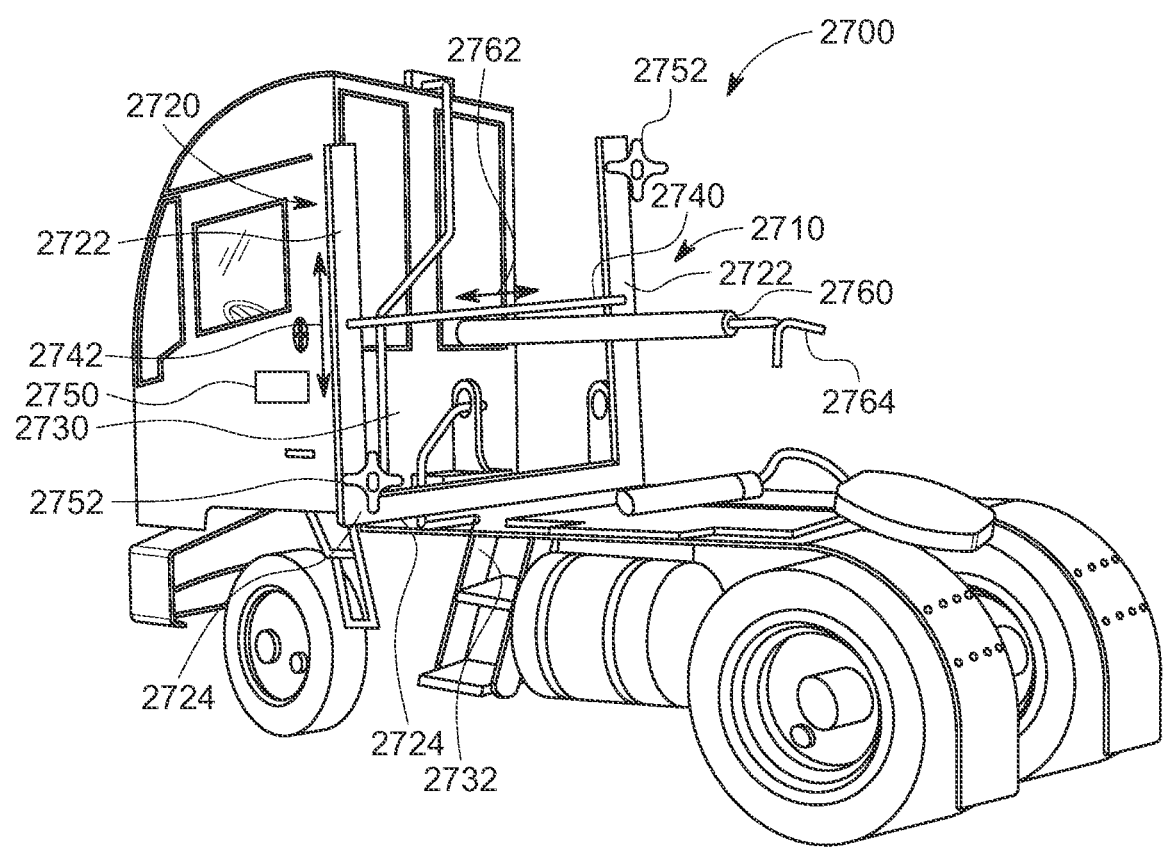
FIG. 27 is a rear perspective view of an AV yard truck showing a robotic framework and telescoping arm and end effector assembly for connecting a truck pressure or electrical connector to a trailer receptacle according to an embodiment.

FIG. 27 depicts an AV yard truck 2700 with automated connection system 2710 according to another embodiment. This system 2710 employs a U-shaped frame 2720 with opposing uprights 2722 on each of opposing sides of the cab rear face 2730, and a base bar 2724 mounted to the chassis 2732. The uprights 2722 each carry a gear rack that is engaged by a servo or stepper driven pinion on each of opposing sides of a cross bar 2740. The cross bar 2740 moves upwardly and downwardly (vertically, as shown by double-arrow 2742) based on control inputs from a controller 2750 that receives position information on the trailer connector based on rear-facing, cab mounted cameras 2752, and/or other appropriate sensor type(s). A telescoping arm 2760, with appropriate end effector 2764 (and/or directly arm-attached connector/glad hand), moves laterally (horizontally, as shown by double-arrow 2762) based on the controller using (e.g.) a leadscrew drive, linear motor or rack and pinion system. Telescoping is provided by another motor or actuation system that should be clear to those of skill, thereby providing at least three (3) degrees of freedom of motion. The end effector 2764 can, optionally, include articulated joints, knuckles and/or other powered/movable structures clear to those of skill (in both this embodiment and the embodiment of FIG. 26). The framework system 2710 can be custom-built, or fully/partially based upon an existing, commercially available system, such as a printing servo frame.

Figure 28:
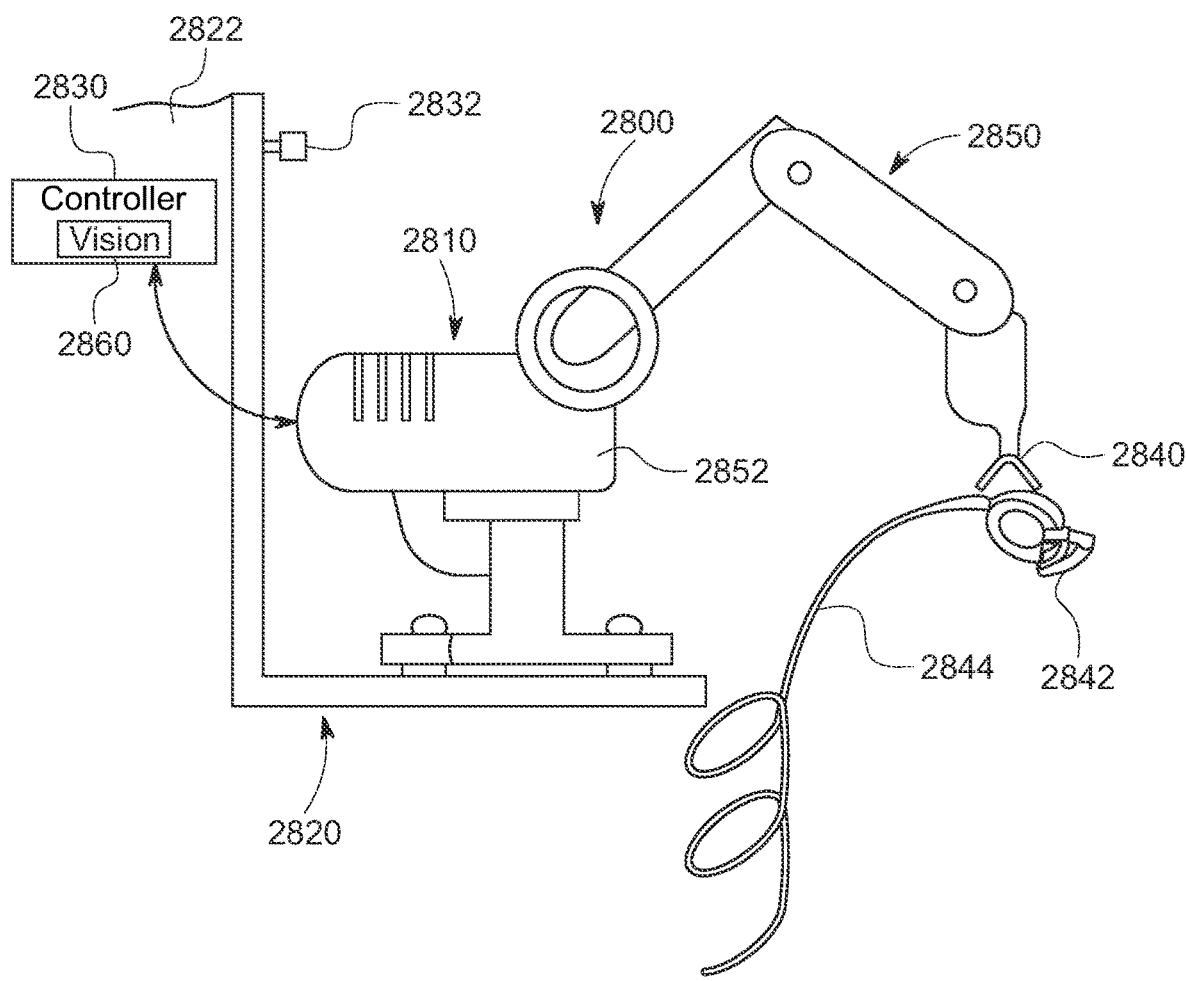
FIG. 28 is a fragmentary side view of a truck chassis showing a multi-axis robotic arm and end effector assembly for connecting a truck pressure or electrical connector to a trailer receptacle according to an embodiment.

With brief reference to FIG. 28, an automated connection arrangement 2800 can comprise a multi-axis robot 2810, available from a commercial supplier, (or custom built), and adapted to outside/extreme environments as appropriate. The design and function of such a robot should be clear to those of skill. In general, the robot 2810 is mounted to the chassis, behind the truck cab 2822. It communicates with a controller 2830, which receives inputs from one or more sensor(s) 2832. As described above, the sensors 2832 can be used to identify both the trailer connector and its associated 3D location and the 3D location of the end effector 2840, and the associated connector 2842, which is carried by that end effector. The connector 2842 is shown connected to a hose 2844, that is, likewise, connected to the truck pneumatic and/or electric system. The end effector is a distal part of fully articulated (e.g. 5 or 6-axis) robot arm 2850 and base 2852. It is servoed (i.e. it is guided using sensory feedback) by commands from the controller 2830. Where 2D or 3D camera sensors are employed (in any of the embodiments herein), they can be connected to a vision system 2860. A variety of commercially available vision systems can be employed—typically operating based on pattern recognition, and trained on model (e.g.) 3D data. Such systems are available from a variety of vendors, such as Cognex Corporation of Natick, MA. These systems include modules for robot control.

Using a fully-articulated, multi-axis robot can enable the connector 2842 to be either modified or conventional (e.g. a standard rotation-locked glad hand). In the case of a conventional connector, the robot 2810 can be trained to move the end effector containing the connector along its several axes, in which the robot arm 2850 and base 2852 is trained to align and rotate the (e.g.) glad hand into a securely locked/sealed position during connection, and to counter-rotate/unlock the glad hand during disconnection. In various embodiments, the fingers, or grippers, on the end effector 2840 can be made from an elastomeric material, so that they can flex and/or provide shape-conforming compliance and associated gripping friction relative to the gripped object. The flexibility in the grippers of the end effector 2840 can allow compliance that can help to avoid binding, explained more fully below. In various embodiments, the grippers on the end effector 2840 can (alternatively, or additionally) have pads 2841 comprised of elastomeric material to provide compliance and conform to the external contour of a gripped object. Additionally, these grippes could utilize pneumatic suction elements or otherwise to increase or aid in the attachment.

Figure 28A:
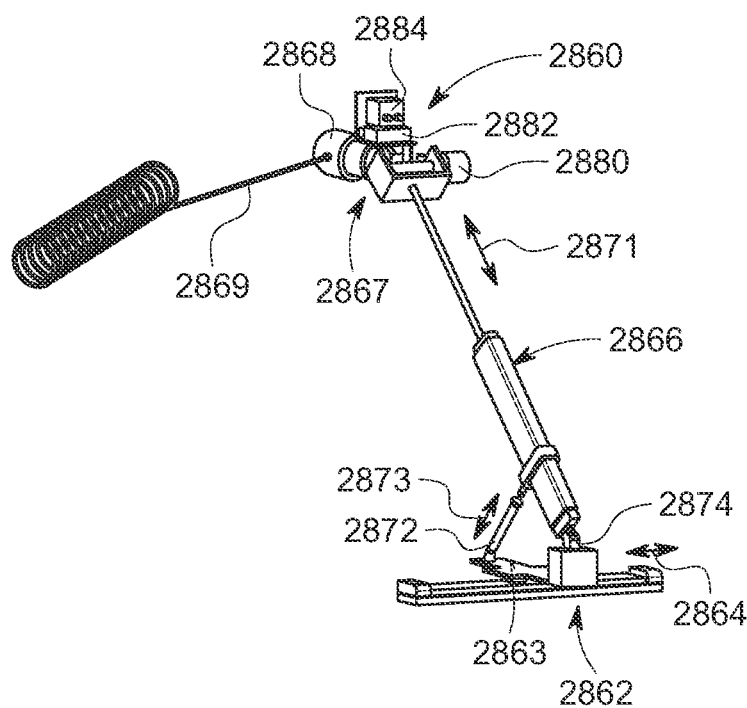
FIG. 28A is rendering perspective view of an AV yard-truck-mounted robotic manipulator, including an arm/wrist/hand delivery mechanism with interconnected trailer pneumatic line (air hose) and coupling device, according to an embodiment.
Figure 28B:
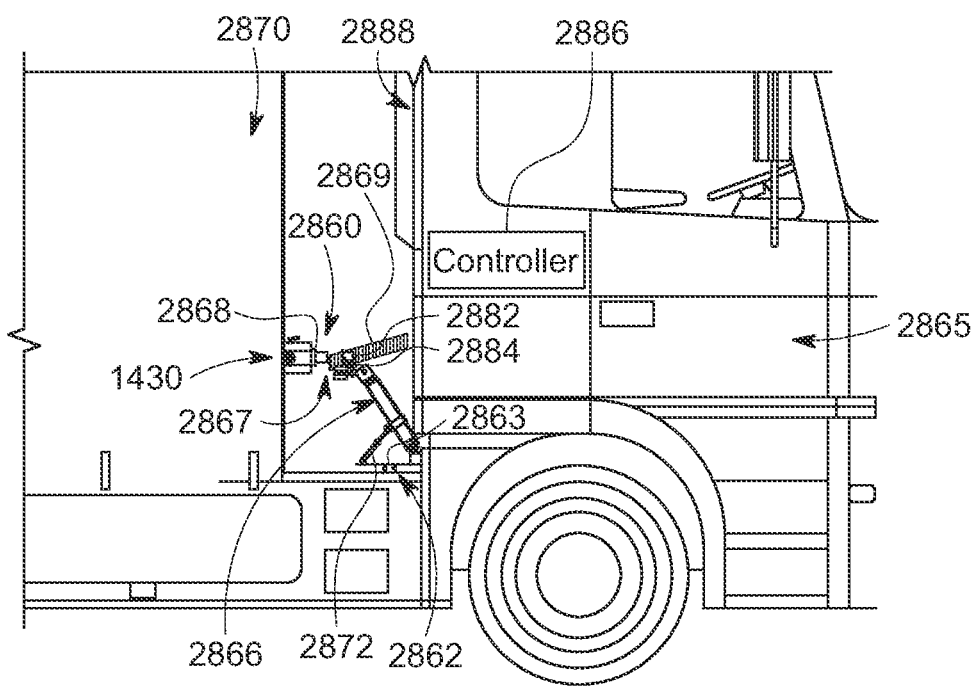
FIG. 28B is a fragmentary side view of an exemplary AV yard truck and trailer hitched thereto, having of the arm/wrist/hand delivery mechanism of FIG. 28A, and a corresponding receiver mounted on the trailer.
Figure 28C:
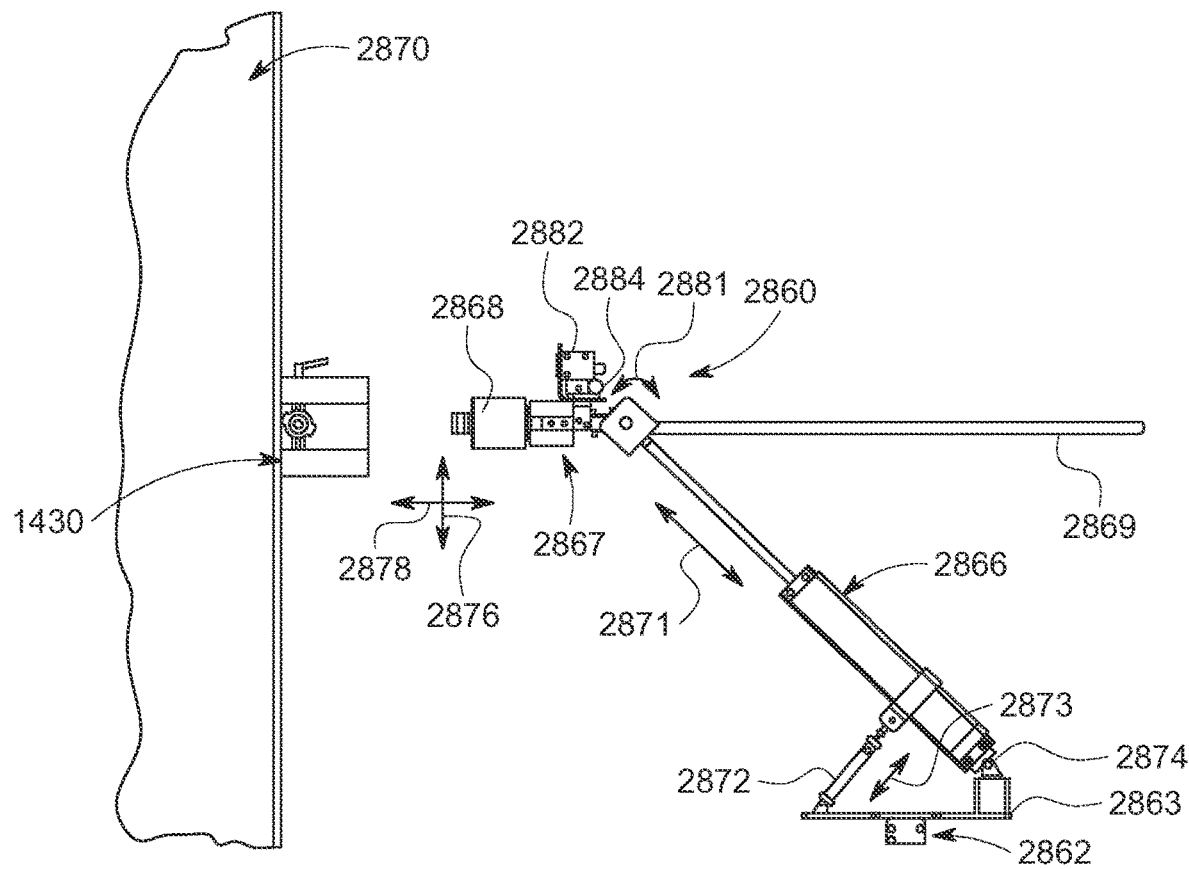
FIG. 28C is a side view of the arm/wrist/hand delivery mechanism of FIG. 28A shown making a connection to the trailer-mounted receiver.

FIGS. 28A-28C depict an automated connection arrangement 2860 according to another embodiment. The arrangement 2860 consists of a horizontally, left-right, positioned linear actuator or screw-drive base 2862 (as also described generally above—see, for example, FIG. 26A) with a baseplate 2863 mounted to the actuator/screw-drive 2862, allowing for lateral movement (double arrow 2864) across the back of the truck 2865 (e.g. approximately 1-3 feet). Attached to the baseplate 2863 is a large hydraulic or pneumatic piston 2866, with an articulating end-effector (also termed a "hand") 2867, shown holding onto a releasable coupling assembly 2868 (see, for example the female portion of the connector 880 in FIGS. 8B-8E above), which can remain connected to the trailer receiver after the end-effector/hand 2867 has been retracted. Also associated with the coupling 2868 is a side-ported pneumatic line/hose 2869 that connects back to the main AV yard truck air-system. Routed with the pneumatic line 2869 is electrical power, used to operate an actuation device on the air-connection device (e.g. solenoid sleeve 892 in FIGS. 8b-8E), as well as to optionally connect electrical power to the trailer 2870 (as described above—see for example, FIG. 8A). In addition to the large piston 2866 that is primarily used to selectively extend (e.g. 1-4 feet) the end effector 2867 out toward the trailer 2870 and retract the end effector away from the trailer 2870 (double-arrow 2871), there is a smaller hydraulic or pneumatic piston 2872 that is pivotally affixed to both the baseplate, and as the belly side of the large piston 2866. Motion (double-arrow 2873, 3-9 in) of this smaller piston 2872 is responsible for allowing the entire arrangement to move up/down by inducing rotation about a base pivot 2874. More particularly, the motions of three discrete actuators is coordinated to allow the end effector 2867 and its gripped connector 2868 to move in two orthogonal directions—vertically (double-arrow 2880 and horizontally (forwardly/rearwardly—double-arrow 2878). That is, as the large/main piston 2871 strobes inwardly and outwardly, and appropriate height is maintained by changing the position of the smaller piston 2872 (which also has a smaller effect on front-to-rear position). A rotary actuator 2880 changes the relative angle (double-curved-arrow 2881) of the end effector 2867 so that the gripped connector 2868 remains horizontally aligned (level) with the trailer receiver 1430 (described above). That is, as the smaller piston 2872 changes the angle of the larger piston 2866 relative to the truck, the rotary actuator re-levels the end effector. Appropriate motion sensors, accelerometers, gyros and other position/attitude sensors can be employed to maintain level. Such sensors can be located on the end effector and/or elsewhere on the arrangement 2860. Alternatively, or additionally, using stepper motors, differential controllers, etc., the angular orientation of the end effector 2867 can be computed based on the relative positions of the two pistons 2866, 2872, and the rotary actuator 2880 can be adjusted to level the end effector 2867 (in a manner clear to those of skill).

In an embodiment, a camera 2882 and ranging device 2884 of conventional or custom design are mounted on top of (or at another location on) the end effector. These components are interconnected via wires or wirelessly to a processor (e.g. the AV yard truck controller 2886, or a module thereof), which operates a vision system to assist in coupler/receiver alignment (as described above). Ranging and alignment are also assisted by any of the previously mentioned optional components or arrangements above (e.g. reference position to known location, reflective patterned stickers, etc.).

In operation, the arrangement 2860 of FIGS. 28A-28C, initiates function after the AV yard truck 2865 hitches to the trailer 2870 under operation of the controller 2886. The controller (or another processor/module) 2886 then instructs the end effector 2867, which is gripping the coupler 2868 to move from a retracted position toward the receiver 1430 on the trailer. The camera 2884 and range finder 2882 acquire the receiver 1430 using a variety of techniques as described above. Other cameras on the truck rear face 2888 can also assist in locating the receiver as appropriate. The controller 2886, or a localized motion module/processor on the arrangement 2860 servos the linear motor 2862 to laterally (side-to-side) align the end effector 2867 and coupler 2868 with the receiver. Subsequently, or concurrently, the large and small pistons 2866 and 2872 are stroked (large piston outwardly and small piston inwardly) while the rotary actuator 2880 rotates to maintain a level angle, thereby bringing the coupler 2868 into engagement with the receiver 1430. After engagement, the electronic locking solenoid in the coupler de-energizes and causes the (e.g. female) quick disconnect fitting to springably lock onto the receiver (e.g. male) fitting. The end effector 2867 then releases and the arrangement returns to a retracted location on the truck chassis rear—out of interfering contact with the trailer. The connection is made only by the flexible pneumatic line 2869, which can bend and stretch freely as the trailer swings relative to the truck during normal driving motion.

Disconnection of the coupled connectors 1430, 2868 is the approximate reverse of connection, as described above. That is, the end effector moves back into engagement with the coupler 2868 and grips it. The solenoid in the coupler energizes, allowing for unlocking from the fitting in the receiver. The pistons 2866, 2872 and rotary actuator 2880 move in a coordinated manner to withdraw the coupler and move it to a neutral (retracted) location. The linear actuator 2862 can also move to a neutral location as appropriate. The trailer is then unhitched in a manner described above.

As the autonomous connection hardware is typically operating in an environment that is relatively unpredictable, with vehicles coming and going and objects/vehicles potentially crossing or blocking normal paths of travel, a system that can monitor the surrounding environment can significantly assist in improving safety and reducing unwanted collisions. The system can use various sensors to collect information about the topology of the robotic system's workspace, including the trailer geometry, trailer face position, items supporting the operation of a trailer, and other obstacles that may impede movement or present collision hazards. As described below, the system can be arranged to scan the workspace, make determinations about particular trailer characteristics, identify occupied portions of the workspace, project the swing arc of trailer-mounted objects, and/or provide for more precise scans of target regions to assist in reconnection or remote assistance efforts. Sensors used in initial scans and/or rescans can include LIDARs, Reed sensors, RGB cameras, and other non-contact sensors.

Figure 29:
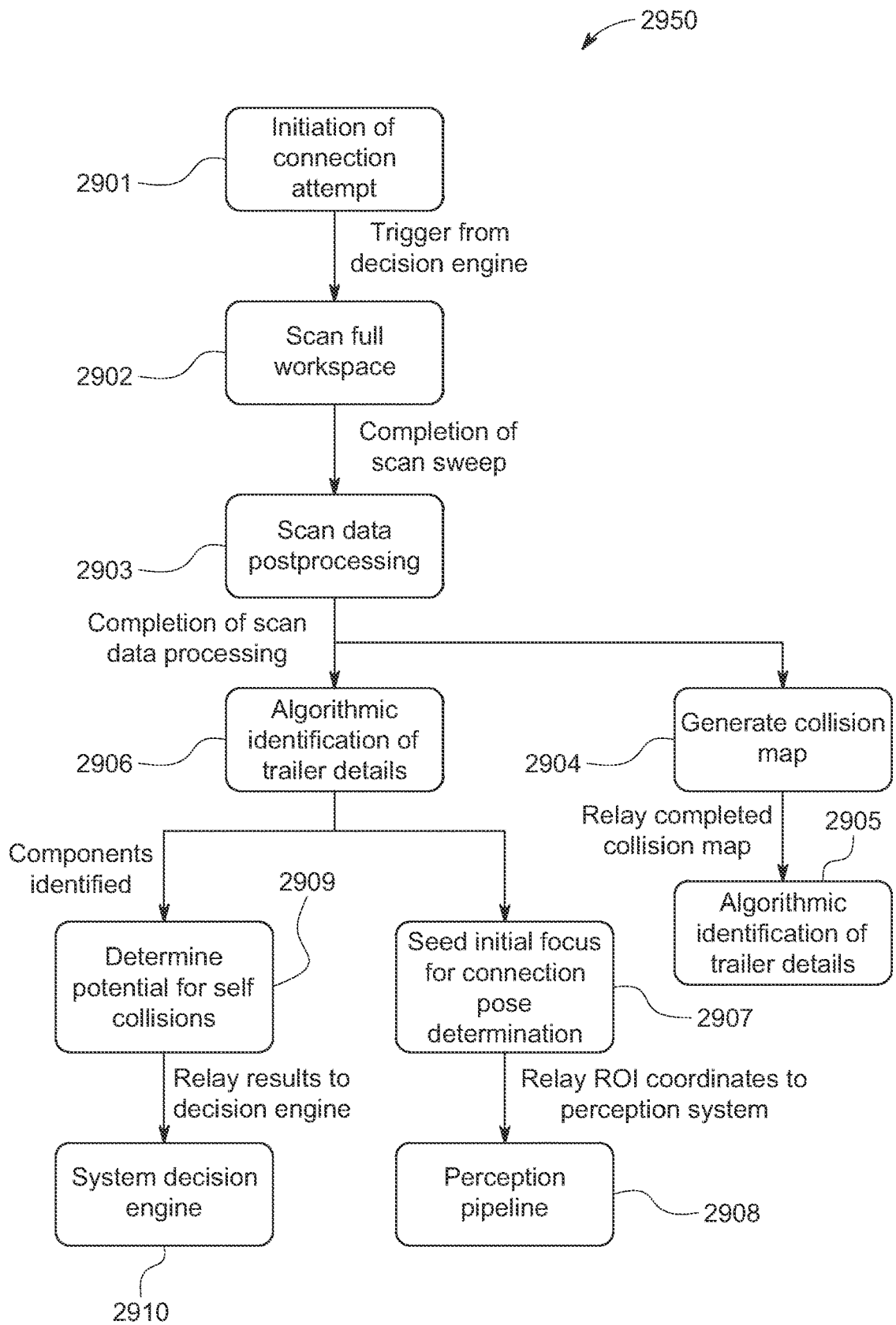
FIG. 29 is a flow diagram of an exemplary obstacle detection and collision avoidance procedure.

FIG. 29 is a flow diagram of an exemplary obstacle detection and collision avoidance procedure 2900. When the system initiates a connection or disconnection sequence at step 2901, this can trigger a full scan of the workspace to take place at step 2902. The system can scan the full extent of the possible workspace, as defined by the excursion constraints of the connecting and manipulating hardware. After completion of the full scan (or another benchmark), the collected data can be processed at step 2903 to improve data fidelity and shorten processing time. The system can then begin a two-fold conversion and identification process. At step 2904, the data can be used to create a collision map indicating the occupied space in the working environment. This collision map can be used to inform motion planning for the manipulation hardware at step 2905. At step 2906 the data can also be used in identification of trailer components, and separation of trailer components from truck components. Scanning can also include scanning the nearby surroundings for unique trailer traits, such as reefer components, tool boxes, etc. The information generated at step 2906 can then be used at step 2907 to seed the initial focus for connection point identification efforts, described more fully below. The initial location estimates generated at step 2907 can be relayed to the vision system at step 2908 for use in determining the location and pose of the trailer connections, explained more fully below. The information generated at step 2906 can also be used at step 2909 to predict the occurrence of self-collisions during normal truck operations between the trailer hardware and the truck, including the manipulation hardware mounted on the truck. The prediction of the possibility of self collisions can also incorporate information from other vehicle actuators, such as fifth wheel height in making the determination. The information generated at step 2909 can be relayed to a system decision engine that can make decisions about motion plans and possible collisions at 2910.

Figure 29A:
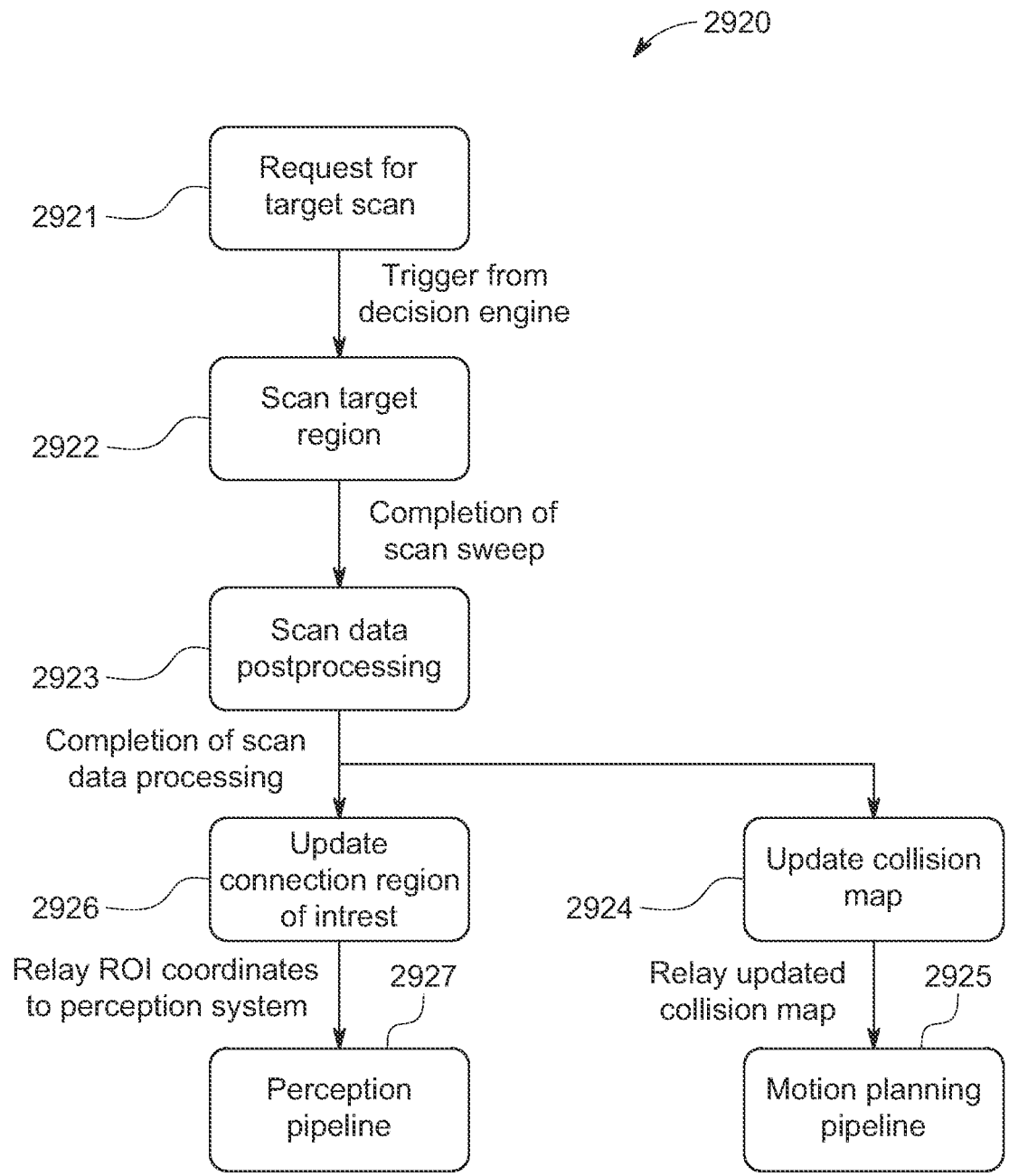
FIG. 29A is a flow diagram of an exemplary procedure for rescanning at least a portion of the working environment.

FIG. 29A is a flow diagram of an exemplary procedure 2920 for rescanning at least a portion of the working environment. Throughout the progression of a typical sequence, conditions may arise where rescanning all or a portion of the working environment can be called for to continue operations. Capability can exist in the obstacle detection subsystem to allow for targeted scans to focus on a region of interest with a configurable degree of precision. The targeted scans can improve the capability of the system to identify objects, determine the detailed topology of connection-point-containing regions, and/or update gross portions of the workspace collision map before further motion planning takes place. In various embodiments, the manipulation hardware can be removed from a scan through the use of prior-known state information about the manipulator's configuration.

At step 2921, the system can request for an additional scan of a target region, which can be triggered from the decision engine. At step 2922, the requested target region can be scanned, which can be a scan of less than the entire workspace. After completion of the target scan, the collected data can be processed at step 2923 to improve data fidelity and shorten processing time. The system can then begin a two-fold updating process. At step 2924, the data can be used to update the collision map indicating the occupied space in the working environment. This updated collision map can be used to inform motion planning for the manipulation hardware/process(or) at step 2925. At step 2926, the data can also be used to update information on the connection point region of interest, and the updated information on the connection point region of interest can be relayed to the vision system for use in determining the location and pose of the connection points at step 1927.

III. AV Yard Truck Operation

Figure 29B:
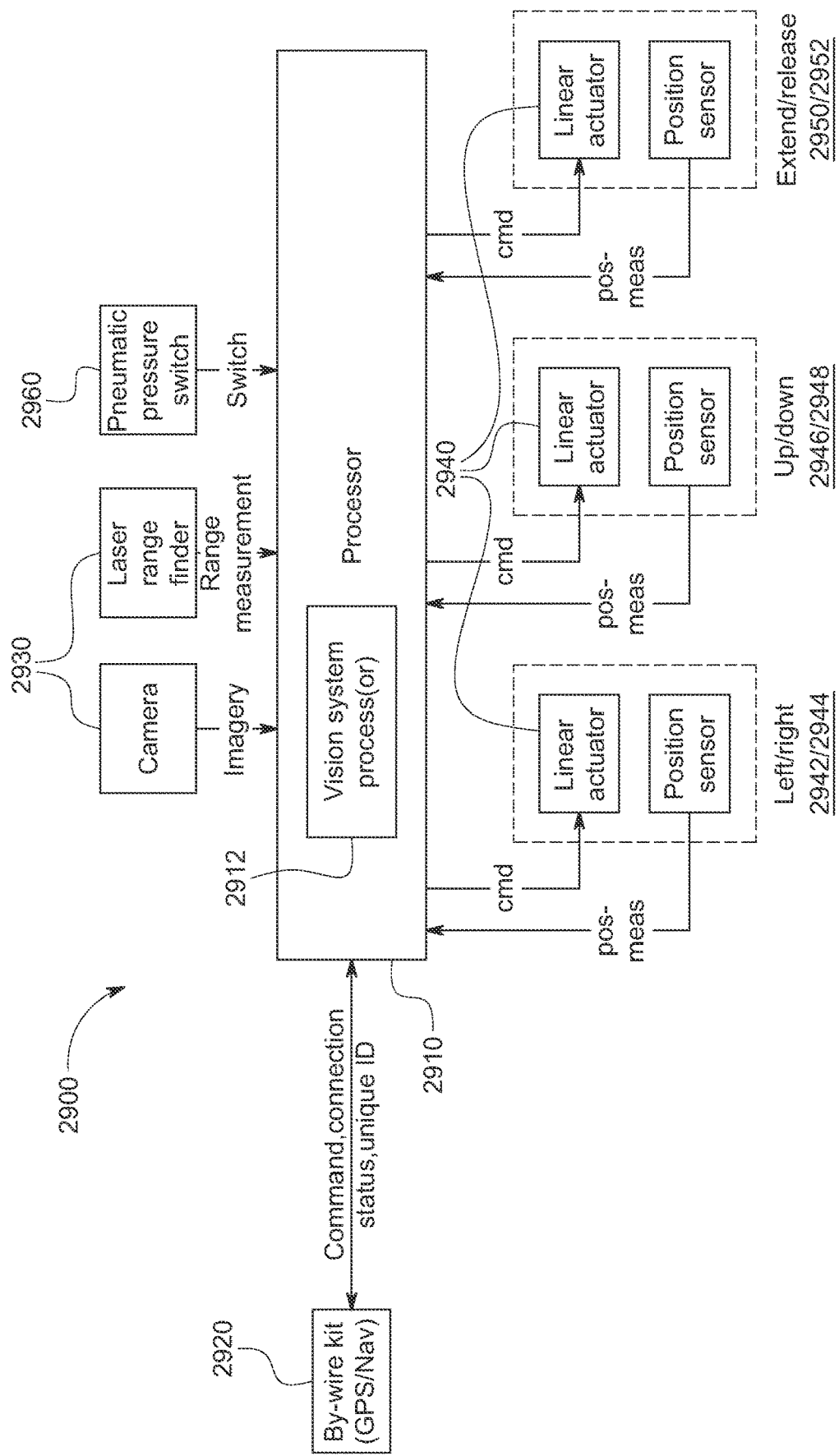
FIG. 29B is a block diagram showing generalized procedures and operational components employed in hitching an AV yard truck to a trailer, including the connection of one or more service lines using a robot manipulator according to an embodiment.

Further to the general operation of an AV yard truck as described above, once the designated trailer has been successfully secured/hitched to the AV yard truck (pneumatic line(s), optional electrical connections, and kingpin), the fifth wheel is raised by operation of the controller, in order to clear the landing gear off the ground, and the trailer is then hauled away. Reference is made to the block diagram of FIG. 29B, showing an arrangement 2930 of functions and operational components for use in performing the steps described above—particularly in connection with the hitching of a trailer to the AV yard truck. As shown, the processor/controller 2940 coordinates operation of the various functions and components. The AV yard truck is instructed to drive to, and back into, a slip containing the trailer. This movement can be based on local or global navigation resources—such as satellite based GPS and/or yard-based radio frequency (RF) beacons 2950. Once within optical range, the camera(s) and/or other sensors (e.g. RF/RFID-based) 2960 can transmit images of the trailer to the vision system process(or) 2942, locating the trailer's receptacle or similar connector. As the receptacle/connector is identified, the truck and/or manipulator (e.g. robotic framework, robot arm, etc.) 2970 can be servoed by the vision system to attempt to align the end effector and associated truck probe/connector with the trailer receptacle/connector. This can include a variety of motion commands (denoted "cmd"), including moving the framework/arm left 2972, right 2974, up 2976 and down 2978, and extending/retracting 2980 the (e.g.) telescoping arm/member of the robot manipulator to move the truck probe/connector a desired 3D location and impart a required attachment motion i.e. insertion of a probe into the receptacle. Appropriate knowledge (denoted as "pos-meas" of current arm position (e.g. counting stepper motor/encoder steps, providing servo feedback and/or using visual tracking via a guidance camera assembly) can be returned to the processor 2940 as the arm components move. The arm can be released (block 2982) at this time so the connection between the truck and trailer pneumatics (and optionally, electrics) is able to flex as the vehicle turns. Once connected, the pneumatic pressure of the truck is switched on (block 2990) by the controller. The controller also then lifts the fifth wheel when using appropriate hydraulic/pneumatic (more generally, "fluid" herein) pressure actuators on the truck to raise the trailer landing gear out of engagement with a ground surface and allow it to be hauled to another location in the yard.

IV. Additional AV Yard Truck Devices and Operations

A. Secondary Pressure Source

In order to simplify yard truck to trailer connection for the large variations in service connection locations that exist, one option is to produce adapter connectors that could be applied to any configuration, producing a universal connection location on any trailer. This connector can be provided and/or connected at the guardhouse, or by the driver during OTR disconnection. In addition, a provided glad-hand to universal connection air-line adapter' could be connected to the trailer's existing glad-hand system by the OTR driver, during disconnection. This can allow for a variety of options, more suitable for AV truck connection, to be accomplished. Also, in addition to the universal adapter, the system can include a cone that shrouds the universal connector and allows for a reduction in the need for accuracy of alignment. The cone can physically assist in the guiding and alignment of the service line connection.

To avoid the need for any service (pneumatic, etc.) connection from AV yard truck to trailer, in an alternate arrangement, a compressor or pre-compressed air tank can be secured to the trailer (e.g. at the guardhouse, or by the driver, during OTR disconnection). The pressurized air can be capable of releasing the emergency brakes of the trailer via a (e.g. RF) signal (from the AV yard truck), or a physically closed contact occurring during the kingpin hookup of the AV yard truck that senses that the trailer is now hitched to the truck. This system can then be removed when the trailer exits the yard via the guard shack. As needed, the tank can be recharged for future reuse by a compressor system within the yard.

B. Automated 'Tug-Test'

A truck tug-test is a mechanism by which the fifth-wheel connection of a truck to its trailer is confirmed by placing the truck into a forward gear and pulling against the trailer while the trailer's brakes are still engaged. If the truck encounters strong resistance, this proves that the fifth wheel engagement has been successful.

Figure 30:
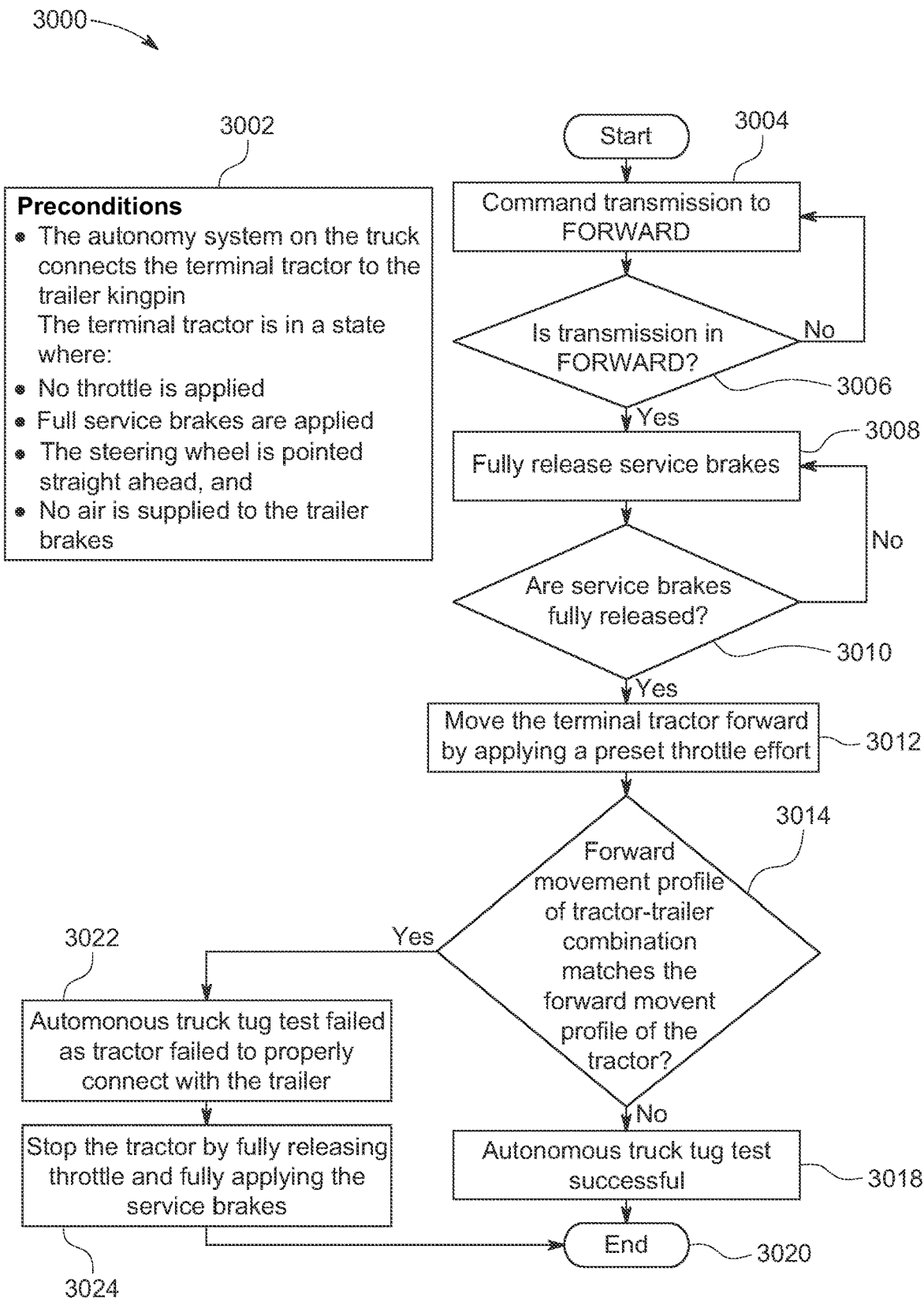
FIG. 30 is a flow diagram of an exemplary tug-test procedure for use with an autonomous truck to verify proper hookup of a trailer thereto.

From a safety standpoint, it is desirable that this same tug-test be employed by an autonomous (e.g. AV yard) truck. With reference to the procedure 3000 of FIG. 30, the autonomous truck tug-test procedure 3000 assumes that before being activated the truck is positioned such that the entire fifth wheel is under the front edge of the trailer floor/skid plate (the trailer is physically sitting on the tractor fifth wheel) there is no gap between the fifth wheel and the trailer floor/skid plate, and the fifth-wheel has been raised sufficiently so that the trailer's landing gear is clear of the ground (in order to avoid landing gear damage during test). Further, the autonomous truck tug-test procedure 3000 is adapted to detect proper mechanical coupling with a fifth wheel in the absence of any feedback from the fifth wheel unlatch control valve, thereby indicating if the kingpin jaws on the fifth wheel are in the open position.

Before beginning the autonomous truck tug-test procedure 3000 to confirm proper mechanical coupling of a fifth wheel with a trailer, the autonomy system on the truck connects the truck's fifth wheel to the trailer kingpin and gets the truck in a state where, a) no throttle is applied, b) full service brakes are applied to the truck, c) the steering wheel is pointed straight ahead, and d) no air is supplied to the trailer brakes (precondition box 3002).

The autonomous truck tug-test procedure 3000 begins by commanding the transmission to transition to FORWARD (or DRIVE) in step 3004. As soon as the transmission, via the controller, returns a status value indicating that it is in FORWARD (decision step 3006), the autonomous truck tug-test procedure 3000 fully releases the service brakes in step 3008, and when confirmed (decision step 3010), the autonomous truck tug-test procedure 3000 then drives the truck forward (step 3012), by commanding a preset throttle effort, and monitors, (a) the tractor longitudinal acceleration, and (b) the tractor forward distance traveled. Additionally, depending on the drive train on the truck, the autonomous truck tug-test procedure 3000 also monitors either the drive motor current and/or the engine RPMs. If, upon the application of the preset throttle effort, it is determined by the process(or) that the actual forward movement of the truck system does not match (or is less than an experimental percentage based upon current and future testing) the forward motion profile of the truck without a trailer connected to it (decision step 3014), then the autonomous truck tug-test procedure concludes that the mechanical coupling of the fifth wheel with the trailer is successful (step 3018), and the procedure 3000 concludes (step 3020), and the system is notified of such success. Conversely, if after step 3012, the truck moves, and its forward motion profile is the same/ similar to when no trailer is connected (decision step 3014), then the autonomous truck tug-test procedure 3000 concludes that the mechanical coupling of the fifth wheel with the trailer has failed (step 3022) and immediately notifies the system while releasing the truck throttle and fully applying the service brakes (step 3024). The procedure again ends at step 3020 awaiting a repeat attempt to hitch the trailer and/or operator intervention.

In various embodiments, a multiple tug test procedure can consist of successive single tug tests. Upon successful completion of initial tug-test, and following connection of air and electrical cables to the trailer, the fifth wheel is commanded to raise the trailer to a driving height, with possibly a forward motion to ensure that the back of the trailer is not dragging weather stripping on dock doors. After the trailer has been lifted to a driving height, some customers and application areas would prefer that an additional, final tug be performed as an additional check that the mechanical mating of the tractor and trailer is complete. In this case, since air has been provided to the trailer to remove emergency brakes, either this air must be removed to re-engage emergency brakes, or air must be supplied on the service brakes to the trailer. Following, a brief forward throttle or propulsion is applied to the tractor, to perform a tug on the trailer and ensure the tractor remains engaged with the trailer.

Figure 30A:
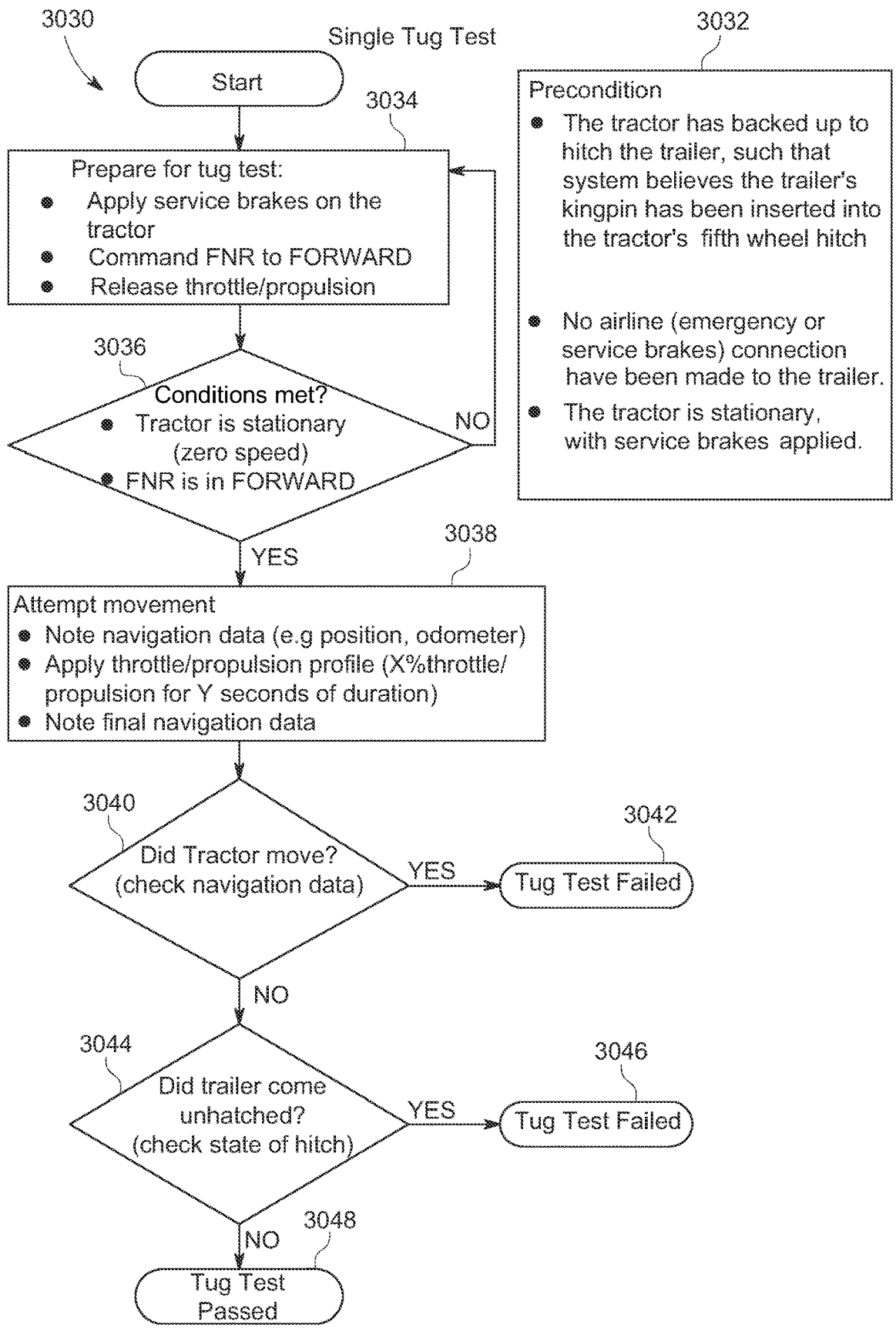
FIG. 30A is a flow diagram of an exemplary single tug-test procedure for use as part of a multiple tug-test procedure to verify proper hookup of a trailer.

With reference to the procedure 3030 of FIG. 30A, the autonomous truck tug-test procedure 3030 assumes that before being activated the truck is positioned such that the entire fifth wheel is under the front edge of the trailer floor/skid plate (the trailer is physically sitting on the tractor fifth wheel) there is no gap between the fifth wheel and the trailer floor/skid plate, and the fifth-wheel has been raised sufficiently so that the trailer's landing gear is clear of the ground (in order to avoid landing gear damage during test). Further, the autonomous truck tug-test procedure 3030 is adapted to detect proper mechanical coupling with a fifth wheel in the absence of any feedback from the fifth wheel unlatch control valve, thereby indicating if the kingpin jaws on the fifth wheel are in the open position.

Before beginning the autonomous truck tug-test procedure 3030 to confirm proper mechanical coupling of a fifth wheel with a trailer, the autonomy system on the truck a) has backed the tractor up to hitch the trailer such that the system believes the trailer's kingpin has been inserted into the tractor's fifth wheel hitch, b) no airline (emergency or service brakes) connections have been made to the trailer, and c) the tractor is stationary, with service brakes applied (precondition box 3032).

Preparation for the tug test includes applying service brakes on the tractor, commanding the FNR to FORWARD, and releasing the throttle/propulsion (step 3034). The system confirms the conditions that a) the tractor is stationary (zero speed) and b) FNR is in FORWARD (decision step 3036). If the conditions are not met, the procedure returns to step 3034. If the conditions are met, the procedure then attempts movement at step 3038. Attempting movement at 3038 includes a) noting navigation data (e.g. position, odometer), b) applying a predetermined percentage (X %) of throttle/propulsion profile for a predetermined number of seconds (Y). At decision step 4040, the procedure determines if the tractor moved, based on navigation data. If the tractor moved, the tug test has failed, and the procedure ends at step 3042 awaiting a repeat attempt to hitch the trailer and/or operator intervention. If the tractor did not move, the procedure advances to decision step 3044 and determines if the trailer cam unhitched by checking the state of the hitch. If the trailer became unhitched, the procedure ends at step 3046 awaiting a repeat attempt to hitch the trailer and/or operator intervention. If the trailer did not come unhitched, the procedure ends at step 3048 with the iteration of the tug test being passed.

Figure 30B:
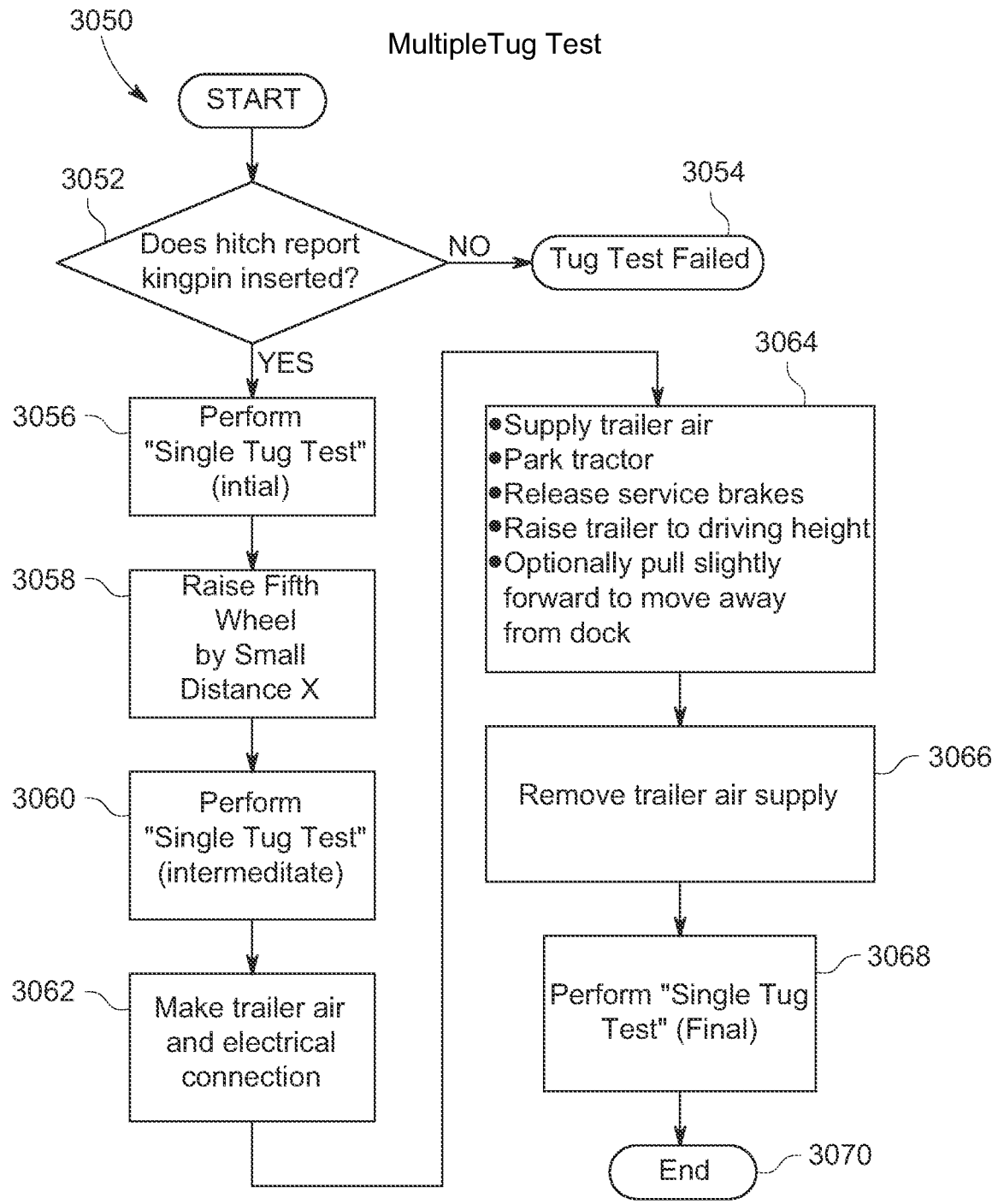
FIG. 30B is a flow diagram of an exemplary multiple tug-test procedure incorporating repeated use of the single tug-test procedure of FIG. 30A to verify proper hookup of a trailer.

The procedure 3030 can be repeated as multiple parts of a multiple tug test procedure 3050, as shown in FIG. 30B. At decision step 3052, the system determines if the hitch reports the kingpin is inserted. If the hitch reports that the kingpin is not inserted the procedure ends at step 3054 awaiting a repeat attempt to hitch the trailer and/or operator intervention. If the hitch reports that the kingpin is inserted, the procedure advances to step 3056 to perform the first iteration of the single tug test procedure 3030. If the first iteration of the tug test is passed and ends at 3048 (FIG. 30A), the multiple tug test procedure 3050 then raises the fifth wheel by a predetermined small distance at step 3058. After raising the fifth wheel by the predetermined small distance, the multiple tug test procedure 3050 performs the single tug test procedure 3030 a second time at step 3060. If the second iteration of the tug test is passed and ends at 3048 (FIG. 30A), the multiple tug test procedure 3050 then makes the trailer air and/or electrical connections at step 3062. After making the connections, at step 3064 a) the trailer is supplied with air, b) the transmission is put in park, c) the service brakes are released, d) the trailer is raised to driving height, and (optionally) e) the tractor pulls slightly forward to move the trailer away from the dock. The trailer air supply can then be removed at step 3066. At 3068, the multiple tug test procedure 3050 can perform the single tug test procedure 3030 for a third and final time. If the single tug test procedure 3030 is passed at step 3068, the procedure ends at step 3070 and the system is notified of success.

Different customers and mission environments require selection and customization of the automated tug-tests. The automated tug-test conceived here is configurable with respect to enablement of individual tugs, and selection of parameters of the complete test.

C. Glad Hand Gross Detection

Referring again to the description of the modified glad hand-based connection system, shown and described with reference to the embodiment of FIGS. 23-25, it is contemplated that the conventional (i.e. unmodified) glad hand connections on a trailer front can be used to interconnect pneumatic lines relative to the AV yard truck according to embodiments herein. A trailer that can interoperate with the AV yard truck herein with a minimum of, or substantially free of, modification is logistically and commercially advantageous. The embodiment of FIGS. 31-33 helps to facilitate such operation. More particularly, it is desirable to provide a mechanism for gross detection of the conventional pneumatic connections (typically configured as glad hands) on the front side of the trailer.

Figure 31:
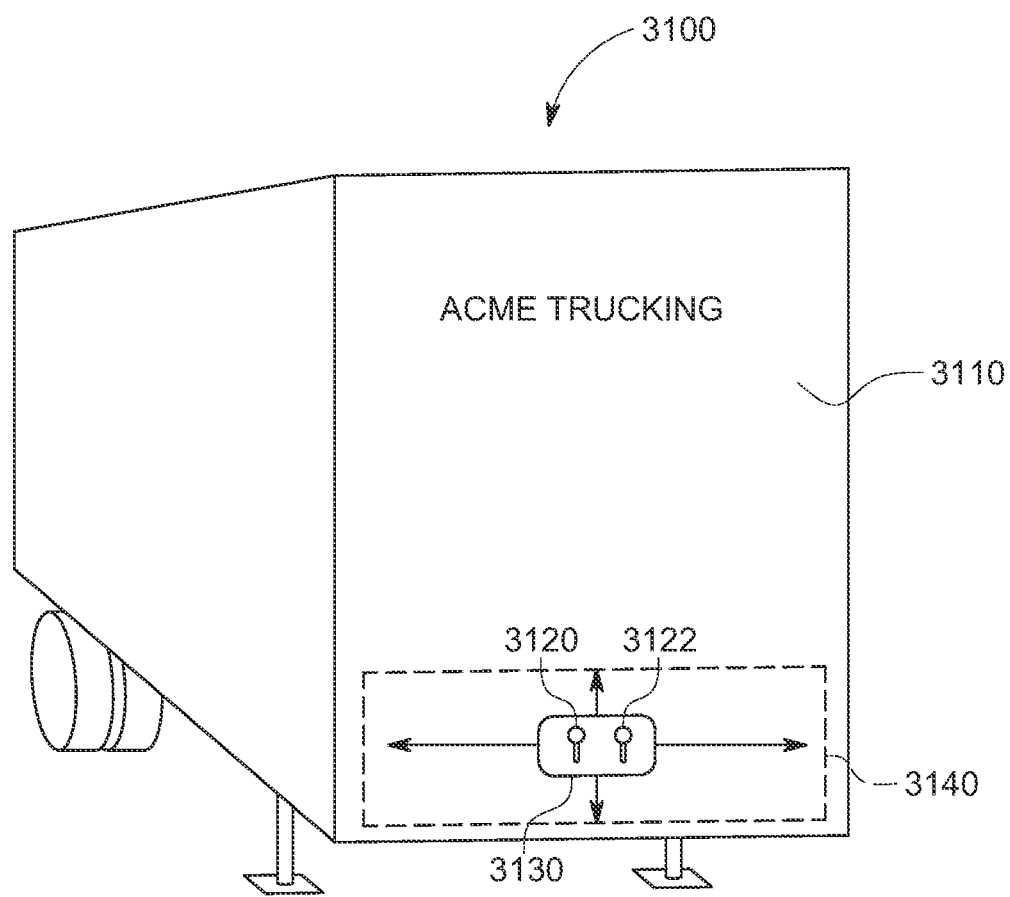
FIG. 31 is a diagram showing the front face of a trailer showing the probable location of pneumatic braking glad hand connections and an associated panel for use in gross location determination by a gross sensing assembly provide on an autonomous truck according to an embodiment.

Reference is made to the exemplary trailer 31 of FIG. 31. Where a robotic manipulator (described above and further below) is used to maneuver an end effector, containing a pneumatic (glad hand-compatible) connection, to a corresponding glad hand 3120, 3122 on the front 3110 of the trailer 3100, the gross position of the glad hands 3120 and 3122 can help narrow the search for the connection by the end effector. In general, the glad hand(s) are mounted in a panel 3130 that can potentially be located anywhere on (e.g. dashed box 3140), and typically along the lower portion of, the trailer front 3110. A system and method for the gross detection of the glad hand (or similar trailer-mounted pneumatic and/or electrical connection) is provided in this embodiment. This system and method generally provides a sensor-based estimate of the location of the glad hand panel on the front of the trailer is provided in this embodiment.

Once the glad hand panel 3130 is located on the front face 3110 of the trailer 3100, the end effector can be grossly positioned to align with it. Thereafter the connection system can begin a fine manipulation of the end effector to actually engage the glad hand with the end-effector-mounted truck-based connector. An end effector-mounted sensor (e.g. a vision system camera) can be used to finely guide the connector into engagement with the trailer's glad hand. The data from the sensor/camera assembly 3210 is provided to a machine vision system 3250 that determines the location of the glad hands as described below.

Figure 32:
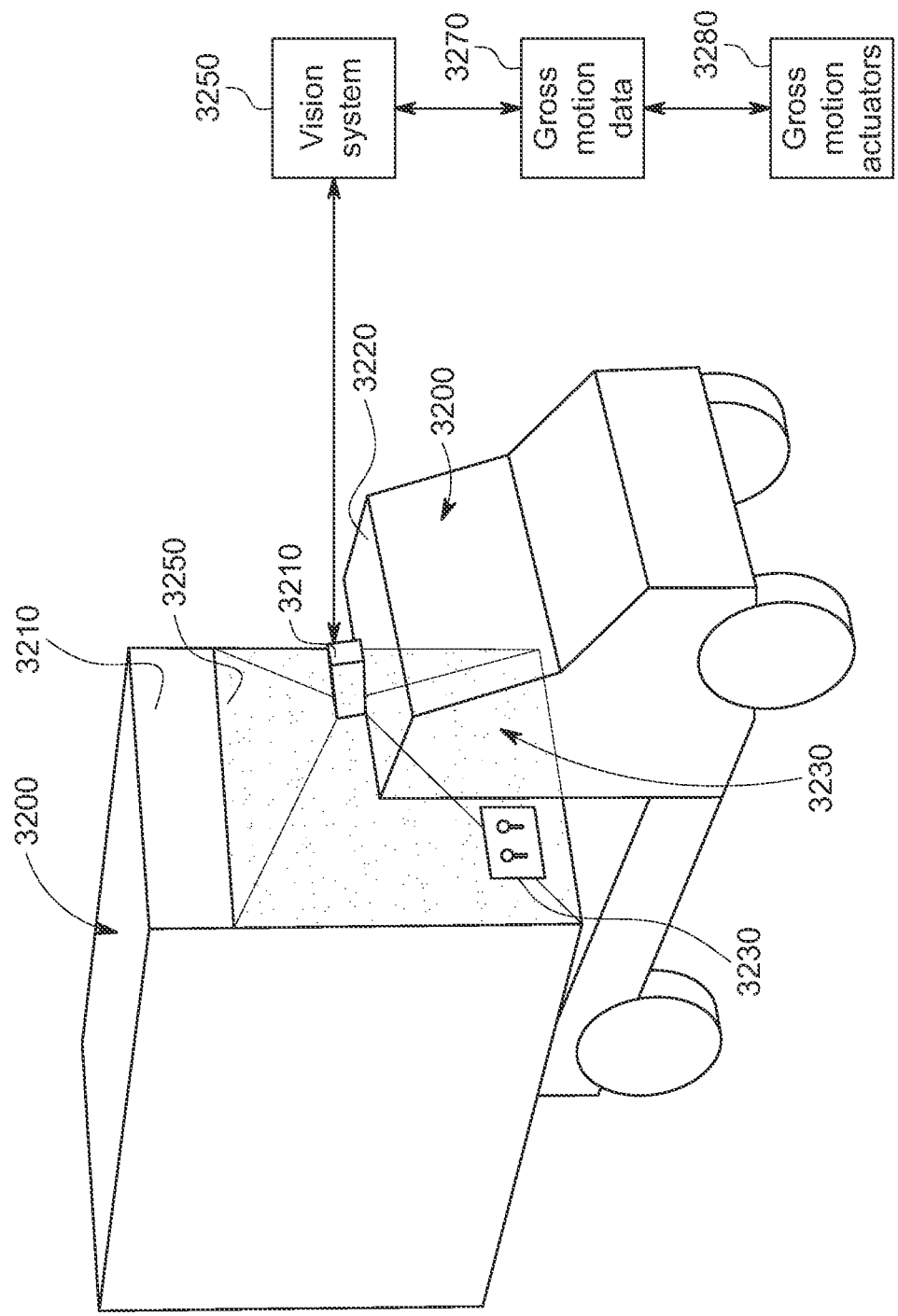
FIG. 32 is a diagram showing an autonomous truck-mounted gross location sensing assembly detecting the characteristics of the front face of an adjacent trailer so as to attempt to localize the glad hand panel thereof.

With further reference to FIGS. 31 and 32, a single-color camera or a combination of a color camera and a 3D imaging sensor 3210 is/are provided at a location on an autonomous truck 3220 that can be used to find the glad hand panel 3130 on the front face 3110 of the trailer 3100. The sensors 3210 for detecting the glad hand panel 3130 can be statically mounted to the truck 3200 on, for example, the roof 3220 of the cab 3230. The sensors 3210 are mounted so that they have coverage over the expected areas on the adjacent trailer front (when hitched or in the process of hitching) where glad hands would be located. The sensor coverage is shown as a shaded area 3250 on the depicted trailer front 3110 in FIG. 32.

In operation, understanding the location of the trailer face bounds the search in the sensor data for the glad hand panel. In an exemplary embodiment, the sensor assembly 3210 can include exclusively a 2D color camera. Using acquired color images of the scene that includes the trailer 3100, the process identifies which image pixels are associated with the front face 3110 and which are background pixels. The front face is highly structured and tends produce prominent contrast-based edges using edge processing tools generally available in commercially available machine vision applications. From the edge information and the (typically) homogeneous color of the front truck panel, the trailer front face 3110 can be identified in the imagery.

In another exemplary embodiment, the sensor assembly 3210 includes a dense 3D sensing, which is used to detect the front face 3110 of the trailer 3100 using the known/trained 3D geometric signature of the trailer face (for example, a rectangle of a given height and width ratio). The 3D sensing can be accomplished using a variety of arrangements including, but not limited to, stereo cameras, time-of-flight sensors, active 3D LIDAR, and/or laser displacement sensors. These 2D and/or 3D sensing modalities each return the generalized location and boundaries of the trailer front face, and potentially its range from a reference point on the truck.

Figure 33:
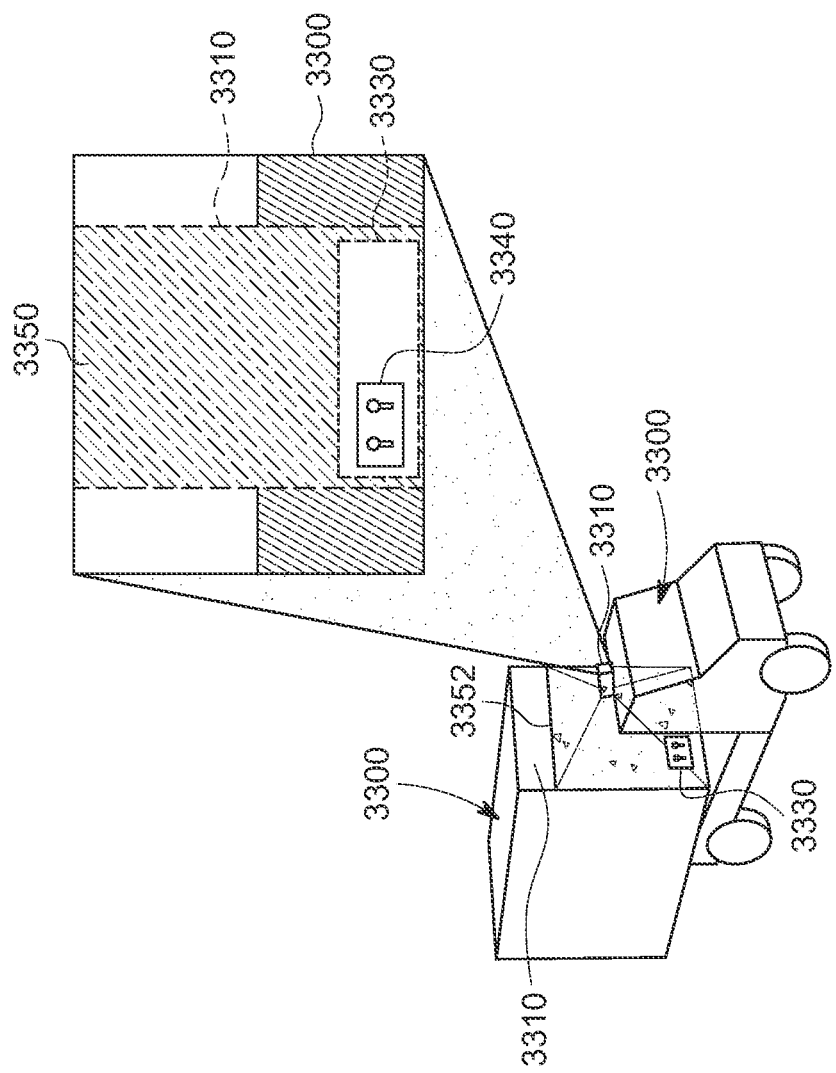
FIG. 33 is a diagram showing the acquired image(s) generated by the sensing assembly of FIG. 32 and the regions therein used to localize the glad hand panel.

After locating the trailer front face and bounding it, the next step in the gross detection procedure is locating the glad hand panel 3130 within the bounds of the trailer front face 3110. With reference to FIG. 33, the reduced search area 3310 comprising the image of the trailer front face 3110 is shown within the overall imaged scene 3300. Within the reduced search area 3310, the expected polygonal (e.g. rectangular) region of the glad hand panel 3340 is identified based on the knowledge that glad hand panels are situated at the bottom (dashed search box 3330) of the trailer front face.

Based upon identification of the outline/edges of the trailer front face within one or more acquired images, as described above, the gross detection procedure is completed as follows:

(a) A diverse color sampling of pixels is made for regions within the identified front trailer face but outside of the expected region where glad hands are situated (the color sample region 3350). This provides a color sampling of the background color characteristics of the trailer.

(b) The background color samples are then compared to the pixel colors within the expected search region (dashed box 3330) for glad hand panels 3340. Since glad hand panels are typically a different color/texture than the background trailer color, the glad hand pixels will produce a low color match response.

(c) Within the expected glad hand search region, the color match responses are thresholded and then grouped using (e.g.) a connected component analysis which will form groupings of pixels. The groupings represent possible glad hand locations.

(d) The groups of pixels are then analyzed for shape properties and groups are discarded that do not have a structured geometric rectangular shape. Additional shape attributes such as size and width-to-height ratio can be used to eliminate false glad hand panel detections. The remaining groups are the highest probability candidates for the glad hand panel.

(e) The shape attributes are also used to score the remaining group candidates. The group with the highest score has the greatest likelihood of being the glad hand panel.

(f) Optionally, in an embodiment in which dense 3D sensing is used, if there are still multiple high probability candidate regions for the glad hand panel, 3D geometric cues can be used to filter out false positive candidates based on the expected 3D characteristics of glad hands.

(g) The location/pose of the identified glad hand panel and associated glad hand(s) in an appropriate coordinate space—for example, a global coordinate space that is relevant to the truck's manipulator based upon calibration with respect to the sensor(s) 3210—is then for use in a fine localization process to be carried out by the robot manipulator in connecting to the glad hand.

(h) The manipulator and its associated end effector can be moved based upon gross motion data 3270 derived from the present location of the manipulator assembly versus the determined location of the glad hand panel 3130 and associated glad hands. This gross motion data 3270 is delivered to the gross motion actuators 3280 of the manipulator assembly, or otherwise translated into gross motion that places the end effector into an adjacent relationship with the glad hands/glad hand panel.

D. Fine Localization of Glad Hand Pose

Once a gross estimation of the glad hand (and/or glad hand panel) location is provided to the system, a sensor-based estimate of the glad hand connector location/pose is computed. As described further below, the robot manipulator contains a separate or integrated gross manipulation system that is adapted to place the connector-carrying end effector, which also carries an on-board fine localization sensor/camera into a confronting relationship with the located glad hand panel. Since the panel can be located anywhere on the trailer front face, the use of a gross manipulator system limits the effort and travel distance required by the fine adjustment actuators of the manipulator—thereby increasing its operational speed and accuracy in making a connection between the truck pneumatics (and/or electrics) and those of the trailer. Thus, after moving the manipulator into a gross adjusted position, the fine manipulation system is now in a location in which it can detect the glad hand pose on the panel. Any stored information already available from the gross position system on connector pose is provided to the fine system so that it can attempt to narrow its initial search. If this information is inaccurate, the search range can be broadened until the glad hand is located by the fine position system.

Figure 34:
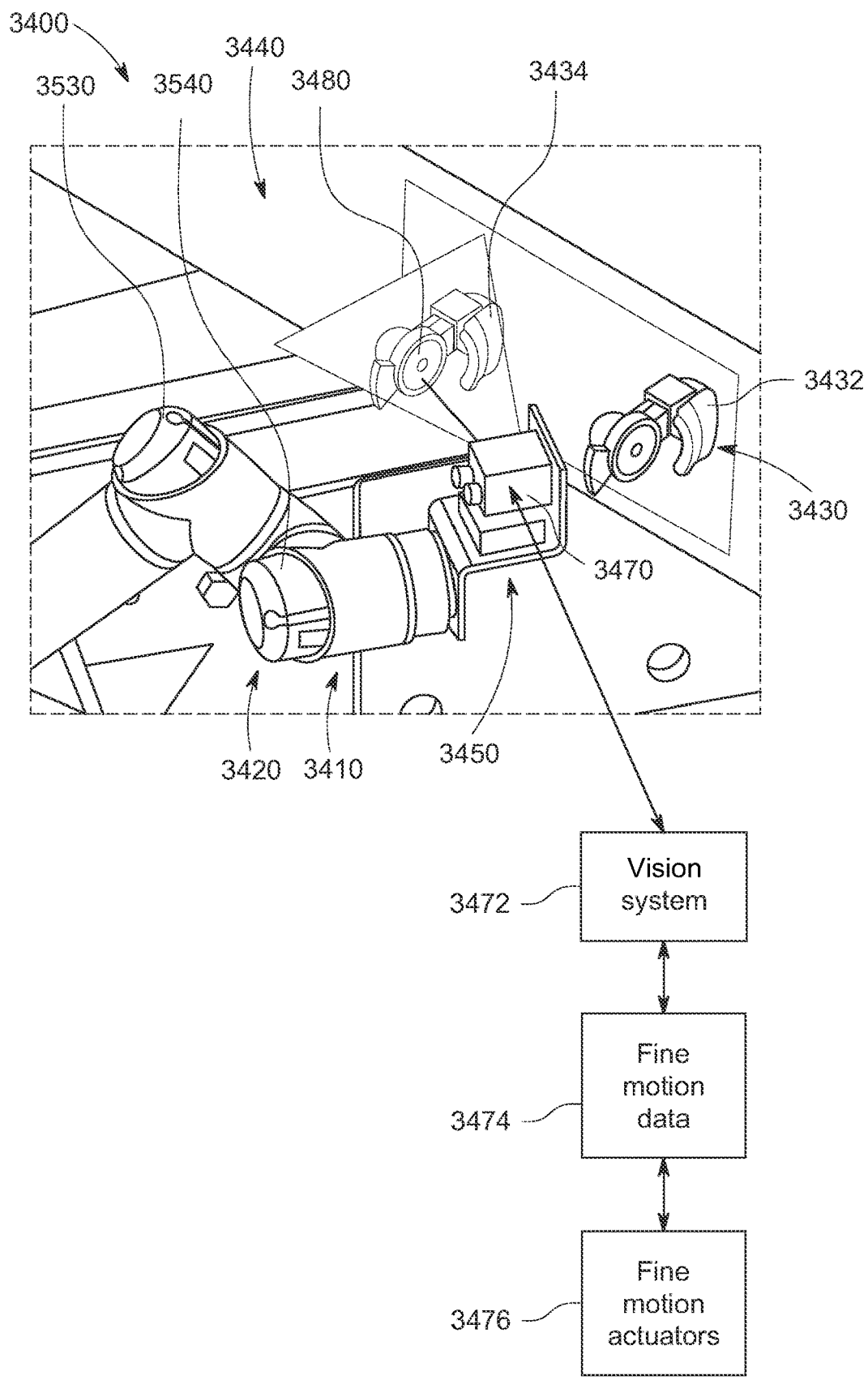
FIG. 34 is a diagram of a trailer hitched to an autonomous truck chassis, showing a fine position end effector mounted on the chassis of an autonomous truck generally in accordance with FIG. 32, having a fine sensing assembly located with respect to tend effector for guiding it to the glad hand of the trailer.
Figure 35:
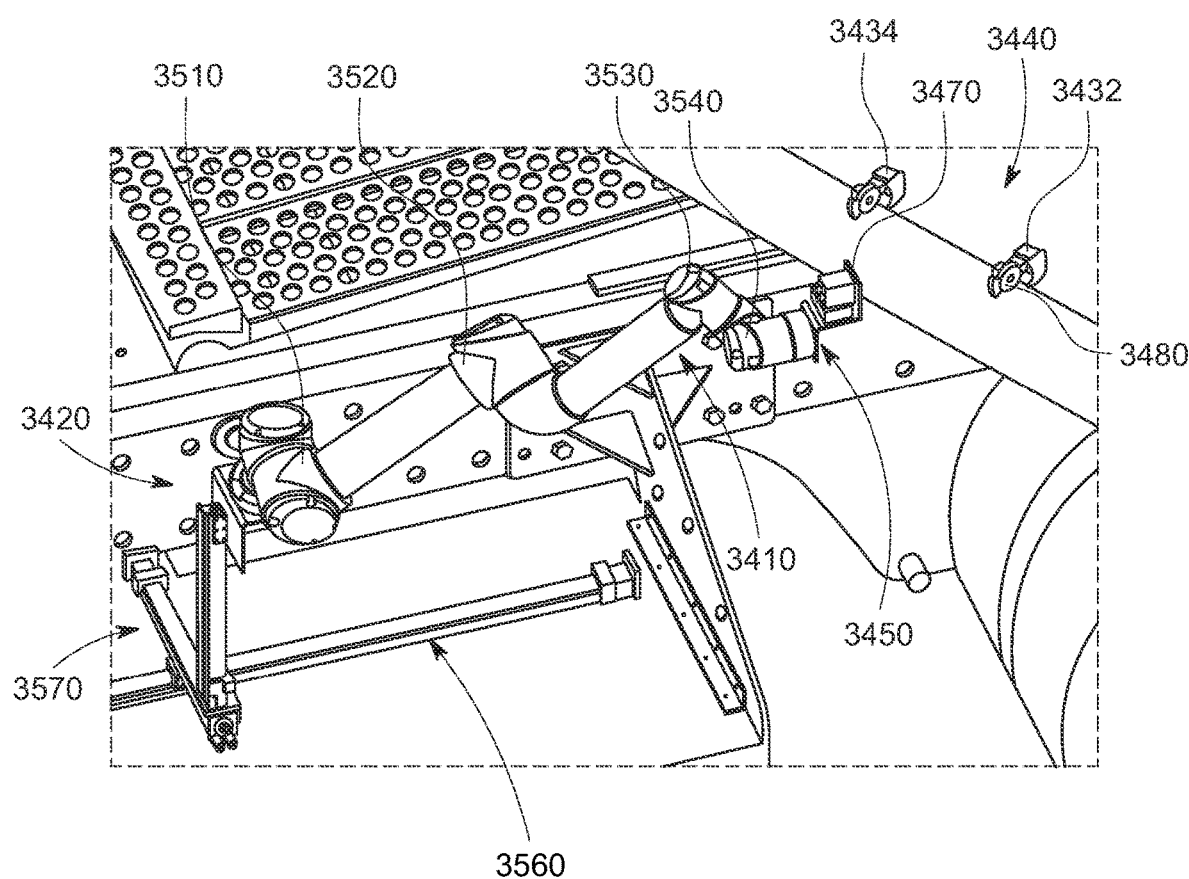
FIG. 35 is a multi-axis (e.g. three-axis) gross positioning assembly mounted on an autonomous truck chassis for moving a robotic arm manipulator and associated end effector so as to locate the end effector and a carried truck-based glad hand connector adjacent to a trailer glad hand panel located by the gross detection system.

Reference is now made to FIGS. 34 and 35 that show a multi-axis robot manipulator assembly 3410 mounted on an autonomous truck rear chassis 3420 in a confronting relationship with the glad hand panel 3430, and glad hand(s) 3432 and 3434 of a trailer front 3440. The trailer 3400 has been, or is being, hitched to the fifth wheel of the truck chassis 3410.

As described above, the robot manipulator assembly 3410 is a multi-axis, arm-based industrial robot in this embodiment. A variety of commercially available units can be employed in this application. For example, the model UR3 available from Universal Robots A/S of Denmark and/or the VS Series available from Denso Robotics of Japan can be employed. The robot includes a plurality of moving joints 3510, 3520, 3530 and 3540 between arm segments. These joints 3510, 3520, 3530 and 3540 provide fine motion adjustment to guide the end effector into engagement with the glad hand 3432. The base joint 3510 is mounted to the gross motion mechanism, which comprises a pair of transverse (front-to-rear and side-to-side) linear slides 3560 and 3570 of predetermined length, mounted and arranged to allow the manipulator end effector 3450 to access any location on the trailer front 3440 that may contain the glad hand(s) 3432 and 3434. The slides can allow the manipulator's base joint 3410 to move according to a variety of techniques, including, but not limited to screw drives, linear motors, and/or rack and pinion systems.

Notably, the end effector 3450 includes the fine motion sensor assembly/pod 3470 according to an embodiment. The sensor assembly 3470 is connected to a vision system and associated process(or) 3472 that can be all or partially contained in the assembly 3470, or can be instantiated on a separate computing device, such as one of the vehicle's onboard processor(s). The vision system can be the same unit as the gross system 3250 (FIG. 33), or can be separate. The gross and fine vision systems 3250 and 3472 can optionally exchange data as appropriate—for example, to establish a single global coordinate system and provide narrowing search data from the gross pose to the fine pose estimate. In general, the fine vision system generates fine motion data for use by the joints of the manipulator assembly 3410 and this data is transmitted in a manner clear to those of skill in robotic control, to the robot's fine motion actuators 3476. Note that the manipulator can also include force feedback and various safety mechanisms to ensure that it does not apply excessive force or break when moving and/or engaging a target. Such can include mechanisms for detecting human or animal subject presence so as to avoid injuring a subject. One or more of the below-described sensor types/arrangements, typically provided to the assembly 3470, mounted on, or adjacent to, the moving end effector 3450, can be used to finely determine glad hand pose, and servo the robot to that location via a feedback routine:

(a) A color or monochrome camera with motion control can be moved using the delivery motion control hardware to produce multiple image frames of the target area (the glad hands). The collection of frames has a known motion profile and stereo correspondence processing can be performed and coupled with the motion profile to triangulate image points to produce a three-dimensional range image.

(b) A fixed-baseline stereo camera can be defined by a single camera, in which movement of the end effector is replaced by two or more cameras separated by a fixed and known separation. Such an arrangement can be mounted on the end effector or another location, such as the base joint 3510, or the chassis itself. Stereo correspondence processing and triangulation steps are used to produce a three-dimensional range image.

(c) A structured light stereo camera can be used, comprising a single camera in conjunction with an infrared (IR) light pattern projector with a known relative pose to the camera. The stereo correspondence processing incorporates the known projected pattern to simplify the processing and permit more dense coverage of the untextured surfaces of the glad hand. A triangulation process is used to produce a three-dimensional range image.

(d) A near IR camera can be used with a near IR filter to take advantage of near IR illumination. Using a near IR illumination will exaggerate the contact between the rubber gasket in the glad hand and the rest of the glad hand structure and background (as described below).

(e) A short-range laser ranger can be used to provide additional distance information of the glad hand.

(f) Additionally, artificial lighting can also be mounted on the end-effector 3450 to allow the vision sensor in the assembly 3470 to image the glad hand in virtually any lighting or weather conditions. The lighting can be in the visible spectrum or can be in the near IR spectrum (or another spectrum or combination of spectrums) to enhance glad hand gasket detection.

(g) The sensor assembly 3470 can also include other forms of distance-measuring devices, such as time of flight sensors to enhance range measurement between the end effector 3450 and glad hand(s) 3432 and 3434.

Figure 36:
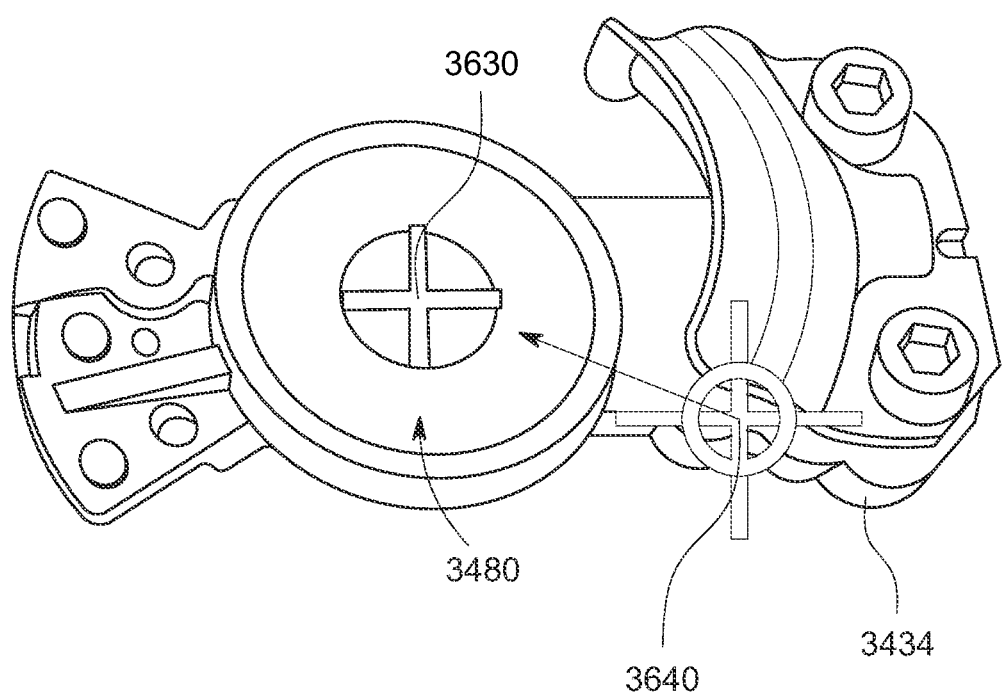
FIG. 36 is a diagram of an image of a trailer glad hand used by the fine sensing system to determine pose for use in servoing a robotic manipulator end effector and associated truck-based glad hand connector into engagement with the trailer glad hand.

One method for fine detection of the glad hand pose is by using machine vision to image and analyze the circular rubber gasket 3480. This gasket 3480 has sufficient contrast to the glad hand and surrounding structure that may be reflected in the camera imagery. The tracking of the rubber gasket 3480 by the fine sensor 3470 can provide a significant amount of information on the glad hand's position relative to the end effector 3450. FIG. 36 shows how the detected rubber gasket 3480 of the exemplary glad hand 3434 is used to generate fine motion control commands for the end effector 3450 to align with the gasket 3480. Since the rubber gasket 3480 is typically annular, with a circular inner and outer perimeter, it can be used to estimate angular offset of the end-effector relative to the (e.g.) center/centroid 3630 of gasket 3480 based on the skew (image center 3640) of the extracted shape in the imagery (which translates into an ellipse defining a particular major and minor axis in an acquired 2D image). The rubber gaskets on glad hands are also typically a standard size, so that the dimensions of the extracted gasket in the imagery can provide a metric of the relative distance/range to the gasket, which can also be used to determine the relative location of the center of the glad hand. A short-range laser ranger (beam 3490) can be provided in the sensor assembly 3470 and used to provide a second measurement of the end-effector range to the glad hand.

Another related option for glad hand detection and ranging via the glad hand gasket is to create a custom molded glad hand seal with characteristics that aid in the goal pose identification process. This seal can be impregnated with additive material during polymeric curing, such as magnetic particles, UV reactive particles, or molded to assume a shape or texture that has other visual based feature (colors, patterns, shapes, markers, etc.) that would aid in pose identification through a variety of methods.

Figure 36A:
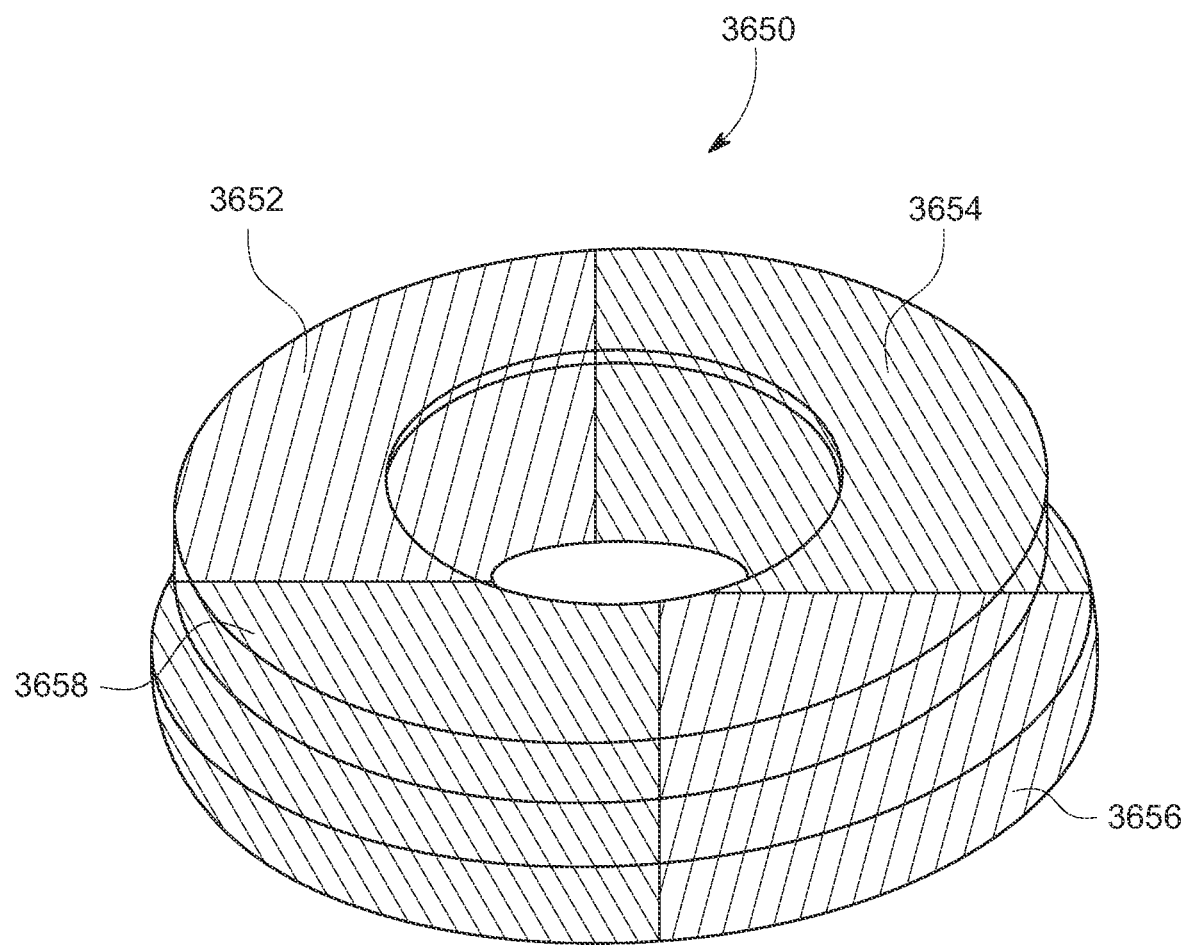
FIG. 36A is a perspective view of an exemplary glad hand gasket with features to enhance autonomous identification, location, and pose of the glad hand gasket.

FIG. 36A is a perspective view of an exemplary glad hand gasket with features to enhance autonomous identification, location, and pose of the glad hand gasket. The glad hand gasket can have different regions with different features so that the system can easily identify the glad hand gasket by these features. As shown in FIG. 36A, the glad hand gasket 3650 can have four distinct identification regions 3652, 3654, 3656, and 3658, although it should be clear that a gasket can have more or fewer than four identification regions. The identification regions 3652, 3654, 3656, and 3658 can include different colors in various regions, magnetic particles in various regions, UV reactive particles in various regions, and/or other features to aid in the location and pose identification process.

Figure 37:
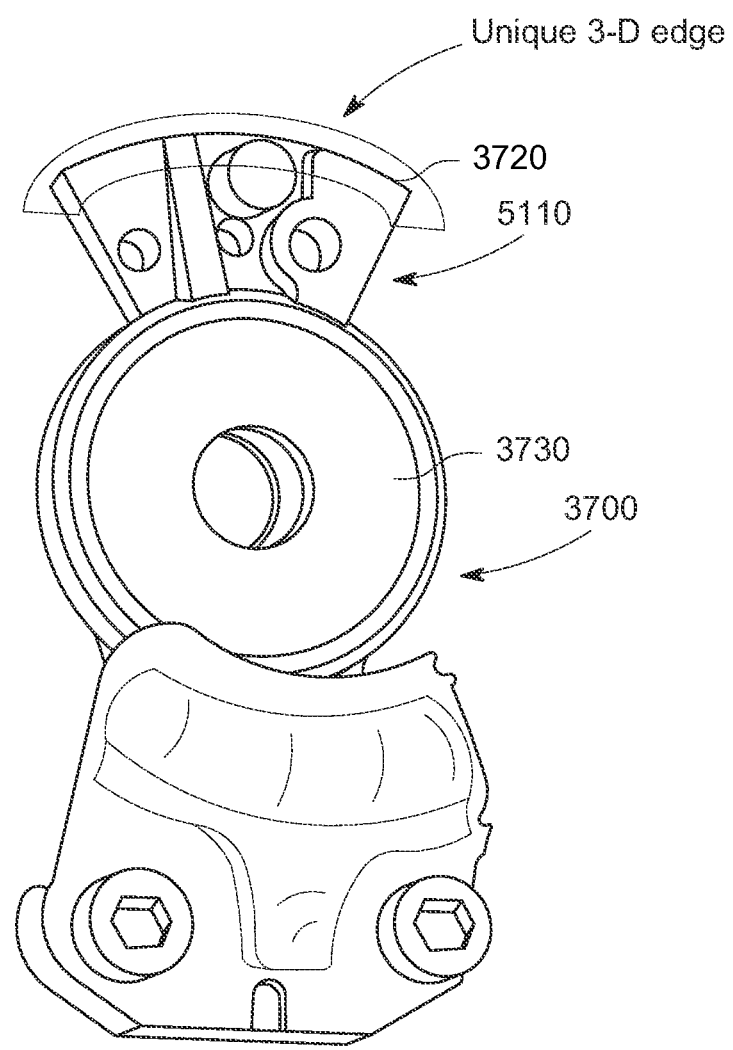
FIG. 37 is a diagram of a conventional trailer glad hand depicting the unique edge of a flange used to identify the pose of the glad hand by the autonomous truck manipulator sensing assembly.

Another method for detecting the glad hand pose is by employing a three-dimensional range image. By way of non-limiting example, the edge 3620 of the unique adapter plate 3710 of the exemplary glad hand 3700, as shown in FIG. 37, can be identified by the fine motion system using three-dimensional shape matching. One exemplary algorithm, which allows identification of this feature, is based upon Iterative Closest Point (ICP) algorithm, relying in part upon constraints related to the consistent geometry of that edge 3720 relative to the glad hand seal 3730. This enables an estimate of the relative position and orientation (pose) of the glad hand seal 3730 for fine positioning. See, by way of useful background information, Besl, P. and N. McKay, *A Method of Registration of* 3-*D Shapes*, IEEE Transactions on Pattern Analysis and Machine Intelligence, vol. 14, no. 2, February 1992, pp. 239-256.

Figure 38:
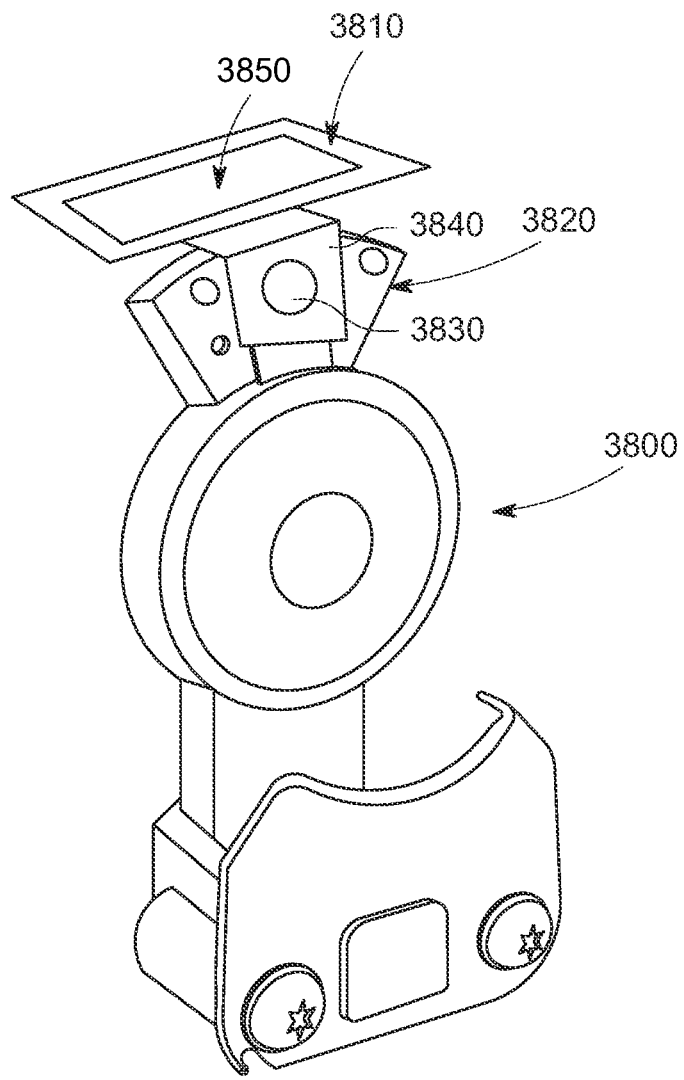
FIG. 38 is a diagram of a conventional glad hand provided with a unique tag used to identify the pose of the glad hand by the autonomous truck manipulator sensing assembly.

In another embodiment, as shown in FIG. 38, a rectangular tag 3810 can be affixed to the exemplary glad hand 3800. This tag 3810 can be located at any position on the glad hand framework that is typically visible to the fine sensor assembly. In this embodiment, it is mounted on the outer end of the adapter plate 3820 using a spring-loaded base 3840. In this example a hole in the base engages a raised cylindrical protrusion 3830 to secure the base 3840 to the adapter. Adhesives, fasteners or other attachment mechanisms can be used as an alternative or in addition to the depicted arrangement in FIG. 38. The tag 3810 provides a visual (or other spectral) reference for simplifying and improving the accuracy of the glad hand fine pose estimate by the sensor assembly. The tag 3810 can be removably attached to the glad hand using the depicted clip base 3840, or other attachment mechanism, so as to provide repeatable positioning of the tag relative to the underlying, associated glad hand. The exposed (i.e. outer) surface of the tag 3810 can define a high-contrast rectangle (or other polygonal and/or curvilinear) of known/stored dimensions. The features of the tag can be extracted by the sensor assembly and associated vision system using thresholding of the observed intensity. The extracted image pixel coordinates can be related to the planar physical dimensions of the tag using a homography (transformation) in accordance with known techniques. This transformation provides the rotation and translation of the tag relative to the sensor's coordinate space. The known transformation between the sensor and delivery coordinate frame and the known transformation between the tag and the glad hand coordinate frame enables an estimate of the glad hand pose for fine positioning.

Figure 39:
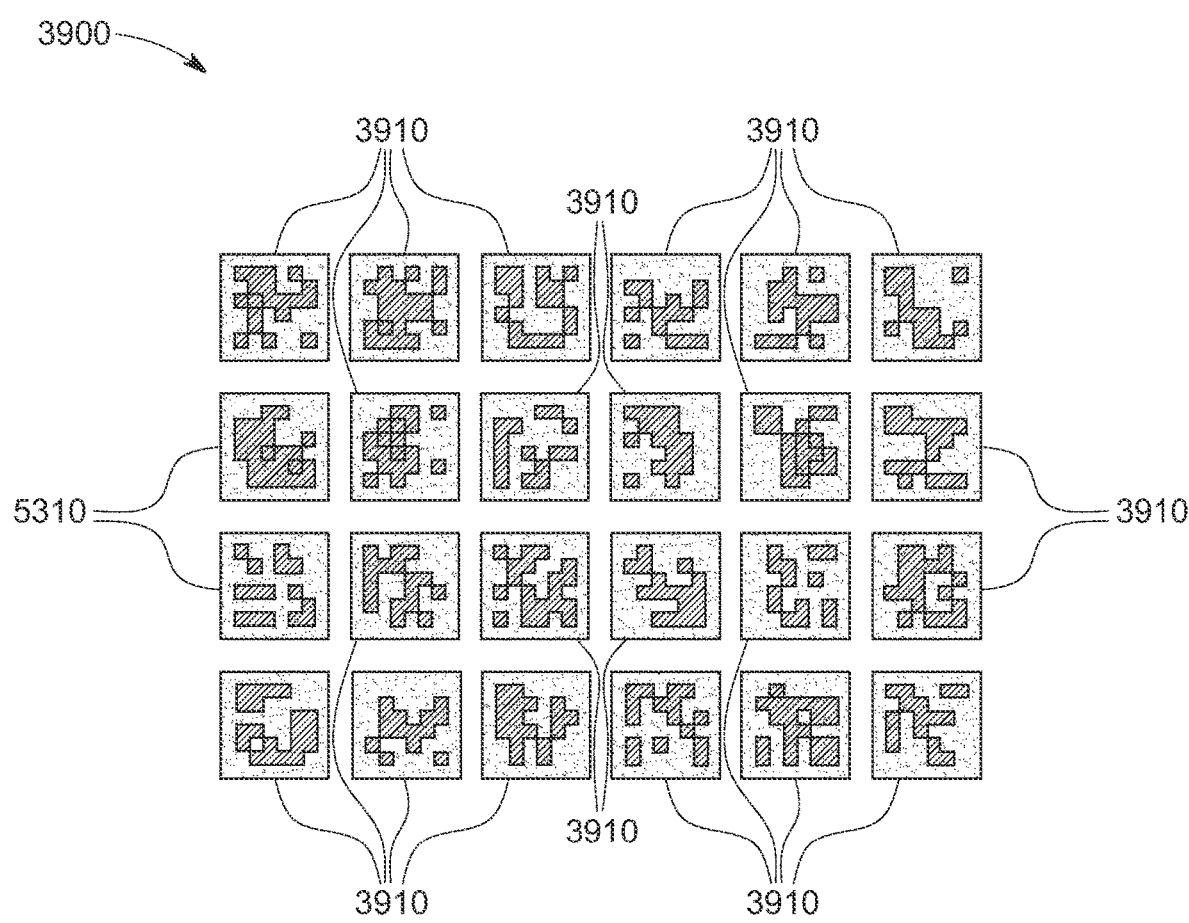
FIG. 39 is a diagram of a unique fiducial-based identifier that can be applied to the surface of the tag of FIG. 38.

An alternative to a single high contrast rectangle for use as the tag 3810 is the use of a visual marker/fiducial embedded within the bounded (e.g. rectangular) area 3850 of the tag 3810. Examples of this type of marker 3900 are depicted in FIG. 39. The advantage offered by this visual marker is more robust detection and homography estimation in degraded environments or when a portion of the tag is occluded. The generation of this form of visual tag and the detection and pose estimation is known in the art and described generally in Garrido-Jurado, S. et al., *Automatic generation and detection of highly reliable fiducial markers under occlusion*, Pattern Recognition, vol. 47, Issue 6, June 2014, pp. 2280-2292; and on the World Wide Web at the Software Repository: https://sourceforge.net/projects/aruco/files/?source=navbar. As shown the marker 3900 can comprise a matrix of 2D ID (barcode) patterns 3910, which provide specific information on the identity, characteristics and/or positioning of the glad hand, as well as other relevant information—such as the identity of the trailer, its extents and characteristics. In alternate embodiments, the tag can define 3D shapes and/or features (for example a frustum) that allow a 3D sensor to more accurately gauge range and orientation of the glad hand.

Visual servoing can be used to achieve proper positioning for a mating operation between the end-effector-carried glad hand/connector and the trailer glad hand. The end effector can be controlled using proportional velocity control under operation of a control loop receiving pose information from the fine vision system 3472. As the sensor's acquired image of the glad hand rubber gasket 3480 gets closer to the desired target position, the commanded velocities of the manipulator joints driving end effector converge to zero, at which point the end-effector is aligned with the glad hand, and ready to perform the mating operation.

A blind movement (rotation about an axis passing through the glad hand gasket centroid) can be used to mate the end effector to the trailer glad hand. That is, once the glad hand location and pose are understood by the fine vision and manipulator system, a blind movement of the end-effector along the estimated normal to the glad hand can occur, making the final physical contact to the glad hand. The move is typically (but not necessarily) blind because the sensors are too close to the target glad hand to produce useful information.

In some operational situations/conditions, environmental factors, such as direct sunlight or extreme exposure deltas across a 2D image, can limit vision or otherwise have a negative impact on the system's ability to detect connection points such as glad hands or electrical connectors. An extreme exposure delta can include a scene with some very bright pixels and some very dark pixels, such that the image cannot be seen clearly. In various embodiments, the system can be adapted to exert direct control over camera exposure parameters, contrast, and/or brightness to increase the accuracy of connection point detection. For example, in a fiducial marker-based approach, if some semblance of scale and rough location of the fiducial marker is known across an image through partial detection, exposure control can be targeted over a region of interest within the image that includes the rough location of the fiducial marker. Then saturated or excessively dim pixels outside the region of interest can be ignored, so that only the pixels of interest are considered. Additionally, in various embodiments, an extendable and retractable physical shade can be deployed from an autonomous truck in order to block out or diminish natural light and/or other elements including precipitation on the surface that is being analyzed. With reference again to FIG. 9, the physical shade 916 is shown in the retracted conformation. Controlling the various camera parameters and/or controlling environmental factors can improve the system's ability to determine the location and/or pose of the connection points. This control can be automatically performed by the system, or can be manually performed by a remote operator, explained more fully below.

In some situations, the native glad hands on a trailer can be spring-loaded rotating glad hands. These native glad hands often rest flat against the trailer, and rotate outwards on a rotational axis that can sometimes be vertical and parallel to the front face of the trailer. To connect to these rotating glad hands, the system should first identify the pose of the glad hands, and then rotate them outwardly to expose the sealing components and maintain them in an outward orientation until they are connected. A 2D or 3D computer vision system can be used to not only identify the location of the glad hand mating features, but also to determine if the glad hand is a spring-loaded rotating type, and if so, to identify the location and orientation of the rotation axis. If the rotation axis can be determined, the system can then determine the exact path the manipulator arm should articulate along in order to swing the glad hand out from the trailer face.

In some situations, the rotational axis can be difficult to determine with sufficient precision, due to damage, an obscured axis, etc. The system's robustness can be enhanced by providing compliance into the manipulation system that can overcome any inaccuracies in a determined axis. Compliance can allow the manipulation system to accommodate imperfect motions without excessive reaction forces on the manipulation system or the glad hand. Such compliance can be provided through use of springs and/or elastomeric materials at various locations in the mechanism, which elastically deform (flex), and/or otherwise absorb a degree of accommodate geometric variation.

In various embodiments, the compliance can be active compliance, where the reaction forces are sensed, and control algorithms can work to correct unexpected reaction forces. In an ideal manipulation procedure, the only force the manipulator should feel/experience should be the force of the spring applying a torque around the glad hand's rotational axis. If the system senses any unpredicted forces, the manipulator can be adapted to automatically deviate from the originally computed path to remove any unpredicted forces.

In various embodiments, the compliance can be passive. The system can include various compliant elements into the manipulation system so that the system can be self-conforming to unpredicted reaction forces induced by imperfect motions. By way of non-limiting examples, these passive compliant features can include flexible grippers, compliant pads, spring loaded components, and/or other passively compliant features.

In various embodiments, unconstrained manipulation can be used to overcome any inaccuracies in a determined axis by pulling outwards on the glad hand with unconstrained motions. As a non-limiting exemplary model, a rope, cable, or other compliant material can be connected to a glad hand, and the other end can be connected to the manipulator arm. The rope/cable then provides a point contact between the manipulation system and the glad hand. The rope/cable is typically only capable of applying force along a single vector to the glad hand, and the rope/cable is not able to apply any moments to the connection point. When the manipulation system pulls on the rope/cable, so long as the induced vector is in half-plane, then at least a component of the force vector can go towards pulling the glad hand out. While the above explanation uses a rope/cable for simplicity, various systems for unconstrained manipulation are contemplated. By way of non-limiting example, incorporating one or more hinges, pivot points, socket joints, etc. into an end portion of the manipulator system also can allow a system for rotating glad hands with unconstrained manipulation that can be minimally sensitive to knowledge of the exact glad hand rotation axis.

Figure 38A:
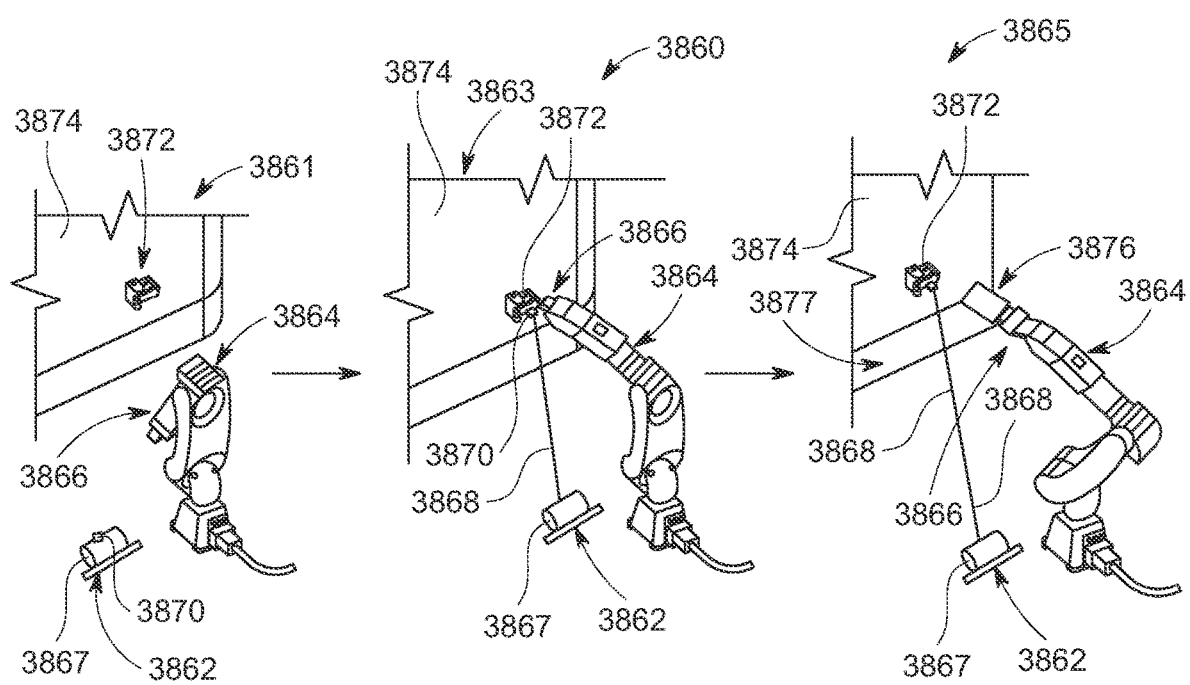
FIG. 38A is a step-by-step diagram showing a gross manipulation technique for connecting a retractable/rotational, trailer-mounted, glad hand, including the use of a winch and tether to withdraw/rotate the glad hand for connection thereto, according to an exemplary embodiment.

According to FIG. 38A, an arrangement 3860, and associated process (steps 3861, 3863 and 3865), for gross manipulation/managing of a trailer connection using a tether assembly 3862 in conjunction with a multi-axis robotic arm 3864 and end effector 3866 is shown. The tether assembly 3862 includes a powered winch 3867 that pays out and reels in a tether 3868. The winch 3867 is mounted on the truck chassis, adjacent to the robotic arm 3864. The distal end of the tether 3868 includes a glad hand connection device 3870, which can be manipulated by the robot end effector 3866 using appropriate fixtures, graspers, etc. The connection device 3866 is attached by the robot arm 3864 to the trailer glad hand 3872 as shown (step 3863) before attempting to perform an airline connection. Once connected to the glad hand 3872, which is in a retracted state on the side of the trailer 3874, the winch 3867 is powered to retract the tether 3868 sufficiently to pull/rotate (curved arrow 3877) the glad hand 3872 away from the trailer side 3872 using an appropriate control process (for example guided by a visual feedback or an encoder count). Then, as shown in step 3865, the repositioned glad hand is engaged by any appropriate airline connection tool 3876 using the robot end effector 3866. Thus, as shown in step 3865, the tether 3868 is drawn taut through powering on the winch 3867, which would provide the work necessary to extract the glad hand. The robotic manipulator (arm) 3864 can then deliver the connection tool 3876 to the now-exposed glad hand through any appropriate technique and/or mechanism described herein. After attachment, the arm 3864, or another mechanism can release the tether 3868, and allow it to be rewound into the winch 3867, with or free of, assistance by the arm/end effector.

Figure 38B:
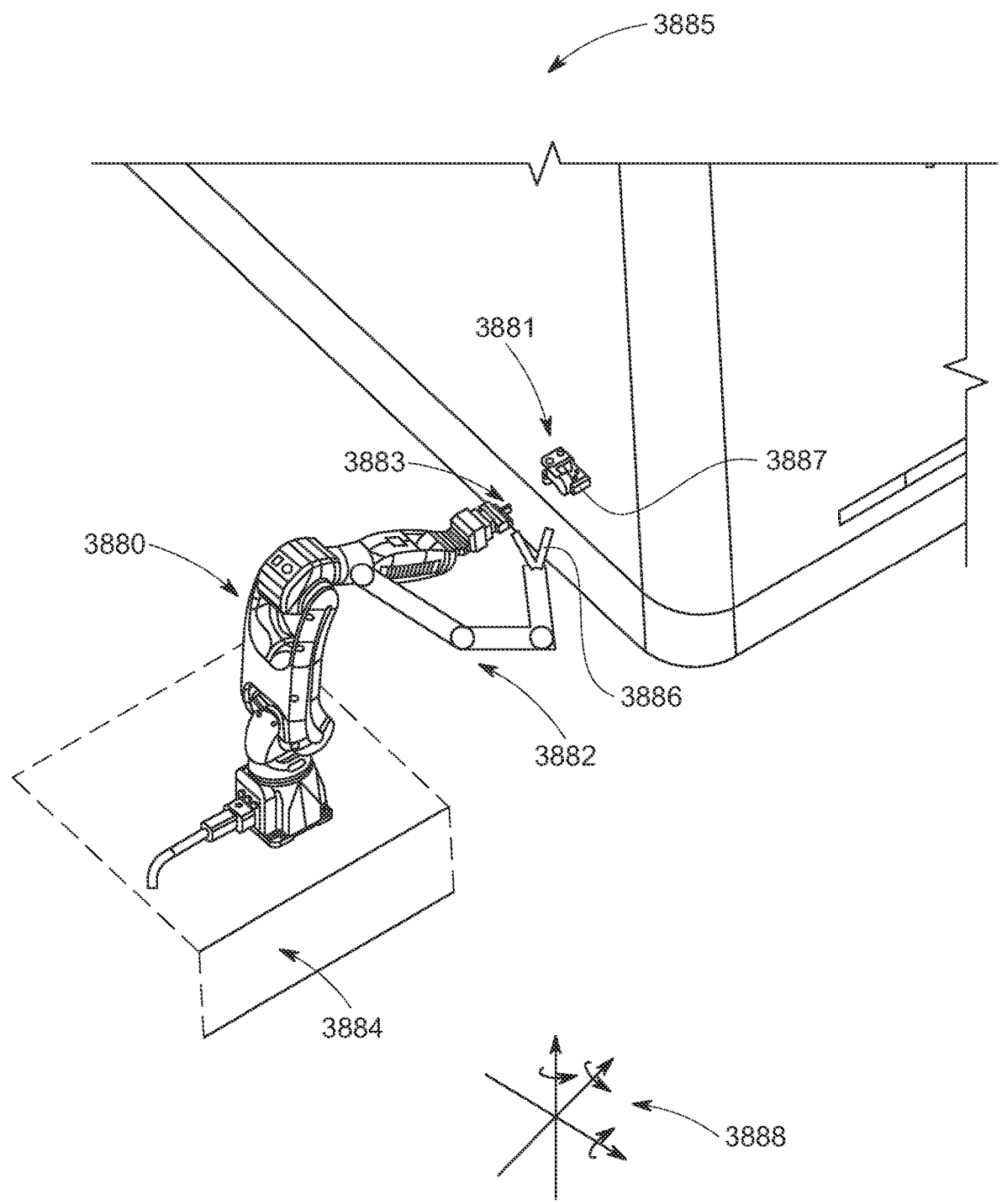
FIG. 38B is a diagram showing a gross manipulation technique for connecting a retractable/rotational, trailer-mounted, glad hand, including the use of a manipulator with a secondary robotic arm assembly to withdraw/rotate the glad hand for connection thereto, according to an exemplary embodiment.

In another gross manipulation embodiment, shown in FIG. 38B, a system and method for extracting a retractable/rotational glad hand 3881 from it recessed enclosure (box), or mounting directly on the trailer face 3885 (as depicted), when in the closed position (as depicted) is to utilize a second robotic manipulation system/arm 3882 that operates in conjunction with the primary robotic arm 3880 and end effector 3883, which are mounted on the truck chassis 3884. The primary manipulator arm 3880, and associated end effector 3883, is/are used to attach the connection tool after the glad hand 3881 is rotated/exposed. The secondary manipulator arm 3882 can operate using a variety of mechanical articulation systems—including but not limited to powered joints, wrists and/or telescoping beams. The distal end of the secondary manipulator arm 3882 carries a manipulator that can be powered or passive (and moving or stationary. For example, the manipulator 3886 can define a stationary or movable fork that grabs a portion (for example, the wedge/flange 3887 of the glad hand 3881), and once grabbed, rotates the glad hand 3881 outwardly by withdrawing the secondary arm 3882 according to an appropriate 3D path of travel. Once fully withdrawn, the primary manipulator arm's end effector 3883 attaches the connection tool. Note that the secondary manipulator arm 3882 can be constructed as a separate and standalone structure attached to the truck chassis 3884, or alternatively, it can be branched off of the primary manipulator arm 3880 as depicted. The secondary manipulator arm 3882 can be constructed with one or more active joints that can allow motion in multiple degrees of translational and/or rotational freedom (axes 3888). By way of non-limiting example, a form of distally mounted manipulator structure for grasping the glad hand by the secondary manipulator arm 3882 is shown and described with reference to FIGS. 52F-52I below. Note that both the primary manipulator arm 3880 and the secondary manipulator arm 3882 can be directed to the glad hand 3881 based upon the classification of the type of glad hand (e.g. fixed, rotating, enclosed, etc.), and its 3D pose using the machine vision system associated with the manipulator. Each manipulator can also provide 3D motion feedback to an overall guidance system based upon steppers, encoders, and the like, integrated with each arm, Alternatively, or additionally, the vision system can track the end effector (or another known component/feature) of each manipulator to servo it to the recognized glad hand. By way of non-limiting example, a glad hand classification and pose-determination system is shown and described in the embodiment of FIG. 78 below.

Figure 39A:
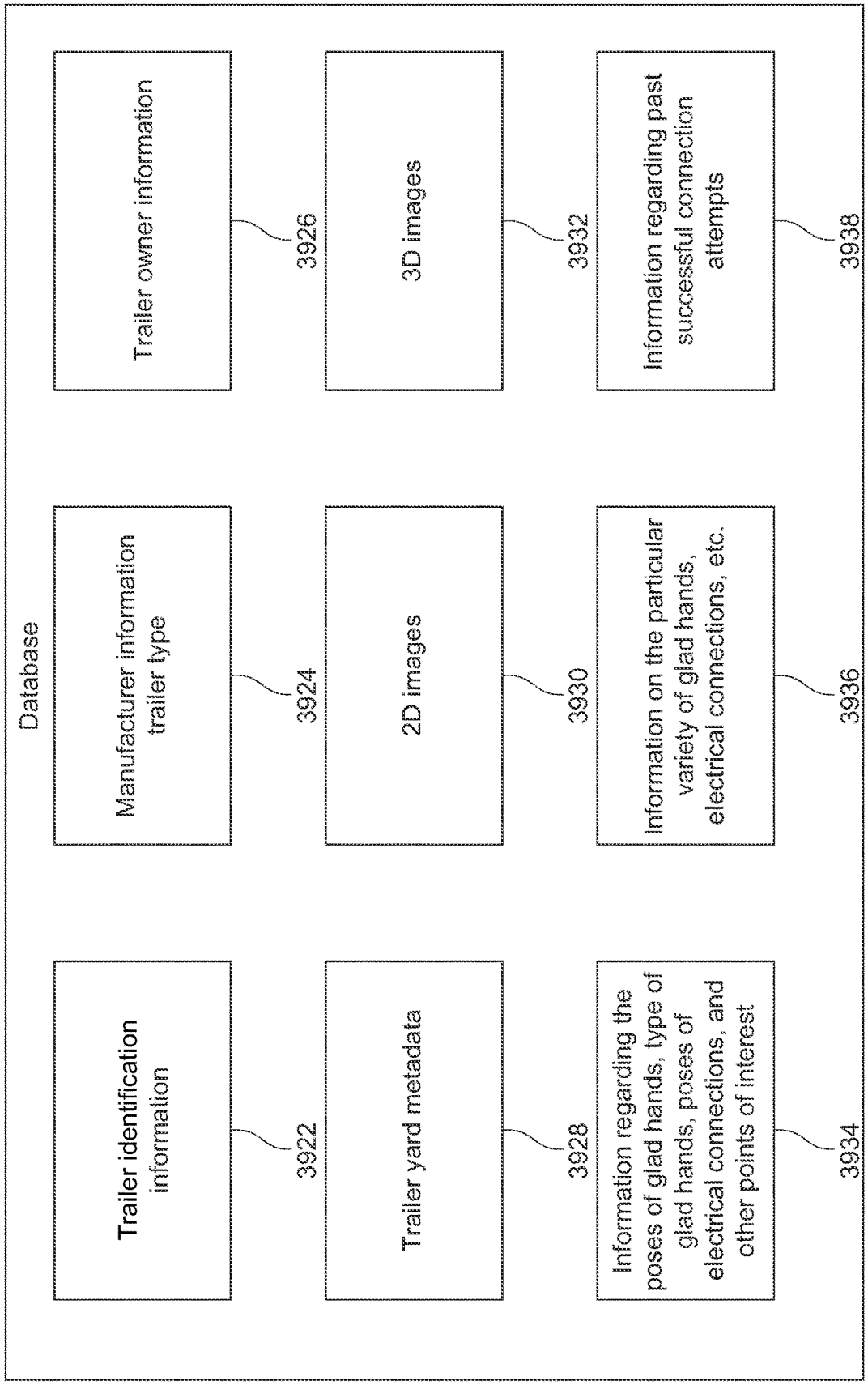
FIG. 39A is a schematic diagram of a trailer database.

It should also be clear that various trailers can have a wide variety of different types and locations of electrical connections and airline glad hands, including rotatable, fixed, mounted at different angles, and connectors that are mounted in any number of different locations on the trailer, etc. As the autonomous connection system encounters different trailers, the system can locate, identify, and connect to all of the different possible trailer connections. As the autonomous system encounters trailers over time, the autonomous system can store details regarding each trailer in a trailer database. FIG. 39A is a schematic diagram of a trailer database 3920. The trailer database can store trailer identification information 3922 for each specific trailer, and manufacturer information and trailer type 3924 for each trailer. The database can also store trailer owner information 3926 and metadata for the trailer yard 3928. 2D images 3930 and/or 3D images 3932 can be gathered by sensor systems and stored for each specific trailer. Information regarding the poses of glad hands, types of glad hands, poses of electrical connections, and other points of interest can be stored at step 3934. Information on the particular variety of glad hands, electrical connections, etc. can be stored at step 3936. Information regarding past successful connection attempts for each specific trailer can be stored at step 3938, including successful ways to approach the connections, connection difficulties that were overcome, previous successes that relied on adjusting the truck locations, etc.

This information can be used in multiple ways to improve the overall functionality of the autonomous system. In an embodiment, the autonomous system can identify a specific trailer and check the database for information on that particular trailer. Useful information can include the exact pose of various connectors in a previous connection event, previous connection difficulties that were overcome, etc. By reviewing past connections with the same trailer, the system can use that past information to seed the next connection attempt, including an assumption that the connectors are likely to be in the same poses as the had been previously. In various embodiments, the system can start with an assumption that the movements and locations that were successful in a previous attempt may be successful again, and that information can seed the next connection attempt.

In various embodiments, the system can be arranged to use the stored information to train and validate perception systems capable of identifying and locating glad hands, electrical connections, or other points of interest. In various embodiments, the system can use the stored information to increase search efficiency when searching for trailer connectors. Clustering algorithms can be used to bias where the system starts searching for glad hands and other points of interest, so that, for example, the system can start searching for connectors in the areas that are statistically most likely to contain the connectors based on the areas where connectors where found in the past on the trailers that have contributed to the database. Subsets of data can be searched for clustered locations of past connections, informed by trailer manufacturer, trailer type, site information, customer information, etc. Prioritizing future searches for trailer connectors in likely locations can result in increased efficiency and reduced operation times.

Figure 39B:
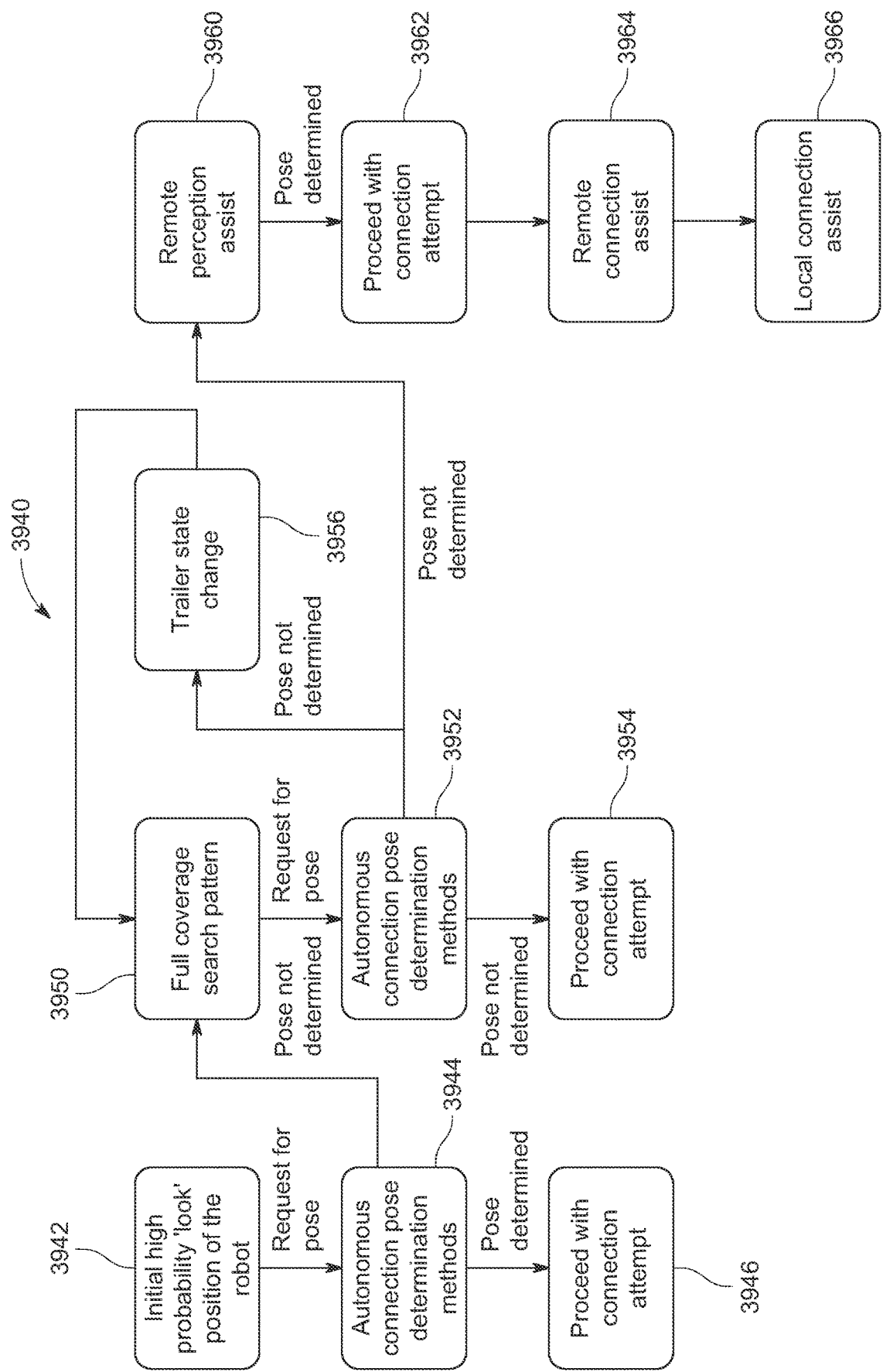
FIG. 39B is a flow diagram of a procedure for determining a glad hand pose.

In order to determine the connection point for an electrical or airline connection operation, and perform a successful connection, there are a number of steps that can be undertaken in a sequential order to ensure maximum likelihood of pose identification. During these steps, various factors can arise that prevent accurate determination of the pose, so each successive step can be provided a backup method in case the previous one fails. FIG. 39B is a flow diagram of a procedure 3940 for determining a glad hand pose. At step 3942, the system can perform an initial look based upon historical location data and vehicle state information. The initial look can look to the highest probability area on the trailer. A database can contain historical information about the locations of connection points, such as glad hands on trailers, and this information can be compiled and used in the aggregate to determine an idealized centroid of a clustering for all glad hand locations, and this idealized centroid can be used as a high probability fixation area of interest for perception sensors. For example, the fixation area of interest for perception sensors can include the central portion of the field of view of a camera or an area of interest for (e.g.) a scanning LIDAR system. This fixation area of interest, or central position, can be considered the location of highest probability for a single step connection point detection, if no other information is provided. This fixation area can be preemptively determined during a backing maneuver when a truck is backing to a trailer. The perceptions systems can be on the lookout for these connection points, such as glad hands, during the backing maneuver, and can report the positions to the control system. If the perception system identifies and report the positions of the glad hands, the system can proceed to step 3944, where the perception sensors can begin determining the pose of the glad hands. If the pose is successfully determined, attempts to connect the lines can begin at step 3946.

If the initial high probability look at step 3942 does not result in a successful connection, a full coverage search pattern can occur at step 3950. Sensors including sensors on the back of the truck, on the robotic manipulator arm, and/or other sensors can proceed with a full coverage search pattern covering that can cover the entire region of possible connector locations on the trailer. This full coverage search pattern can include motion (pan, tilt, yaw, etc.) of sensors through either the robotic arm or other actuation mechanisms to ensure full coverage of an area of interest on the back of a trailer. The coverage can be empirically determined, or can be based upon known properties of the sensor system. The coverage can be determined based on the historical information about the known locations of connection points on various trailers. If the perception system(s) identify and report the positions of the glad hands, the system can proceed to step 3952, where the perception sensors can begin determining the pose of the glad hands. In various embodiments, the 2D and/or 3D perception sensors can also be used to determine the trailer glad hand's relevant mating features, the type of glad hand, such as spring-loaded rotational type, the rotational axis of rotational type glad hands, etc. If the pose and type are successfully determined, attempts to connect the line can begin at step 3954.

If the full coverage search pattern at step 3950 does not result in a successful connection, a trailer state change can be initiated at step 3956. If the search for the connection point is executed with a failed pose determination or a resulting pose that has a high error metric, then a process of altering the location of the connection point relative to the truck can be tried. By way of non-limiting example, the trailer angle between the truck and the trailer can be varied by re-hitching at a different angle, or by dragging the trailer with locked wheels a short distance to slightly change the angle. In another example, when the truck and trailer are already hitched, the method can include altering the $5^{th}$ wheel height to change the location of possible undetected connection points. After the state of the trailer relative to the truck has been altered, the system can return to step 3950 and can begin a new full coverage search pattern.

If necessary, the trailer state change at step 3956 can be repeated more than once. However, after a predetermined number of failures, or after a predetermined range of trailer state changes, the system can proceed to step 3960 and can call for remote perception assistance. The remote perception assistance can be adapted to allow a human operator, who could be in a remote location, to manually intervene when (for example) the autonomous system is unable to decide, or is unsuccessful in, a course of action with respect to the identification of the connection points. Note that a remote human operator can employ an appropriate interface and network (e.g. a local PC, server, etc. and LAN/WAN) to perform various operations to assist with the connection point identification. In an operational example, when the system is unable to identify a connection point in a scene, the human operator can click on a region of interest or designate a region of interest in a frame image that has been sent to a user interface. The click by the operator can identify the location of the connection point, as determined by the operator. Additionally, the operator can have control over all aspects of the camera exposure, and can request additional frame images. Additional information can be supplied by the operator to indicate more detailed information about the classification of the type of connection point, such as fixed vs rotational, or straight vs. (e.g.) 37.5° degree down. Once the location and/or pose of the glad hands have been identified, the system can proceed as according to a conventional operating procedure/protocol, as if the system has been (previously) provided with enough information to proceed with a connection.

In another example, if the control system still has insufficient information after the operator has attempted to identify the location and/or pose of the connection points, the operator can be given an image of the scene containing depth information. An overlay of a proposed connection point type can be generated. The overlay can be scaled and oriented appropriately based on any information on a proposed pose as determined by the automatic recognition system. The operator can then manually adjust the position of the overlay to align with the information provided to the operator by the sensors that are observing the scene. The operator can use interface artifacts such as button and sliders to make adjustments in a 2 to 6-dimensional space to get a satisfactory subjective alignment of the connection point. Additionally, the operator can have the ability to adjust the vantage points, scale, and position of the scene in an effort to get a better perspective on a real-world scenario. Additionally, the operator can have the ability to adjust any exposure settings or request an entirely new sensor data set of the scene. Once the location and/or pose of the glad hands have been identified, the system can proceed as normal, as though it has been given enough information to proceed with a connection.

In another example, if fiducial markers are utilized by the perception system, the operator can designate the location of certain information that may have been incorrectly identified on the fiducial markers. The information designated by the operator can include corners of the markers, or other key pieces of information. In general, the system can have a number of metrics available in normal operation to effectively self assess the quality of a detected connection point. The measures of quality can be thresholded or used as an indication to that a human operator should be automatically prompted to confirm the adjustment of a given proposed connection point.

After the remote perception assistance has helped the system to identify the location and pose of the glad hands, the system can proceed to attempt the connection at step 3962. If the system is still unable to establish the connection, a remote operator can be used at step 3964 for remote manipulation assist during connection. If the system is unable to make a connection between the truck and the trailer, the system can alert a remote operator of the error state, and the system can enter a teleoperation assist mode allowing the remote operator to manually intervene. In this mode, the remote operator can visually monitor the state of the system in the environment by monitoring information from one or more sensors, and can provide motion primitives (e.g. lines, arcs, point rotations, and/or directional nudges) to the manipulator tool frame to manually attempt a connection. The operator can be given information in the form of a video feed, and can be given an awareness of the 3-D environment that that can be zoomed, scaled, and panned. The video feed of the robot can be aligned with a particular motion axis of the delivery mechanism, such that desired motion in and out of the camera can be directly aligned with a motion axis of the delivery mechanism. This can simplify the intuitive understanding of how the intended directional changes can manifest as actual movement in the remote environment. The operator can then manually teleoperate the robot arm through directional nudges, rotational changes, and motion primitives and trajectories, as described above. More generally, a teleoperations system can use teleoperation to connect the airline via a remote operator. The operator controls the connection process over a network using appropriate, sensor-based, visual and/or tactile feedback in conjunction with a controller (e.g. a joystick, etc.), the implementation of which should be clear to those of skill.

In another operational example, a series (plurality, sequence, etc.) of motion plans can be displayed to an operator, and those motion plans can be associated with/mapped to a previously failed attempt at connection. The operator can physically manipulate the trajectory waypoints along the motion plan to some desired end state in an effort to complete a connection operation. In another example, the remote operator can have control over other elements of the delivery mechanism or tool, such as actuated degrees of freedom that are typically involved in making a connection. In this case, the operator can manually control motion in each of these degrees of freedom in coordination with the delivery mechanism to attempt a successful connection.

In the event the remote manipulation assist at step 3964 is unsuccessful, the system can proceed to alerting a nonremote human at step 3966. At step 3966, a local human who is on site, in cases where the connection has been unsuccessful, can be alerted to the problem, and the local human can proceed to make the connection or determine why the connection cannot be made.

After a physical connection has been made between the truck connection tool and the trailer glad hand, the control system can use one or more methods to verify that a successful air connection has occurred. In an embodiment, the control system can perform a test of the mechanical engagement between the connection tool and the trailer glad hand by performing a light "tug test." If the tool has a known force or torque threshold to disconnect from the trailer, the manipulator system can apply a lower amount of force or torque on the tool (below the threshold), and then monitor that the tool has not moved in a predetermined manner/amount. Non-movement of the tool can be used to indicate proper mechanical alignment.

The control system can also monitor the air in the airlines using one or more (e.g.) pressure sensors in-line with the truck air supply. In an embodiment, the control system can monitor the level of pressure in the air line and track if/how the pressure changes over time. For example, in an ideal connection scenario, the pressure would likely start out at a maximum level, then drop by a certain amount depending on the flow characteristics of the path to the trailer air reservoir, and then the pressure would asymptotically return to the same value as before the connection attempt began. The drop in pressure, as air flows out of the truck and into the trailer, indicates that a connection has occurred, and a return to the same original value indicates that the connection is secure and does not leak. A return to a pressure level/value that is close to, but not substantially the same as, and/or identical to, the original pressure level/value indicates the potential presence of a slight leak in the system. A failure to return to a value near the original value can also indicate that a proper connection has not been made. A similar test method can be used to verify electrical hook ups—providing appropriate current and/or voltage level sensors along the electrical circuits subject to connection, along with associated interfaces that read and interpret the electrical parameters of such sensors.

In various embodiments, the control system can monitor a pressure switch that can change state based on a set pressure level/value. The pressure switch can be set to the value required for the trailer brakes to release, and can be continuously monitored. If the pressure switch reports a value above the desired threshold for a predetermined amount of time, the control system can determine and/or confirm that a successful connection has been made. In an embodiment, the control system can monitor a flow sensor that can detect proper engagement by monitoring the flow of air after air is supplied to the trailer. Airflow data (obtained via an appropriate flow meter and associated interface) can be used to indicate that a proper connection was made if the airflow data reveals that air has flowed for a limited (predetermined) amount of time, and then such flow has tapered down to zero flow as the trailer system pressure circuit equalizes. Conversely, if the read airflow data reveals a degree of continuous flow, then such a condition can indicate a leak and/or a poor connection within the connected pressure system.

In general, and as described below, once the truck connector (e.g. glad hand) is mated fully to the trailer glad hand, the end effector releases its grip upon the truck glad hand via an appropriate release motion. The motion is dependent upon the geometry of the end effector grasping mechanism. A variety of grasping mechanisms can be employed, and can be implemented in accordance with skill in the art. After releasing the glad hand, the end effector can return to a neutral/retracted position based upon motion of both the fine and gross motion mechanisms to an origin location.

Figure 39C:
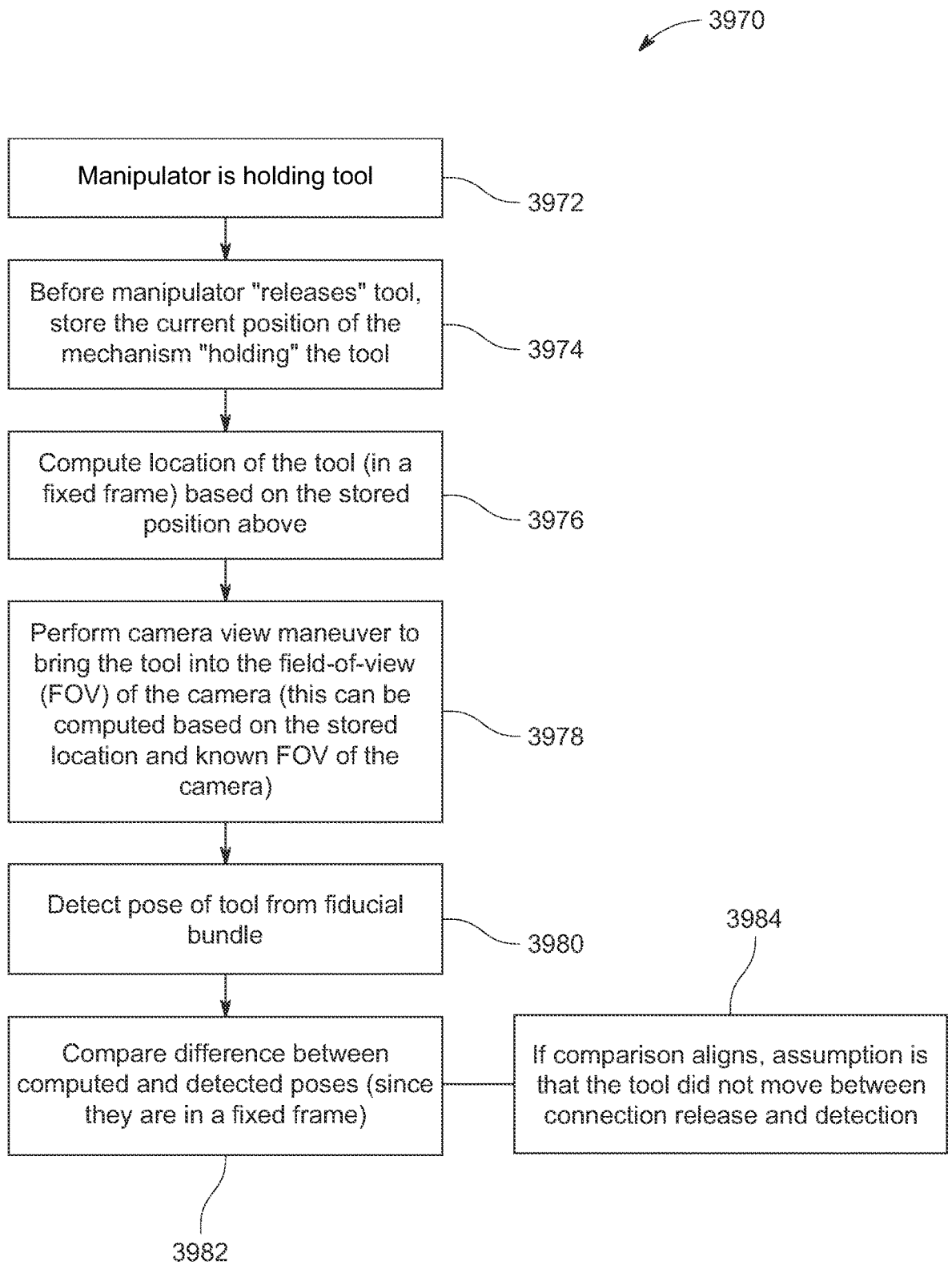
FIG. 39C is a flow diagram of a procedure for verifying the position of a tool.

After the truck connector is mated fully to the trailer glad hand, the control system can verify that the connection tool remains fully connected to the trailer after it is released by the end effector. The control system can verify that the connection tool remains in the expected location and pose before initiating movement of the truck and the connected trailer. Fiducial markers on the connection tool, which can provide six degree of freedom pose information for the connection tool, can be used in verifying the tool position. That is, the fiducials are acquired as images by one or more cameras, associated with the control system, and a machine vision system uses the image data to determine pose in a manner clear to those of skill. FIG. 39C is a flow diagram of a procedure 3970 for verifying the position of a tool. At step 3972, the connection system has performed a connection between the truck and a trailer, and the manipulator is still holding the connected connection tool. At step 3974 the control system can store the current position of the end effector that is holding the tool before the end effector releases the tool. At step 3976, the control system can compute the location of the tool (in a fixed frame) based on the stored position of the end effector. At step 3978, after the tool has been released, the control system can perform a camera view maneuver to bring the tool into the field of view of the camera. This can be computed based on the stored location and known field of view of the camera. At step 3980, the control system can detect the pose of the tool from the fiducial bundle that has been imaged by the vision system. At step 3982, the control system can compare the computed pose to the detected pose (because they are in a fixed frame). At step 3984, if the computed pose and the detected pose are in alignment, then the control system can verify that the tool did not move between the release of the tool by the end effector and the detection by the camera. This verification can provide a technique for assuring that the pressure line is properly connected.

As with other embodiments described herein, the release of the mated truck glad hand from the trailer glad hand can be performed in a similar manner to attachment. The end effector is moved to a gross location and then the fine sensor servos the end effector to the final position in engagement with the mated truck glad hand. The end effector then grasps the truck glad hand, blindly rotates it to an unlocked position and it is withdrawn to the origin.

E. Gross Manipulation Systems and Operation Thereof

As described above, the end effector carrying the glad hand or other truck-based pneumatic (and/or electric) connector can be moved via the manipulator assembly in an initial, gross movement that places the end effector relatively adjacent (and within fine sensor range of) the trailer glad hand(s). Thereafter, the relatively adjacent end effector is moved by the fine manipulation system into engagement with the trailer glad hand.

A gross manipulation system is also desirable if the fine manipulation system lacks the ability to reach glad hands when the trailer is at an angle relative to the truck, or is otherwise outside of the workspace of the fine manipulation system. The gross manipulation system generally operates to move the fine manipulation system within reach of the trailer glad hands. In operation, the gross manipulation/movement system can have one-two or three axes of motion along sufficient distance(s) to locate the end effector in contact with the trailer glad hand(s) at any expected location along the trailer front face and/or at any pivotal orientation of the trailer with respect to the truck chassis. A generalized gross manipulation system can include: (a) a frame, comprising a structure that is mounted to the yard truck; (b) a platform where the fine manipulation assembly is integrated; (c) an x-axis manipulation mechanism that moves the fine manipulation system in the x-direction (i.e. front-to-rear of the vehicle); (d) a y-axis manipulation assembly that moves the fine manipulation system in the y-direction (side-to-side of the vehicle); and (e) a z-axis manipulation assembly that moves the fine manipulation system in the z-direction (vertically with respect to the ground).

Figure 40:
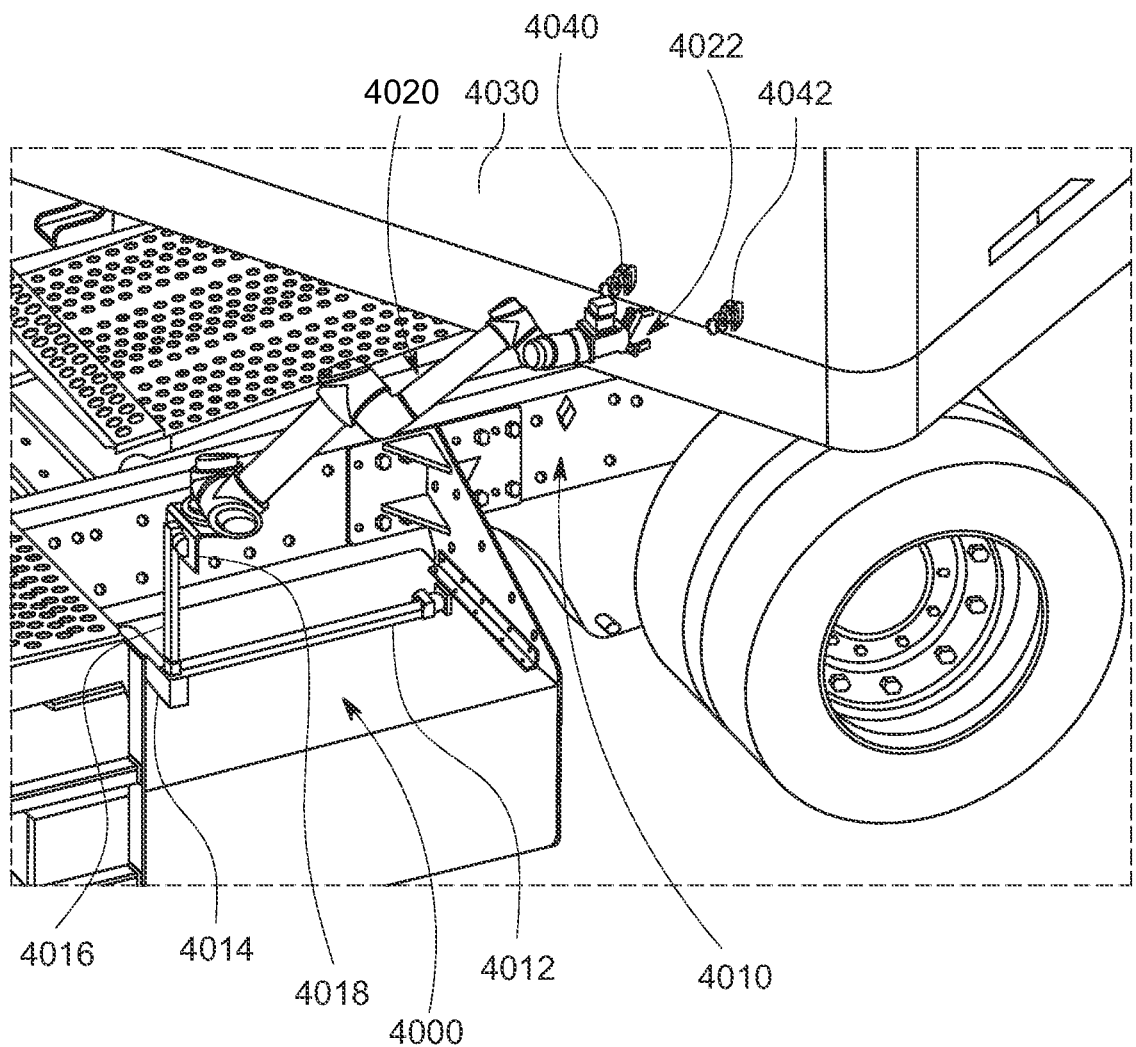
FIG. 40 is a diagram of a trailer hitched to an autonomous truck chassis, showing a multi-axis gross manipulation system carrying fine manipulator robotic arm according to an embodiment.

One embodiment is a 3-axis gross manipulation system 4000 is shown in FIG. 40, located on the side of the autonomous truck chassis 4010. This system 4010 includes an x-axis rail or slider 4012, a y-axis rail/slider 4014 and a z-axis rail/slider 4016. The base 4018 of the robotic manipulator (the depicted multi joint arm assembly) 4020 rides vertically along the z-axis rail/slider 4016, whilst the z-axis rail travels laterally along the y-axis rail/slider 4014. In turn, the y-axis rail slider travels front-to-rear along the x-axis rail/slider 4012, thereby affording the arm base 4018 full three-dimensional gross movement within the range (length) of each rail/slider. Use of a multi-axis system improves the overall motion range for the robotic manipulator arm 4020, and thereby allows the arm's end effector 4022 to reach a larger range of trailer pivot angles and glad hand locations along the trailer front face 4030, including the depicted glad hands 4040 and 4042.

Figure 40A:
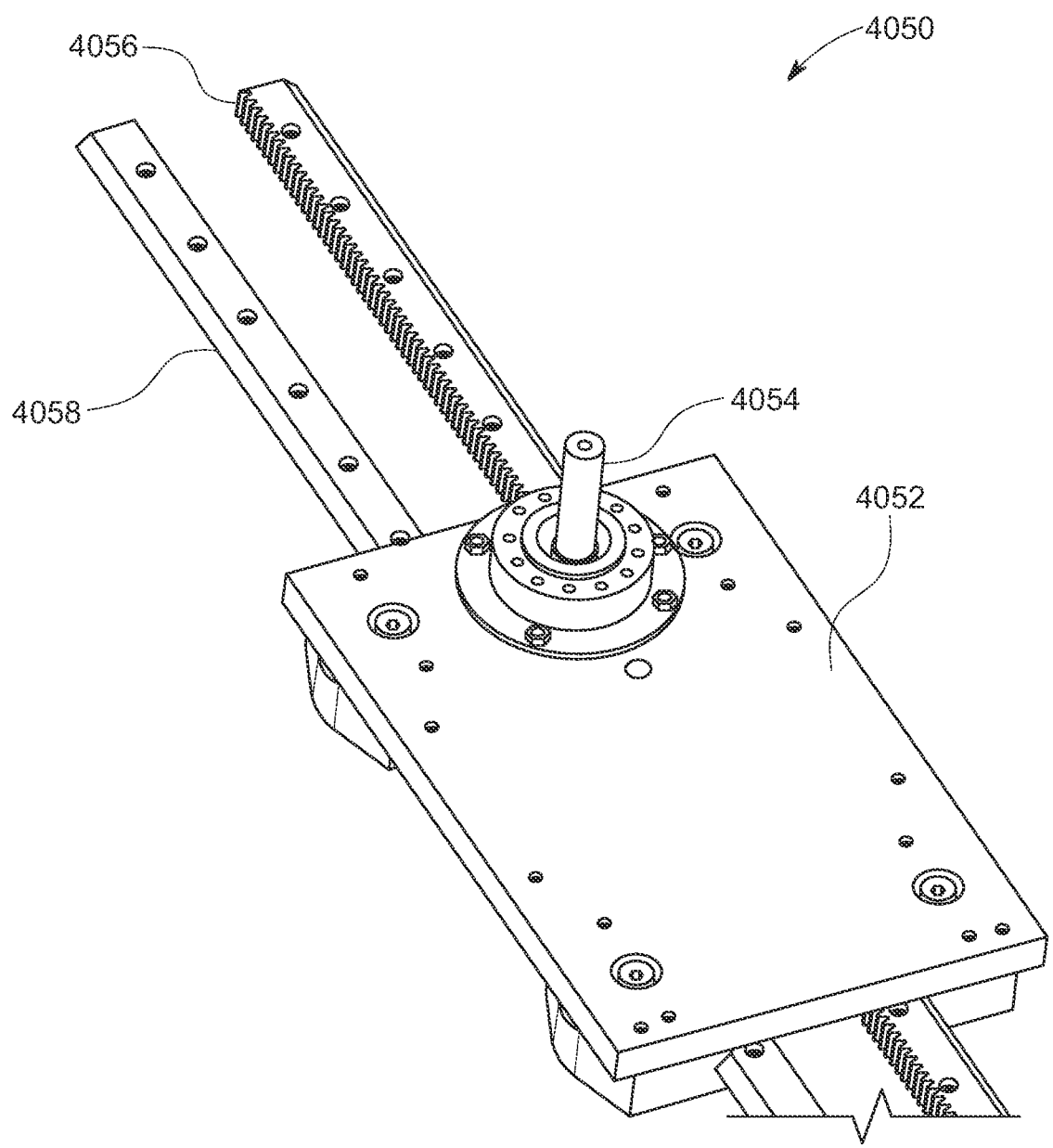
FIG. 40A is a perspective view of a slide mechanism of a gross manipulation system for carrying the fine manipulator robotic arm, according to an exemplary embodiment.

FIG. 40A is a perspective view of a slide mechanism of the gross manipulation system for carrying the fine manipulator robotic arm, according to an embodiment. The slide mechanism 4050 can include a base plate 4052 to support the robotic manipulator arm, and a spindle 4054 connected to a pinion that interfaces with toothed rack 4056. As the spindle 4054 is rotated, the pinion can move along the rack 4056, so that the base plate 4052 can travel along the rack 4056. A rail 4058 can be parallel to the rack 4056, and can provide additional support to the base plate 4052, so that the base plate and robotic manipulator arm can each slide along both the rack 4056 and the rail 4058. The workspace of the robotic manipulator arm can be expanded along the length of the rack 4056, so that connections can be made while using a smaller robotic manipulator. Notably, a smaller-sized robotic manipulator can operate in a smaller space, and is therefore less likely to encounter interference from external objects. In various embodiments, multiple slide mechanisms can be incorporated so that the workspace can be extended in a plurality of directions to accommodate a multitude of connection point locations.

Figure 41:
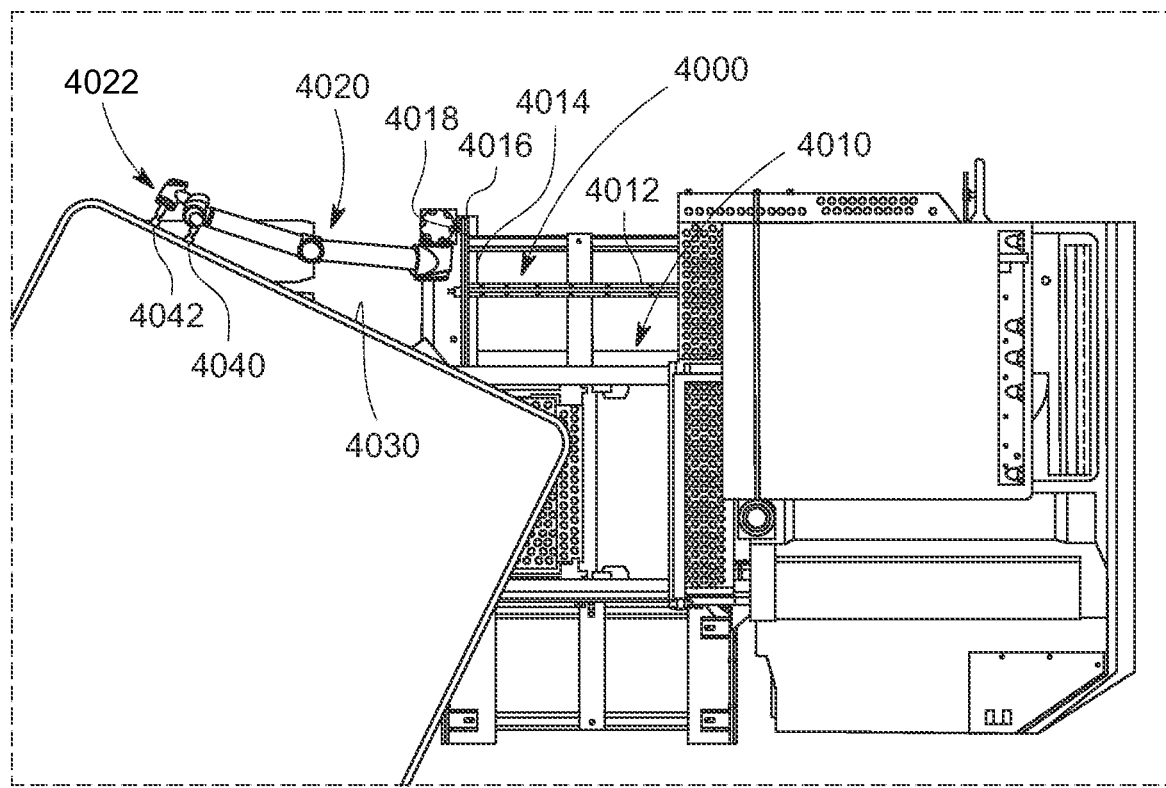
FIG. 41 is a top view of the trailer and autonomous truck of FIG. 40, showing the trailer at a pivot angle on its hitch, in which the gross manipulation system is locating the fine manipulator so that its end effector can reach the trailer glad hand panel.
Figure 42:
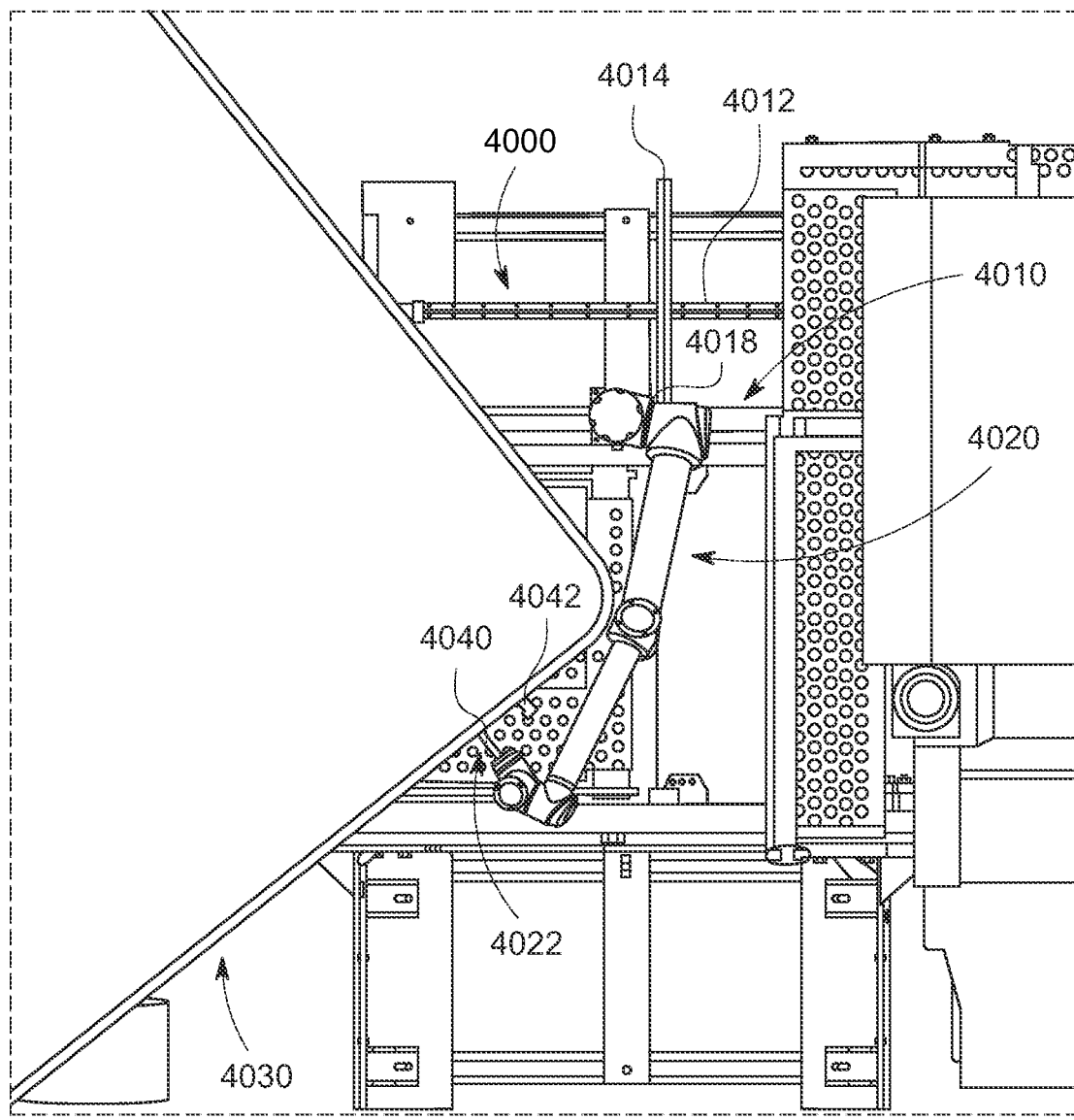
FIG. 42 is a top view of the trailer and autonomous truck of FIG. 40, showing the trailer at another, opposing pivot angle relative to FIG. 41, in which the gross manipulation system is locating the fine manipulator so that its end effector can reach the trailer glad hand panel.

The improved gross motion range provided by the exemplary 3-axis system 4000 is exemplified in FIGS. 41 and 42. In FIG. 41 the trailer front face 4030 is pivoted with respect to the truck chassis at a steep angle that places the trailer glad hands 4040 and 4042 at a distant rearward angle. The manipulator arm base 4018 is moved rearward and leftward on the x-axis rail/slider 4012 and y-axis rail/slider 4014, respectively, to a nearly maximum distance. This allows the end effector 4022 to reach the glad hand(s) 4040 and 4042, even at the extreme geometry depicted. Likewise, in FIG. 42, the trailer front face 4030 is pivoted at an opposing steep angle. In this example, the manipulator arm base 4018 is moved to a slightly forward and rightmost position by the x-axis rail/slider 4012 and y-axis rail/slider 4014, respectively, allowing the end effector 4022 to reach the glad hands 4040 and 4042, which now reside further forward and centered on the chassis, when compared to FIG. 41. The exemplary multi-axis gross manipulation system 4000 can contain one or more of the linear actuation devices described above (e.g. linear motors, lead screws, rack and pinion gears, etc.). Note that the vertical position of the base 4018 along the z-axis rail/slider 4016 is chosen to make the arm appropriately level with the height of the glad hands 4040, 4042. The height/level of the base 4018 may differ from the actual glad hand height to allow for bends in certain manipulator arm joints.

Figure 43:
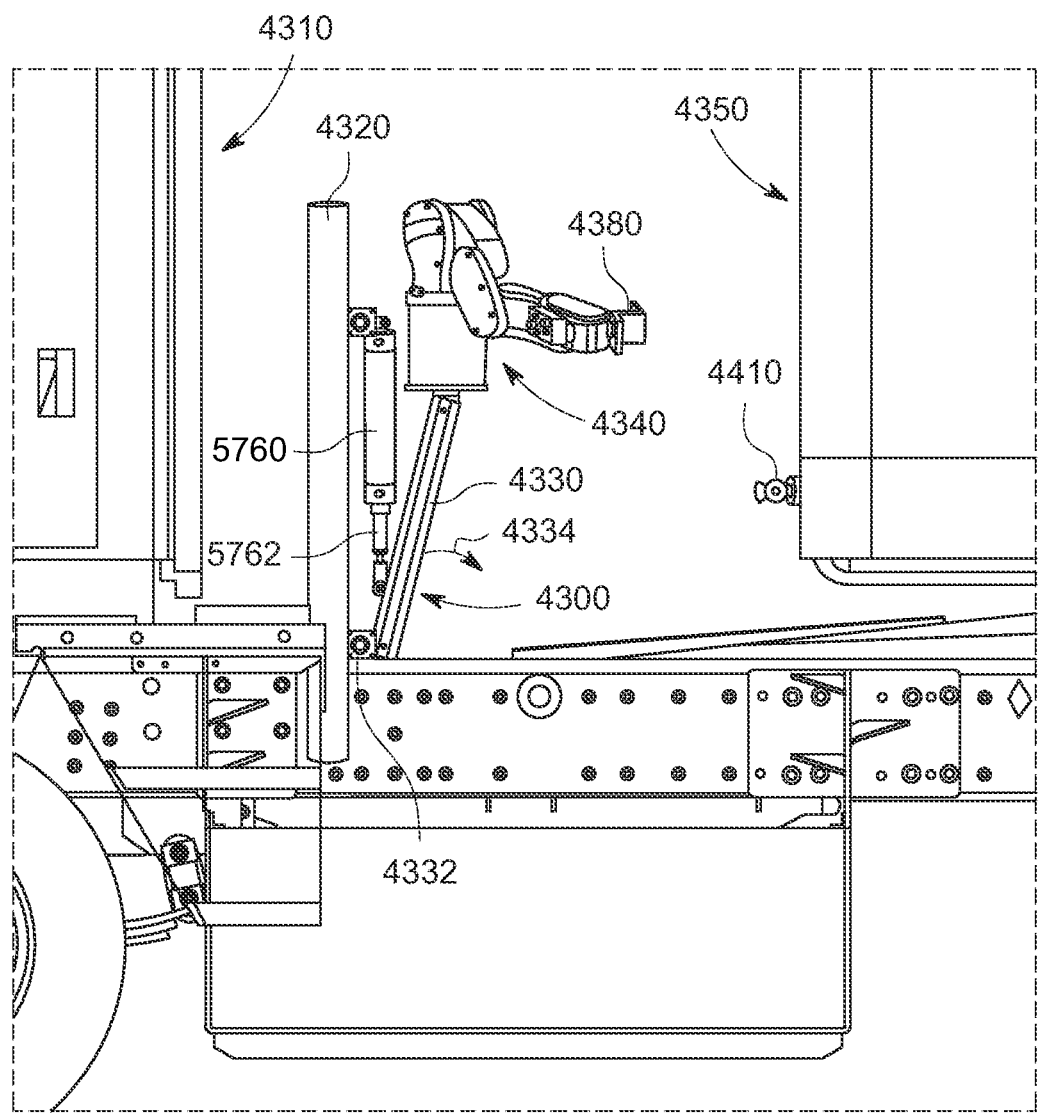
FIG. 43 is a side view of a trailer hitched to an autonomous truck chassis, showing a multi-axis gross manipulation system carrying fine manipulator robotic arm, in which the manipulator system is mounted on a piston-driven, hinged platform in a stowed orientation on the truck chassis, according to another embodiment.
Figure 44:
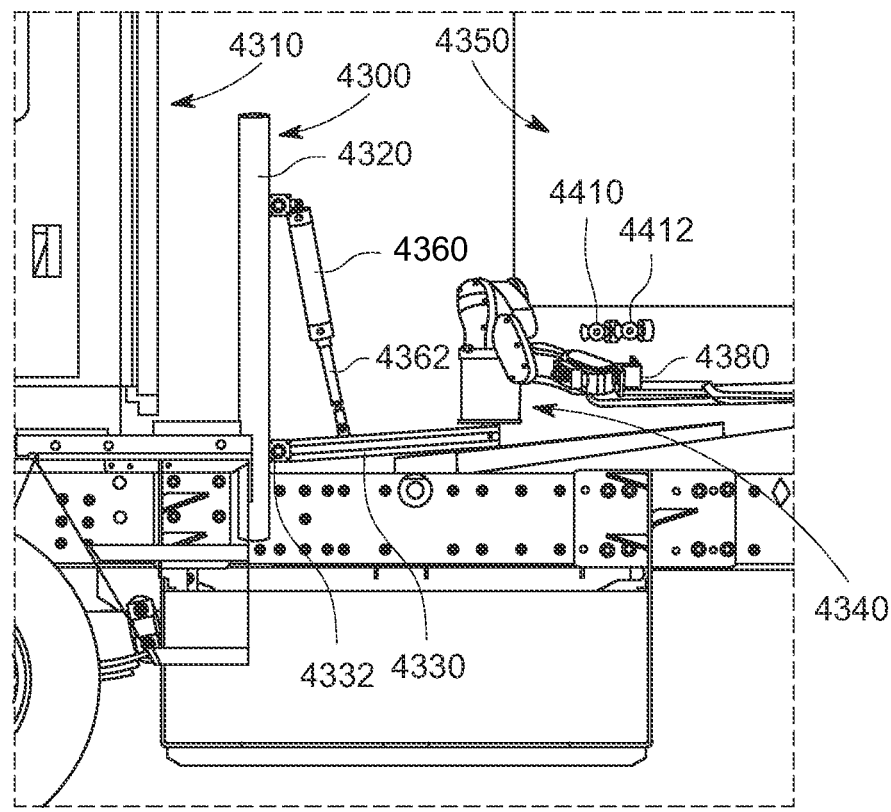
FIG. 44 is a side view of the trailer and autonomous truck of FIG. 43, showing the piston-driven, hinged platform in a deployed orientation on the truck chassis.

Another embodiment of a gross manipulation system 4300 is shown in FIG. 43. In this arrangement, the system is mounted on an upright frame 3420 behind the cab 4310 of the autonomous truck. A platform 4330 is mounted on a hinge 4332. The platform supports the fine manipulation system 4340 at a top end and is adapted to pivot downwardly on the hinge 4332 to adjustably extend (curved arrow 4334) the fine manipulation system 4340 toward the trailer front face 4350. This pivotal extension can be accomplished using (e.g.) any acceptable linear actuator described above. In the depicted exemplary embodiment, a fluid (e.g. hydraulic or pneumatic) piston 4360 is used to extend and retract the hinged platform 4330. The piston is pivotally mounted between the upright frame 4320 and the hinged platform 4330. Extending the piston ram 4362 causes the platform 4330 to hinge downwardly, as shown in FIG. 44. This moves the manipulator arm system 4340 closer to the trailer front face 4350. When the ram 4360 is retracted into the piston 4360, as shown in FIG. 43, the manipulator arm system 4340 is retracted upwardly and towards the cab 4310. This takes it out of interference with the trailer when not in use. The piston 4360 and hinged platform 4330 effect coordinated motion along the x-axis and z-axis directions. The geometry of the platform and motion characteristics of the arm are coordinated in the overall design so as to allow the end effector 4380 to access the glad hand(s) 4410 and 4412 in a range of possible positions and trailer orientations. While not shown, the hinge axis 4332 (or another element in the system 4300) can include a y-axis slider/rail (e.g. a lead screw, linear motor or rack and pinion system that facilitates y-axis (side-to-side) movement). In an exemplary embodiment, the y-axis assembly can be electromechanically driven, while the x/z-axis assembly can be fluid-driven (hydraulic/pneumatic).

In various embodiments in which the robotic manipulator is mounted on a truck body, it is contemplated that the truck can become a mobile manipulation system and the motion profile that the truck can attain and control can also change the location of this delivery mechanism workspace with respect to the trailer connection point. If necessary, the connection operation can happen before the hitching operation occurs between the truck and the trailer. For example, motion of the truck during approach for hitching can be used to affect the position of the connection point on the trailer relative to the vehicle through altering the desired trailer angle (between the truck and the trailer) in order to bring the connection point within the workspace of the delivery mechanism. In various embodiments, a connection can be attempted before the hitching operation is completed. If desired, the truck can be moved to bring the delivery mechanism closer to the connection point on the trailer. It should be clear that the connection of the airlines can occur before or after the hitching is undertaken and/or completed, so long as the air is not applied to release the brakes before the hitching is completed.

In another operational example, the truck and the trailer can be hitched first, although the connection point is outside the workspace for the delivery mechanism. In that event, the trailer can be dragged a short distance while the brakes remain applied so that the angle of the trailer relative to the truck can be altered. Changing the angle of the trailer relative to the truck can affect the location of the connection point to bring it into the workspace of the delivery mechanism. Similarly, the fifth wheel height can be altered to also affect the position of the connection point in an effort to bring it into the workspace of the delivery mechanism.

In various embodiments, the connection can be outside of the workspace of the robot manipulator arm, and thus, the overall system can provide appropriate coordination and exchange of information between the vehicle system and the manipulator system. By way of non-limiting example, this exchange of information can be implemented as a serial communication arrangement, in which successive connection attempts and state changes occur sequentially, one after another, in an effort to provide a successful attempt. The changes can be implemented via random/semi-random adjustment values, or can be dictated by performance heuristics, previous knowledge of connection locations, and/or look-ahead motion planning, in a manner clear to those of skill. In various embodiments, these motions can operate in a coordinated manner during a connection attempt, and can result in multi-system coordinated motion—that is, the robot, truck, trailer and/or other actuators are in motion concurrently.

It is contemplated in another embodiment that the gross manipulation mechanism can be part of a separate vehicle. This separate vehicle can be manually driven or comprise an autonomous robotic vehicle (not shown)—which can be similar to those commercially available from a variety of vendors for use in hazardous environments, etc. A fine manipulation arm assembly is mounted on the vehicle/robot. The vehicle/robot can move along the truck length and provide fine manipulation access to the truck hoses and trailer glad hands. The separate vehicle can communicate with the yard truck and/or the system server and execute an attach or detach command as desired.

F. Systems for Fine Manipulation and Delivery of a Truck Glad Hand

Upon sensing of the glad hand location on the trailer front face, a combination of fine and/or gross manipulation system can be used to connect the manipulated truck glad hand interface onto the fixed position trailer glad hand. The fine manipulation system is used in accordance with the sensor-based glad hand perception system described above (see Section K).

Figure 45:
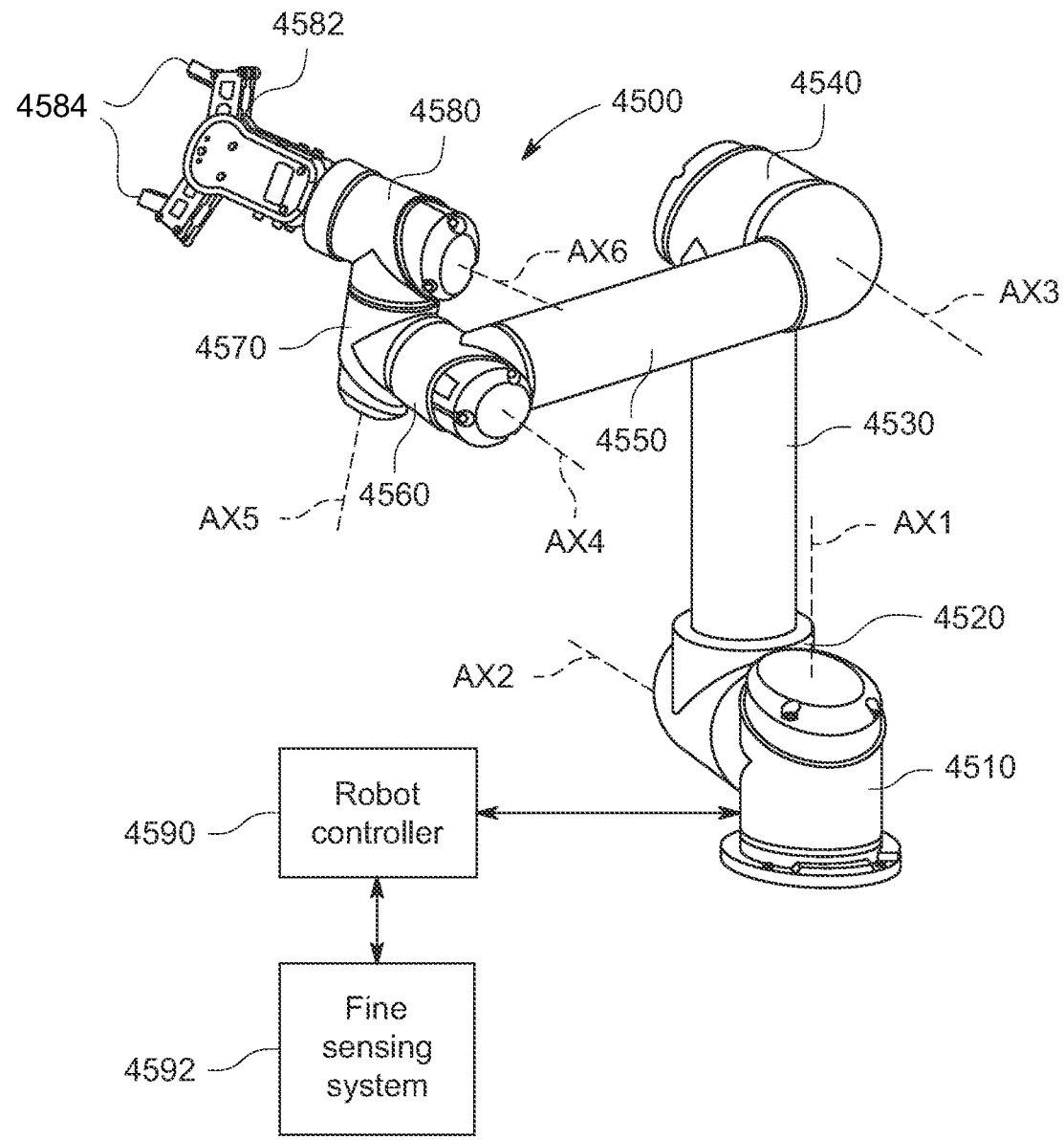
FIG. 45 is a perspective view of a multi-axis (e.g. 6-axis) fine manipulation robotic arm assembly and associated end effector for use in manipulating a truck-based trailer glad hand connector according to various embodiments herein.

An embodiment of this fine manipulation system consists of a tightly controllable, multi-axis robotic manipulator (multi joint arm) that can compensate for variations in trailer pivot angle with respect to the truck, glad hand position on the trailer front face, glad hand angle with respect to the plane of the trailer front face, and overall trailer height. The system is capable of depositing/releasing and grasping/retrieving the glad hand interface. The multi-axis manipulator system can contain any or all modalities for linear travel including electro-mechanical actuation, in which one or more electric motors are used to move the system components, such motors can include integrated or integral motion feedback devices (e.g. stepper motors, encoders, etc.) that allow the robotic controller to monitor motion with respect to a given coordinate space. An example of such an electromechanical manipulator system is shown in FIG. 45. The depicted, tightly controllable, 6-axis robotic arm 4500 can be commercially sourced from, a variety of vendors, including Universal Robotics and Denso, described above.

The manipulator arm 4500 includes a base 4510 that is attached to an appropriate platform (such as a gross manipulator, described above). The base can rotate a first transverse joint 4520 about a first vertical axis AX1. The first joint 4520 rotates about a second, transverse axis AX2 so as to swing an elongated arm segment 4530 through an arc. On the distal end of the arm segment 4530 is mounted another joint 4540 that rotates about a transverse axis AX3 to swing an interconnected arm segment 4550 about an arc. The distal end of the arm segment 4550 includes three joints 4560, 4570 and 4580 that rotate the end effector 4582 about three orthogonal axes AX4, AX5 and AX6 in the manner of a wrist. The end effector 4582 can include a variety of actuated mechanisms, including the depicted gripper fingers that move into and out of a grasping configuration. In embodiments a specialized end effector can be used to grasp and release the truck's glad hand interface. The end effector 4582 can be actuated using electrical, pneumatic or hydraulic motive force under control of the robot controller 4590 (that also moves and monitors the joints 4510, 4520, 4540, 4560, 4570, 4580). Alternatively, a separate controller that also communicates with the fine sensing system 4592 can actuate the end effector.

In alternate embodiments, the robotic arm manipulator can define a differing number of motion axes, as appropriate to carry out the desired grasping and releasing tasks. In further alternate embodiments, some or all of the manipulator motion elements can be operated with differing mechanisms and/or motive forces including, but not limited to, hydraulic actuation, using hydraulic pressure to extend or retract a piston in a cylinder and/or pneumatic actuation, using air pressure to extend or retract a piston in a cylinder.

G. Glad Hand Interface Mechanisms and Operational Methods

As described above, various mechanisms can be used to create a pressure-tight connection between the truck pneumatic (and/or electric system) and a fully or substantially conventional glad hand mounted on the trailer front face. Some implementations of a connection mechanism/interface employ a similarly conventional glad hand geometry on the truck pneumatic line, while other implementations utilize a modified connection.

One system entails modification of the truck glad hand to provide a favorable interface that allows for leverage and integration with a robotic end effector to twist and lock the glad hand into place. The system is composed of (a) a conventional glad hand connector on the trailer; (b) a glad hand adaptor, which includes a mechanism to connect the glad hand to a lever; (c) a lever, consisting of a long extension to provide favorable leverage to twist the glad hands into place; and (d) an end effector interface that provides a location for an end effector to grasp and pivotally move the lever.

Figure 46:
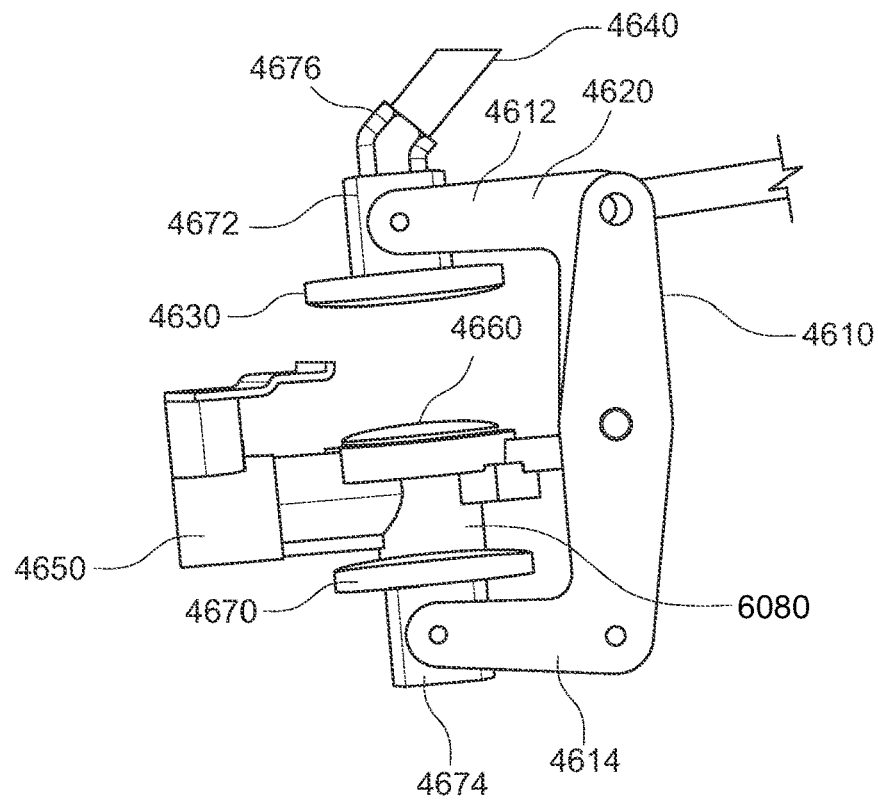
FIG. 46 is a fragmentary side view of a truck-based glad hand connection employing a clamping action in response to an associated actuator, shown in an open orientation with respect to a trailer glad hand.
Figure 46A:
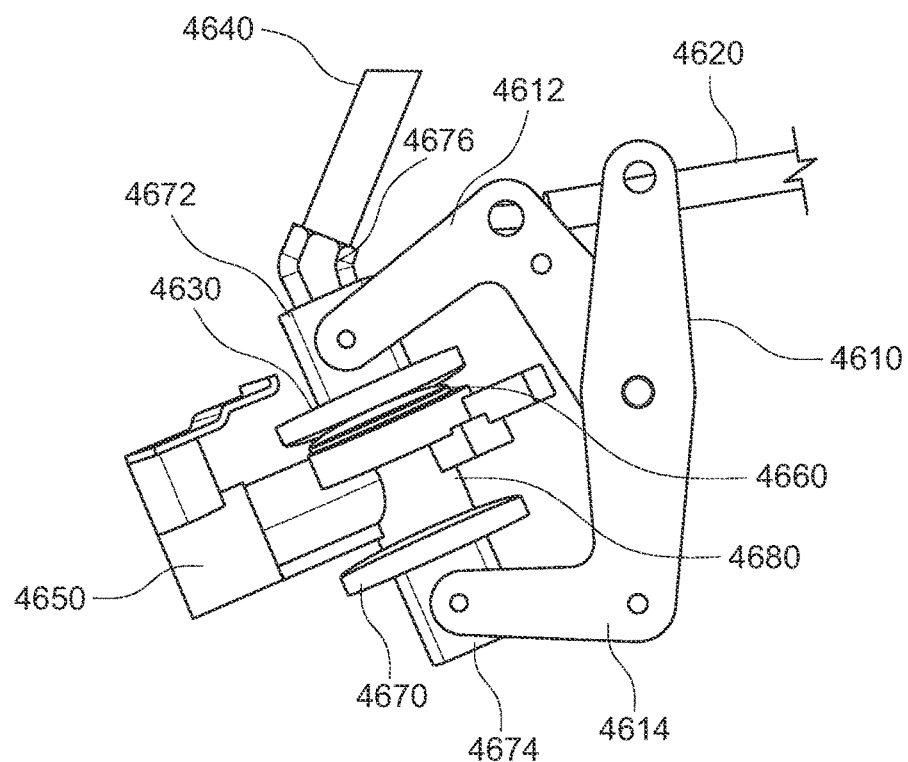
FIG. 46A is a fragmentary side view of the truck-based glad hand connection of FIG. 46, shown in a closed/engaged orientation with respect to the trailer glad hand.

An alternate technique, shown generally in FIGS. 46 and 46A, employs a clamp 4610 with an actuator 4620 that provides consistent force and seals the glad hand face. A rotary actuator or linear actuator can provide linear force to close the clamp from an opened, disengaged position (FIG. 46) to a closed, sealed position (FIG. 46A), in which top clamp pad 4630 is annular and is connected to a truck pneumatic line 4640. The pad confronts, and seals against, the trailer glad hand 4650 and associated seal 4660. More generally, the bottom clamp pad 4670 bears against the central barrel 4680 of the trailer glad hand 4650. The body of the clamp 4610 is composed of two pivotally jointed L-shaped sections 4612, 4614, each carrying a respective clamp pad 4630, 4670. The clamp pads 4630, 4670 are, likewise, carried on respective pivoting bases 4672, 4674. The upper base 4672 receives a threaded connector 4676. Clamping action by the actuator is used to pressurably engage and disengage the trailer glad hand 4560. In an alternate embodiment, a rotary actuator can be employed instead of the depicted linear actuator, which serves to drive a led screw that clamps and unclamps the arrangement.

Figure 47:
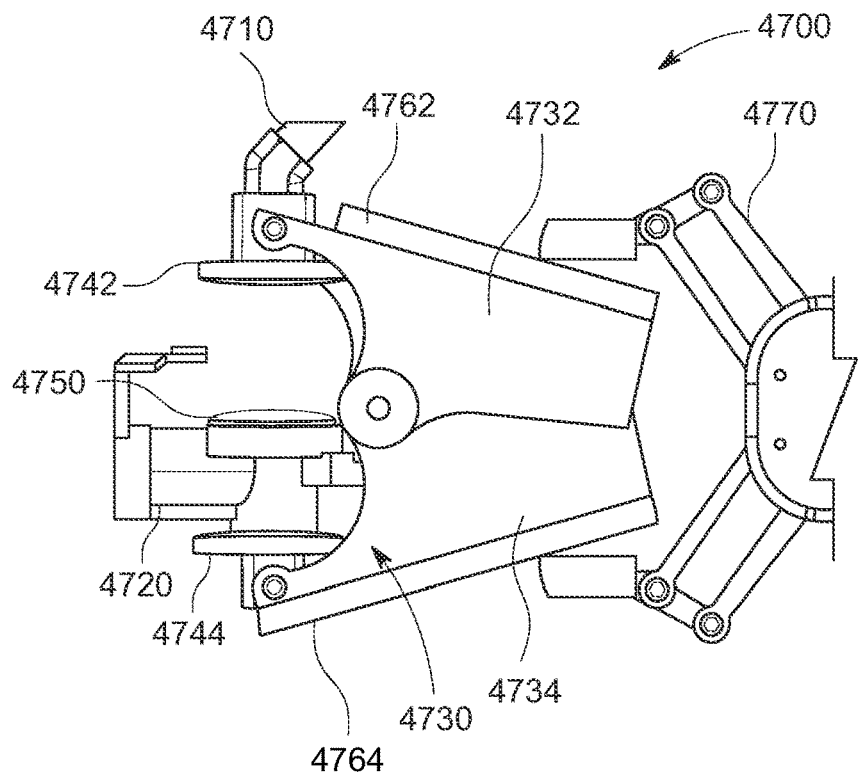
FIG. 47 is a fragmentary side view of a truck-based glad hand connection employing a spring-loaded, clip-like action in response to the motion of the manipulator end effector, shown in an open orientation with respect to a trailer glad hand.
Figure 47A:
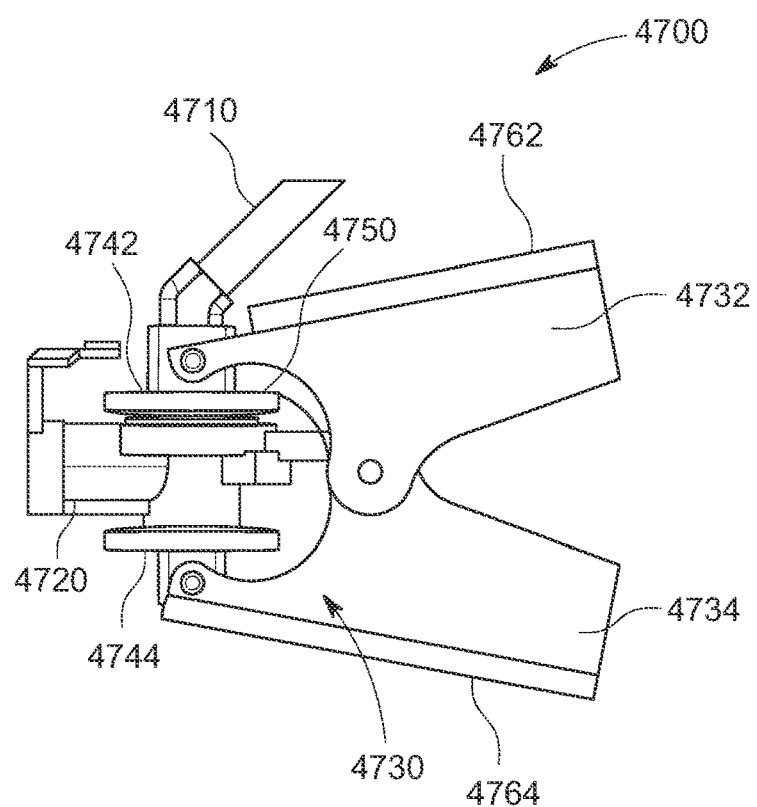
FIG. 47A is a fragmentary side view of the truck-based glad hand connection of FIG. 47, shown in a closed/engaged orientation with respect to the trailer glad hand.

FIGS. 47 and 47A provide another clamping mechanism 4700 for selectively engaging and disengaging the truck pneumatic source/line 4710 from a conventional trailer glad hand 4720. This embodiment employs a spring-loaded clamp body 4730 with a pair of pivoting clamp members 4732, 4734. The clamp members 4732, 4734 are spring-loaded to remain in a normally closed orientation under a predetermined clamping pressure. When normally closed (FIG. 47A), the opposing clamp pads 4742, 4744 on each member 4732, 4734 compress against opposing sides of the trailer glad hand 4720. In this orientation, the upper clamp pad 4732 includes an annular passage that seals against and allows air passage into the trailer glad hand seal 4650 in a manner similar to the clamp 4600 of FIGS. 46 and 46A, described above. The fine manipulator end effector can be used to deliver the clamping mechanism into alignment with the trailer glad hand using servoing techniques and sensor feedback as described above.

As shown in FIG. 47, the clamp members 4732 and 4734 each include a respective outer interface surface 4762, 4764, which can include a textured finish and/or friction-generating material. The end effector 4770 of the fine manipulator can grasp the interface surfaces and force the clamp open as shown in FIG. 47. The clamp can be moved into and out of alignment with the trailer glad hand 4720 in this orientation. The end effector releases pressure on the clamp members 4732, 4734 causing the internal spring (e.g. a conventional torsion wrap spring) to pivot the clamp members closed into sealed engagement with the trailer glad hand 4720. The spring-loaded clamp is opened using the fine manipulator system and positioned facing the center hole in the glad hand. This spring-loaded clamp 4700 automatically engages with the trailer glad hand when released in proper alignment therebetween.

Figure 48:
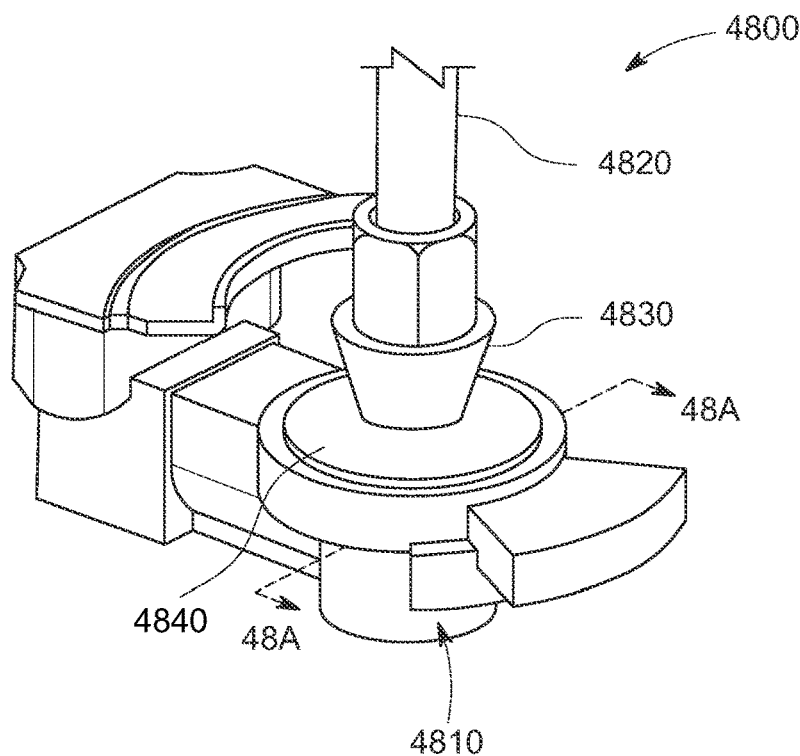
FIG. 48 is a fragmentary perspective view of a truck-based glad hand connection employing a press-fit connection action, shown in an engaged/connected orientation with respect to a trailer glad hand.
Figure 48A:
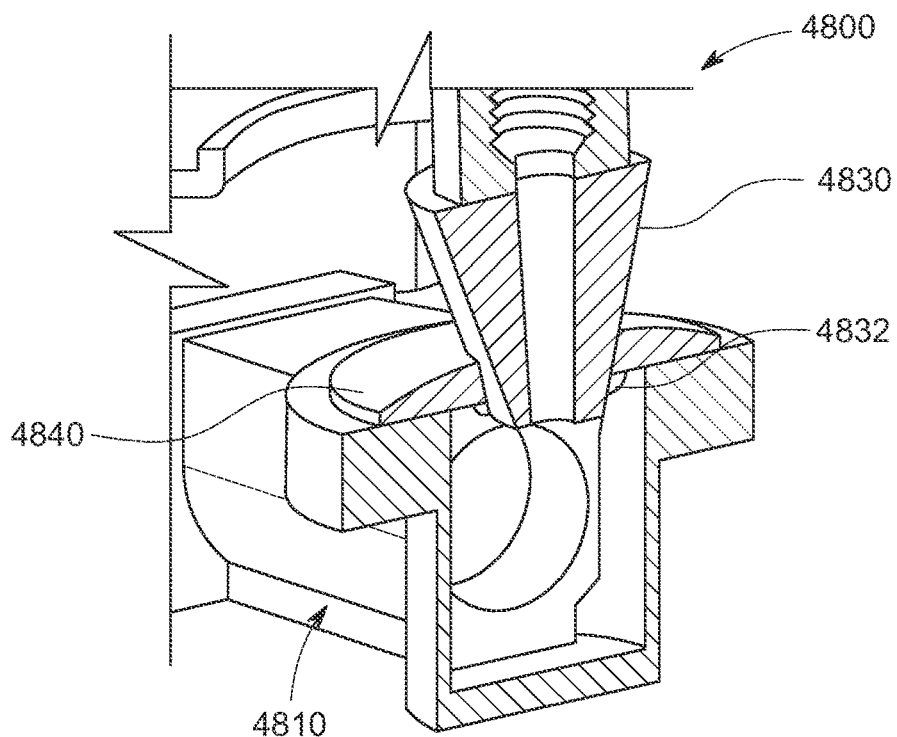
FIG. 48A is a cross section taken along line 48A-48A of FIG. 48.

FIGS. 48 and 48A show another embodiment of an arrangement 4800 for sealing the truck pneumatic source/line 4820 with respect to a conventional trailer glad hand 4810. This embodiment employs a cone shaped plug 4830 that is pressed into the annular seal 4840 of the trailer glad hand 4810 to provide a proper seal. The plug can define an optional step 4832 that passes through and acts as a holding barb with respect to the glad hand seal hole, so as to provide extra holding strength. As another option (not shown) an external clamp can be used to grip the back of the trailer glad hand and provide positive pressure to seal. The plug is aligned and pressed into place by an appropriately shaped end effector on the fine manipulator. The plug can include a bracket interface (not shown) that allows the end effector to apply and remove the cone.

Figure 48B:
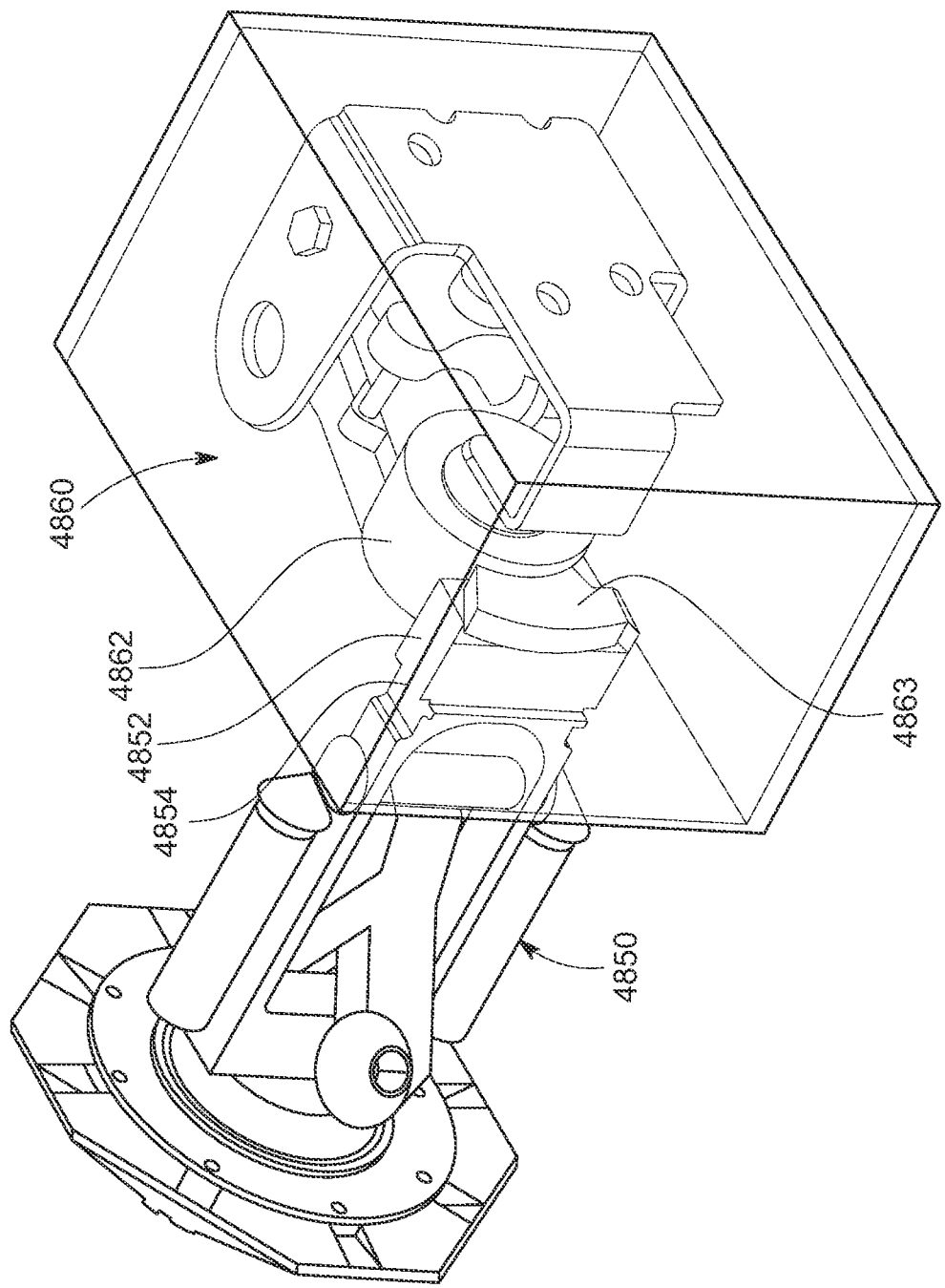
FIG. 48B is a perspective view of a truck-based glad hand connection with a magnet that can be used with rotational trailer glad hands.
Figure 48C:
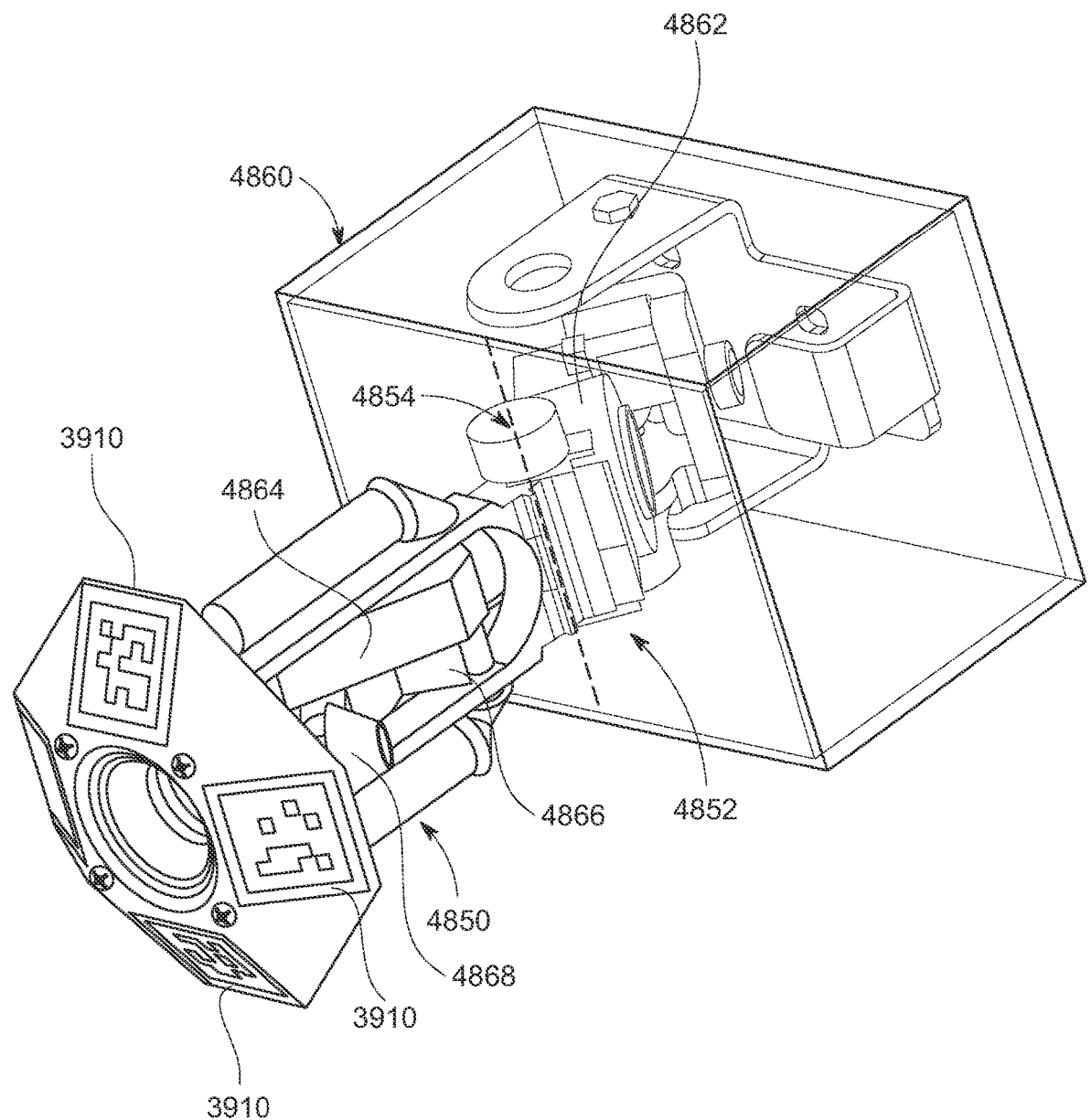
FIG. 48C is a perspective view of the truck based glad hand connection of FIG. 48B.

In exemplary embodiments, the glad hands on the trailer can be rotational, so that in an unused state, the glad hand rotates to rest in a low profile orientation against the trailer. In some examples, the glad hand can be arranged to rotate into a recess, so that the glad hand is entirely tucked away when not in use. It is desirable that such rotationally operating, and recessed, glad hands be adapted to withdraw away from the trailer before they can be connected. FIG. 48B is a perspective view of a truck-based glad hand connection with a magnet that can be used with rotational trailer glad hands. The glad hand connection tool 4850 can have a low profile that enables it to reach into a recess 4860 to reach a recessed rotational glad hand 4862. The glad hand connection tool 4850 can have a magnetic distal end 4852 that can affix to the glad hand so as to operate the rotational glad hand. In various embodiments, the magnetic force can be continuously acting (generated by a permanent magnet), or can be provided by a switched electromagnet. The magnetic distal end 4852 can be sized and shaped to conform to the standard curved-triangular wedge 4863 of a glad hand, or be adapted to other consistent features across the standardized dimension of glad hands, as defined in (e.g.) standard SAE J318. FIG. 48C is a perspective view of the truck-based glad hand of FIG. 48B, shown in a position to extract a recessed rotational trailer glad hand. The glad hand connection tool 4850 can reach into a recess, affix to the glad hand, and pull outward on the glad hand to pull the glad hand out of the recess towards an orientation that allows the airline to be connected. Note that the depicted embodiment is a straight rotational glad hand, but the overall operational technique herein is generalizable to a variety of different angles of glad hands, and associated recessed depths, such as 45-degree down rotational glad hands. The tool 4850 can have a passive (non-actuated/freely moving) rotational axis 4854, such as a hinge, that allows the magnetic distal end to rotate freely. This free rotation can allow the laterally moving connection tool 4850 to induce rotation in the rotationally moving glad hand 4862. As with other elements described herein, this motion can be conducted by a robotic arm, a multidimension manipulation system, or equivalent positioning system. A torsion spring can be added to this passive joint to maintain the configuration of the joint angle in a nominal state. In a separate embodiment (claim A5) this axis 4854 is not passive, but is actively rotated by a motor (electromechanical, hydraulic, pneumatic, etc.) such that when the tool is dropped off by the delivery mechanism and then decoupled, the tool can be driven to change its conformation to expose the glad hand seal for air delivery. When this occurs, the body of the tool 4850 would react against the trailer face or chassis body, reacting forces that work against the spring loaded glad hands to open them up.

Figure 48D:
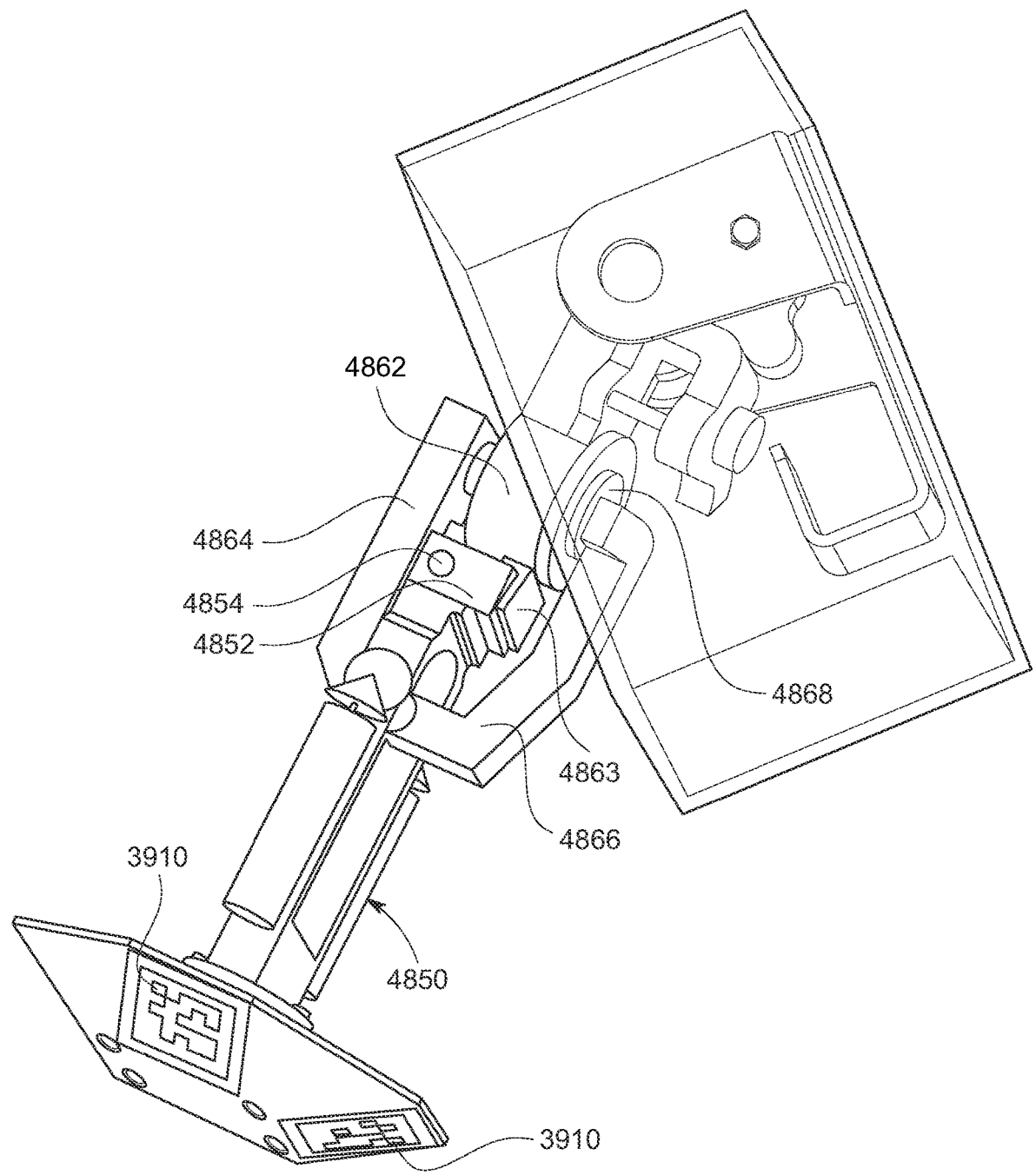
FIG. 48D is a perspective view of the truck-based glad hand connection of FIG. 48B shown in an engaged/connected orientation with respect to the trailer glad hand.

The glad hand connection tool can have electrically, hydraulically, or pneumatically driven, segmented scorpion arms 4864, 4866 or clamping mechanisms that can rotate into engagement with the trailer glad hand to clamp, seal, and deliver air to the trailer glad hand. In an embodiment, the speed reducer of this driving mechanism (gear train or gearbox, linkage mechanism, or similar) is designed such that when the clamping arms are sealing the glad hand, the system self-locks and no energy is required to maintain an effective seal (consider as new claim). An airline scorpion arm 4866 can have an air delivery mechanism, and can end in a cone shaped plug 4868 with a central air passage that can be pressed into the annular seal of the trailer glad hand to provide a proper seal. A reaction scorpion arm 4864 can provide a force against the back of the trailer glad hand to provide positive pressure to create a seal between the cone shaped plug 4868 and the annular seal of the trailer glad hand. In an embodiment, the plug does not define a conical/frustoconical shape, but a flat platter-like surface which provides a planar seal over the glad hand orifice (consider for a claim). FIG. 48D is a perspective view of the truck-based glad hand connection of FIG. 48B shown in an engaged/connected orientation with respect to the trailer glad hand. As shown, the airline scorpion arm 4866 has been rotated into a position with the cone shaped plug 4868 inserted/biased into the annular seal of the trailer glad hand 4862, and the reaction scorpion arm 4864 is pressed against the back of the trailer glad hand to provide the force to push the cone shaped plug 4868 into the annular seal to create an airtight seal between the connection tool 4850 and the rotational glad hand 4862. The glad hand connection tool can be selectively attached to a robotic manipulator arm, so that the robotic manipulator arm can release the tool after connection is established. Additionally, in a an exemplary embodiment, the scorpion arms can be unilateral in the sense that there is a single driven scorpion arm and associated articulation between the two arms to maintain a desired geometry. A fixed surface (e.g. an alternative to arm 4864) can be used to react the force generated by the driven clamping scorpion arm. This fixed surface can be an extension of the tool end 4863, and support the backside face of the glad hand 4862. Secondary mechanisms will increase the effectiveness of this approach. This comes in the form of a locking mechanism to lock the relative motion between the tool body 4850 and the distal end 4852. This locking mechanism would engage when the tool end 4852 and body 4850 are at 90 degrees to one another. Once locked, the force of the clamping arm is able to be transmitted past the passive rotation axis (now fixed) and reacted upon by other mechanisms described herein, such as (latching finger or manipulation jaws, as described below). Additionally, upon tool release, the actuated clamping scorpion arm or the latching fingers/manipulator jaws can trigger the unlocking of the mechanism and a return spring can rotate the distal end back to its original configuration for glad hand extraction. In a related operational example, it can be desirable to switch the state of the angle between the distal end and the main body for different types of glad hands. The process 4851 for switching tool configuration is shown pictorially in FIG. 48J. In this process 4851, the relative angle between the distal end of the tool and the tool body 4853 can be changed through motion profiles and subsequent interactions with features on a tool cradle 4855 or other fixed or active devices in order to change the passive configuration of the tool to facilitate various glad hand connections.

As described above, the connection tool 4850 can include one or more fiducial markers 3910 that can assist the manipulation system in locating and attaching to the connection tool 4850 at a time in which it is appropriate to disconnect the connection tool from the glad hand. In various embodiments, the scorpion-type glad hand connector tool described above can be used in conjunction with various types of rotational glad hand grippers, including the embodiment described below, and can also be used on non-rotational fixed trailer glad hands.

Figure 48E:
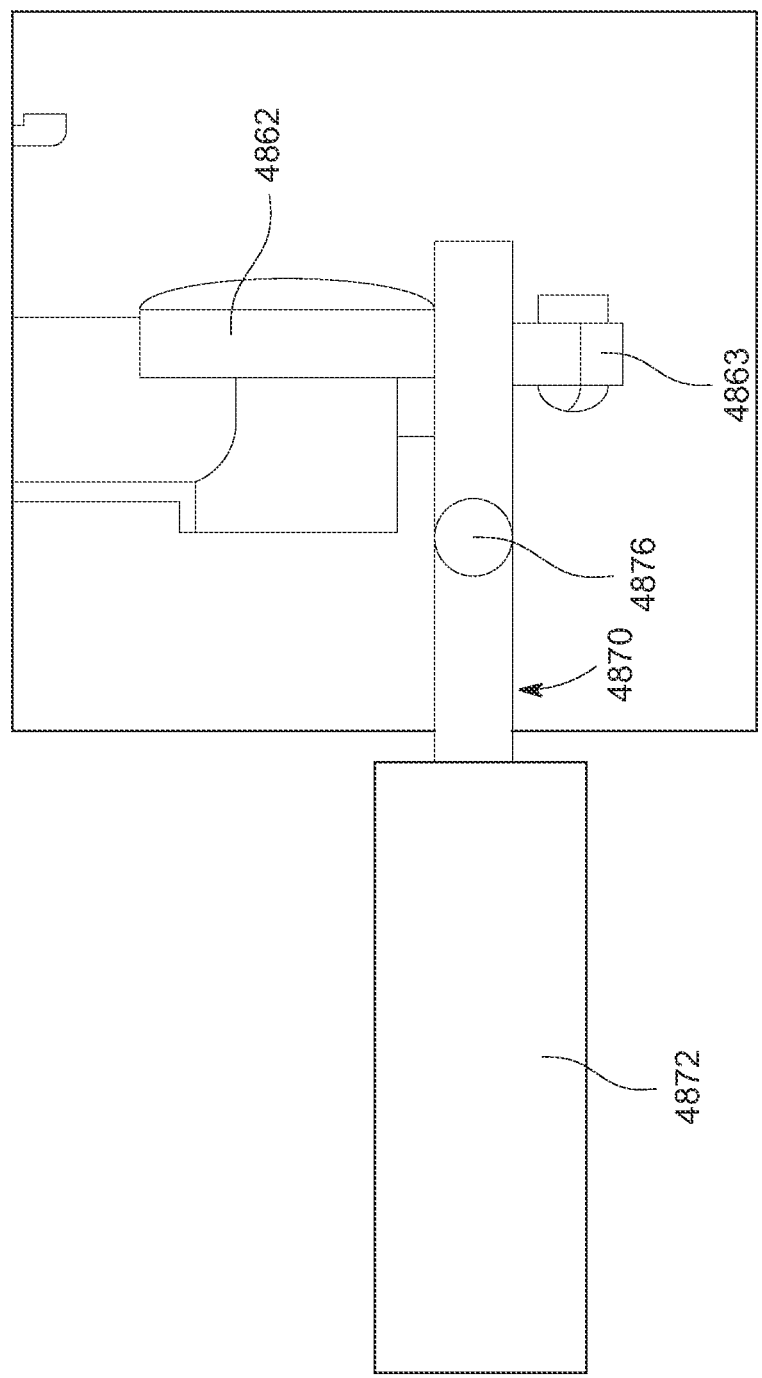
FIG. 48E is a top view of a truck-based glad hand connection with a clamp that can be used with rotational trailer glad hands.
Figure 48F:
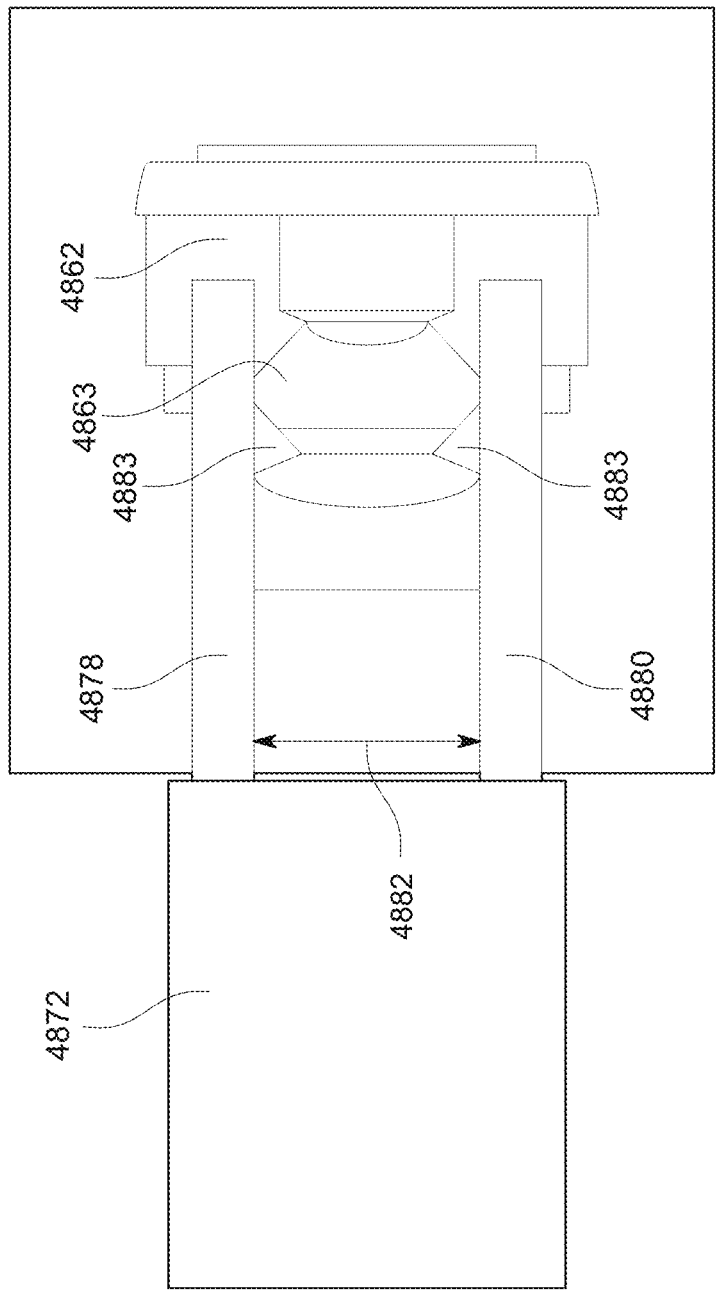
FIG. 48F is an end view of the truck-based glad hand connection of FIG. 48E, shown with gripping fingers engaged with the wedge of the trailer glad hand.
Figure 48G:
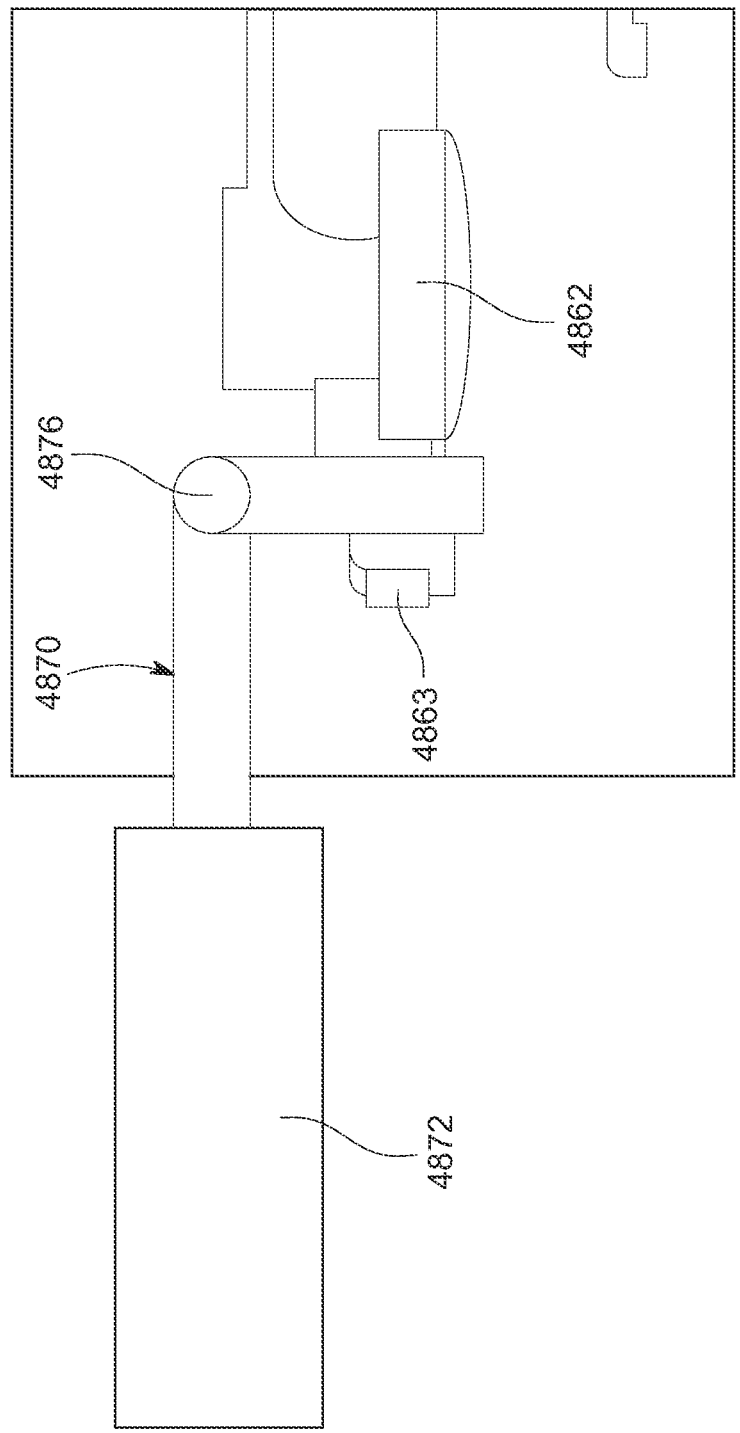
FIG. 48G is a top view of the truck-based glad hand connection of FIG. 48E, shown with the glad hand pulled out from the trailer and ready for airline connection.

In various embodiments, an active gripper system can be used as an alternative to, or in conjunction with, the magnetic forces described above to pull a rotary glad hand outwards away from the trailer so it can be connected. FIG. 48E is a top view of a truck-based glad hand connection with a clamp that can be used to extract rotational trailer glad hands. A gripping connection tool 4870 can have a clamping base 4872 that can include an active clamping mechanism for forcing two gripper fingers around a glad hand wedge 4863 on the rotational glad hand 4862. The two gripper fingers can have a passive rotation axis 4876 that allows the distal ends of the gripper fingers to rotate freely. FIG. 48F is an end view of the truck-based glad hand connection of FIG. 48E, shown with the gripper fingers engaged with the wedge of the trailer glad hand. The clamping base 4872 can cause movement of the gripper fingers 4878, 4880 up and down along the direction of arrow 4882. In various embodiments, the gripper fingers 4878, 4880 can include compliant pads 4883 that can conform around the glad hand wedge 4863 so that the wedge can be easily grasped by the gripper fingers when the clamping base drives the gripper fingers to squeeze the wedge. In various embodiments, the gripper fingers can include teeth or knobs at the distal ends of the fingers, so that the knobs can capture the wedge and the glad hand can be pulled out from the trailer. FIG. 48G is a top view of the truck-based glad hand connection of FIG. 48E, shown with the glad hand pulled out from the trailer and ready for airline connection. The passive rotation axis 4876 can allow the laterally moving connection tool 4870 to induce rotation in the rotationally moving glad hand and rotate it out from the front of the trailer. After the rotating glad hand has been rotated outwards, the airlines can be connected using the scorpion arm system explained above, or other connection systems explained herein.

Similar to the above-described arrangements, the passive rotation axis can either be actively driven, or locking, to allow for previous methods of sealing as described herein. As shown in the exemplary embodiment of a connection tool 4861, depicted in FIGS. 48K-48O, spring-loaded, rotating locking wedges or fingers 4863 that engage the exemplary glad hand flange 4867 are provided. In this arrangement, the wedges/fingers 4863 rotate (curved arrows 4869) on rods/shafts 4875 to selectively engage the glad hand flange 4867. As shown in FIGS. 48K and 48M, during a connection process, the wedges/fingers 4863 start in an open state to get around the main glad hand body and behind the glad hand flange. The fingers can then be rotated (curved arrows 4869) to engage and grab onto the glad hand flange 4867, as shown in FIGS. 48L and 48N. A ramp or other lead in 4865 can be provided/defined on the engaging edges of the wedges/fingers 4863 to account for connection misalignment or variations in flange thickness. Additionally, to account for larger variations, there can be axial compliance along the axes of rotation of each finger/wedge 4863. Such axial compliance (arrow 4871) is shown in FIG. 48O, and can include end springs 4873 located at a proximal end (or another location) on each rod/shaft 4875, which provide biasing force between the wedge and the glad hand flange. These springs 4873, and associated compliance (biasing force) along the axis of rotation allows each of the wedges 4863 to account for differences that occur in glad hand flange thickness to, thereby, increase compliance and tightly grab the glad hand flange in a range of conditions and geometries.

Figure 48H:
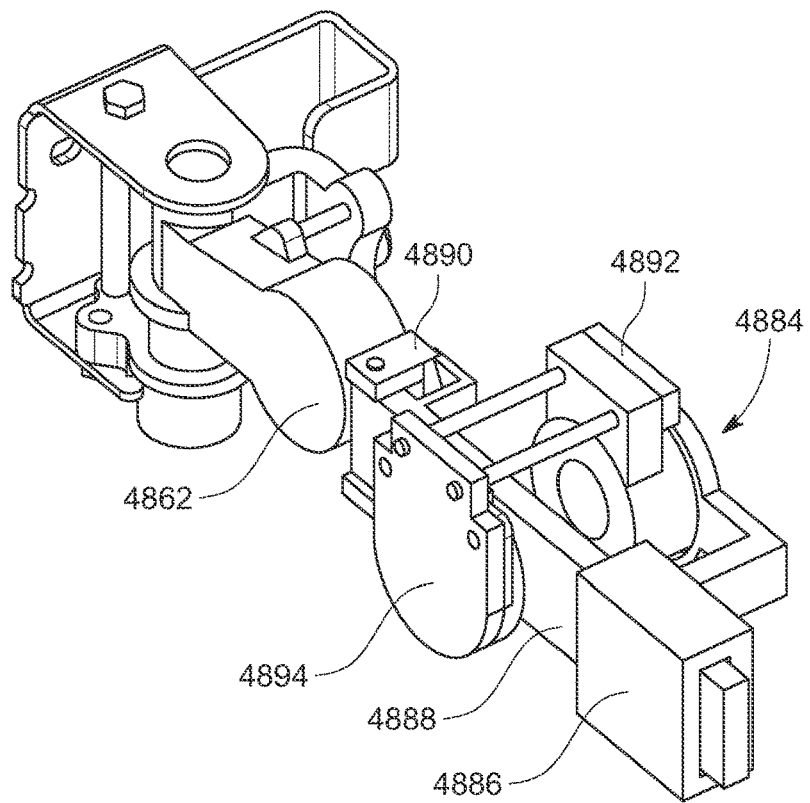
FIG. 48H is a perspective view of a caliper-type connection tool that can be used on a rotational glad hand, shown in an disengaged orientation.
Figure 48I:
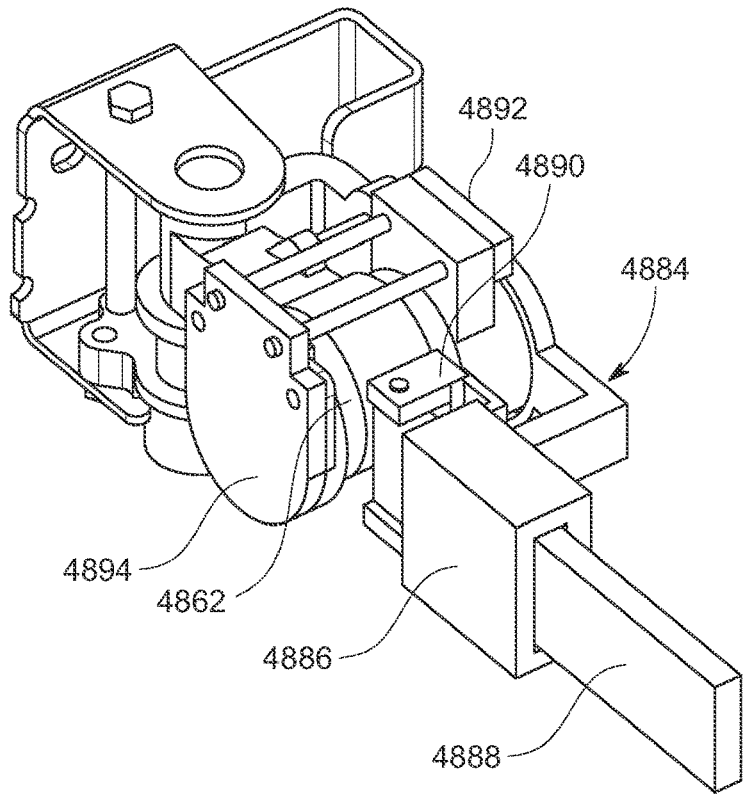
FIG. 48I is a perspective view of the caliper-type connection tool shown in a clamped, engaged orientation.
Figure 48J:
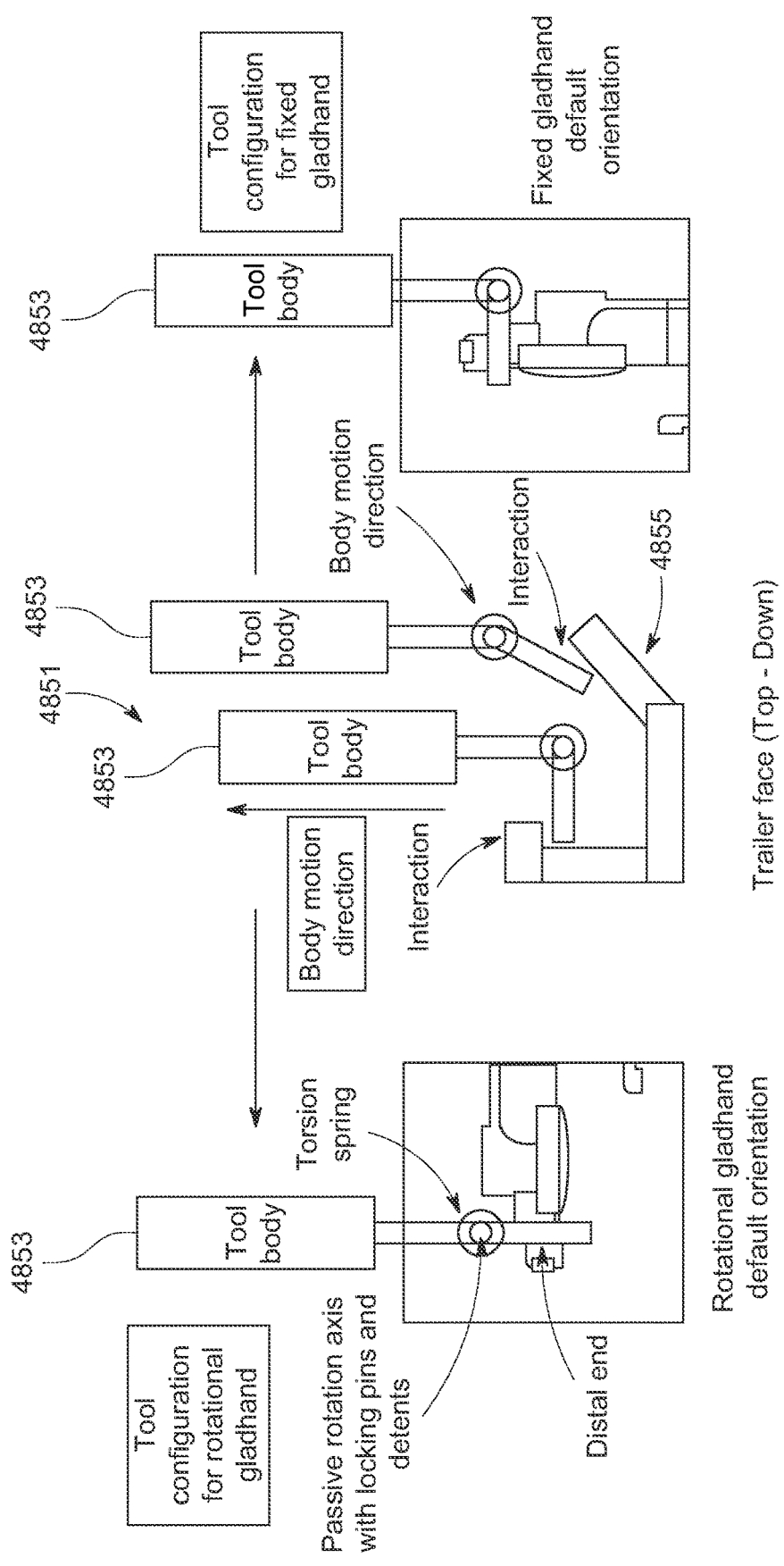
FIG. 48J is a pictorial diagram showing a process for switching glad hand connection tool configurations to accommodate different types of trailer glad hands and orientations.
Figure 48O:
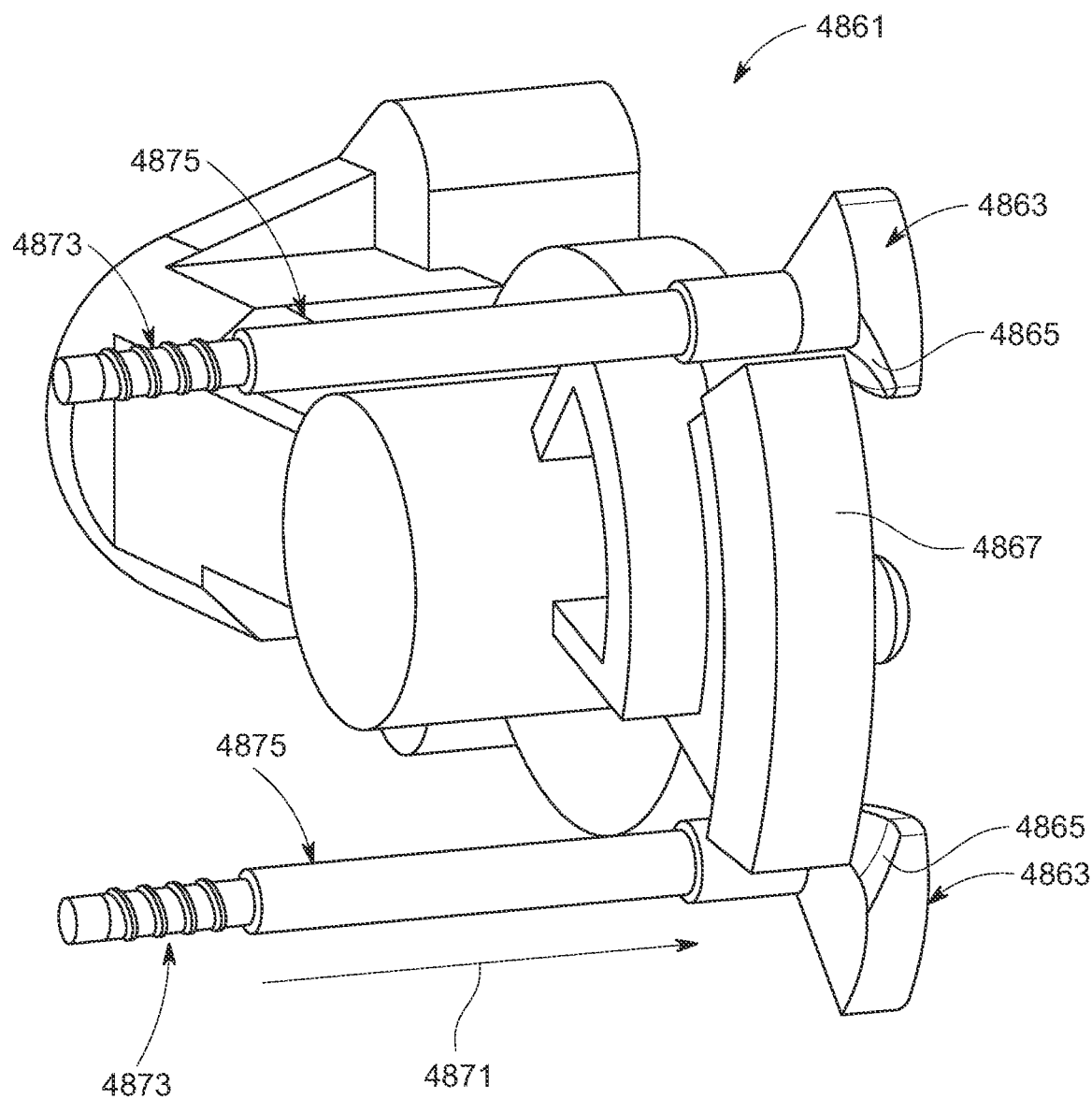
FIG. 48O is a partial perspective view of the connection tool of FIG. 48K, shown in a partially locked orientation, and depicting compliance springs on each finger/wedge shaft.
Figure 48P:
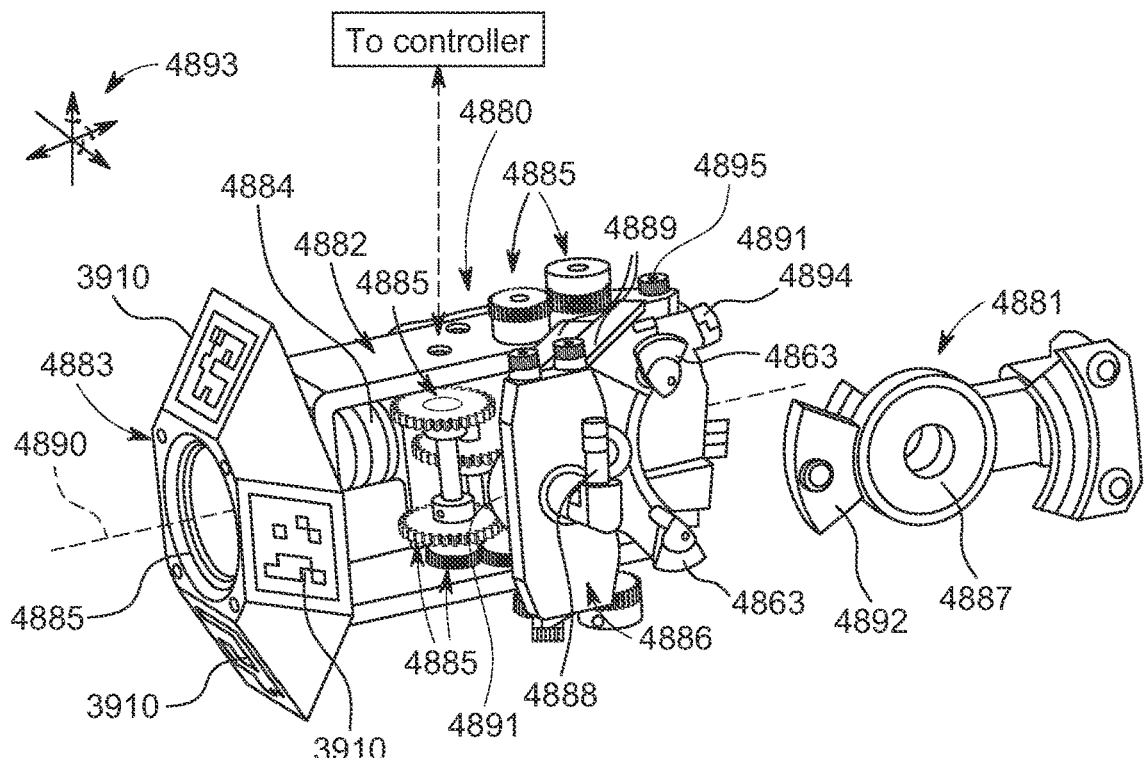
FIG. 48P is a perspective view of a glad hand connection tool adapted to grasp and lock onto a variety of types and orientations of glad hand using a pivoting, grasping sub assembly and rotating, locking fingers/wedges as shown in FIG. 48K, shown approaching a horizontally extended, fixed glad hand according to an exemplary embodiment.

With further reference to FIGS. 48P-48AA, the structure and operation of a connection tool 4880 to connect to a trailer-based glad hand 4881, utilizing the above-described fingers/wedges 4863 is shown. The connection tool 4880 includes a frame 4882 that includes an end cap 4883 that defines a truncated pyramid as described generally herein (see, for example, FIG. 69I), with a central orifice, defining a gripper interface for use by a robotic end effector (not shown, but described generally herein). The end cap further includes differently, spatially oriented, unique fiducials (e.g. 2D barcodes) 3910, as described herein. The frame defines a pair of parallel plates that enclose therebetween a motor drive 4884 (servo, stepper, or another appropriate mechanism) that operates a gear train 4885 for selectively moving a lever-mounted air connection plate 4886 into, and out of, sealed engagement with the ring seal 4887 of the glad hand 4881. In particular, the gear train 4885 drives a set of parallel bars 4889 that move the glad hand both laterally and transversely with respect to the longitudinal axis 4890 of the frame 4882. A corresponding, confronting seal is provided on the inside surface of the connection plate 4886, and can be permanently/semi-permanently interconnected to a pressure source/airline (not shown, but described generally herein) via a fitting 4888.

The depicted glad hand 4881 in FIGS. 48P-48S is mounted in a straight-outward, right-angle configuration with respect to the trailer front. The robot manipulator is guided toward the glad hand 4881 after the glad hand is recognized, and its 3D pose is determined by the system's machine vision system (described variously herein). The vision system, having determined the pose, directs the connection tool 4880 toward, and into sealed engagement with the exemplary glad hand in a series of moves that compare the current spatial orientation of the fiducials 3910 (during robot motion) relative to the stored, fixed pose of the glad hand 4881.

Figure 48Q:
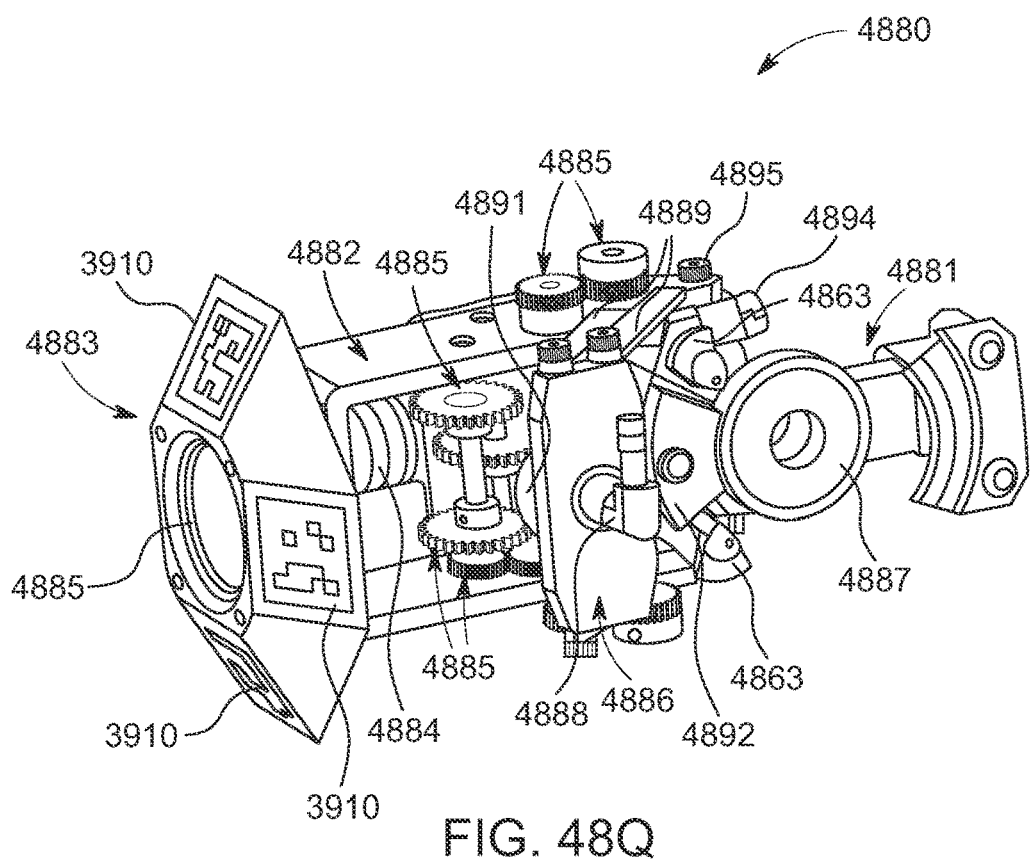
FIG. 48Q is a perspective view of the glad hand connection tool in the exemplary arrangement of FIG. 48P, shown aligned with the glad hand, ready to apply the locking fingers/wedges thereto.

In operation, as shown in FIG. 48P, the robot manipulator initially moves (arrows 4893) along multiple axes and rotations (4893) as it guides the connection tool 4880 to align its longitudinal axis 4890 generally with the attachment direction appropriate to the glad hand 4881, based upon its classification for pose and type (described below in the embodiment of FIG. 78). The motor 4884 retains the connection plate 4886 in the retracted position during motion, as shown. Notably, the locking fingers/wedges 4863 are in an open position so as to allow the flange/wedge 4892 to pass through during the connection process. In FIG. 48Q, the connection tool 4880 moves into an overlapping position and alignment with the glad hand 4881 and its seal 4887 as shown. The connection plate 4886 remains retracted and the locking fingers/wedges 4863 are unlocked with respect to the glad hand wedge/flange 4892. The fingers/wedges are part of a grasping subassembly 4894 that pivots on an axis 4895 to conform to the geometry of the glad hand. This subassembly can also be motorized to adjust the pivot angle, or can be free floating. In general, all motorized components of the connection tool can be controlled by an appropriate controller that is tied by wires or wirelessly to the overall robotic and machine vision system in a manner clear to those of skill.

Figure 48R:
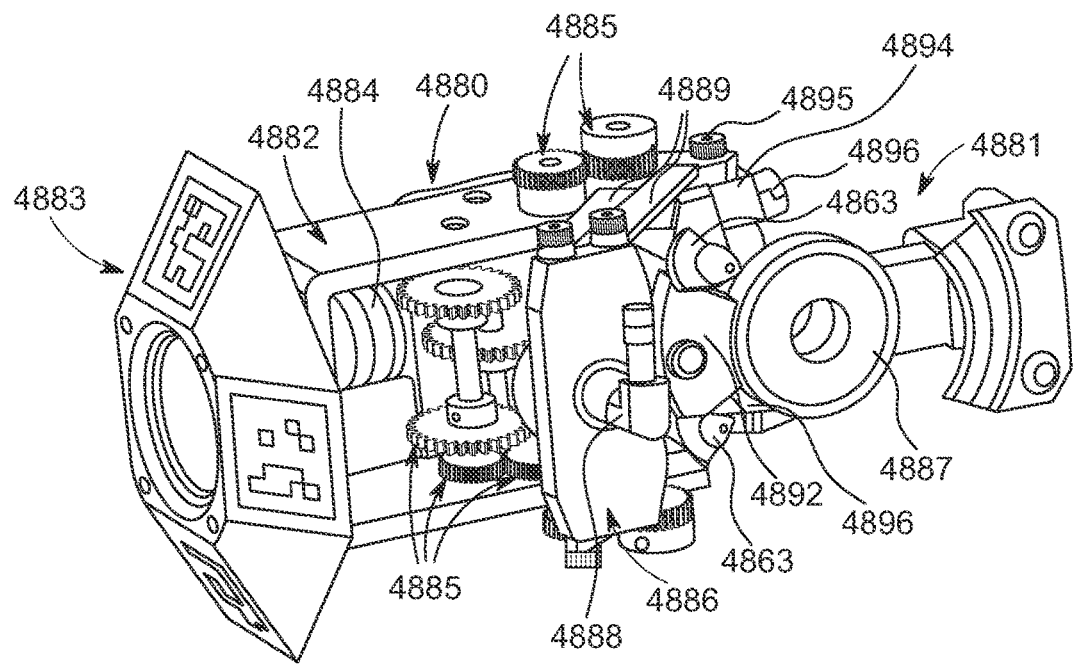
FIG. 48R is a perspective view of the glad hand connection tool in the exemplary arrangement of FIG. 48P, shown applying the locking fingers/wedges to the glad hand.
Figure 48S:
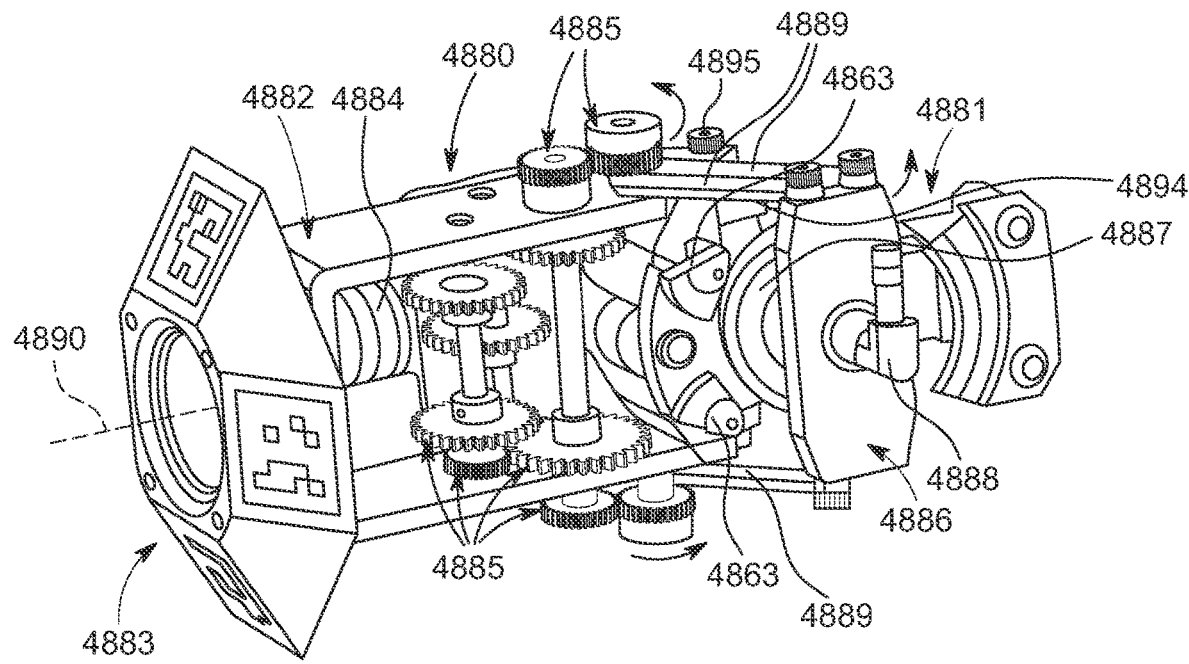
FIG. 48S is a perspective view of the glad hand connection tool in the exemplary arrangement of FIG. 48P, shown with the airline connection plate swung into a sealed relationship with the glad hand to complete the pressure circuit therebetween.

Then, in FIG. 48R the motor driving the fingers/wedges closes them toward each other (curved arrows 4896) to lock the glad hand wedge/flange 4892 with respect to the grasping subassembly 4894. This ensures the glad hand seal 4887 remains aligned when the connection plate is swung into an extended position by the motor 4884, gear train 4885 and arms 4889. This extended position is shown in FIG. 48S, in which the seal between the glad hand 4881 and plate 4886 is completed and the airline pressure circuit is made. The robotic manipulator can retract from the end cap 4883 at this time, and return to a retracted, non-interfering, neutral position on the truck chassis.

Figure 48T:
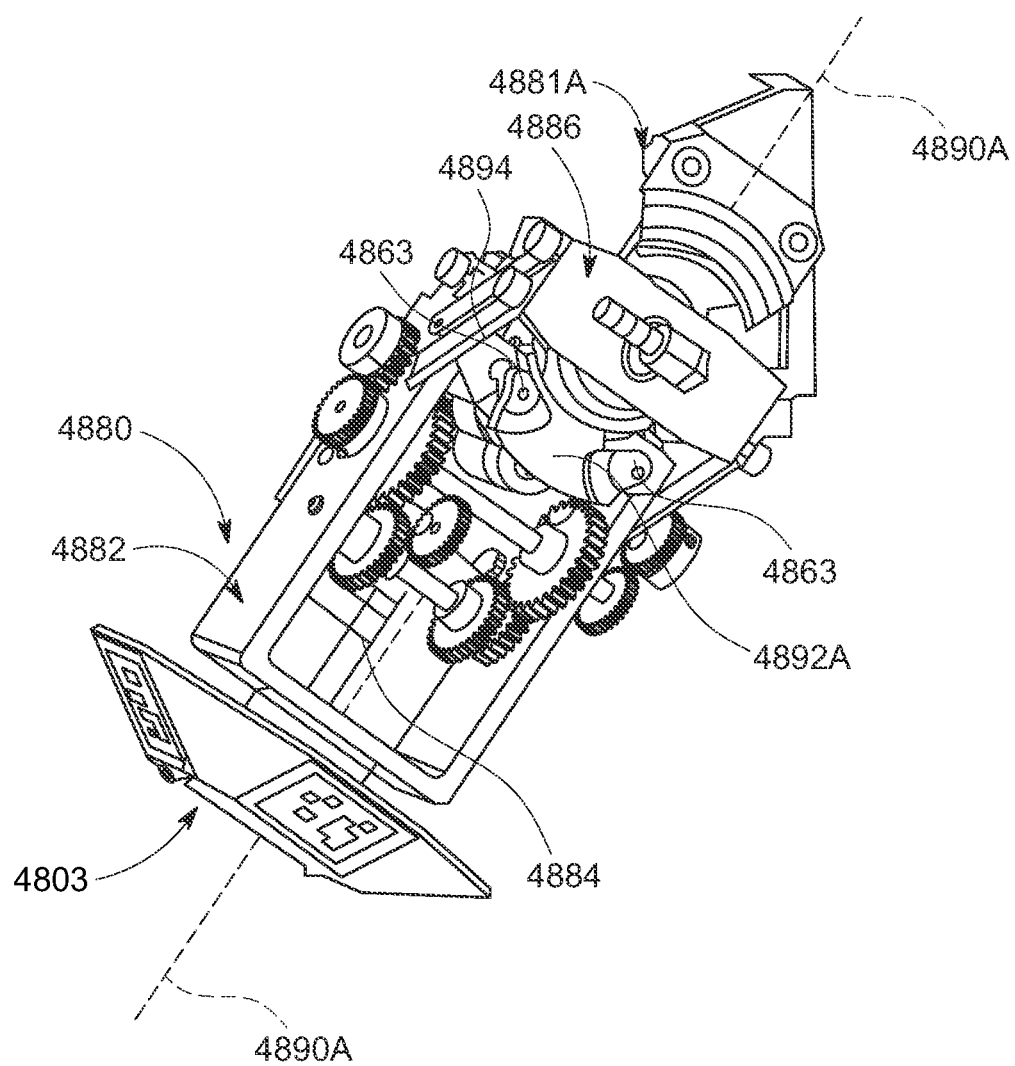
FIG. 48T is a perspective view of the glad hand connection tool of FIG. 48P, shown with the airline connection plate swung into a sealed relationship with a fixed, downwardly angled glad hand to complete the pressure circuit therebetween, according to another exemplary arrangement.

In FIG. 48T, the glad hand 4881A is fixed to the side of the trailer and extends outward in a manner that is aligned (axis 4890A) at a downward angle (e.g. 30-45 degrees from the horizontal). The connection tool 4880 is shown having moved into an aligned orientation with the glad hand 4881A, and its wedge/flange 4892A is grasped by the rotating fingers/wedges 4863 on the grasping subassembly 4894. The connection plate 4886 has been swung into a sealed relationship with the glad hand 4881A completing the airline pressure circuit.

Figure 48U:
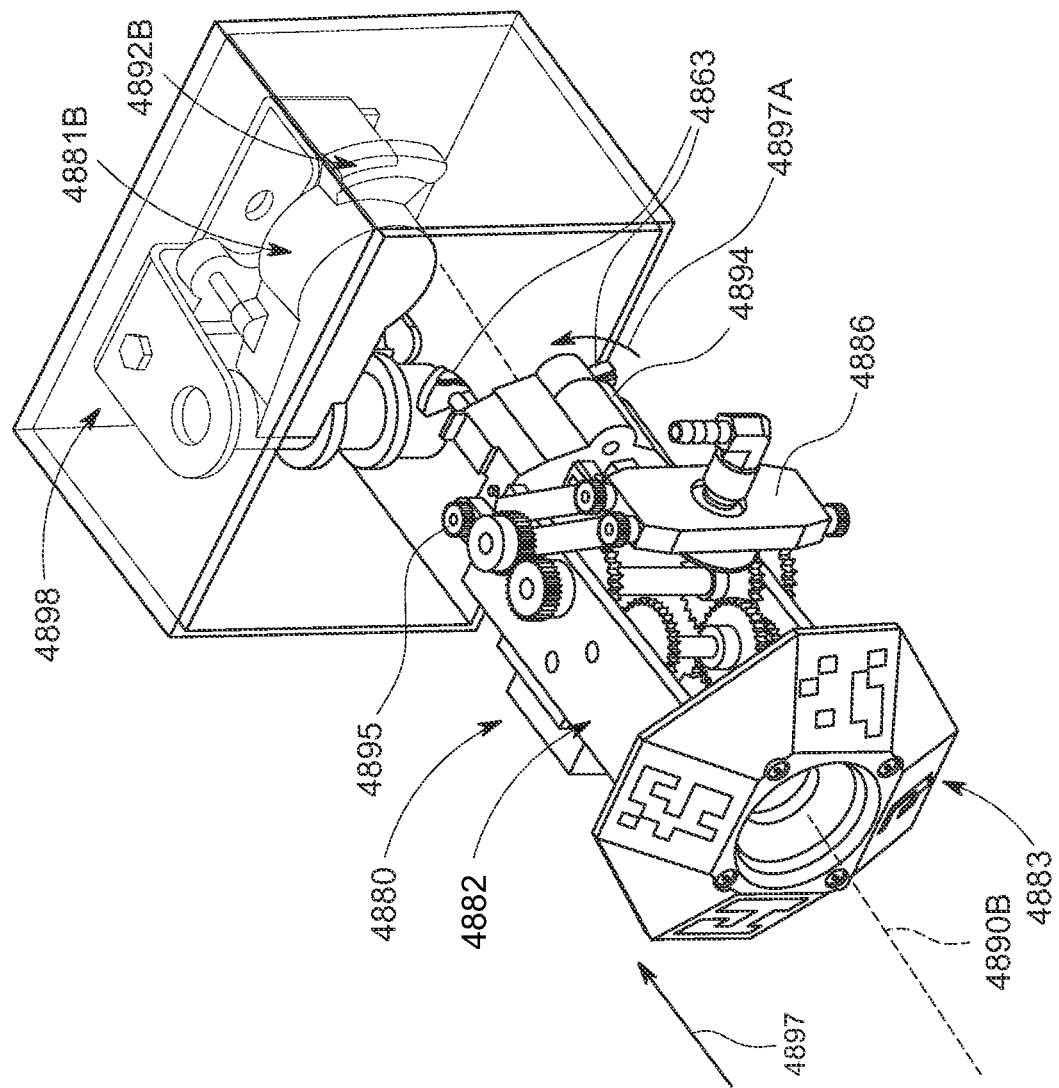
FIG. 48U is a perspective view of a glad hand connection tool of FIG. 48P, shown approaching an enclosed (in a box structure), rotating/retractable glad hand with the grasping subassembly pivoted forwardly so as to allow the fingers to grasp the glad hand in the retracted orientation, according to an exemplary embodiment.

With reference to FIGS. 48U-48X, the connection tool 4880 is shown connecting with an enclosed (shrouded in an open box 4898), spring-loaded (rotational) glad hand 4881B, shown in a retracted position, flush against the trailer side (FIG. 48U). The vision system classifies the glad hand 4881B and surrounding enclosure structure (box) 4898 as a shrouded unit, and determines the 3D pose of the glad hand 4881B, and the spatial orientation/location of the associated wedge/flange 4892B. Since the glad hand flange/wedge 4892B is transverse to the longitudinal axis 4890B of the connection tool 4880, the manipulator (not shown) directs (arrow 4897) the tool 4480 along the direction of the axis 4890*b*, into the enclosure 4898 with the grasping subassembly pivoted (curved arrow 4897A) so that the fingers/wedges 4863 carried thereon face forwardly as shown.

Figure 48V:
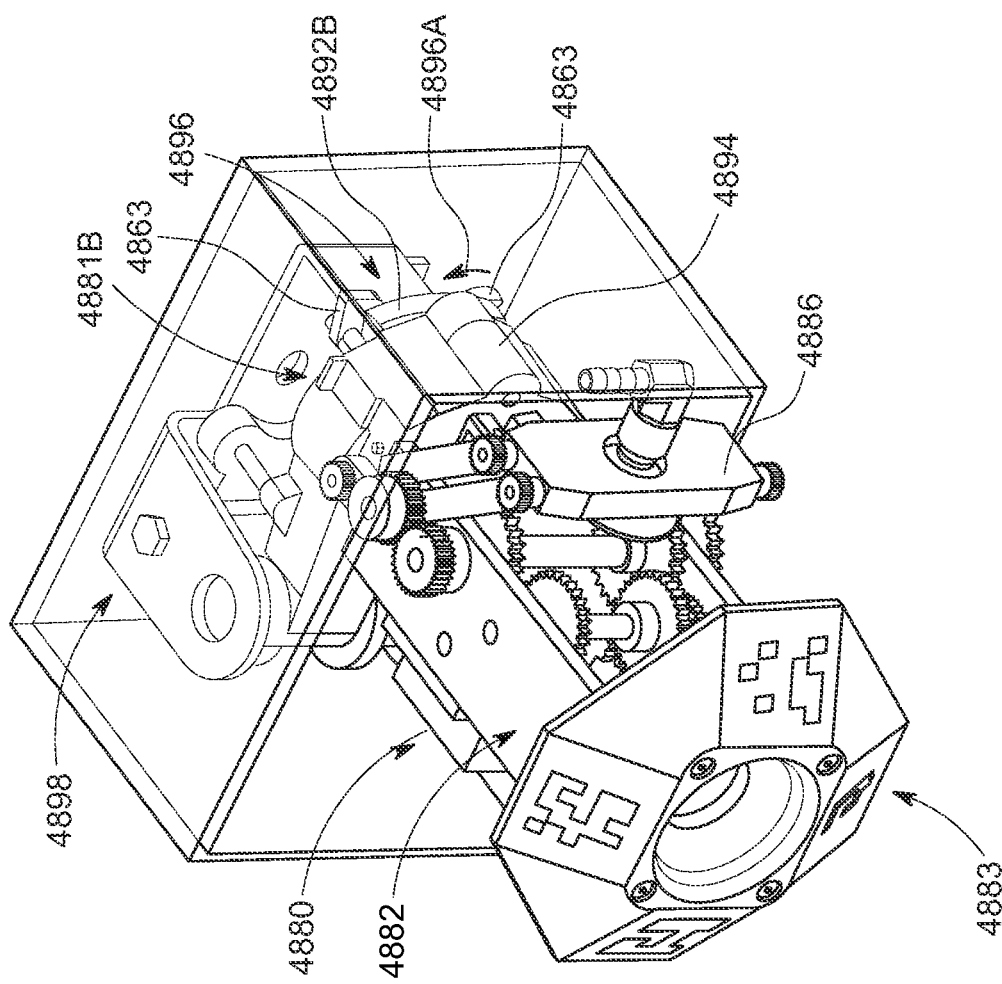
FIG. 48V is a perspective view of the glad hand connection tool in the exemplary arrangement of FIG. 48U, shown applying the locking fingers/wedges to the glad hand.
Figure 48W:
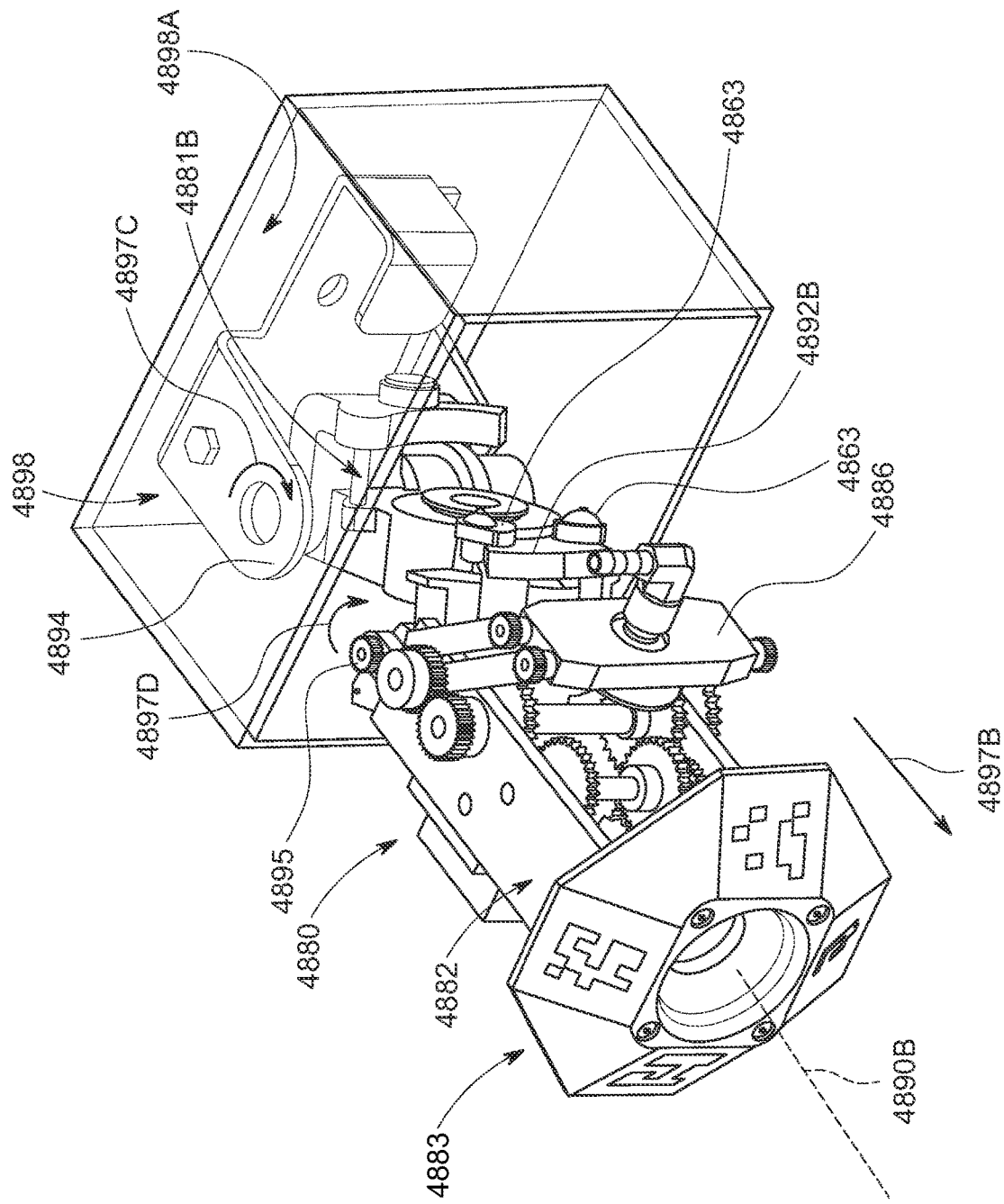
FIG. 48W is a perspective view of the glad hand connection tool in the exemplary arrangement of FIG. 48U, shown withdrawing to cause the glad hand to rotate outwardly in engagement with the locking fingers/wedges.

In FIG. 48V, the connection tool 4880 has moved into engagement with the glad hand (still in a retracted state in the enclosure 4898). The pivoted grasping subassembly 4894 is thereby located to confront the glad hand flange/wedge 4892B and the locking fingers/wedges 4863 are rotates (curved arrows 4896A) to secure the glad hand 4881B with respect to the grasping subassembly 4894. Then, in FIG. 48W, having locked the glad hand flange/wedge 4892B, with the locking fingers/wedges 4863 relative to the grasping subassembly 4894, the manipulator withdraws (arrow 4897B), the tool 4880 along the axis 4890B, and causes the glad hand 4881B to pivot (curved arrow 4897C) outwardly, away from the trailer side, while the grasping subassembly also pivots (curved arrow 4897D) about its axis 4895 to comply with the pivoting action of the glad hand 4881B. The manipulator continues to withdraw the tool, moving it in three dimensions as needed to maintain the outward pivoting motion of the glad hand 4881B until it extends outwardly, and substantially perpendicularly, relative to the wall 4898A of the enclosure 4898 (and the underlying trailer front side). This final orientation is shown in FIG. 48X, in which the grasping subassembly 4894, with glad hand 4881B engaged, is positioned to allow the connection plate 4886 to swing into a sealed relationship with the glad hand seal—as shown. The airline pressure circuit is thereby completed. Once connected, the manipulator can detach and withdraw into a neutral position on the chassis. The connection tool 4880 can include an auxiliary locking and/or stop mechanism (not shown) that engages the enclosure 4898, or another structure associated with the retracting glad hand 4881B, so as to prevent the glad hand from retracting back into the enclosure 4898 while the tool is engaged thereto. Alternatively, the tool can free float in the manner of a conventional glad hand connection, naturally overcoming any retraction bias exerted by the glad hand assembly.

Figure 48Y:
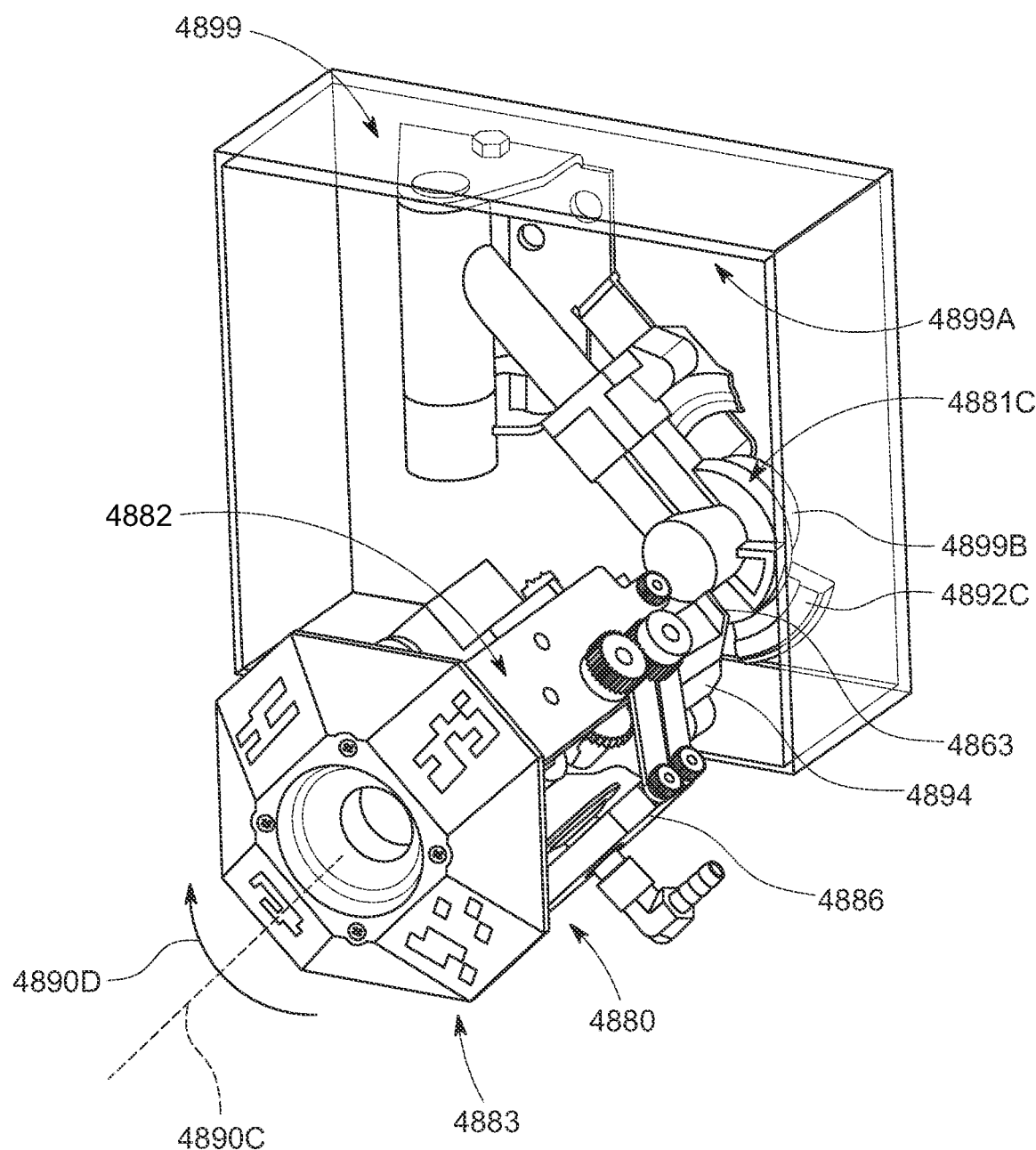
FIG. 48Y is a perspective view of a glad hand connection tool of FIG. 48P, shown approaching an enclosed (in a box structure), rotating/retractable glad hand, which is angled downwardly, with the grasping subassembly pivoted forwardly so as to allow the fingers to grasp the glad hand in the retracted orientation, according to an exemplary embodiment.
Figure 48Z:
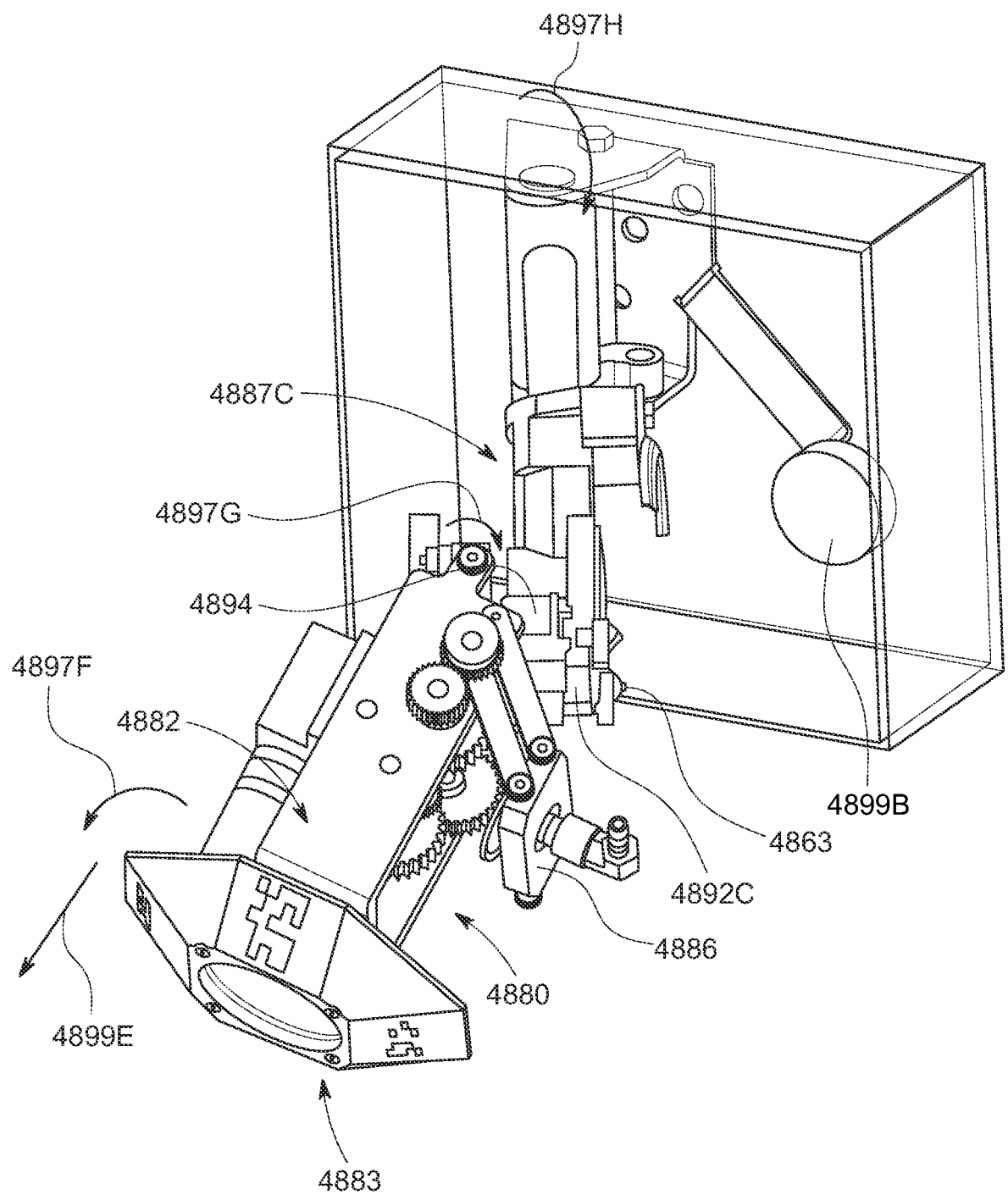
FIG. 48Z is a perspective view of the glad hand connection tool in the exemplary arrangement of FIG. 48Y, shown withdrawing to cause the glad hand to rotate outwardly in engagement with the locking fingers/wedges.
Figure 48A:
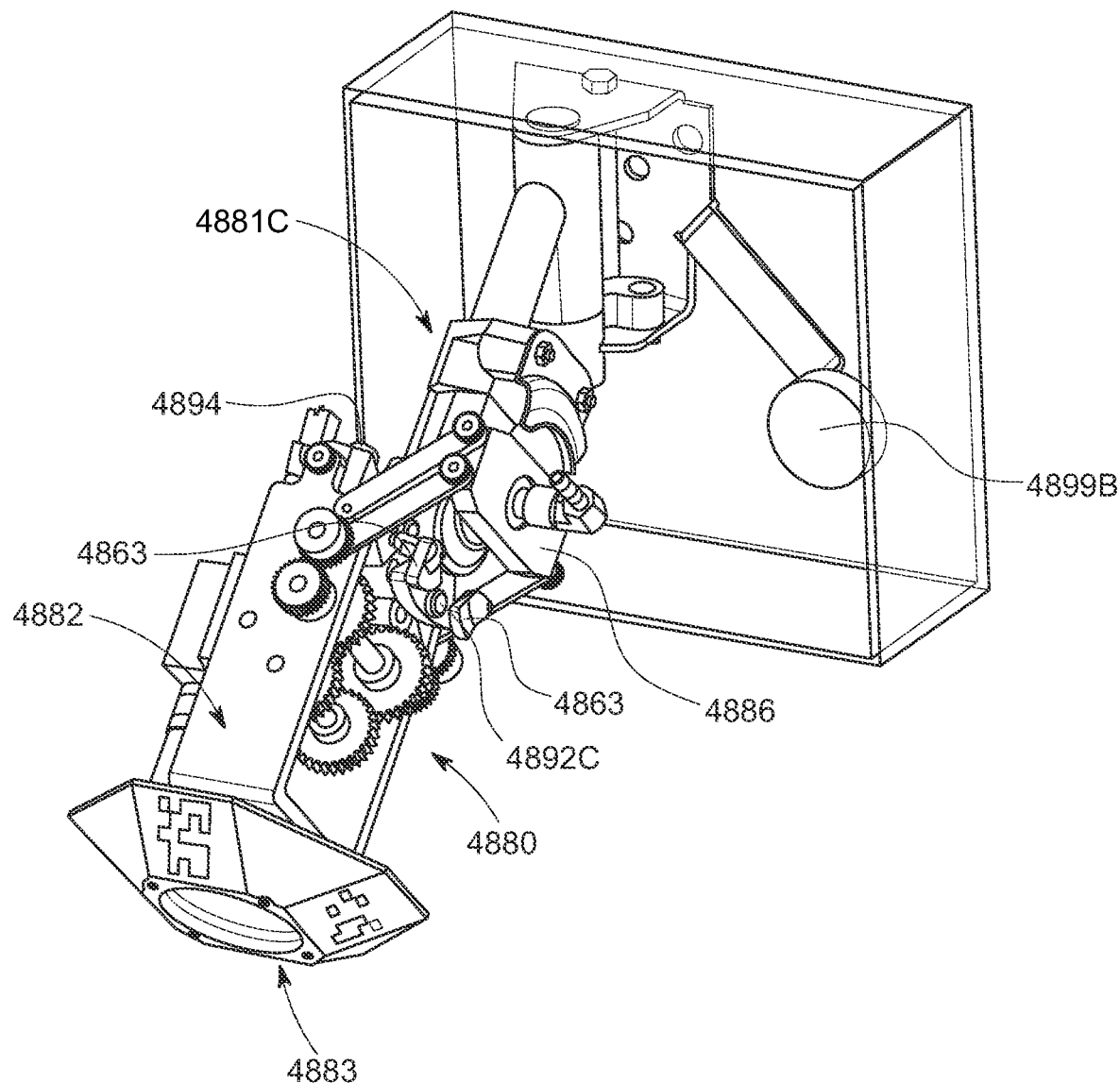

In FIGS. 48Y-48AA, the connection tool operates with respect to another type of retractable/rotational glad hand 4881C. In this example, the glad hand is retracted against the wall 4899A of an open-front enclosure structure 4890, and rests on a support 4899B. The glad 4881C resides in a downward angle (non-perpendicular to the horizontal—defined generally herein by the top and bottom walls of the enclosure 4899). Thus, the exemplary glad hand 4881 presents a challenging connection task for the manipulator (not shown) and associated connection tool 4880. As shown in FIG. 48Y, the manipulator aligns (generally along longitudinal axis 4890C) the outwardly pivoted grasping subassembly 4894 and associated fingers/wedges 4863 with the glad hand wedge/flange 4892C. The tool 4880 is also rotated (curved arrow 4890D) about the longitudinal axis 4890C so that the fingers/wedges can pass over and engage the glad hand wedge/flange. In FIG. 48Z, the fingers/wedges 4863 have engaged the glad hand flange 4892C. In outwardly rotating/extending (curved arrow 4897H) the glad hand, the connection tool 4880 is withdrawn (arrow 4897E) and rotated (curved arrow 4897F) in space by the manipulator. The grasping subassembly 4894 pivots (curved arrow 4897G) to comply with the rotation (curved arrow 4897H) of the glad hand 4881C, as it extends. Then, in FIG. 48AA, the manipulator has moved the connection tool 4880 to a final position, in which the subassembly 4894 is fully aligned to receive the connection plate 4886, and the plate is thereby swung into engagement with the glad hand seal. The manipulator can now withdraw from the connection tool 4880, and the resulting airline pressure circuit is now completed.

In each of the above-described embodiments (FIGS. 48P-48AA), the vision system can track the fiducials 3910 on the end cap 4883 of the connection tool to assist in guiding the robot manipulator—which provides motion feedback via various motion sensors (e.g. steppers, encoders, etc.). Disconnection of the connection tool can be accomplished in a similar manner. The manipulator is guided to the connection tool via the fiducials 3910 using the vision system and its end effector is secured to the end cap 4883. The connection tool is then disconnected using a series of steps that can comprise a reverse order of some or all of the above-described connection steps. In a basic example, the tool is simply disengaged (by unlocking the connection plate 4886 and fingers/wedges 4863) and withdrawing the connection tool to a neutral position with the manipulator. The disconnected glad hand is then free to receive another connection, potentially retracting back into its enclosure under its own spring bias where applicable.

FIG. 48H is a perspective view of a caliper-type connection tool 4884 that can be used on a rotational glad hand 4862, shown in an unengaged conformation. As shown in FIG. 48H, the rotational glad hand 4862 has been grasped and rotated out into an accessible position for connecting. The caliper-type connection tool 4884 can be connected to a carrier 4886 that can slide along a rail 4888 that has pulled the rotational glad hand out into the accessible position. The end of the rail 4888 can have a glad hand grabber/grasping structure 4890 that can be constructed in accordance with any of the mechanisms described herein, and is adapted for pulling out/withdrawing the rotational glad hand. The caliper-type connection tool 4884 can have a reaction arm 4894 and an air delivery arm 4892 that can form the caliper and be pressed against the seal ring of the rotational trailer glad hand 4862. The air delivery arm can have an air passage that can connect between the trailer glad hand and the truck airline. The connection tool 4884 can be slid along the rail 4888 into position over the glad hand 4862.

FIG. 48I is a perspective view of the caliper-type connection tool shown in a clamped, engaged conformation. After the connection tool has been slid into place over the glad hand, air pressure can be applied to the tool to close the reaction arm 4894 and air delivery arm 4892 of the caliper towards each other, thereby clamping the glad hand 4862 in the caliper. The reaction arm 4894 can be adapted to press/bias against the back of the trailer glad hand 4862 to ensure an air tight contact seal between the seal ring of the trailer glad hand and the air delivery arm 4892 of the connector 4884, so that air can be delivered into the trailer glad hand. The caliper type connection tool 4884 can be used with any of the rotational tool extraction systems described herein, and can also be used on fixed, non-rotational trailer glad hands when combined with other described systems and/or methods herein.

Figure 49:
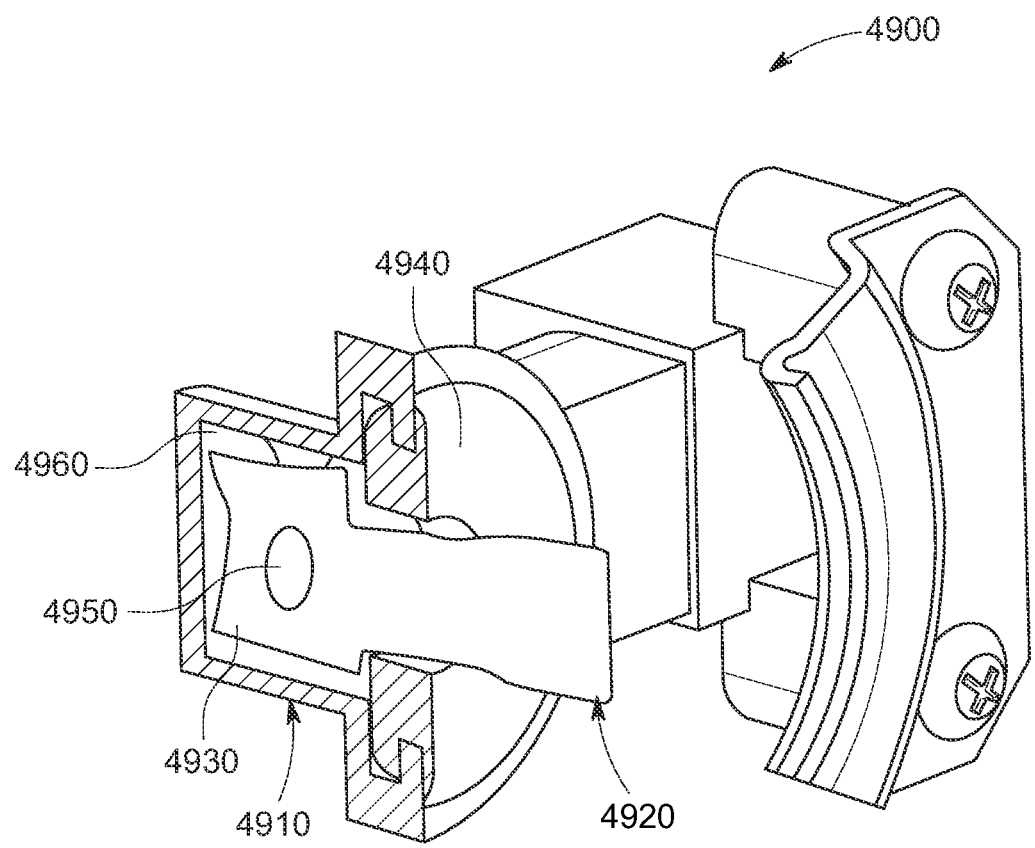
FIG. 49 is a cross-sectional perspective view of a truck-based glad hand connection employing a an inflatable, plug-like connection, shown in an engaged/connected orientation with respect to a trailer glad hand, whereby the manipulator accesses the interconnector via an appropriate truck based connection and end effector.

FIG. 49 shows yet another embodiment of an arrangement 4900 for a connection between a conventional trailer glad hand 4910 and a truck pneumatic source/line 4920, the pneumatic line includes an inflatable probe/plug 4930 that passes into the hole of the glad hand annular seal 4940. The plug is sealed around an internal line that exits in an outlet 4950. The uninflated plug geometry allows it to pass freely into and out of the glad hand seal hole. However, when inflated in response to an engagement command (after inserted) the interior of the plug expands, as shown, to seal against the edges of the annular seal 4940. Upon proper inflation of the plug into the glad hand pocket 4960, positive pressure can be supplied to the system via the port 4950. The plug can be constructed from a durable elastomeric material (e.g. natural or synthetic rubber) that expands upon application of inflation pressure. Appropriate adapters and/or brackets can be employed to allow the end effector of the fine manipulation system to carry, insert and extract the plug with respect to the glad hand annular seal.

Figure 50:
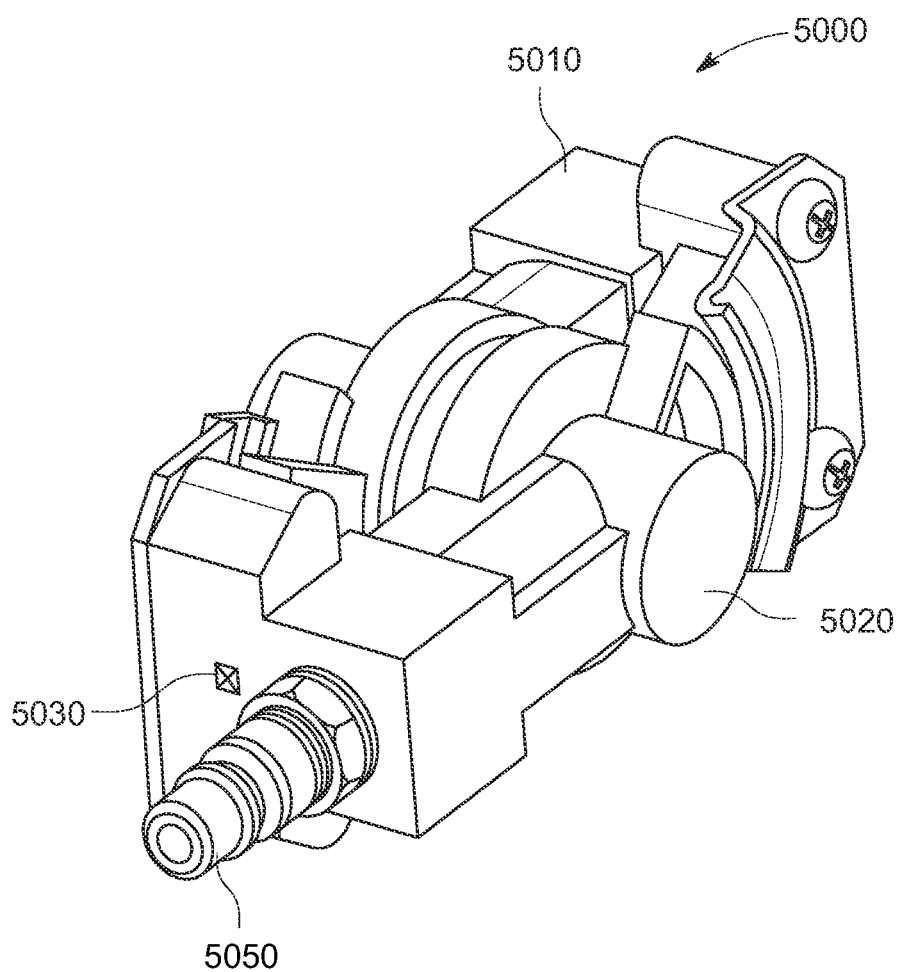
FIG. 50 is a perspective view of a truck-based glad hand connection employing an industrial interchange connector thereon for semi-permanent attachment of the truck-based glad hand (using conventional, rotational attachment techniques) to a trailer glad hand.

FIG. 50 shows another connection arrangement 5000 in which the trailer glad hand 5010 is provided with a semi-permanently attached truck glad hand 5020 according to a conventional rotary clamping motion. The truck glad hand connector 5020 now includes industrial interchange pneumatic connector (a quick-disconnect) 5050. The truck glad hand adaptor 5020 can include one or more fiducial(s) 5030 (e.g. ID codes with embedded information) for easier recognition by the gross and/or fine manipulation sensing system/camera(s). The interchange connection adaptor 5050 can be arranged to thread into the truck glad hand 5020, and thereby allows for the connection of a corresponding industrial interchange connector mounted on the end of the truck pneumatic line (not shown), and which is carried into engagement by the fine manipulator end effector. The fiducial can also be carried on a bracket in a manner similar to that described above with reference to FIG. 38. The fiducial can, more particularly, define ArUco marker images that provide pose estimation using a camera. The fiducial can also be part of an arrangement of reflective points: defining a reflective or high contrast coating to allow vision by a sensor camera.

Figure 50A:
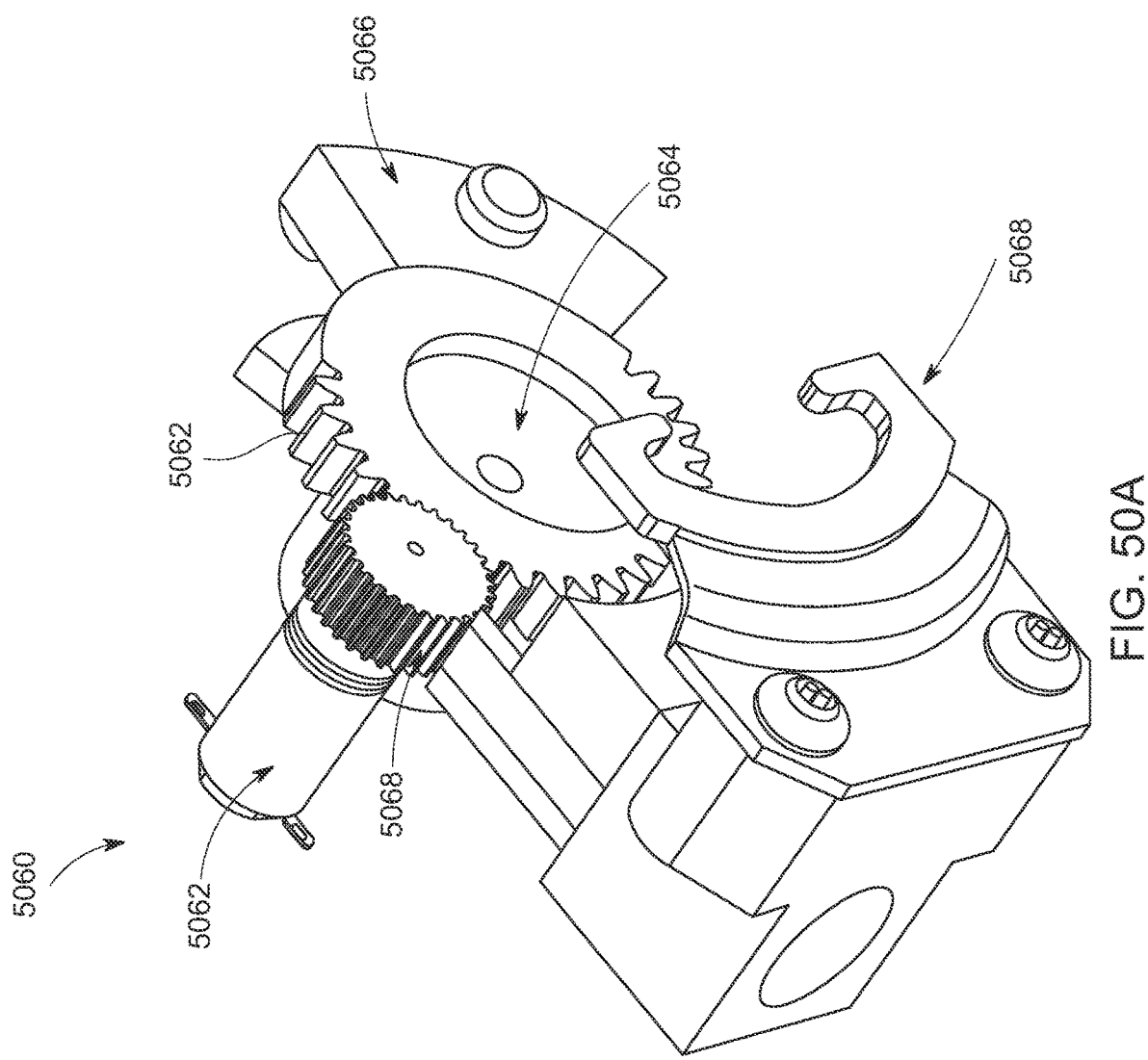
FIG. 50A is a perspective view of a truck-based glad hand connection tool with a rotary wedge.

FIG. 50A is a perspective view of a truck-based glad hand connection tool 5060 with a rotary wedge. The connection tool 5060 can have a rotating toothed ring 5062 that can rotate about rotational axis 5064, and rotational axis 5064 can pass through the connection tool's air delivery opening. A servo motor 5067 attached to a gear 5068 can drive the rotating toothed ring 5062 to rotate about the axis 5064. A rotary wedge 5066 can be affixed to the rotating toothed ring 5062.

The connection tool 5060 can approach a receiving trailer glad hand with a slight offset angle, with the rotational glad hand wedge located away from its normal position. The wedge on the trailer glad hand can be positioned under the standard glad hand flange 5068 on the connection tool 5060. After the connection tool 5060 has been positioned on the trailer glad hand, with the wedge of the trailer glad hand under the flange 5068 of the connection tool, the servo motor can be turned on to rotate the rotating toothed ring 5062 and drive the rotary wedge 5066 into engagement under the glad hand flange on the trailer glad hand, thereby locking the connection tool and the trailer glad hand together and forming an air tight seal. Air from the truck can then pass through the connection and energize the brakes on the trailer during operation.

Figure 50B:
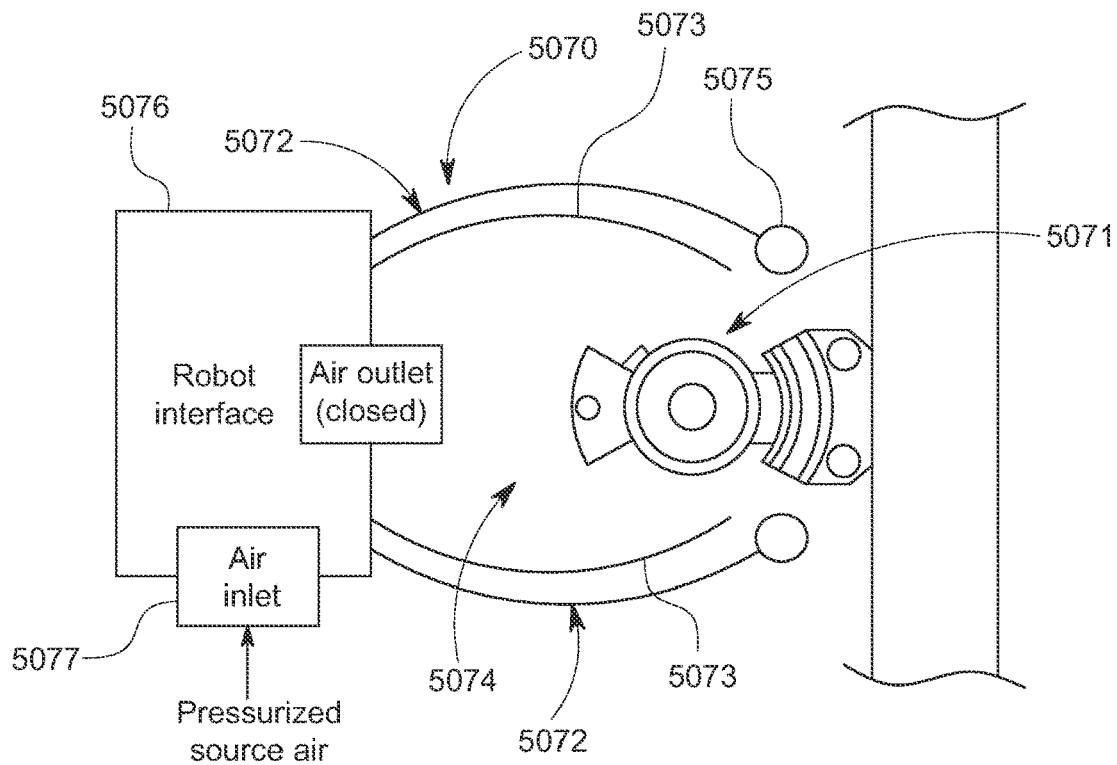
FIG. 50B is a schematic cross section of a sealing sleeve for engaging and providing pressure to a trailer-based glad hand in a manner free of an adapter or connector, shown in an engaged and unsealed state with respect to the trailer-based glad hand.
Figure 50C:
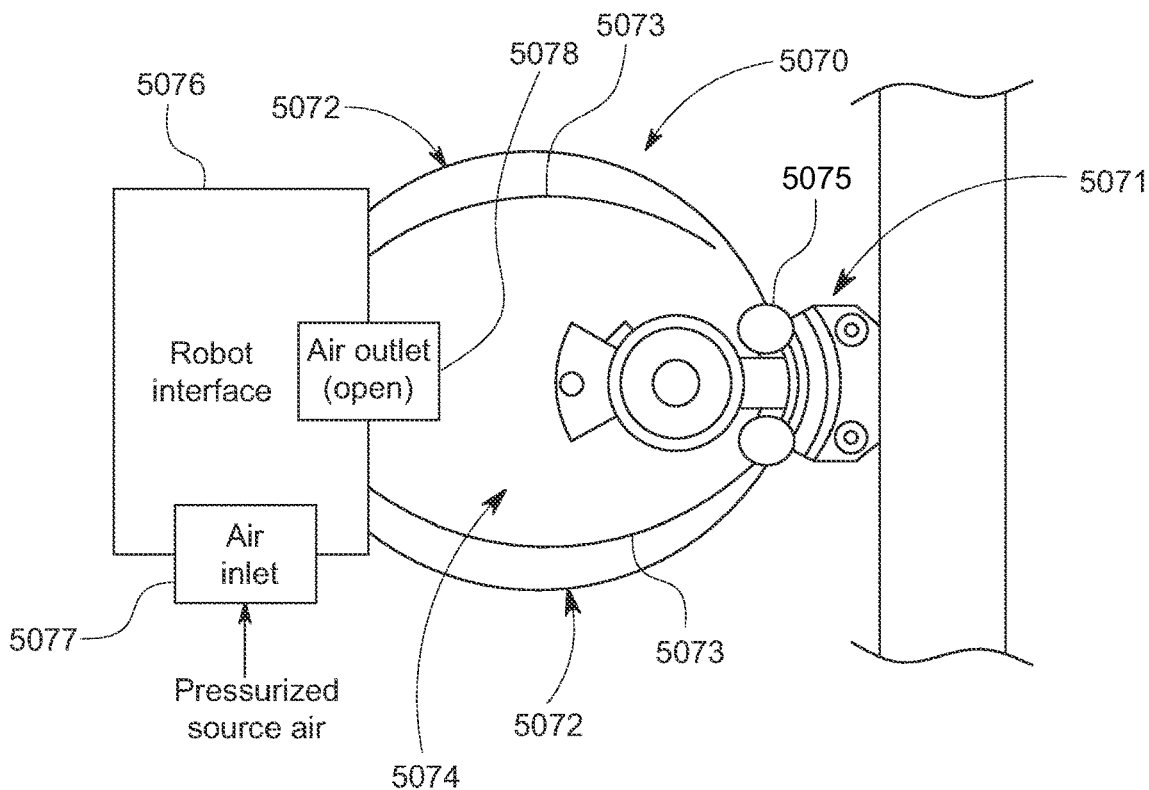
FIG. 50C is a schematic cross section of the sealing sleeve of FIG. 50B, shone in an engaged and sealed state with respect to the trailer-based glad hand.

In an exemplary embodiment, FIGS. 50B and 50C depict a sealing sleeve 5070 for use with various truck-based connection tools. Hence, a connection tool can define an amorphous sealing sleeve 5070 that can be directed into engagement with the trailer glad hand 5071, so as to surround and encompass the entirety of the trailer glad hand 5071. After the sealing sleeve 5070 is positioned around the trailer glad hand (FIG. 50B), it can be pressurized, forming a seal and providing air pressure to the trailer braking system (FIG. 50C). More particularly, the sleeve 5070 defines a flexible membrane 5072 that surrounds (e.g. semi-rigid) support ribs. The support ribs 5073 help maintain shape and support the flexible membrane 5072 when in the open state (FIG. 50B). There is an inner cavity or chamber 5074 that is exposed to the outside atmospheric pressure air through an actuated clamping ring 5075. In the open state (FIG. 50B), this ring 5075 defines a sufficiently large inner perimeter/circumference to surround a target glad hand 5071. All of the elements of the sleeve assembly 5070 are connected as depicted and primarily supported through an interface 5076 that couples with the robotic arm or other delivery mechanism as described according to the various exemplary embodiments herein. Pressurized source air can be routed through this interface 5076 from an inlet 5077 to a switchable outlet valve 5078 that can be toggled between closed and open. This outlet valve 5078 is, for example, located inside the interior chamber 5074. The sleeve assembly connection device 5070 is delivered to a position that can surround a target glad hand 5070 via (e.g.) a robotic manipulator/arm and associated end effector. Once in place, the actuated clamping ring 5075 is tightened (FIG. 50C). Note that the exemplary clamping 5075 ring can be constructed of an appropriate complaint and/or elastic material that can effectively seal around the glad hands irregular features. A variety of materials and/or combinations of materials—for example rubber, silicone, etc. can be employed When in place, the actuated clamping ring 5075 is closed (through cables being tightened or other mechanisms (such as an pneumatic, hydraulic and/or vacuum actuation) and the air outlet valve 5078 is opened. The interior chamber 5074 is then exposed to pressurized air, which is substantially contained by the seal created around the glad hand by the actuated clamping ring 5075 in the closed state and the flexible membrane, which has structural elements within that limit the degree that it can expand. The inner, sealed chamber 5074 is maintained at a pressure sufficient to unlock the trailer brakes through the enclosed glad hand orifice.

Figure 51:
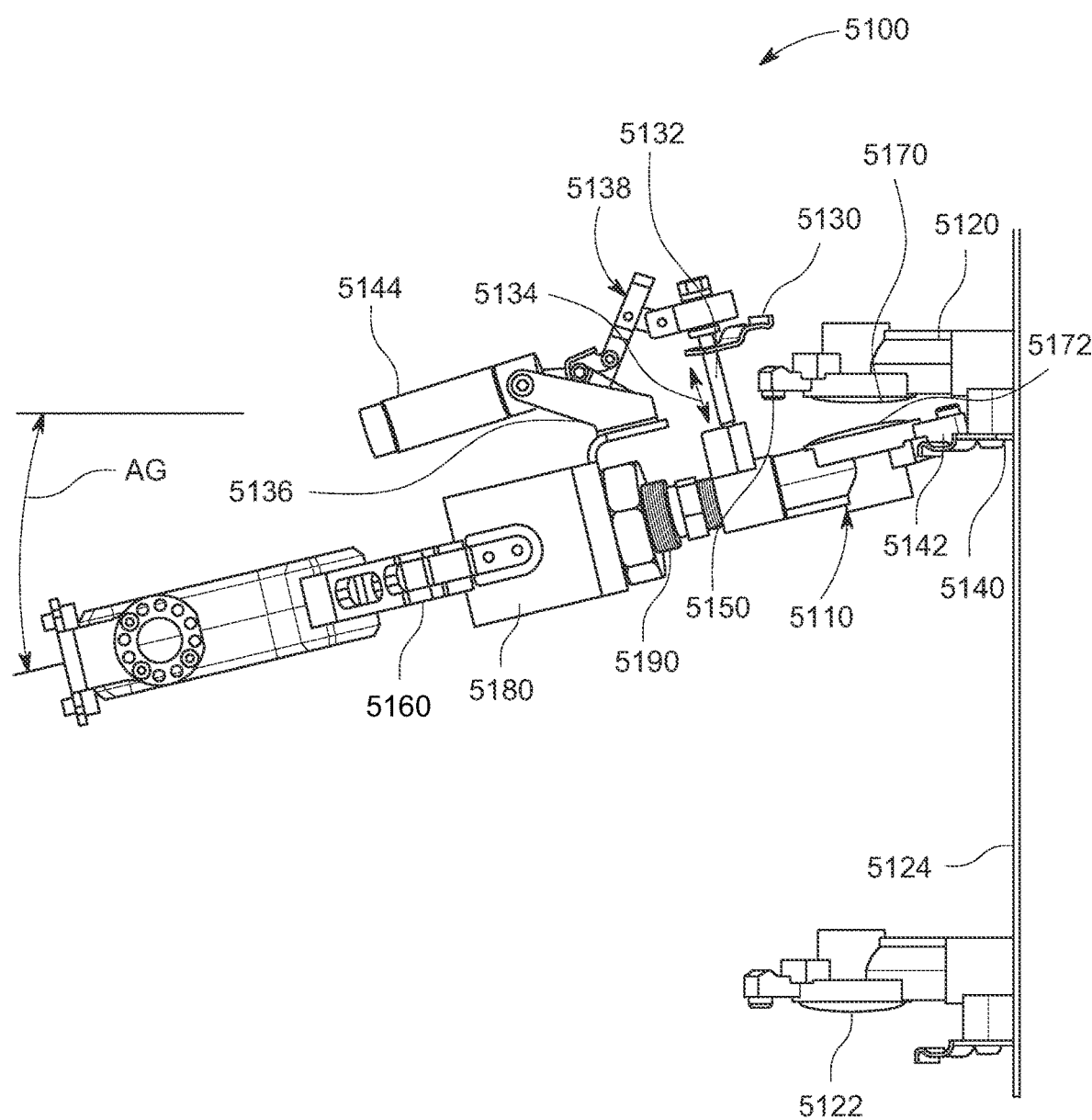
FIG. 51 is a fragmentary side view of a truck-based glad hand connection employing a clamping action with a linear actuator integrated with the truck connector, shown in an open orientation with respect to a trailer glad hand.
Figure 52:
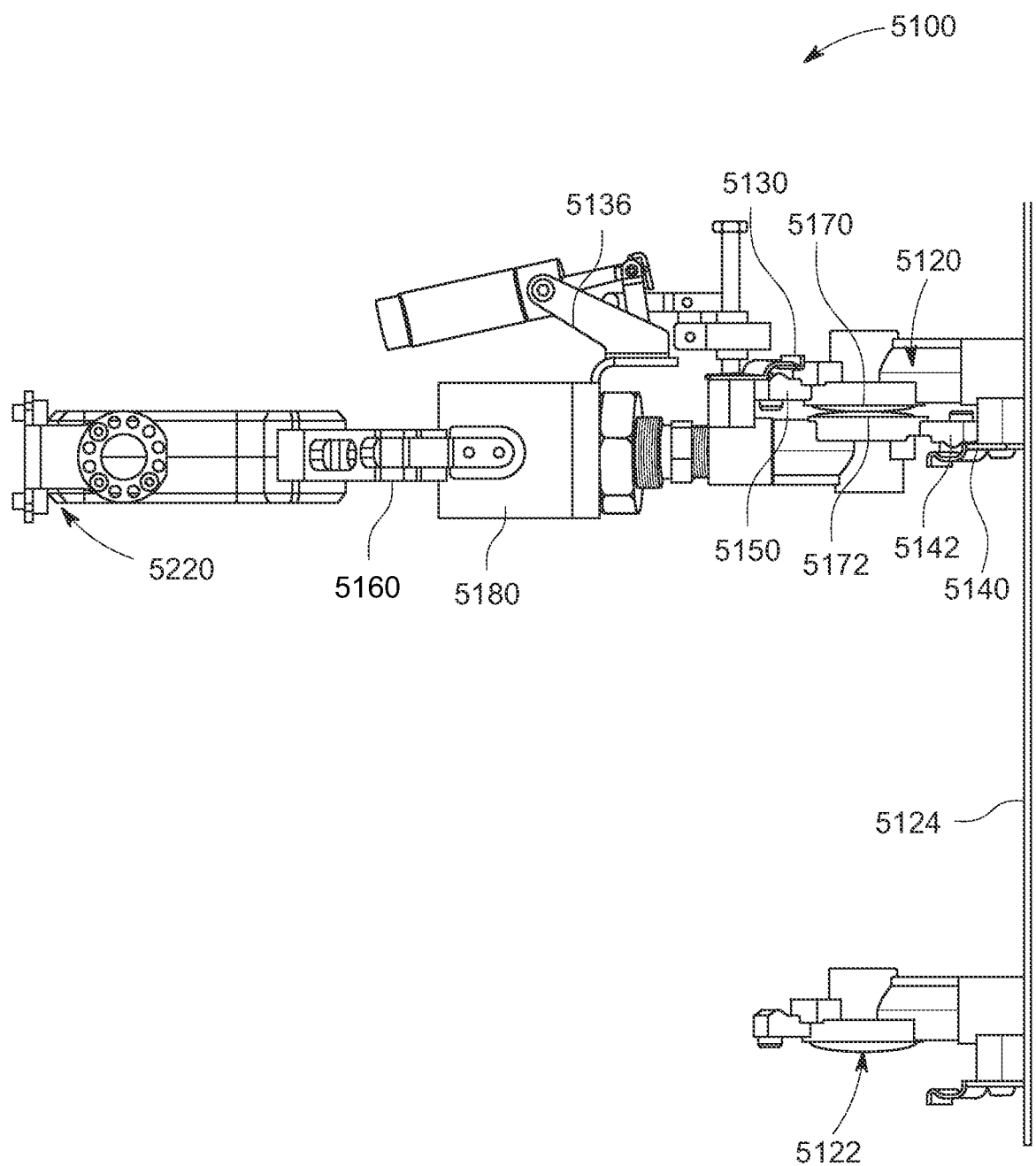
FIG. 52 is a fragmentary side view of the truck-based glad hand connection of FIG. 51, shown in a closed/engaged orientation with respect to the trailer glad hand.

FIGS. 51 and 52 show another arrangement 5100 for attaching a truck-based glad hand connector 5110 to a trailer glad hand 5120, shown mounted in tandem with a second glad hand 5122 on the trailer front face 5124. The glad hand connector 5110 is a modification of a conventional glad hand unit. The glad hand 5110 includes a sliding sheet metal retainer 5130, that rides (double arrow 5134) on a rail 5132, under the driving force of an actuator assembly 5136. The actuator assembly can be operated by the sensor system when the glad hand 5110 is aligned with the trailer glad hand as shown in FIG. 51. In this orientation, the trailer glad hand's sheet metal retainer 5140 engages the truck glad hand's flange 5142. The actuator 5132 selectively engages and disengages the sheet metal retainer 5130 of the modified truck glad hand 6510 with the retainer 5130 of the aligned trailer glad hand 5120. In engaging the retainer 5130, the end effector 5160 rotates (curved arrow 5220) the glad hand 5110 into a parallel relationship with the trailer glad hand 5120, so that their respective seals 5170 and 5172 are engaged and mated (See FIG. 52). Hence, in operation, the end effector 5160 approaches the trailer glad hand 5120 at a non-parallel angle AG that allows the flange 5142 to slip under the fixed trailer glad hand retainer 5140 while the seals 5170 and 5172 are remote from each other (as shown in FIG. 51). The end effector then rotates the glad hand 5110 into a parallel relationship with the trailer glad hand 5120. During this step, the actuator 5136 slides the retainer 5130 into contact with the trailer glad hand flange 5150 to compressibly join the two seals 5170, 5172 together (as shown in FIG. 52). The end effector 5160 can release the attached glad hand 5110 at its grasping base 5180 and return to a neutral position on the truck chassis thereafter. Disconnection and removal of the glad hand 5110 from the trailer glad hand 5120 is the reverse of attachment—that is, the end effector 5160 is servoed to, and engages the glad hand grasping base 5180; the actuator 5136 releases the retainer 5130 and the end effector 5160 rotates the glad hand 5110 to generate the angle AG with respect to the trailer glad hand 5120; and then the glad hand 5110 is moved away from the trailer glad hand 5120 to a neutral location, awaiting the next connection cycle. This arrangement 5100 allows for relatively straightforward attachment and removal of the glad hand using a robot manipulator. It avoids (is free of) the complicated motions required in conventional glad hand interengagement—which requires rotation about the seal centroidal axis. Note that the glad hand grasping base can also act as an adaptor so as to allow pressurized air to pass through. The actuator assembly 5136 can include the depicted pivoting joints 5138 and linear actuator 5144. The actuator can employ electrical, hydraulic or pneumatic motive force. An appropriate line connection (not shown) to the actuator, so as to provide power, can be provided and can run in parallel to the truck pneumatic line (also not shown, but attached generally to the grasping base 5180 to deliver pressurized air to the glad hand pressure connection 5190).

Figure 52A:
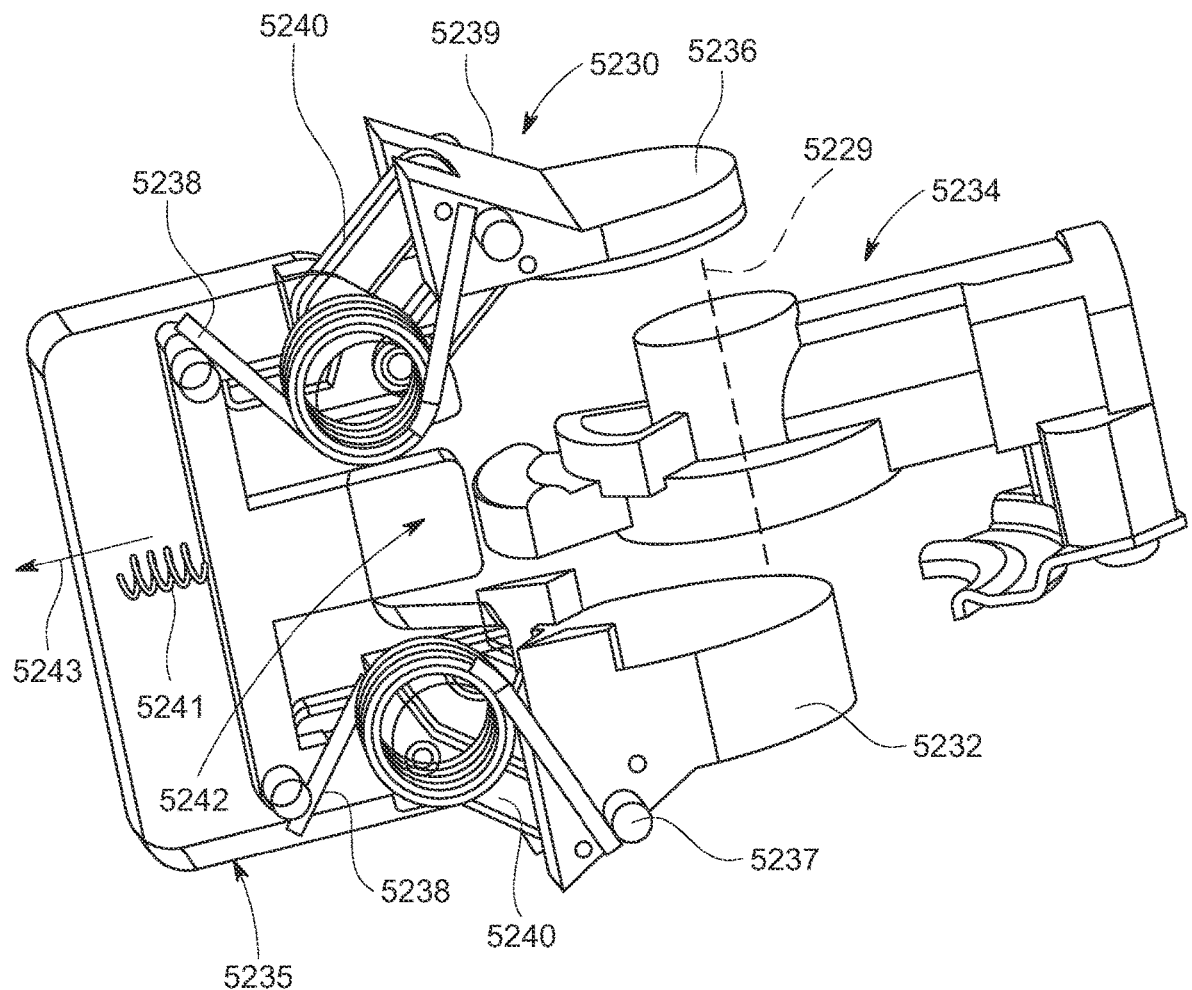
FIG. 52A is a perspective view of a passive spring-loaded clamping mechanism shown in an open state approaching a trailer glad hand.

FIG. 52A is a perspective view of a passive spring-loaded clamping mechanism 5230 shown in an open state approaching a trailer glad hand 5234. Similar to above embodiments, this embodiment of a truck-based passive spring-loaded glad hand connector 5230 is also able to make a connection to a trailer glad hand 5234 without (free of) rotation about the seal centroidal axis 5229 on the trailer glad hand. The connector tool 5230 can have an air delivery arm 5232 that can be pressed against the seal ring of the trailer glad hand 5234, and can thereby deliver air into the trailer glad hand. The air delivery arm 5232 can have an air passage (not shown) that can connect between the trailer glad hand and the truck airline (also not shown, but described generally above). The connector 5230 can have a reaction arm 5236 that can press against the back of the trailer glad hand to ensure an air tight contact seal between the seal ring of the trailer glad hand 5234 and the air delivery arm 5232 of the connector 5230. A pair of respective (relatively) large torsion springs 5238 can be used to clamp the reaction arm 5236 and the air delivery arm 5232 together around the trailer glad hand 5234 to create the seal. Each torsion spring 5238 is pinned to the main body 5235 of the connector 5230 on one end, and is preloaded and pinned (via respective pins 5237 and 5239) to both arms 5232 and 5236 such that when in the open (FIG. 52A) and locked state (FIG. 52B), there is a substantial amount of stored energy within the springs. It is contemplated, that the appropriate level of clamping force can be achieved by, providing an appropriately sized spring and/or parallel springs.

Figure 52B:
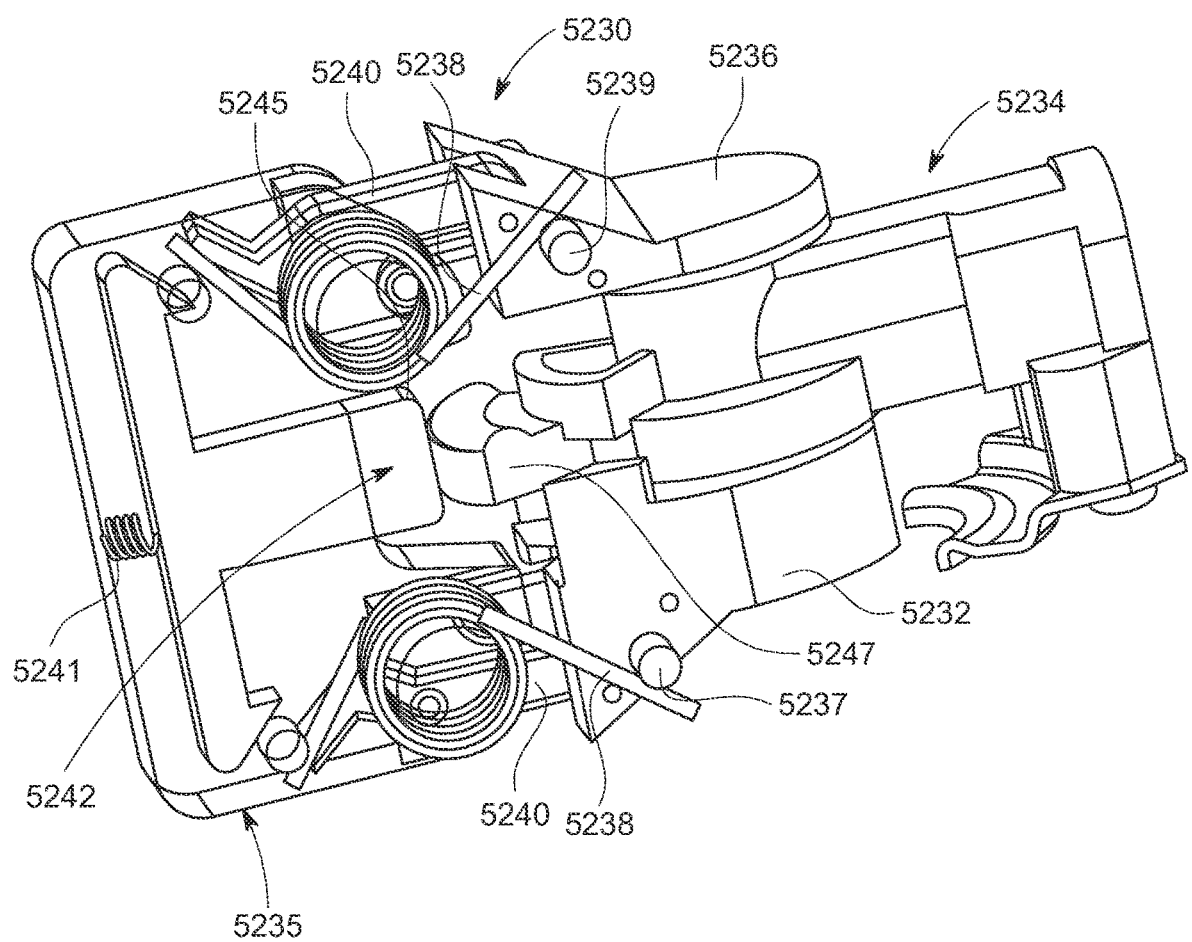
FIG. 52B is a top view of the passive spring-loaded glad hand connection of FIG. 52A, shown in a closed/engaged orientation with respect to the trailer glad hand.

A four-bar linkage system 5240 can be used so that the air delivery arm 5232 and the reaction arm 5236 remain parallel, and move toward and away from each other without (free of) pivoting or changing angles relative to each other. The connector 5230 can also include a spring-loaded (compression spring 5241) trigger mechanism 5242 that can trigger the release of the arms towards each other under the force of the springs 5238. This trigger mechanism is a generally T-shaped component that slides proximally (arrow 5243) during connection and distally during release. The wedge on the trailer glad hand can contact the trigger mechanism 5242 to trigger the clamping. Operating similarly to the trigger on a mousetrap, the trigger mechanism on the connector 5230 releases energy stored in the torsion spring to effect the state change in the connector 5230. This embodiment allows the manipulation system, including the end effector, and the connector tool 5320 to approach the trailer glad hand along a straight line vector and snap into place upon contact with the trailer glad hand. The system can be used in conjunction with other systems for rotating rotational glad hands, if desired. FIG. 52B particularly depicts the passive spring-loaded glad hand connection 5230 of FIG. 52A in a closed/engaged orientation with respect to the trailer glad hand 5234. In this orientation, the tip 5245 of the T-shaped trigger mechanism engages and is compressed by the flange 5247 of the glad hand 5234 by action of the robotic manipulator bringing the connector 5230 into engagement with the glad hand 5234. This action by the trigger mechanism 5242 causes the torsion springs 5238 to exert force on the reaction arm 5236 and the air delivery arm 5232 to bias them toward each other and thereby clamp them together against the glad hand, thereby forming an air tight seal between the air delivery arm 5332 and the trailer glad hand 5234. In order to open the arms 5232, 5236, and disconnect the connector 5230 from the trailer glad hand, the gripper, or end effector, of the fine manipulation system can provide kinetic energy to the connector 5230 to open the arms and reload the spring.

Figure 52C:
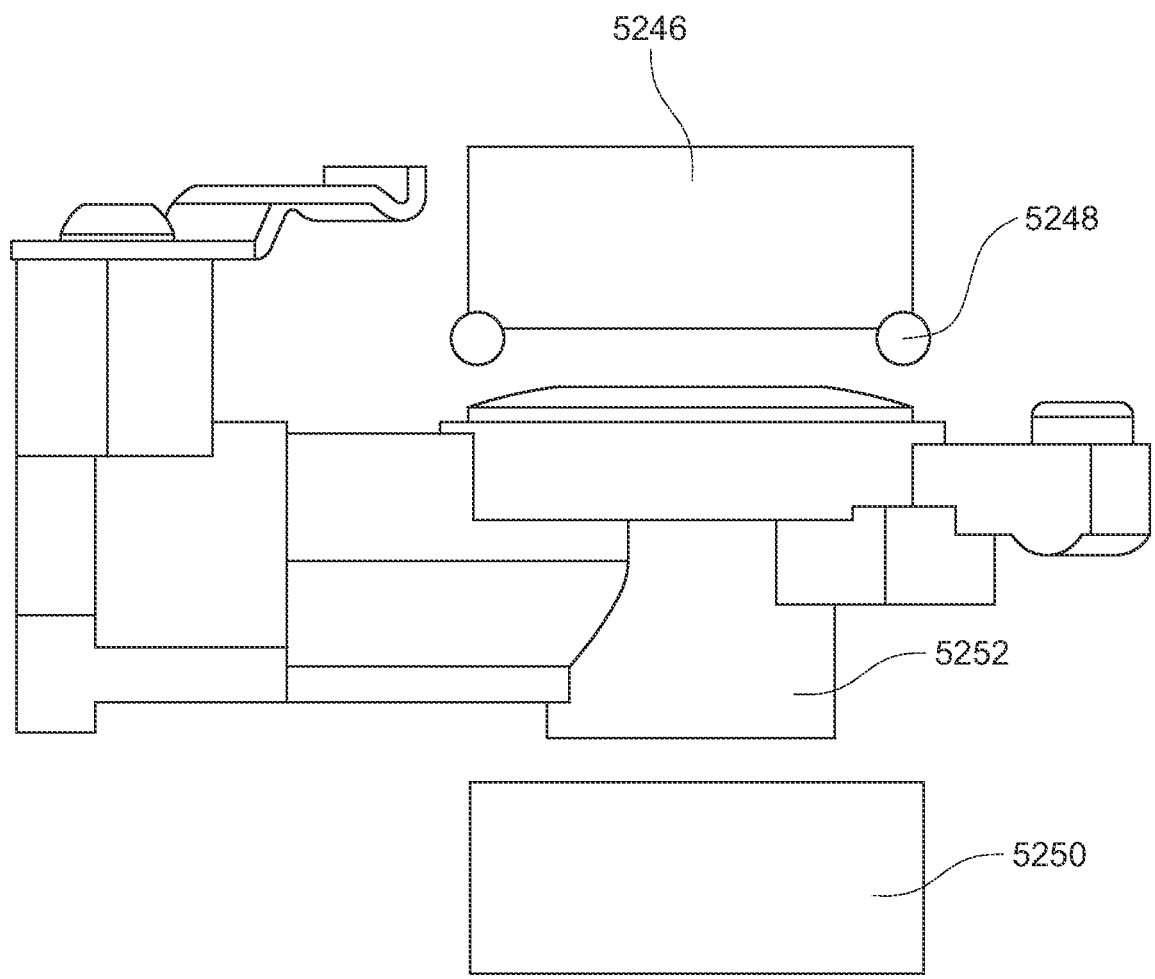
FIG. 52C is a schematic diagram of connection tool with an air delivery arm having an inflatable O-ring, shown in the deflated conformation.
Figure 52D:
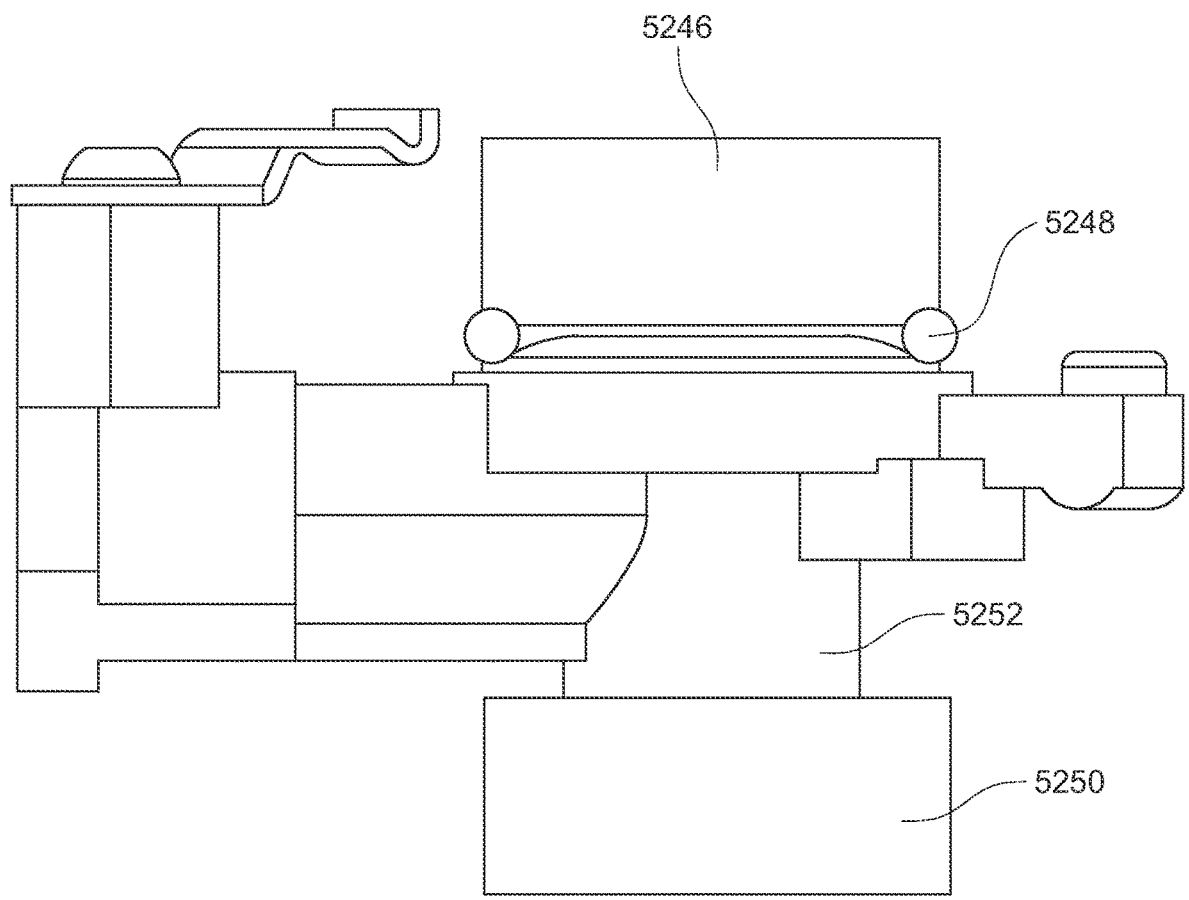
FIG. 52D is a schematic diagram of the connection tool with the inflatable O-ring in an inflated conformation.

FIG. 52C is a schematic view of connection tool with an air delivery arm 5246 having an inflatable O-ring 5248, shown in the deflated conformation. In an embodiment, an inflatable O-ring 5248 can be used on an air delivery arm in conjunction with or instead of a torsion spring system. In an embodiment, the air delivery arm 5246 and reaction arm 5250 can be in a fixed position relative to each other, with a sufficient gap between them for a trailer glad hand 5252 to be positioned in the gap. FIG. 52D is a schematic view of the connection tool with the inflatable O-ring 5248 in an inflated conformation. An inflatable O-ring 5248 can be used to create an air tight seal between the air delivery arm 5246 and the trailer glad hand 5252. The inflatable O-ring can be adapted to inflate to a size that takes up (conforms to) any gap between the trailer glad hand 5252 and the connector tool, so that the trailer glad hand is held securely by the connector tool and a sealed airline circuit is established.

Figure 52E:
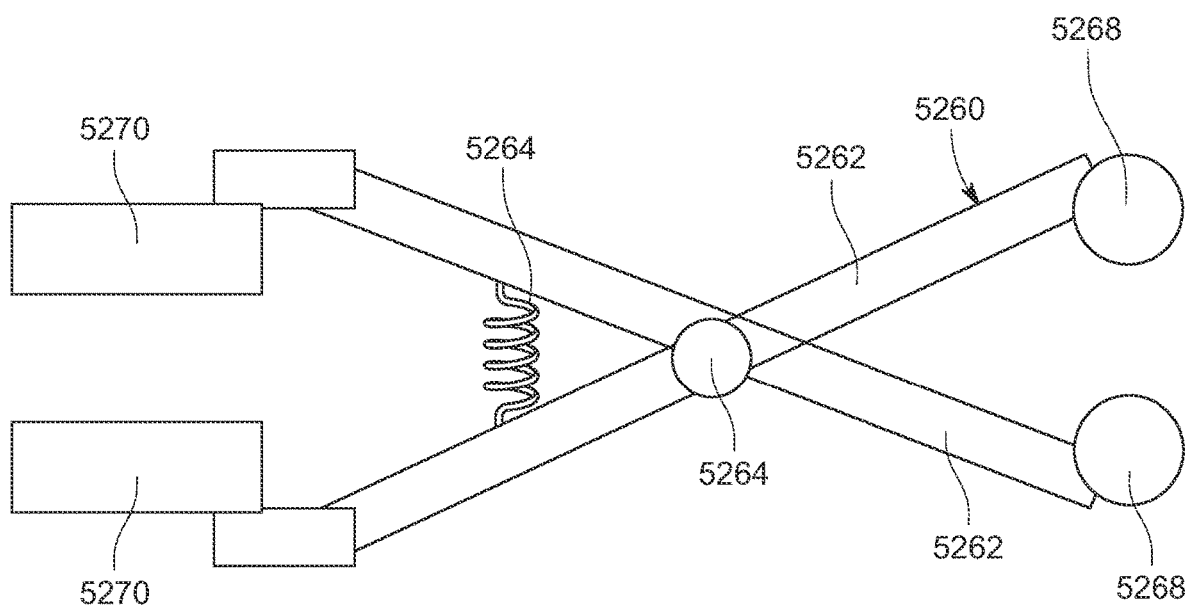
FIG. 52E is a schematic diagram of a wedge/flange capture tool for grabbing a wedge/flange of a trailer glad hand, according to an embodiment.
Figure 52F:
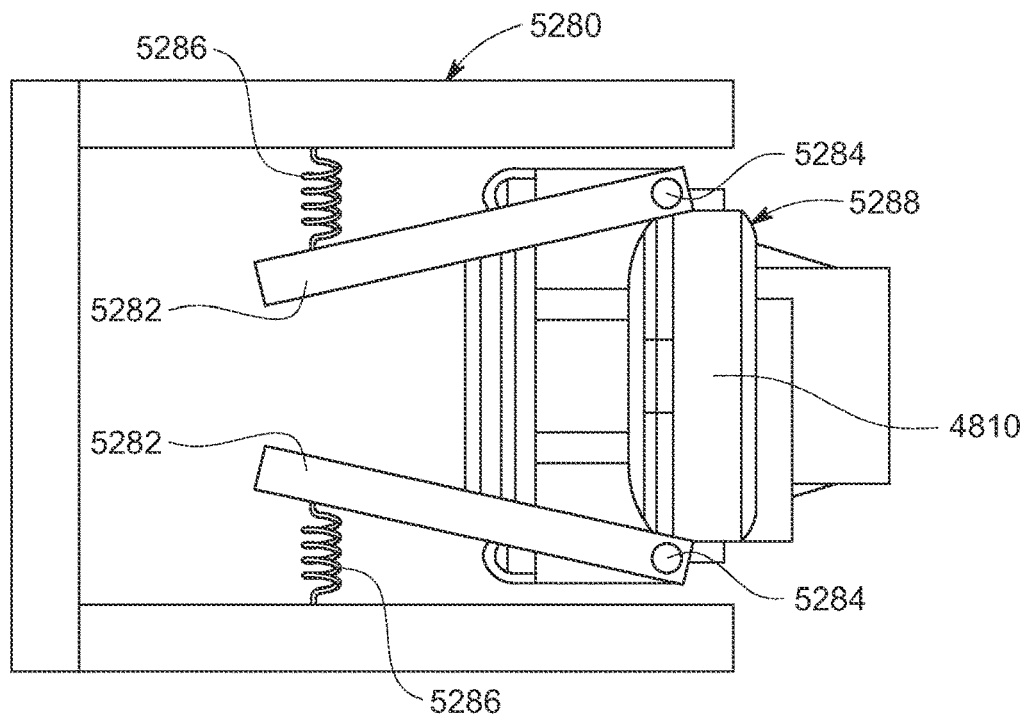
FIG. 52F is a diagram of a spring-loaded wedge/flange capture tool for grasping and manipulating the wedge/flange of a trailer-based glad hand according to an exemplary embodiment, showing the capture tool confronting the glad hand, prior to engagement thereof.

With reference again to FIG. 48, it is noted that the glad hands typically include a wedge 4812 extending out from the glad hand body. This wedge feature is common to the various glad hands described and shown herein, and renders them accessible regardless of the orientation or rotation of a trailer glad hand. FIG. 52E is a schematic view of a wedge capture tool for grabbing a wedge of a trailer glad hand. In the case of rotational glad hands, a specialized wedge grabbing tool 5260 can be used to pull the glad hand out away from the trailer so that a separate glad hand connection tool can access and connect to the rotational trailer glad hand. In an embodiment, the wedge grabbing/engaging (capture) tool 5260 can have two arms 5262 hinged together at a hinged axis 5264, and a tension spring 5266 that pulls the arms together. Each arm 5262 can have a knob or other protrusion 5268 on the wedge grabbing end of the arm. Grippers 5270 on an end effector can hold the arms apart, and the manipulator arm can position the arms 5262 around the wedge 4810, with the protrusions 5268 behind the wedge. The grippers can then allow the wedge grabbing tool 5260 to close around the wedge 4810. Referring again to FIG. 48, the angled sides of the wedge 4810 allow the spring loaded arms and knobs to remain secure around the wedge without sliding off. The wedge can now be pulled out away from the trailer, thereby pulling the trailer glad hand into an accessible position for connecting. A separate connection tool can be used to connect to the airline after it has been rotated into an accessible position.

FIGS. 52F-52I show an exemplary flange/wedge capture tool 5280 for grabbing/engaging a flange/wedge of a trailer glad hand 5288. The wedge capture tool 5280 can include a pair of opposing spring-loaded tabs 5282. Tabs 5282 can be hinged at rotary hinges/pivots 5284, and can have compression springs 5286 that press the tabs 5282 toward each other. In operation, the wedge capture tool 5280 is positioned around the glad hand flange/wedge 4810 (FIG. 52F), and the tabs 5282 can engage around the flange/wedge 4810 (FIG. 52G) so the flange/wedge can be pulled out away from the trailer, thereby pulling the trailer glad hand 5288 into an accessible position for connecting.

Figure 52G:
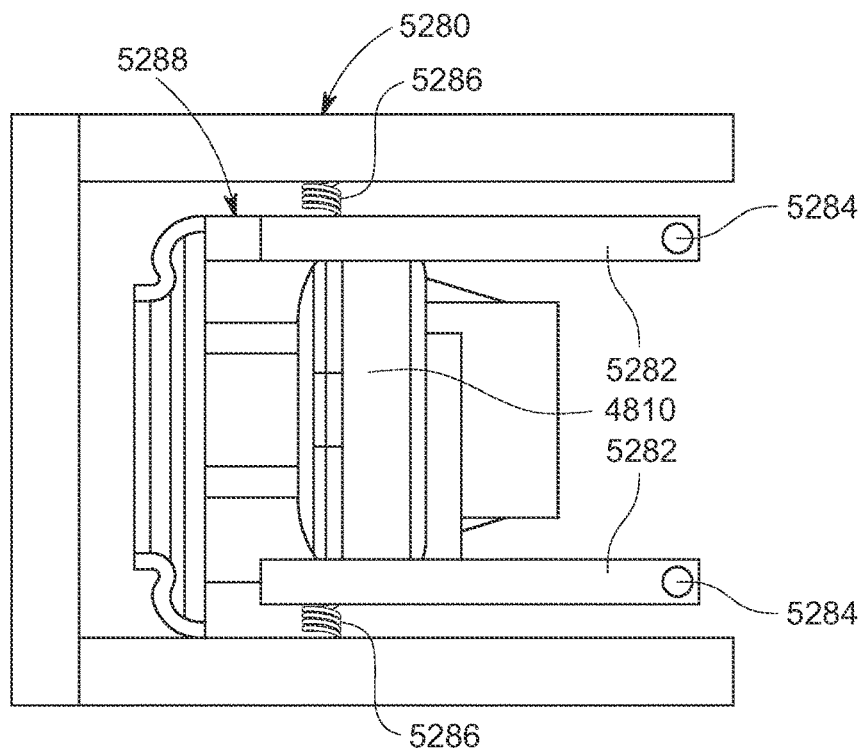
FIG. 52G is a diagram of the wedge/flange capture tool of FIG. 52F, showing the capture tool in the process of engaging the glad hand, whereby the fingers thereof are moved away from each other, against bias of respective compression springs.
Figure 52H:
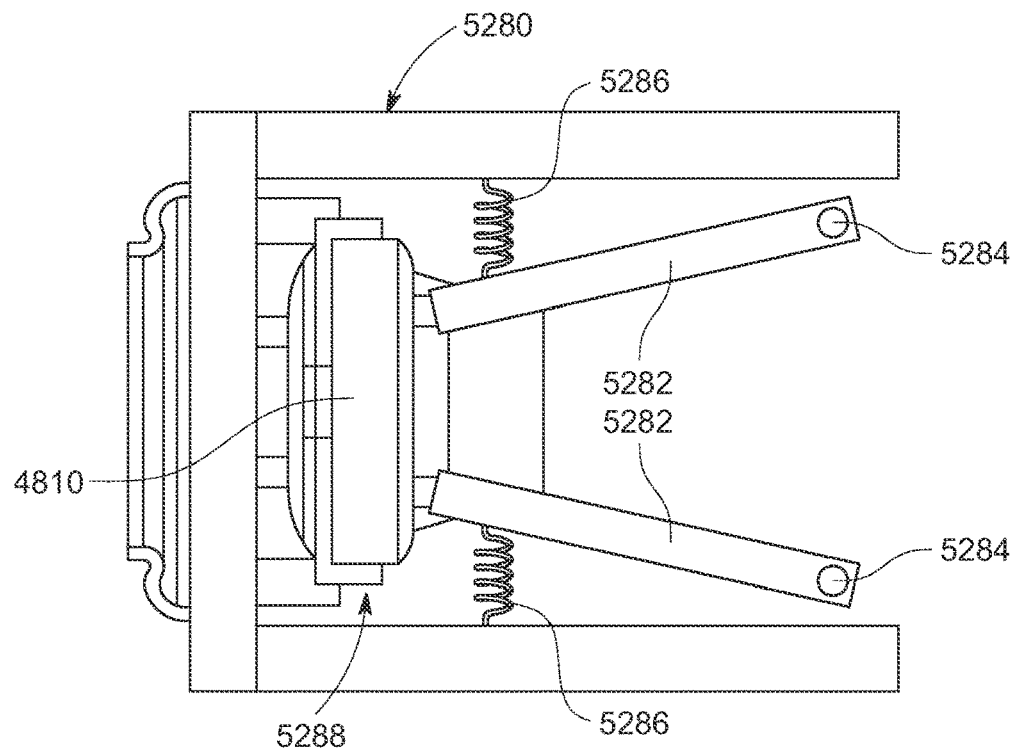
FIG. 52H is a diagram of the wedge/flange capture tool of FIG. 52F, showing the capture tool moved laterally to disengage from the glad hand wedge/flange.
Figure 52I:
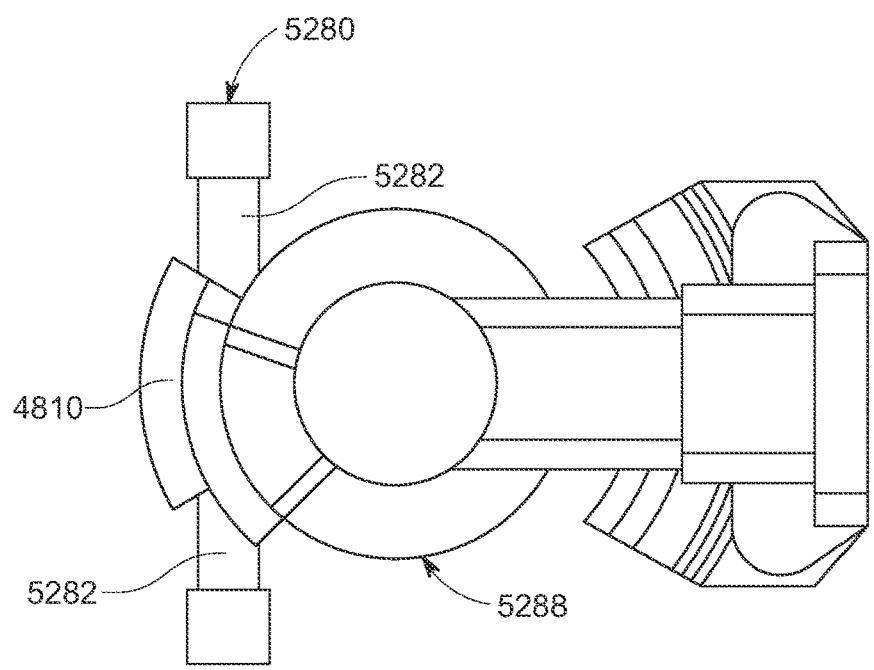
FIG. 52I is a top view showing engagement between the wedge/flange capture tool of FIG. 52F and the glad hand.

Describing the operation further, as the tool 5280 is brought in a linear fashion toward the glad hand 5288 (perpendicularly into the page in FIG. 52F), the tabs 5282 passively spring out of the way until they clear the flange/wedge 4810 (FIGS. 52G and 52I, and the compressions springs return the tabs to their original position, resulting in a locked capture of the flange/wedge 4810 (FIGS. 52H and 52I) A separate connection tool can be used to connect to the airline after it has been rotated into an accessible position. This exemplary tool can also be used in tandem with other components described herein to perform connection operations in a single step. The locking tabs 5282 can be unlocked through active actuation about the pins to free the wedge.

Figure 53:
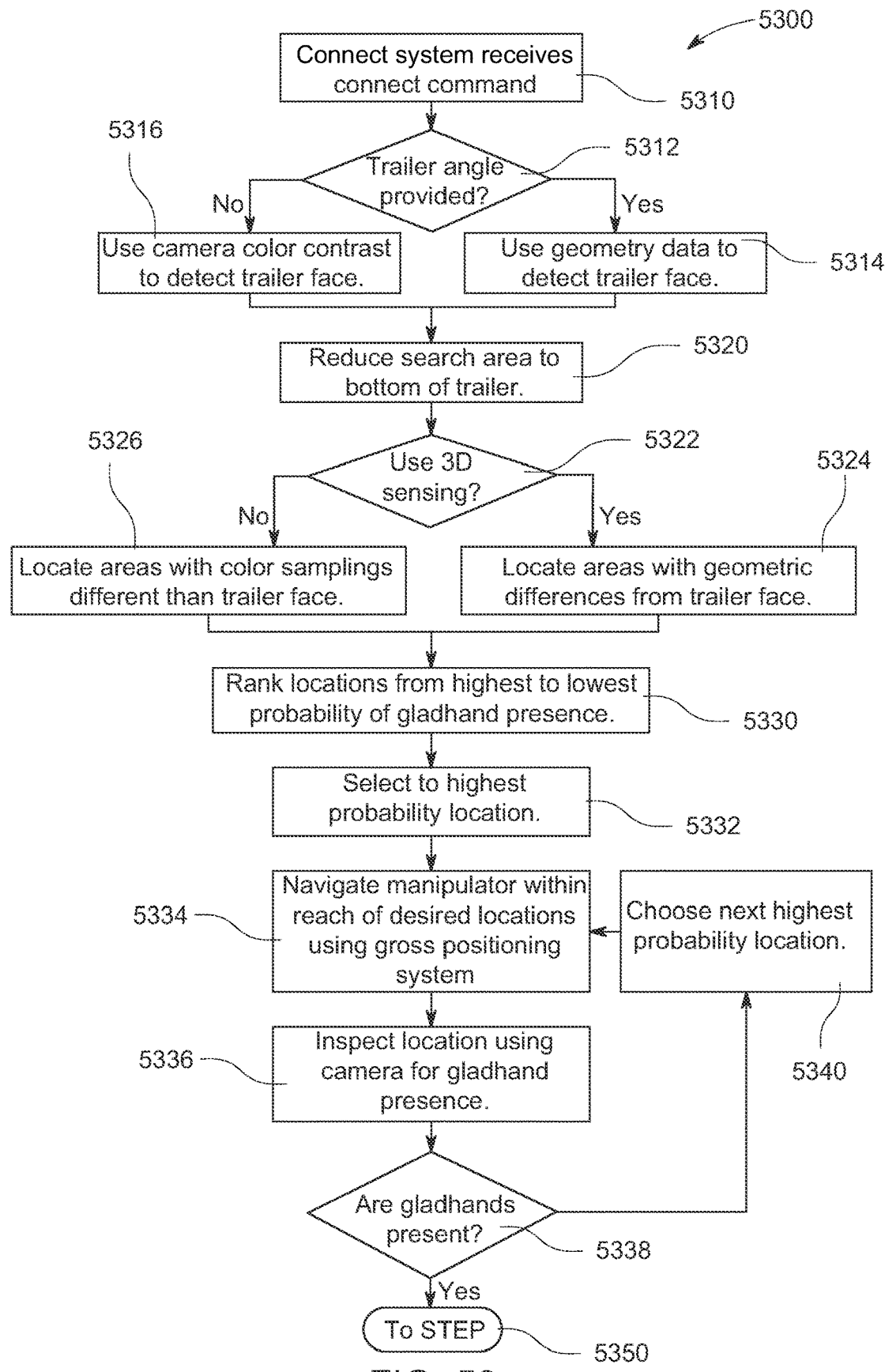
FIGS. 53 and 53A show a flow diagram of a procedure for performing a glad hand (or similar) connection between an autonomous truck and a trailer using a gross and fine sensing and manipulation system according to the various embodiments herein.
Figure 53A:
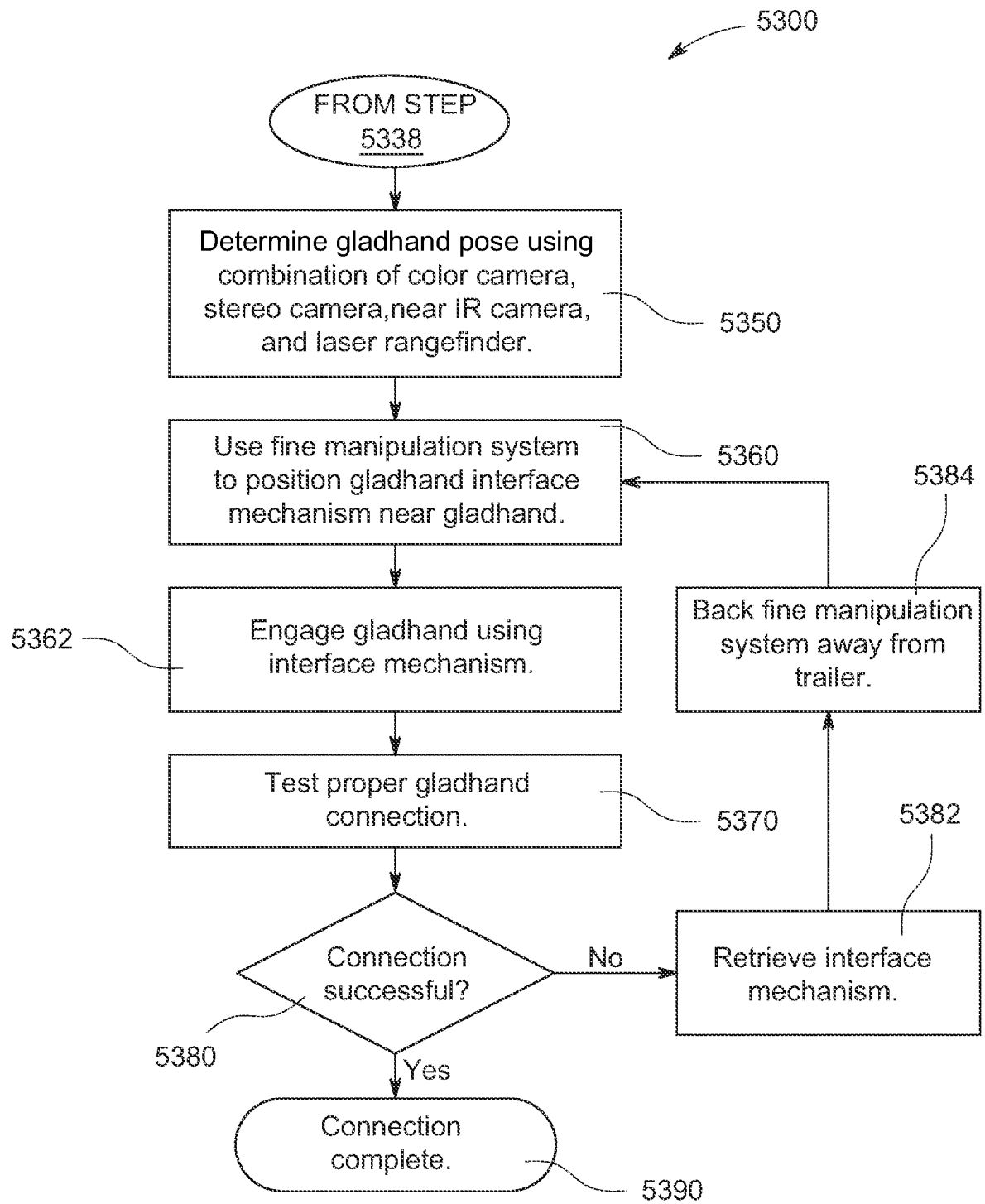

FIGS. 53 and 53A show the general procedure 5300 for operation of the gross and fine localization and manipulation for attaching truck pneumatic (or electrical) connection to the trailer glad hand using one of the connection implementations described above. The procedure 5300 begins by finding the trailer face after the system receives a connect command (step 5310). The procedure 5300 determines whether the trailer pivot/hitch angle, with respect to the truck chassis is available (decision step 5312). If the angle is available, the geometry data is provided to detect the trailer face in acquired images from the gross detection sensor (step 5314). Conversely, if the angle data is not available, then the gross sensor assembly can use (e.g.) color contrast in acquired images of the trailer front face to detect its location and dimensions (step 5316). Once determining the trailer location and dimensions, the procedure 5300 reduces the search area to the bottom region of the trailer where glad hands/glad hand panel are likely located (step 5320).

Next, the procedure 5300 attempts to locate the glad hand panel in the reduced search region, which may or may not entail 3D sensing (decision step 5322). If 3D sensing is used by the gross sensing system, then the system locates areas with geometric differences from the trailer face, and stores image features therefrom, in step 5324. If 3D sensing is not employed, the procedure 5300 can attempt to locate the glad hand panel by identifying and storing color features on the trailer face image(s) that differ from surroundings (step 5326). Based on feature information identified via step 5324 or step 5326, or (optionally) both, the procedure 5300 then ranks locations on the trailer face from highest to lowest probability of glad hand/panel presence (step 5330). This ranking can be based on a variety of factors including the prevalence of glad hand/panel candidate features, a strong pattern match of specific colors or shapes, or other metrics. Trained pattern recognition software can be employed according to skill in the art. In step 5332, the location with the highest rank is selected as the target for gross position movement of the manipulator and the end effector carrying the truck connection.

This location data is then used to guide the manipulator and end effector using the gross positioning system in step 5334. The end effector is brought into proximity with/adjacent to the candidate location whereby a fine sensor (e.g. camera, 3D scanner, etc.) assembly carried on the end effector and/or the manipulator can inspect the location for glad hand features (step 5336). If the fine sensing system verifies that glad hand features are present at the location, then the procedure uses that location for the fine manipulation process (decision step 5338). Conversely, if no identifiable glad hand features or patterns are recognized by the vision system associated with the fine sensing, then the next highest rank feature set is chosen, and (if needed) the manipulator is moved again in step 5334 to inspect the next location (step 5336). This process repeats until the glad hand is located or no glad hand is found (at which point the procedure reports an error or takes other action). Once a glad hand location is confirmed, then (via decision step 5338) the procedure 5300 estimates the glad hand pose from images acquired with the fine sensing system. The glad hand's associated mating features, including the type such as rotational or fixed, location and orientation of the rotational axis, etc. can also be determined at this time. This can include image data derived from any combination of color, stereo near IR or laser range finding, 2D and/or 3D imaging, among other modalities (step 5350). The fine manipulator is moved toward the identified coordinates of the trailer glad hand and in an orientation that matches its 3D pose. Note that the carried truck-based connector has a known pose that is correlated with the determined pose of the trailer glad hand so that they can be engaged. Visual/sensor-based feedback can be used to servo the manipulator as it approaches the trailer glad hand (step 5360). The trailer glad hand is eventually engaged in the appropriate orientation by the end effector and carried connector in step 5362. Once engaged, the connection can be secured using appropriate motions and/or actuations of the truck-based connector in accordance to any of the embodiments described above or other appropriate connection mechanisms—including, where the manipulator has been adapted, via the conventional rotational connection of a conventional truck glad hand. The connection is tested for security and success (decision step 5380). Such tests can include visual tests and/or whether the pneumatic system holds its pressure. If successful, the procedure 5300 signals success and the manipulator can disengage the truck-based connector and return to a neutral position (step 5390). If the connection test is unsuccessful (decision step 5380), then the procedure can instruct the manipulator to engage and/or retrieve the truck-based connector (step 5382). The fine manipulator is then backed away from the trailer front face (step 5384) to a sufficient location and fine manipulation steps 5360, 5362, 5370 and 5380 are repeated until the connection tests successfully. If the test is unsuccessful after a given number of attempts, then the procedure stops and sends an alert to personnel, and/or takes other appropriate action.

H. Autonomous-Only Glad Hand Adapters and Connecting Tools

Where the connection between the truck and the trailer is arranged to be implemented in a manner generally free of human intervention (i.e. autonomous-only operation), the lad hand assembly can be provided in a form more suited to automated handling—for example via a robotic manipulator. The following are glad hand arrangements for autonomous-only operation.

1. Rigid Adapter

Figure 54:
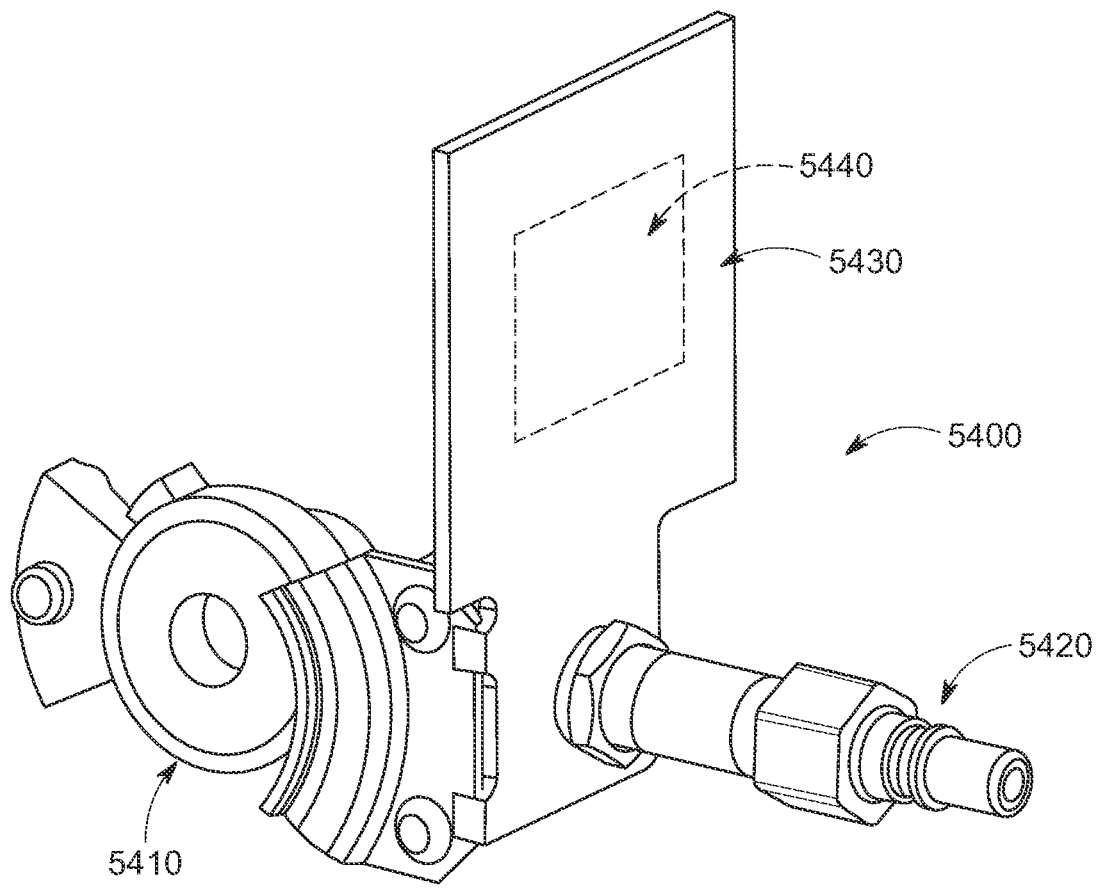
FIG. 54 is a perspective view of a direct-connection glad hand adapter for use in exclusive autonomous operation.

FIG. 54 shows an illustrative variation of the glad hand adapter 5400 that is suitable for exclusively autonomous connections. This adapter 5400 includes a conventional glad hand connection 5410 that is initially attached to the trailer glad hand (e.g. at the yard gatehouse), so that the adapter 5400 is semi-permanently attached to the trailer during yard operations. Hence, the adapter 5400 converts the standard trailer-mounted glad hand into an alternate connection mechanism for attachment of the truck airline. In this exemplary embodiment, the alternate connection is the male end 5420 of a quick-disconnect system, in which the removable (e.g. commercially available), male nipple end is provided with respect to the truck in various ways described above. The adapter is mounted so that the connector is directed outwardly, and is accessible to engagement using a robotic manipulator, probe or other truck-mounted device, which carries the truck's airline connector. Connection (e.g.) using a manipulator is facilitated by a frame-mounted panel 5430 and associated fiducial 5440 (shown in phantom) for visual recognition by an autonomous system using conventional and/or custom machine vision techniques implemented by the truck processor or a remote system server.

2. Flexible Adapter

Figure 55:
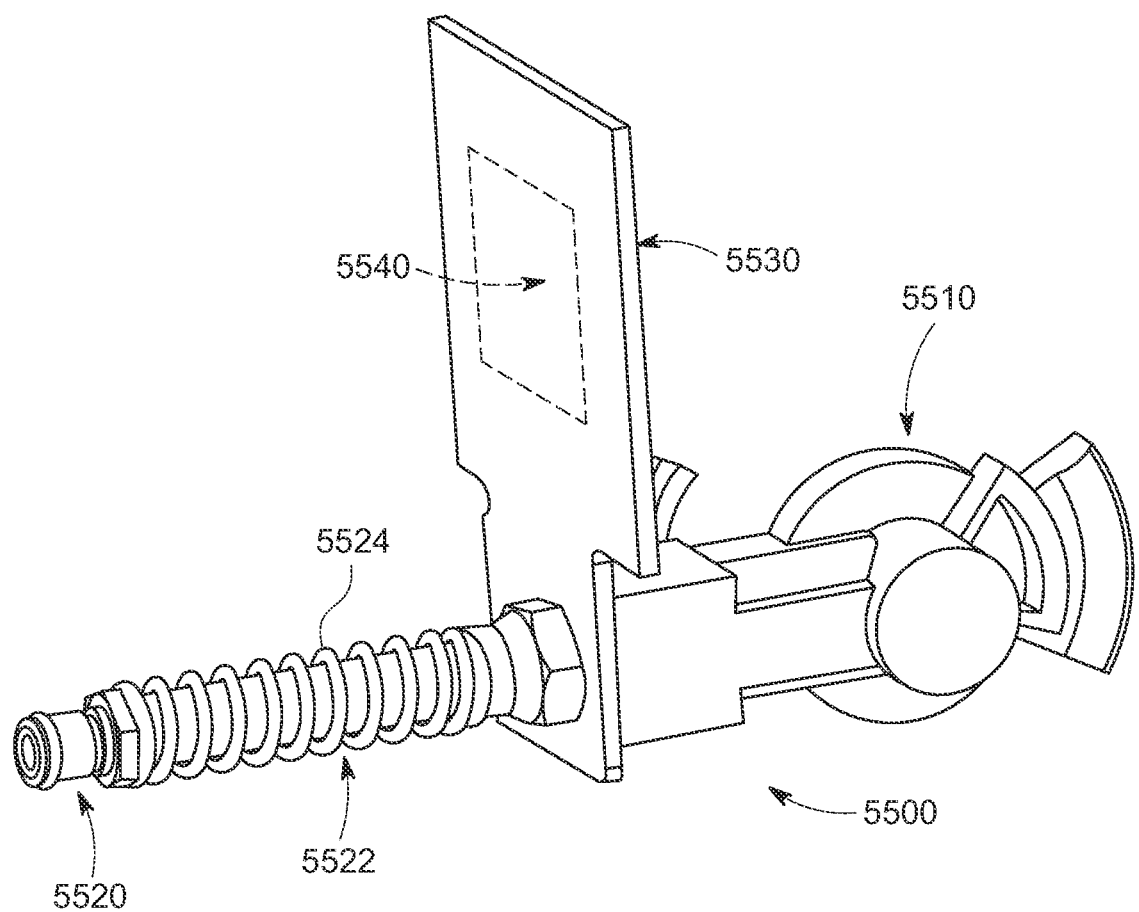
FIG. 55 is a perspective view of a direct-connection glad hand adapter for use in exclusive autonomous operation, having a flexible connector according to another embodiment.

Another exemplary embodiment of a glad hand adapter 5500, functionally similar to the adapter 5400 described in FIG. 54 is shown in FIG. 55. A conventional glad hand connection 5510 is provided. A male, quick-disconnect nipple 5520 is provided at the end of a flexible stem tube 5522 that can be reinforced with a wrapped spring 5524 in an embodiment. This tube 5522 allows the adapter 5500 to comply when making a connection with a handling tool (described below), helping to avoid possible breakage. This embodiment includes a panel 5530 with fiducial 5540 (in phantom) as described above.

3. Solenoid Release Tool

Figure 56:
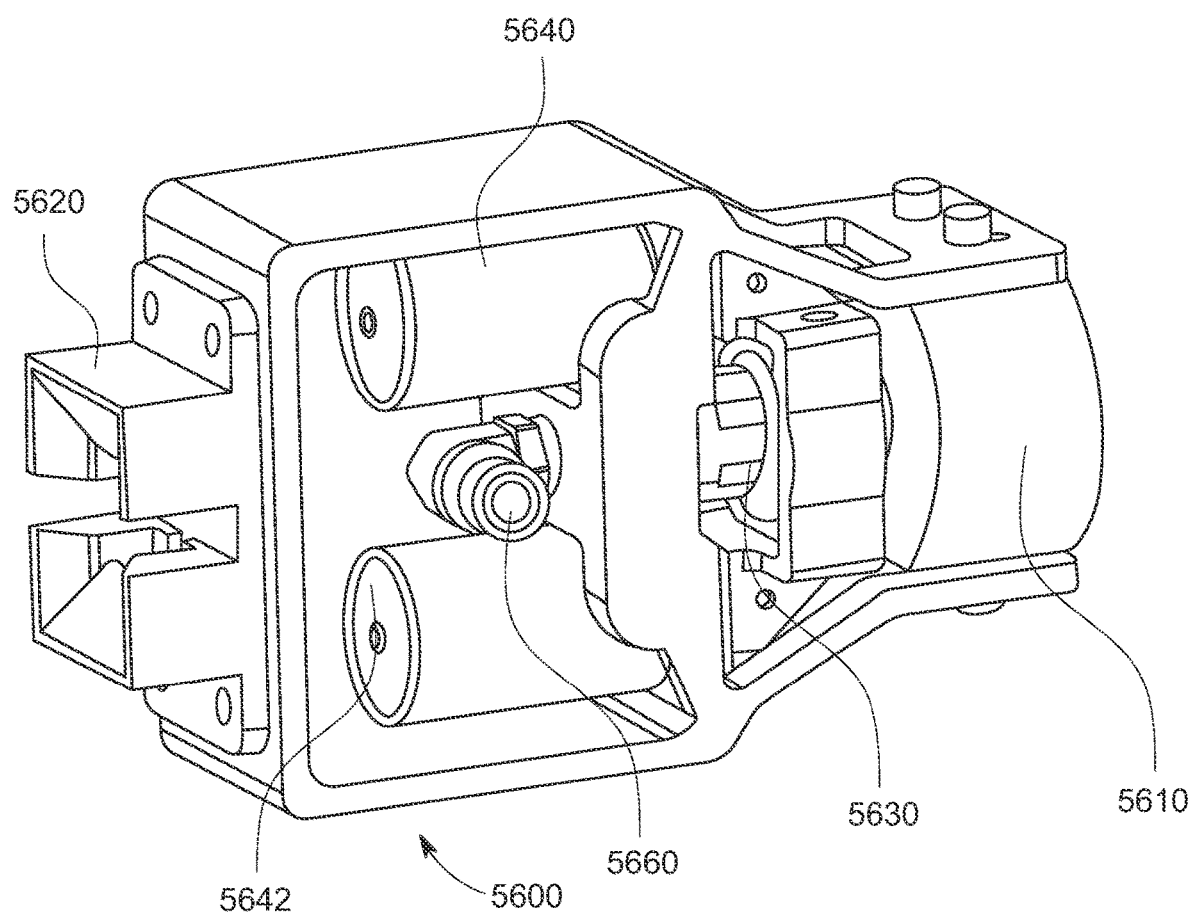
FIG. 56 is a perspective view tool for engaging and providing pressurized air to the direct-connection glad hand adapter of FIG. 54 or 55, that employs selectively powered solenoids to release, according to an embodiment.
Figure 57:
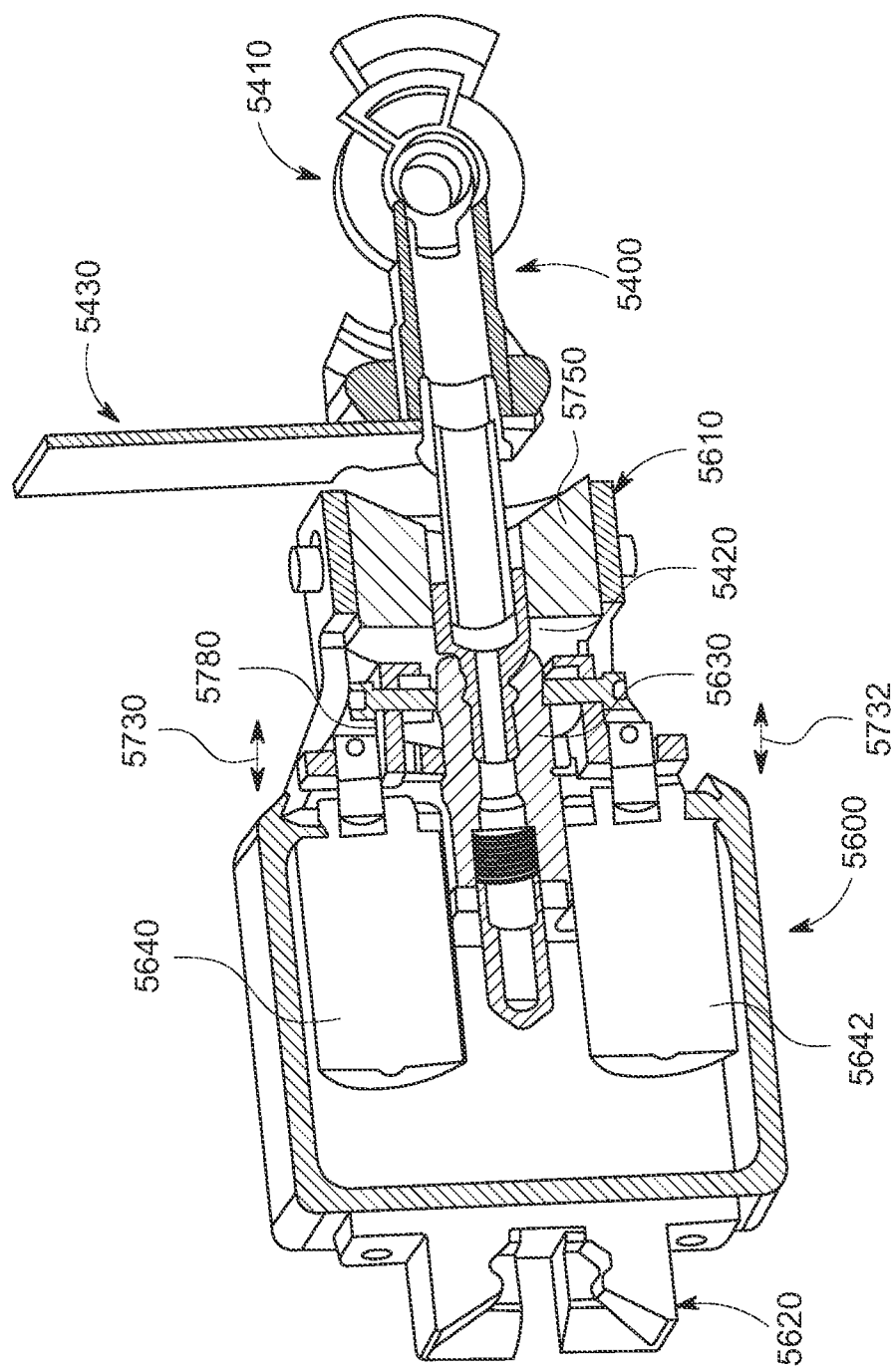
FIG. 57 is a side cross-section of the tool of FIG. 56 shown interconnected with the adapter of FIG. 54.

A tool 5600 that is adapted for connection with an autonomous-only adapter (e.g. 5400 and 5500 above) is shown in FIGS. 56 and 57. This tool 5600 is capable of delivering air and power from a truck to a trailer. It contains a mechanical locking mechanism (locking cone 5610) to maintain engagement of the tool with the adapter (5400 in FIG. 57). The tool 5600 further includes a gripper interface 5620 for retrieval by a robotic arm (described above). This interface 5620 can contain fiducials (not shown) for finding the tool 5600 (using a vision system) after it has been left on a trailer, secured to the adapter. The tool's air connection mechanism 5630 can include a female quick-disconnect-style fitting adapted to engage the male nipple 5420 of the adapter 5400 in a manner described herein and known to those of skill. The mechanism 5630 contains a mechanical locking collar 5720 that is actuated by (e.g.) two electromagnetic solenoid cylinders 5640, 5642 that displace the collar 5720 linearly (double-arrows 5730 and 5732, respectively). The solenoid assembly 5540, 5642 can be activated when the tool 5600 is to be retrieved off of the glad hand adapter 5400. The front of the tool 5600 contains a frusto-conical location structure 5750 to ensure proper alignment with the adapter nipple 5420 for engagement. The solenoid assembly 5640, 5642 can be actuated using a switched power source wired directly from the truck with contacts built into the gripper and the base 5620. When the gripper is engaged it allows the solenoids to be selectively energized by operation of the connection system. The tool 5600 includes an air outlet/fitting 5660 that is permanently connected to the treaded end of a truck-based airline.

4. Pull-to-Release Tool

Figure 58:
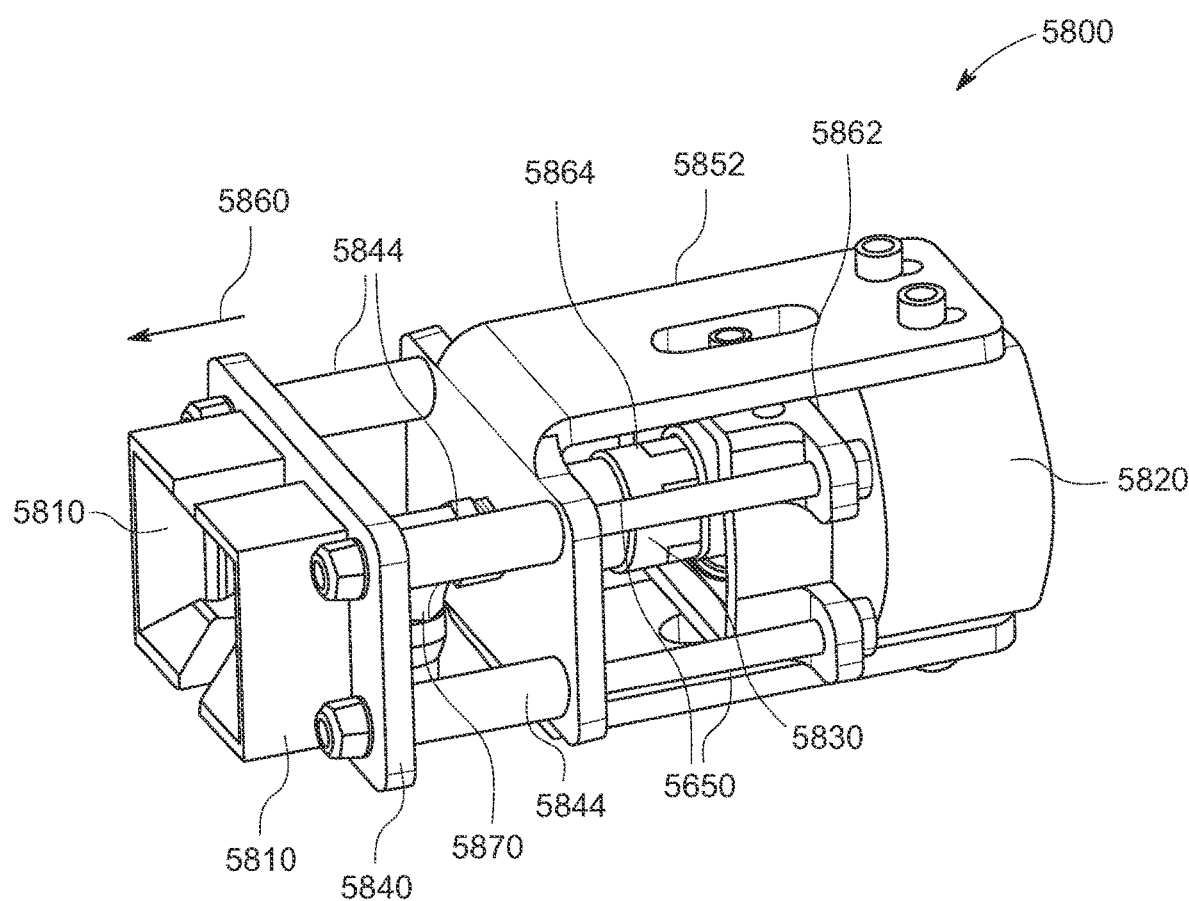
FIG. 58 is a is a perspective view tool for engaging and providing pressurized air to the direct-connection glad hand adapter of FIG. 54 or 55, that employs a pull-motion to release, according to an embodiment.

Another exemplary embodiment of the tool 5600 is shown in FIG. 58. This tool 5800 uses a gripper connection 5810 at a rear of the framework and an aligning locating cone 5820 at the opposing end for engaging a nipple, as described above. A similar female quick-disconnect assembly 5830 to that of the tool 5600 is provided. The tool 5800 defines a sliding framework in which a rear plate 5840 and a front plate 5842 are separated spacers 5844 on rods 5850. The front plate 5842 is integral, or unitary, with the front framework 5852 that supports the locating cone 5820 and non-sliding portion of the female quick-disconnect 5830. The rear plate 5840 can slide rearwardly (arrow 5860), drawing back the rods 5850 and a carriage 5862. The carriage is secured to the spring-loaded (normally forward-biased) outer sleeve 5864 of the quick-disconnect. Thus, drawing back the rear plate 5840, draws back the sleeve 5864, relative to the fixed portion of the quick-disconnect, allowing it to be unlocked. In this embodiment, on-board actuators—such as the solenoids 5640, 5642 of the tool 5600—are thus omitted and unlocking of the quick disconnect is performed by drawing back the gripper in the direction of arrow 5860. This avoids the need for an on-board, powered actuation mechanism in this embodiment. The air outlet 5870 (connecting to the truck airline) is located on the longitudinal, central axis of the tool 5800, and is fixed to the frame 5852 in a non-sliding manner.

5. Pull-to-Release Tool with Cylindrical Gripper Interface

Figure 59:
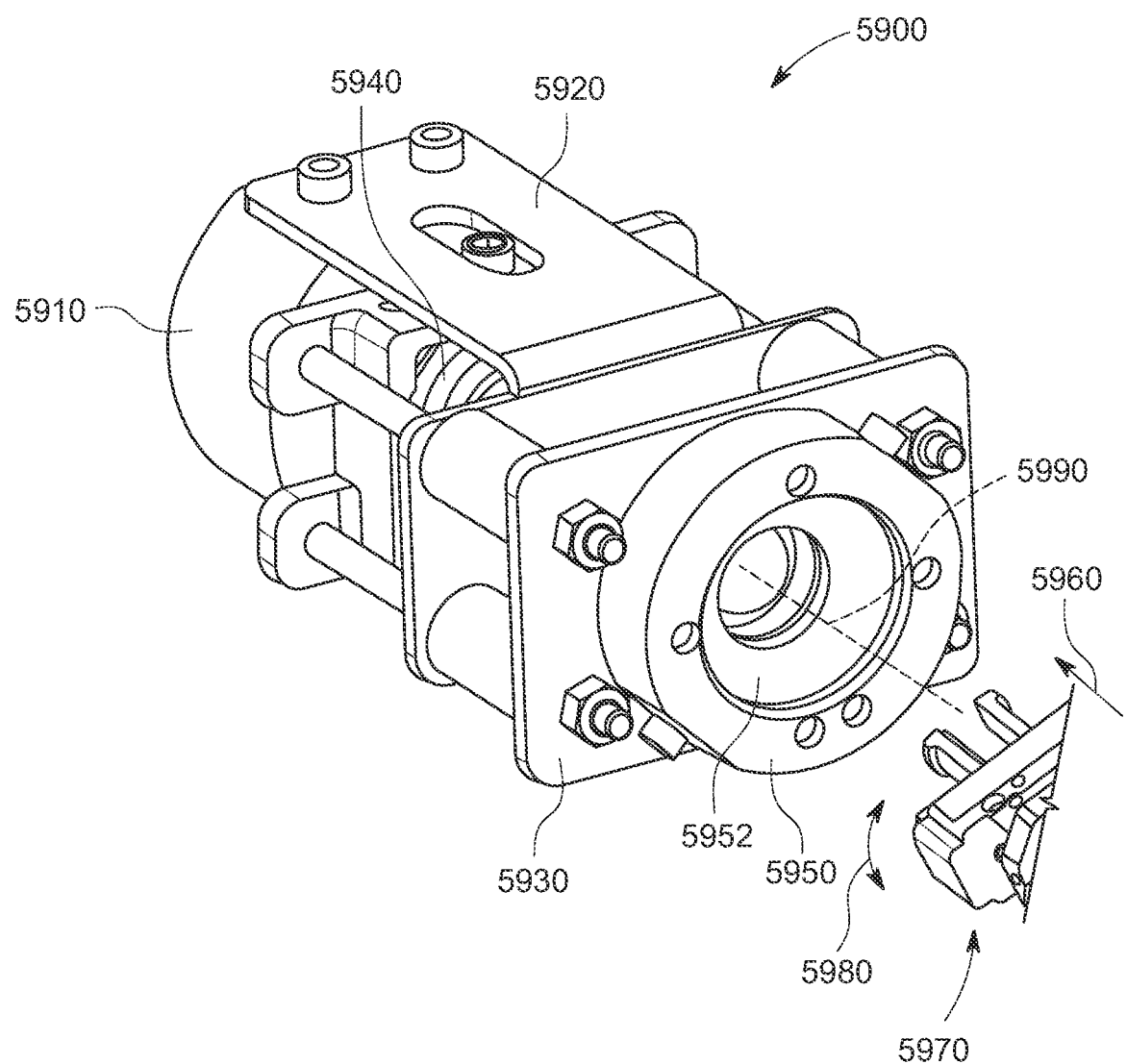
FIG. 59 is a is a perspective view tool for engaging and providing pressurized air to the direct-connection glad hand adapter of FIG. 54 or 55, that employs a pull-motion to release and includes a cylindrical gripper interface, according to an embodiment.

FIG. 59 shows a tool 5900 according to a further exemplary embodiment, which operates on the pull-to-release principle described with reference to FIG. 58. Hence, the locating cone 5910, fixed frame 5920 and sliding rear plate 5930 operate similarly to those of the tool 5800 of FIG. 58 to unlock a central, female quick-disconnect fitting 5940. The gripper base 5950, which is mounted on the rear side of the rear plate 5930 defines an annulus, with a frustoconical guiding funnel 5952. This structure is adapted to receive an inserted (arrow 5960) gripper 5970 at any rotation (double-curved arrow 5980 about the longitudinal central axis (dashed line 5990) of the tool 5900.

6. Systems with Integrated Compliance

FIG. 69A is an exploded view of a multi-axis fine manipulation robotic arm with an end effector, a connection tool, an adaptor, and a trailer glad hand according to an exemplary embodiment. Note that the robotic systems described herein can be a collection of rigid components that can be used to make a rigid connection to a trailer. However, in various embodiments, minor errors in the mechanical system, calibration, or perception could cause misalignment between the manipulation robotic arm and other components, which could cause binding or even prevent a successful connection. Compliance can be integrated into the system's structure and/or function to allow sufficient flexibility to decrease the incidence of bindings and failed connections. The compliance mechanisms can be active, and can include sensors and feedback-based actuators/controllers. Alternatively, the compliance can be passive, and can include one of more elastically deformable components along the overall construction. In various embodiments, compliance can be integrated into the robotic manipulator arm 6940, the end effector 6942, the connection tool 6944, and/or the adaptor 6946.

In various embodiments, the robotic manipulator 6940 arm can be actively compliant. The control system can monitor the loads on the motor at each joint, and can then calculate the load at the end of the robotic arm. As the robotic manipulator arm 6940 moves to make a connection, it can monitor the loads and can move in response to the sensed loads to reduce forces in undesirable directions. By way of non-limiting example, if the robot is performing a linear motion, then the control system can know that any non-axial force is a product of binding, and the control system can adjust the orientation to reduce the non-axial loads and reduce the binding.

In various embodiments, an end effector 6942 can include a force torque sensor 6948. The force torques sensor can provide feedback to the control system regarding forces and torque on the end effector in up to 6 directions, so that the control system can provide real-time adjustments to manipulation trajectories in order to minimize binding. In various embodiments, the sensor 6948 can also include a collision sensor that can detect if the system is misaligned. The collision sensor can provide feedback to the control system if the lateral offset of the system has moved beyond a desired threshold. If the threshold is reached, then the robotic manipulation arm can move in the reverse direction to relieve possible binding.

In various embodiments, an end effector 6942 can include an end effector compliance device 6950. The end effector compliance device 6950 can be an elastic device that can tolerate misalignment in any direction, The compliance device can flex to allow the end effector to move when making connections to reduce the chances of binding, In various embodiments, compliance may be desired during a connection with a trailer, but may not be desired at other times, so the end effector compliance device 6950 can have a lockout feature that prevents the end effector compliance device from being compliant. In various embodiments, the grippers on the end effector can be constructed and arranged to provide compliance, allowing an appropriate level of flexure at the end effector stack.

FIG. 69B is a perspective view of an adaptor tool with fiducial markings and a compliant tube. The adaptor tool(s) 6946 can be attached to the glad hand on a trailer to facilitate connection to the truck airline. The adaptor tool can have a glad hand end 6952, a male linear insertion connection nipple 6954, such as a male quick disconnect nipple, a flexible stem tube 6956, and one or more fiducial markers 3910. The flexible stem tube 6956 can be made from a rubber and/or another elastic material that can provide desired compliance in the event of a misalignment in the system, such as a misalignment between the connection tool 6944 and the adaptor tool 6946. The flexible stem tube 6956 can laterally adjust to any misalignment in the system.

FIG. 69C is an exploded side view of a fiducial-based, vision guided connector tool with an integrated compliance mechanism. The connector tool 6944 can define generally a truck interface end 6958 and a trailer interface end 6960. In various embodiments, the truck interface end 6958 and the trailer interface end 6960 can rotate freely relative to each other about a longitudinal axis, as described further below. The truck interface end 6958 of the connector tool 6944 can be held by an end effector of a robotic manipulator arm on a truck, and the trailer interface end 6960 can be biased into engagement with an adaptor tool that has been engaged with the glad hand on a trailer. The trailer interface end 6960 can include a female linear insertion connector 6962, such as a conventional, or customized, female quick-disconnect connector for making an airline connection with the adaptor tool. The trailer interface end 6960 can further define a broad bell-shaped or funnel-shaped opening 6963 to guide the stem tube and male nipple of the adaptor tool 6961 (shown in phantom in FIGS. 69C and 69D) into position within the connection tool, and into engagement with the female connector 6962. The connection tool 6944 can have a hose point 6963 on the female quick-disconnect 6962 that can be used to attach the airline from the truck to the connection tool, so that the connection tool can be one part of an airline between the truck and the trailer. The portion of the connection tool 6944 between the hose point 6963 and the trailer interface end 6960 can be referred to as the airline connection body 6965.

The pressurized airline quick-disconnect coupling arrangement 6961, 6962 can provide a central feature in the above-described tool. The coupling is pushed to connect in which bars (rather than balls shown above) in the female fitting 6962 latch around the male fitting 6961. With reference to FIGS. 69F-69H, operation of the coupling arrangement is described in further detail. In a decoupled state (FIG. 69F), the collar 6981 of the female fitting is withdrawn, allowing the locking bars (or balls) 6983 to retract and the male fitting 6961 to release. The collar encases a sliding seal/air-delivery component 6984 that is passed distally by a compression spring 6985. A linear actuator (powered by (e.g.) a solenoid or pressure cylinder) 6986 selectively drives the collar 6981. It is de-energized in FIGS. 69F and 69G, in which the disconnect 6962 is unlocked with respect to the male connection 6961. The connector is couples as shown in FIG. 69G by driving it (arrow 6988) onto the male connector 6961 while the actuator 6986 remains de-energized. As shown in FIG. 69H, the actuator 6986 is then energized to drive (arrow 6987) the collar 6981 distally so as to place the locking bars/balls 6983 in a locked orientation with respect to a receiving rim of the male connector 6961. The spring 6984 compresses the seal 6985 against the tip of the male connector 6961 to complete and maintain a sealed, pressurized air circuit.

An alternate embodiment of a quick-disconnect coupling can provide positive pressure that causes another set of bars (or balls) to latch onto the male fitting 6961. This can provide positive engagement whenever pressure is applied to the male fitting, which thereby prevents accidental unlatching of the fitting during use. When the pressure is removed, the air-powered bars lose their locking force, and only the standard mechanical force remains. This positive air locking tool can be used with or without the standard mechanical locking of a quick disconnect.

With further reference to FIGS. 69I and 69J, the truck interface end 6958 can have a cap 6964 that can be rotatable. The end cap 6964 can have a gripper interface 6966 that can include a bell-shaped or funnel-shaped opening that can help to guide an appropriately shaped end effector into position in engagement with the connection tool 6944. The end cap 6964 defines a truncated, four-sided pyramid in this embodiment, with each (cut-off) corner including a fiducial (for example a unique QR or similar 2D barcode 3910, which identifies the relative spatial orientation and location of the endcap using a machine vision system (described variously herein). In exemplary embodiments, the gripper interface 6966 can have an inner pocket 6968 defined by a constricting ridge 6970, so that the end effector can use the inner pocket and gripper interface to help secure the connection tool 6944 to the end effector (FIG. 69I). The end cap 6964 can be rotatable, and can be connected to the trailer interface end at an annular bearing 6972, so as to allow the rotatable cap 6964 to rotate relative to the hose point 6962. The trailer interface end 6960 and the hose point 6962 can, thus, rotate freely relative to the gripper interface 6966 and the interconnected robotic manipulator. By allowing free rotation between the hose point 6962 and the gripper interface 6966, the likelihood of wrapping the truck airline around the connection tool or around robotic manipulator arm can be reduced while the robotic manipulator moves through multiple dimensions and degrees of freedom in moving the connection tool into engagement with the adaptor tool.

The robot arm can move the connection tool in a linear path to attach or remove the connection tool from the adaptor tool. Because minor misalignments or inaccuracies in the detection of the adapter location can lead to possible binding during attachment, the connection tool 6944 can have incorporated compliance features that are part of an associated compliance assembly 6981 (shown separately in FIG. 69E). The connection tool compliance features can include a plurality of bolts 6974 that can pass through oversized holes on the airline mounting plate 6982 that carries the funnel connection body 6965, and can have a positive compliance spring 6978 and a reverse compliance spring 6980 on each bolt 6974. The bolts are seated on a base plate 6976 that is adjacent to the bearing 6972. The springs can be adapted to exert a force that pushes the trailer interface end away from the truck interface end, and can allow the two ends to flex towards each other and/or flex at an angle relative to each other during a connection event so as to allow connection of the connection tool to the adaptor even in the event of misalignment. The springs can be constructed and arranged to hold the tool straight when held in a horizontal position, and can provide a predetermined level of resistance for compliance. The reverse compliance springs and the positive compliance springs push in opposite directions on an airline mounting plate 6982 that extends outward from the airline connection body 6965, so that the bolts and springs support the airline connection body of the connection tool in a floating position relative to the rotatable cap 6964 when the connection tool is in a resting state. In a resting state, the springs also hold the bolt heads firmly against the mounting plate 6982 of the truck interface end. As the connection tool 6944 is pressed into engagement with the adaptor, one, some, or all of the springs can be compressed to allow the connection tool to flex at an angle, thereby reducing the incidence of binding between the connection tool and the adaptor.

7. Line Management

The system can have various means for reducing the incident of tangling or other interference between an airline and/or electrical line, and other components of the system including the robotic manipulator arm. The term "line" can be used herein to refer to either air hoses or electrical cables, and it should be clear that "lines" can refer to either or both air hoses and/or electrical cables. As the system operates to connect and/or disconnect various lines, solutions explained herein can assist in managing the interaction of the manipulation system and the associated lines. Without these line management solutions, various failures can occur. These failures can include an engaged manipulator-line interference, where the manipulation system is carrying a tool in its end-effector that has a line grounded to the vehicle, and the manipulator motions can cause the line to wrap or become entangled with the geometries of the manipulator itself. The failures can include an engaged world-line interference, where the manipulation system is carrying a tool in the end-effector that has a line grounded to the truck, and the manipulator motion can cause the line to become entangled with geometric features of the world unrelated to the manipulator, such as mechanical components on the vehicle or the trailer. The failures can also include unengaged manipulator-line interference, where the manipulator is not carrying a tool, but there are still lines that exist in the workspace of the manipulator arm, and the manipulator arm can become entangled while moving. Various solutions are described herein for addressing each of these types of interference. In various embodiments, combinations of arrangements of components, and their associated operation, can be used collectively to minimize the probability of interference. These arrangements can include mechanical implementations and/or software/algorithmic implementations.

a. Mechanical Solutions

As described above, mechanical solutions can include passive tool rotation, such as the free rotation between the rotatable cap 6964 and the airline connection body 6961 shown in FIG. 69C. A variety of tools used by the manipulation system during operation can have lines grounded to the vehicle. For example, a tool for delivering air to the emergency brakes on a trailer has an air hose routed to an on-vehicle compressor. One technique for avoiding interference while a line-grounded tool is engaged with the manipulation system is a passive, under-constrained tool connection. When the end-of-arm connection between the tool and the line is under-constrained (i.e. has degrees-of-freedom), many desirable motions of the arm can avoid line-manipulation interference. Passive rotation of at least one component in the system can prevent the line from wrapping or otherwise becoming entangled. Adding active sensors to monitor the passive rotation can also provide information to improve the functionality of some algorithmic solutions, explained more fully below.

Mechanical solutions can also include line tension management. By keeping the vehicle-grounded lines under tension while they are engaged with the manipulation system, predicting the motion of the lines and detecting potential interferences can be easier. Tension in the line can simplify the mechanical modeling of the line motion, and sufficient tension can allow a dynamic model to ignore second-order effects. This can result in improved modeling accuracy and broadly-applicable models that can be less reliant on line-specific material parameters. By sensing the tension and actively modulating the tension, the system can ensure that the tension is sufficiently high to enable simplified modeling. Furthermore, if the tension level sensed by the tension system deviates from the tension felt by the manipulation system, this likely indicates an unplanned interference. By also sensing the position of the tensioning system, unplanned interferences can be detected. Known geometries of the tensioning system and the manipulation system can lead to accurate predictions of the required motion of the tensioning system to maintain a given tension for a particular manipulator motion. If deviations from this nominal motion are encountered, this may indicate that the line is not following the minimal predicted path due to an interference.

In various embodiments, mechanical solutions can include routing lines along the degrees-of-freedom of the robotic manipulator arm. A feeding system can be used to feed out and retract the line as needed. By routing the lines along the robotic manipulator arm, the effective ground for the line can become the end of the manipulation system, which can eliminate the possibility of engaged manipulator-line interferences. Furthermore, by shortening the total length required of a line, this routing can also reduce the possibility of other types of interference. Note that an example of a cable management system for use in routing cables along robotic manipulator arms, such as those contemplated for use herein, is commercially available from First Industrial Supplies of Santa Monica, California, and can optionally include a cable feeding and retraction system such as the one commercially available from Fronius in Portage, Indiana.

b. Algorithmic/Process(or) Implementations

An exemplary implementation for avoiding expected types of line interference entails prediction of the locations of lines, and then using 2D and/or 3D "keep-out" (avoidance) shapes to avoid/omit motion plans for the manipulator arm that would result in interferences. During operation, the system uses environmental perception sensors, such as cameras, LIDAR, and/or other spatial sensing arrangements, along with environmental modeling to define a scene that represents the surrounding environment. The scene informs the manipulator arm motion planning algorithms as to where the manipulator arm can move safely. Given a desired task (e.g. move the attached tool to a particular pose), the motion planning system can query the imaged scene to ensure that a possible manipulator trajectory does not result in any invalid motions that would result in tangles or other failures. The system can prevent the manipulator from following a motion plan that would result in tangling, pinching, or other damage to the line, or damage to other components. The scene can include vehicle geometries, manipulator geometries, and various world geometries that can be constructed from geometric primitives and meshes. The scene can be parameterized by configurations of the manipulator. In other words, based upon a particular configuration for the manipulator, the system can determine if any collisions can occur between various combinatorics geometry pairs. That is, a motion is a sequence of manipulator configurations, and a valid motion is one in which none of the configurations, or the paths between configurations, result in disallowed collisions or violations of defined position, velocity, and acceleration manipulator constraints. The use of keep-out shapes can combine sensing systems, dynamic models, and heuristics to add world geometries in order to avoid motions that may result in undesirable interferences. Different types, sizes, geometries, etc. of keep-out shapes are expressly contemplated for muse in the procedures herein.

Keep-out shapes can be static. In some operational implementations/scenarios, it can be challenging to derive detailed information about the exact geometry of a line. In these situations, a conservative approach can involve insertion of oversized static shapes that eliminate the possibility of interferences. By way of non-limiting example, an airline can be connected to a tool that can be, in-turn, connected to the emergency brake glad hand on a hitched trailer. Before the pose of the tool has been determined, the system can insert an infinite plane into the planning scene that can prevent the manipulator arm from coming too close to the trailer, including preventing the manipulator arm from coming closer to the trailer than its default configuration.

Keep-out shapes can also be model-informed. In some operational implementations/scenarios, the system can have information regarding where a tool is located in the world, and where the tool's attached line is grounded, and then the system can use quasi-static or dynamic models to predict the path of the line. In various embodiments, these line paths can be stochastic in nature. Given a path prediction, geometric shapes that provide conservative, or oversized, geometric coverage of the possible path can be inserted into the scene to prevent motions of the manipulator arm that would intersect with the line path.

Keep-out shapes can also be sensing-informed. The system can involve a variety of sensing systems for providing awareness of the surrounding environment. If any of these sensing systems detect information about a line's path, that information can be added into the planning scene. Incomplete path information can occur, and can still be used to inform or augment model-informed keep-out shapes.

Algorithmic solutions can also include constrained motion planning. In a model with constrained motion planning, motion validity can include arbitrary constraints on manipulator configuration, velocity, and/or acceleration. A candidate motion can be considered valid if it meets the conditions outlined above, and also satisfies any further-defined manipulator constraints. These additional constraints can include ensuring the orientation of a manipulator link lies in a subset of SO(3) throughout a motion, which means that it maintains the ability to move in one or more of roll, pitch, and yaw degrees of freedom. The constraints can include ensuring the total winding number of a particular manipulator link's trajectory projected onto a plane does not exceed a predetermined threshold. The constraints can include ensuring the maximum extent of a manipulator link in a particular direction does not exceed a predetermined threshold.

Algorithmic solutions can also include line simulation. Given a valid motion that satisfies all scene requirements, including keep-out shapes and constraints, in various embodiments it is desirable to run the motion plan through a simulation engine to detect any potential line interferences issues before actually executing the motion plan. If interferences are detected, or deemed likely to occur, after the simulation, the motion plan can be rejected.

8. Use of Fiducial Markers

Referring again to FIGS. 69B-69D, the connection tool 6944 can include one or more fiducial markers 3910 on the truck interface end 6958, on the truck-facing surface of the rotatable cap 6964. The fiducial markers 3910 can also be arranged on the adaptor tool 6946, so that a camera that is on the truck, on the robotic manipulator arm, on the end effector stack, or on another location facing the front face of the trailer can see the fiducial markers 3910. The connection tool 6944 and the adaptor tool 6946 can both include one or more fiducial markers 3910. These fiducial markers are adapted to assist in the pose localization of objects related to connecting and disconnecting a trailer from a truck. These fiducials can provide various information to the system through sensor streams including cameras and LIDARs.

The fiducials on the various components, including on the connection tool 6944 and/or the adaptor tool 6946, can provide information that can include identifying the object bearing the fiducial marker(s), such as identifying the connection tool or the adaptor tool. The fiducial marker(s) can also provide information regarding the gross location in image space (2D), a six degree-of-freedom pose location, and/or real-time sensor/device calibration. The fiducial markers can provide information that is directly encoded in the markings themselves, and the sensors can also use the fiducial markings to determine the location and/or orientation of the marked objects in space. By providing more than one fiducial marker on a truck-facing surface can allow sensors, such as cameras on the truck, robotic arm, and/or end effector stack, to triangulate position using the multiple fiducial markers, so that the location and orientation of the marked object can be determined relative to the sensor with a high degree of accuracy. This accurate location and orientation information can then be used in connecting the connection tool to the adaptor tool, and can be used in grasping a connected connection tool with the end effector stack to disconnect the connection tool from the adaptor tool.

Bundling or pairing together multiple fiducial markers 3910 on a rigid surface can also increase the likelihood of detection and pose estimation of the marked object by the system. The bundled fiducial markers can contain additional fixed information to assist in object manipulation or object collision avoidance. These single or bundled fiducials can assist in swift recovery of tools after a trailer maneuver has been performed. The trailer maneuvers can consist of multiple parts, and any of the maneuver parts can change the pose of a tool after the tool has been connected to the trailer. The maneuver parts that can change the pose of the tool can include for example, changing the fifth wheel height, changing the angle of the trailer relative to the truck, and rotation of a glad hand. A database can include information regarding a tool pose after a maneuver, and the system can use that information along with the fiducial markers to improve detection of the components and rule out detection outliers. The utilization of various metrics can also contribute to the quality of a connection point, and the quality of an assessment of the connection point, based on fiducial markers. These metrics can include, for example, calculations such as re-projection comparison of relative detected positions of identified fiducial markers against known values, and the computation of inliers compared across different pose determination algorithmic processes.

In various embodiments, the fiducial markers can have a coating 6984 of a hydrophobic surfactant or surface treatment. This coating can affect the surface energy and wettability properties of the surface of the fiducial marker to mitigate the accumulation of distorting water droplets. The coating 6984 can create a hydrophobic, water repelling surface, which can result in improved visibility in wet weather conditions.

I. Autonomous-Favored Glad Hand Adapters and Tools

Figure 60:
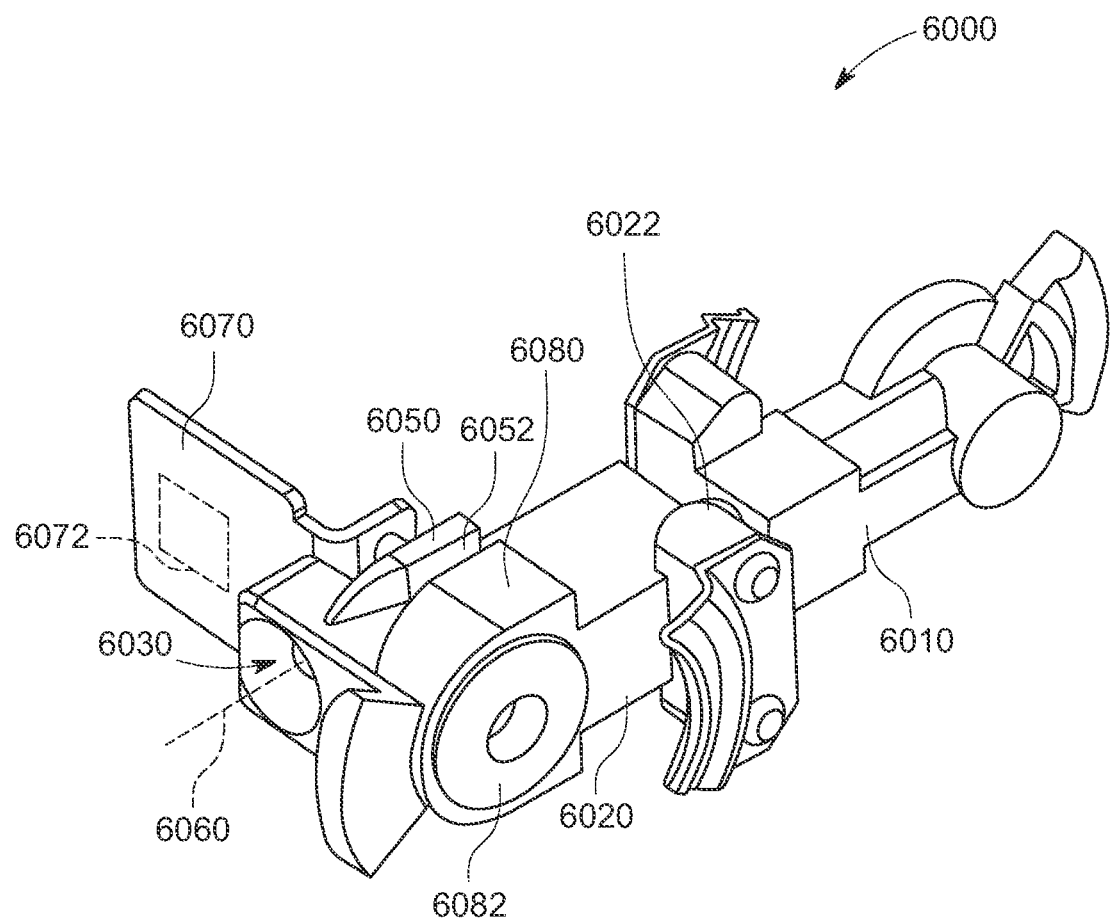

FIG. 60 shows an adapter that is used in scenarios where a manual attachment of the glad hand is still contemplated in an autonomous operating environment. The adapter arrangement 6000 is arranged so that the same connection interface as a conventional, manual connection is employed, but fiducials and alignment mechanisms are added to this adapter arrangement 6000 to enable an autonomous connection system to find and connect to the arrangement. As shown, a standard glad hand 6010 on the trailer-side is connected (e.g. using threaded pipe fittings 6022) to an autonomous capable glad hand 6020 on the truck-side. The same interface exists for connection with an over the road truck's glad hand, but a new interface is added to the back of the autonomous glad hand for alignment. The interface contains a gross alignment cone 6030, and two rotation alignment posts/vanes on the top (6050) and bottom (not shown), that define slots (top slot 6052 shown). The gross alignment cone 6030 allows a corresponding gripper-mounted tool (described below—FIG. 61) to assume a proper position, and the posts/slots ensure the tool is rotated (about longitudinal axis 6060) to the correct angle correctly before engagement. A fiducial plate 6070 and associated fiducial 6072 (shown in phantom) is used to assist in locating the glad hand 6020, and servoing of the gripper tool into engagement with the glad hand 6020. The glad hand base 6080 is arranged in the form of a conventional glad hand geometry for use of either a conventional, manual (twist-lock) glad hand connection on the truck airline, or a manipulated connection tool sent by the truck's autonomous system, as described below.

Figure 61:
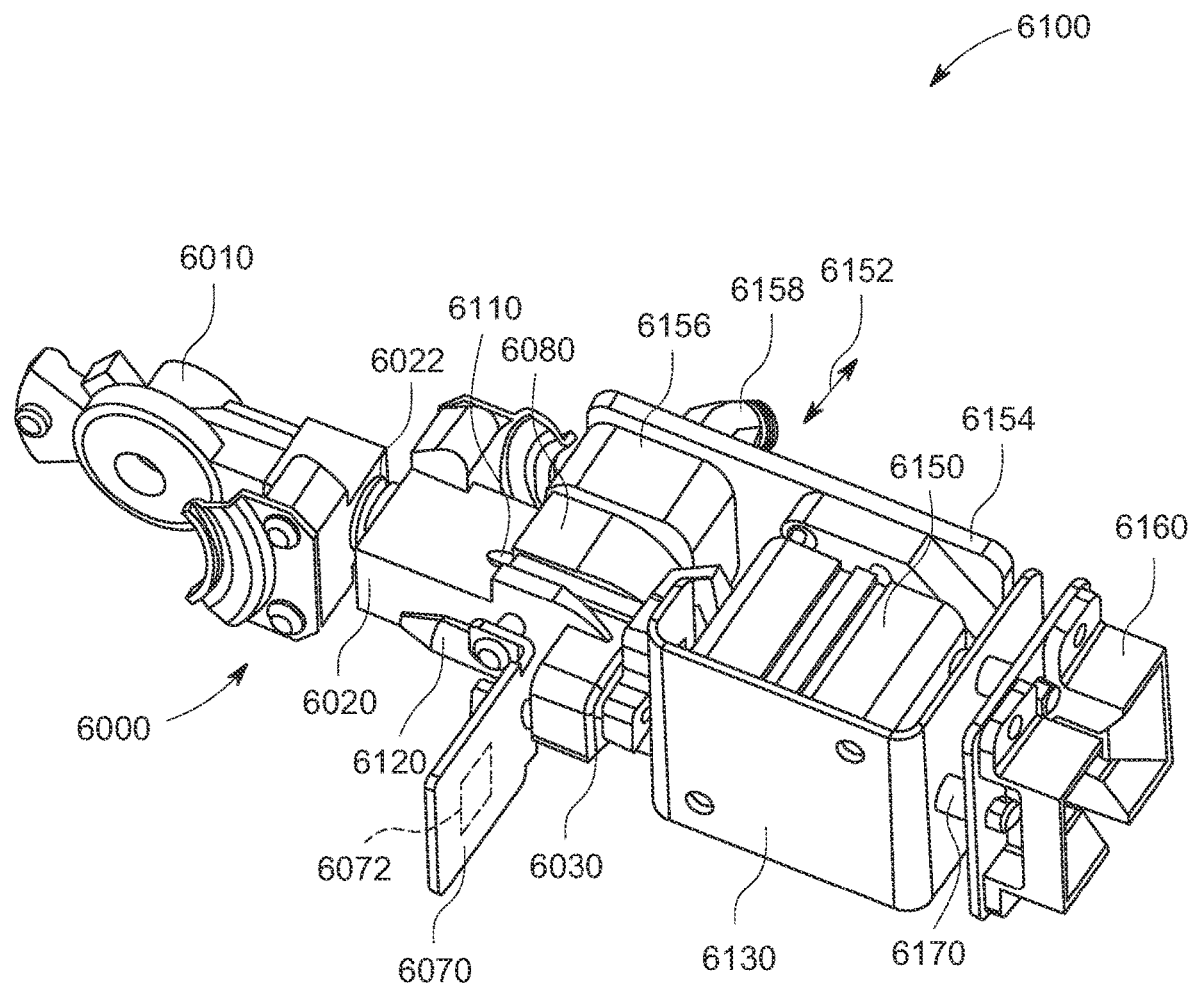

To assist connection of a tool to the glad hand adapter arrangement 6000, a glad hand adapter connection tool, an example of which is shown in FIG. 61, contains top and bottom angle location pins (top pin 6110 shown) and a main locating pin 6120 (shown engaging the alignment cone 6130), all of which ensure proper rotational and angular alignment of the tool 6100 with respect to the adapter arrangement 6000. More particularly, the main location pin 6120 provides an initial location mechanism for the tool 6100 upon approach with the arrangement 6000. The angle adjustment pins 6110 thereafter ensure that the tool 6100 is in the correct orientation before connection. The autonomous manipulator and control system can sense once the pins have bottomed out, and use that sensed impulse to make the clamp connection.

The clamped connection of the tool 6100 with respect to the glad hand base 6080 is facilitated using a pneumatic cylinder 6150, that selectively operates to move (double-arrow) 6152 a baseplate toward and away from the glad hand base 6080 and the tool framework 6130 (that carries the pins 6110, 6120, etc.). The plate 6154 carries a block 6156, with an attached air inlet 6158. The block 6156 seals against the base gasket (6082 in FIG. 64) cylinder is moved into a clamped position. This also ensures that the overall arrangement remains secured together during truck operation. The air inlet 6158 is connected to the truck airline. Note that the use of a pneumatic cylinder 6150 to actuate clamping and connection of the tool is by way of example. Other equivalent actuators, such as electric solenoids, spring-loaded systems, etc., can also be employed. A gripper interface/base 6160 is provided on the rear of the framework 6130. An appropriate gripper and manipulation system, as described generally herein, can be employed to attach and remove the tool 6100 from the arrangement. Elastomeric (e.g. rubber, urethane, etc.) dampers 6170 can be used to mount the gripper interface/base 6160 to the framework 6130 to provide compliance as the tool 6100 is handled by the manipulator.

Figure 62:
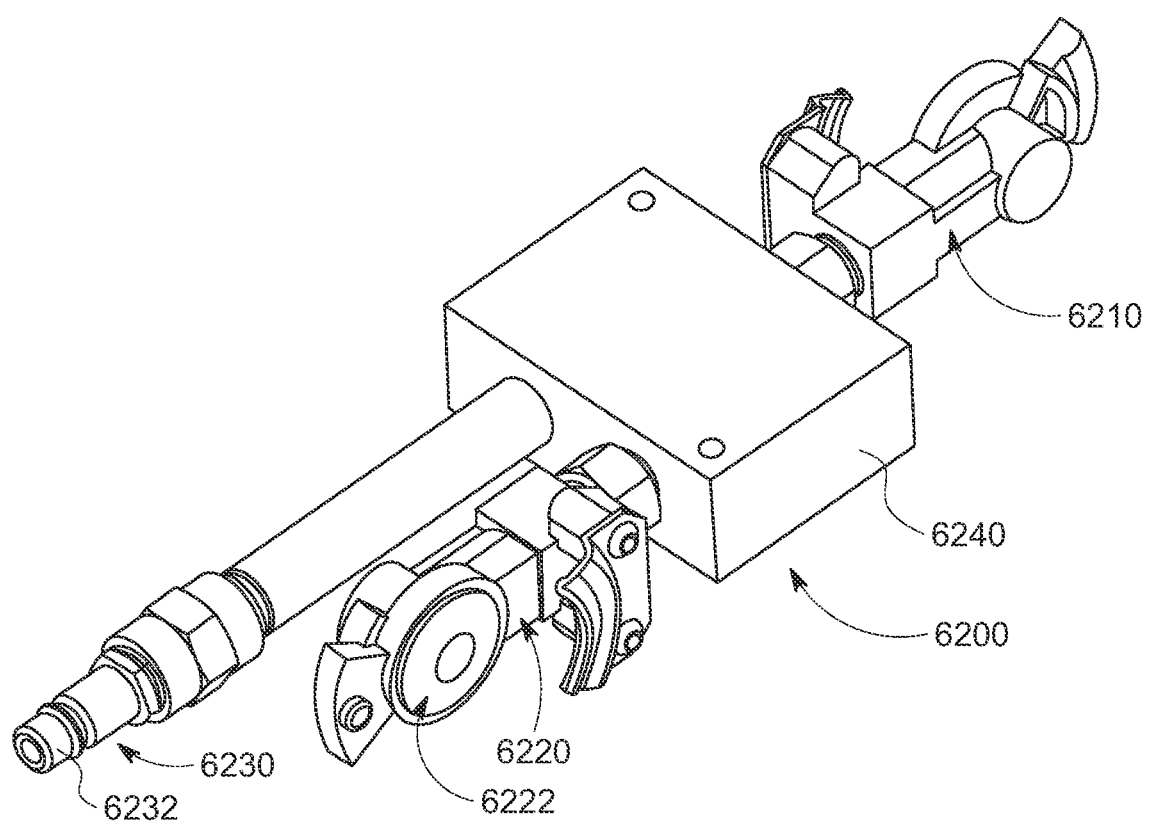

FIG. 62 shows a dual-fitting shuttle valve glad hand adapter arrangement 6200 according to an exemplary embodiment, for autonomous-favored operations. The trailer side of the arrangement 6200 includes a conventional glad hand connector 6210 meant to be mounted semi-permanently to the trailer airline. The opposing side of the arrangement 6200 includes two parallel ports 6220 and 6230. One port 6220 contains a standard glad hand connector base 6222 for interfacing with an over the road truck airline that is manually attached and removed. The second port 6230 can contain any of the autonomous adapters/tools described above—in this example, a male nipple 6232 for an actuated quick-disconnect system, such as shown and described in FIGS. 54 and 55.

In the arrangement 6200, a shuttle valve 6240 interconnects the trailer-side glad hand 6210, the truck-interfacing glad hand 6220 and the autonomous port 6230, and operates (in a conventional manner) to allow for connection from either the autonomous adapter or a standard glad hand connector. The shuttle valve 6240 routes pressurized air from the connected side through to the trailer airline in a manner free of leaks or pressure loss. The shuttle valve 6240 is also adapted to be open to the environment when disconnected, thereby allowing the air in the trailer airlines to purge.

Figure 63:
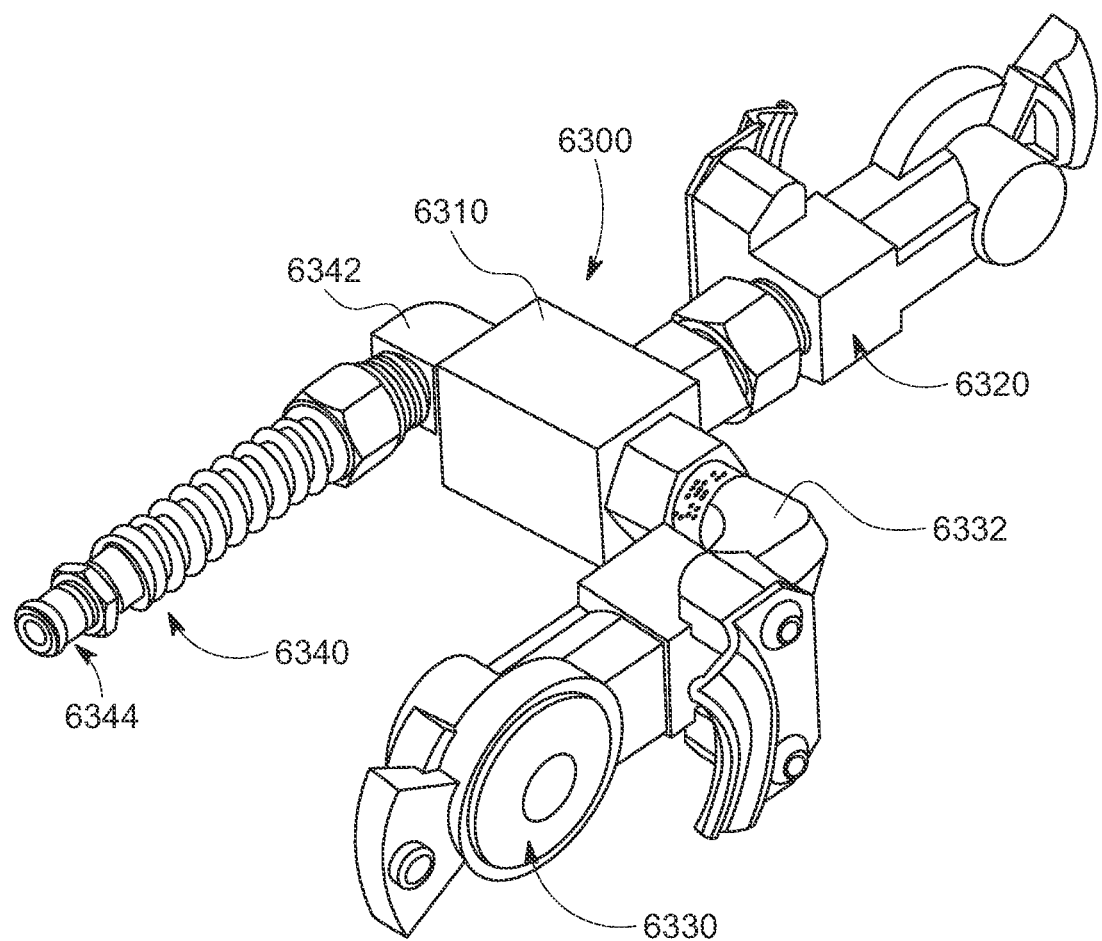

FIG. 63 shows another exemplary embodiment of a dual-fitting shuttle valve glad hand adapter arrangement 6300. In this embodiment, a shuttle valve 6310 connects a conventional, trailer-side glad hand assembly 6320 and a pair of truck-side ports 6330 and 6340. The ports 6330 and 6340 each extend with a respective right-angle elbow 6332 and 6342 from the shuttle valve 6310, which defines a T-connection in this embodiment. It should be clear that a wide range of geometric arrangements can be employed in alternate embodiments to orient the ports appropriately and/or provide desired positioning/spacing. The port 6330 is a conventional glad hand connector for manual attachment of an OTR connection as described above. The other port 6340 is arranged with a quick-disconnect nipple 6344 for use with the above-described tools. The nipple 6344 in this embodiment is mounted on the end of a spring-wrapped tube 6346 for compliance.

Figure 64:
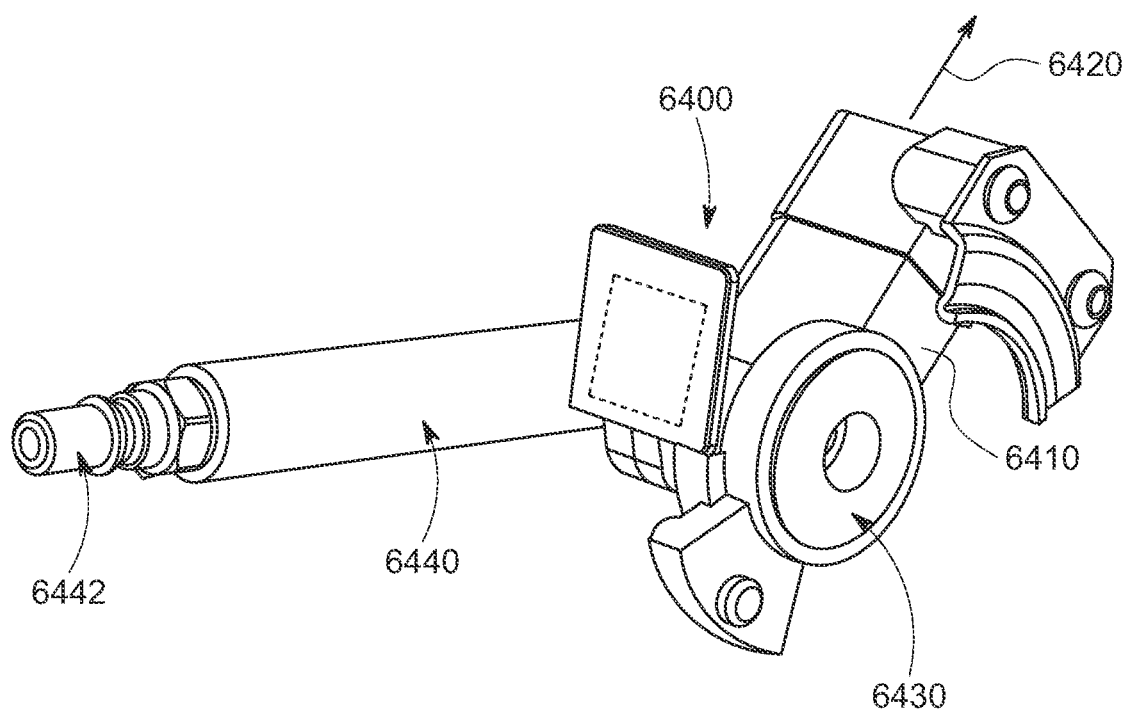

FIG. 64 shows an arrangement 6400 that includes an integrated shuttle valve 6410. As shown, the shuttle valve is integrally constructed directly into the backside of a standard glad hand connection geometry. The shuttle valve allows pressurized air to flow through the rear outlet (arrow 6420) from either the glad hand base 6430 or an autonomous port 6440 (shown with a quick-disconnect nipple 6442 as described above). This arrangement 6400 can provide both autonomous and standard connection mechanisms to a trailer with a relatively small form factor, and without (free of) use of a separate glad hand adapter. Instead, the integrated glad hand can be permanently fitted to the trailer at the outlet (6420), and the trailer is, thus, outfitted for both OTR and autonomous connections.

Figure 65:
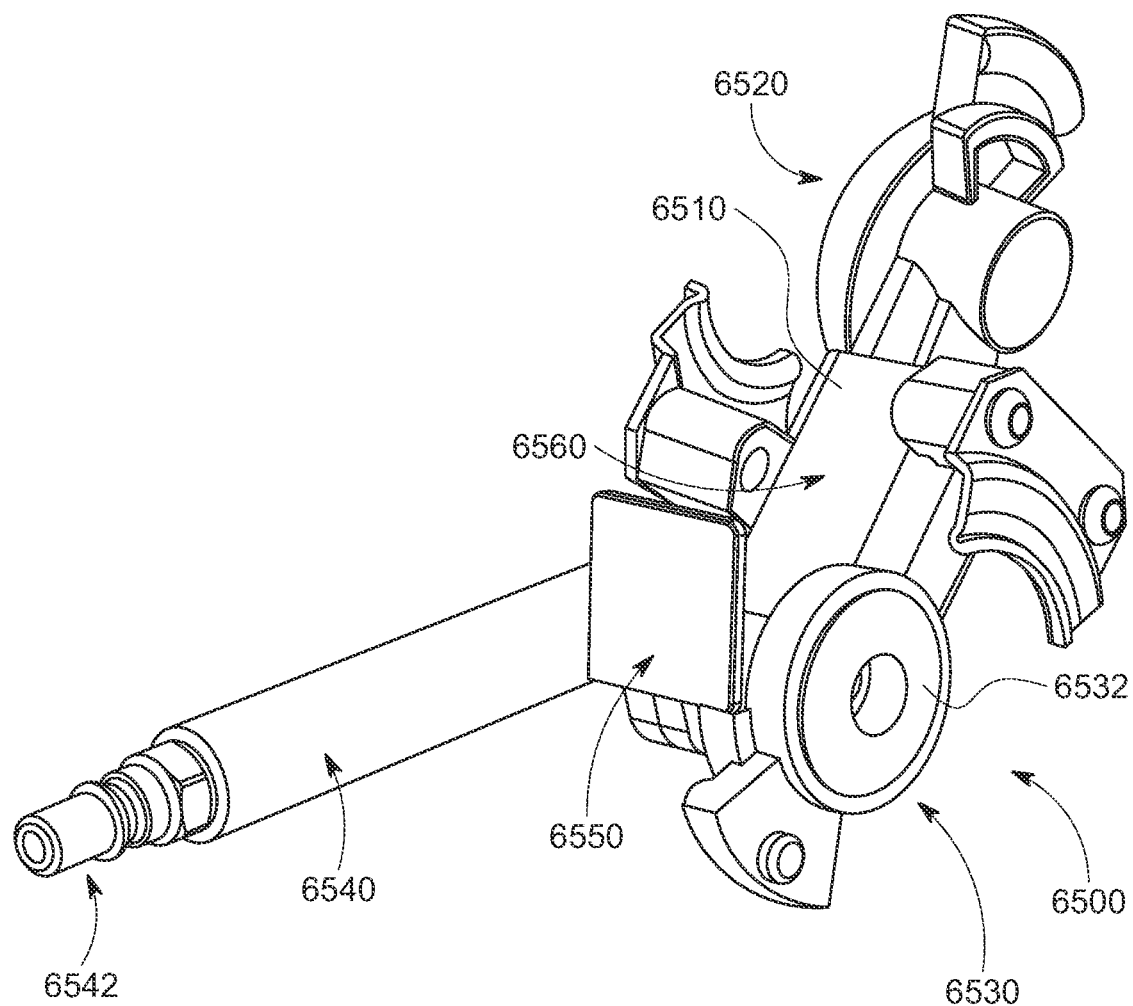

FIG. 65 shows another glad hand adapter arrangement 6500 having an integrated shuttle valve 6510. Unlike the embodiment of FIG. 64, this arrangement 6500 does not dictate direct replacement of a stock trailer glad hand. Rather this adapter arrangement 6500 employs a trailer-side glad hand 6520, which can be semi-permanently attached to the trailer glad hand connection. It is interconnected via the integral shuttle valve 6510 to a pair of ports 6530 and 6540. The valve selectively routes pressurized air to the trailer-side glad hand 6520 from the connected port. As described above, the ports include a conventional truck side glad hand connector 6532 and a tool-engaged autonomous (e.g. nipple) connector 6542. A fiducial-carrying plate 6550 is also provided on the arrangement housing 6560, where it can be imaged by the autonomous manipulator system.

Figure 66:
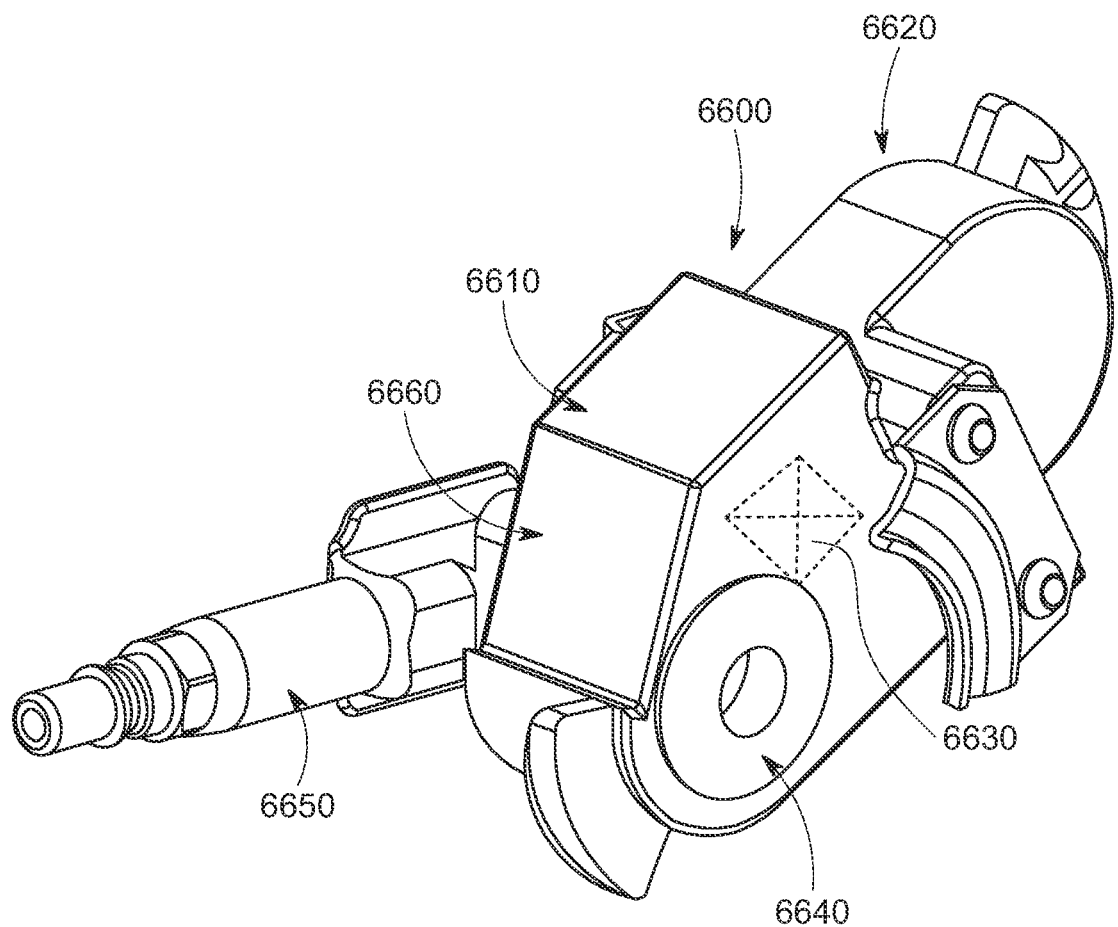

FIG. 66 shows another exemplary embodiment of a glad hand adapter arrangement 6600 with a housing 6610 that is constructed in a machinable configuration. It includes a trailer-side glad hand connection that is fed via an integrated shuttle valve 6630 (shown schematically in phantom within the machined housing 6610). The shuttle valve 6630 allows wither the conventional, truck-side glad hand connection 6640 or the autonomous connection 6650 to deliver pressurized air to the trailer airline via the trailer-side glad hand 6620. A fiducial carrying panel 6660 can be provided on the front side of the housing 6610.

J. Clamping Tool into Adapter

According to an exemplary embodiment, an autonomous connection (nipple) and associated shuttle valve is omitted in the arrangement 6700 of FIGS. 67-69. This adapter arrangement 6700 defines a housing 6710 with a machinable design, and a trailer-side glad hand connection 6720 that can be semi-permanently attached to the trailer glad hand. A truck side glad hand connection 6730 is also provided to the housing 6710. The glad hand connection 6730 defines a cylindrical base 6740 with multiple alignment holes 6782, which allow a clamping tool 6750 to approach at various angles.

As shown particularly in FIG. 69, the clamping tool 6750 includes an alignment pin 6760 that projects from a motorized base 6770. The base 6750 can be adapted for carrying by, and release from, a robotic manipulator. The alignment pin 6760 has a vane 6762 that is sloped at its front so as to assist in aligning the base 6760 with the glad hand cylindrical base 6740. The holes 6742 each define a conforming shape (e.g. la teardrop-shaped keyway) that guides the pin and vane into proper alignment when the tool 6750 is brought into engagement with the glad hand base 6740.

The clamping tool 6750 is shown engaged with the truck-side adapter glad hand 6730 in FIG. 68. A lead screw 6780, driven by the motorized base, moves the clamp member 6782 toward and away from the glad hand seal 6734. A variety of linear actuators can be used to move the clamp member 6782. In an embodiment, NEMA 23 stepper motor provides sufficient force to make a seal. A pair of bolts, mounted into the motorized clamp base 6770 provide guideways for the clamping member 6782 and it is driven linearly (double-arrow 6912 in FIG. 69) by the lead screw 6780. The motor base 6770 receives power via leads 6786 and the clamping member is pressurized by the truck airline, with pressurized air routed through the member 6782 to a port 6910, surrounded by an appropriate glad hand seal 6920 (FIG. 69). As in other embodiments, the housing 6710 can include a fiducial-carrying plate 6790 to help identify the adapter arrangement 6700 and guide a manipulator carrying the clamping tool into engagement with the arrangement. Clamping can occur when the system confirms (via impulse, etc.) that the tool 6750 is firmly seated with respect to the glad hand base 6740, after which, the manipulator is released from the tool. Unclamping can occur when the manipulator firmly re-engages the tool 6750, after which, the manipulator and tool are withdrawn to a neutral location so that the trailer can be unhitched in accordance with the general description herein.

K. Automated Trailer Angle Detection

When hauling a trailer, it is desirable to determine the orientation (relative angle) of the trailer with respect the tractor. Traditionally, the orientation and perspective of the front face of trailer is observed by a human driver to derive the approximate angle measurement. However, due to the variability in the front face's surface (due to the presence of refrigeration units, fairings, etc.), this approach is less effective using automated sensors, such as visual cameras, conventional LIDAR, etc. However, the commercial availability of so-called high-resolution LIDAR affords more capability in automating the relative trailer angle determination process. Such a high-resolution solution is commercially available from Velodyne LiDAR, Inc. of San Jose, CA in the form of the VLS128™ system, which is presently considered one of the world's highest-resolution LiDAR for use in (e.g.) autonomous vehicles and similar applications. This system uses 128 discrete structured light (laser) beams to derive a 3D surface contour/shape at a significant working distance. These beams can be arranged in projected concentric rings. Other competing high-resolution LIDAR devices and also be employed herein, as well as alternate 3D sensing systems, which can include stereoscopic cameras, etc.

FIGS. 70 and 71 show an arrangement 7000 of an autonomous (e.g. yard) truck 7010 and unhitched trailer 7020 to detect the relative trailer angle ATA, shown herein between the plane of a rear chassis (e.g. bumper 7030) of the truck 7010 and the centerline CLT of the trailer 7020. Illustratively, this arrangement 7000 includes a LIDAR device 7022 mounted on the truck rear chassis/bumper 7030, facing rearwardly toward the trailer. In operation, the LIDAR device 7022 communicates with a processor 7024, which can be part of the vehicle CPU, and includes an angle determination process(or) 7026. The process(or) 7026 detects the position and orientation of the (e.g.) two landing-gear legs 7110 and 7112 on the trailer 7020 in order to estimate the trailer's angle ATA relative to the rear 7030 of the truck 7010. The LIDAR device 7022 defines a working angle range 7120 that is sufficient to capture the legs 7110 and 7112 within the range of expected trailer angles ATA to be encountered during operation. As shown, the LIDAR beam(s) can also acquire the fronts of at least one of the wheel set(s) 7130, 7132, 7134 and 7136. The height HLT (FIG. 89) between the LIDAR device 7122 and the ground 7050 is chosen to allow its beams 7042 to travel sufficiently beneath the trailer underside 7040 to reach the landing gear legs 7110 and 7112, and potentially, the tire set(s) 7130, 7132, 7134 and 7136. Because the legs 7110 and 7112 and (optionally) the tires are positioned at known parallel orientation across the width/beam on either side of the trailer 7120, and these structures have distinctive surface shapes, they can be used as a reference to determine the relative angle ATA with respect to the truck and associated LIDAR unit (and the truck coordinate system established by the process(or) 7026).

In operation, and with further reference to FIG. 72, the process(or) 7026 analyzes at least one of the rings in the transmitted LIDAR data from the trailer scan to search for groups of points 7210, 7212 where the overall group is roughly the width WLL of a respective landing gear leg. The process(or) 7026, then compares all groups to look for pairs of groups which are roughly equidistant from the trailer kingpin point 7060, and where the separation distance WLG between the two groups 7210, 7212 is roughly the width of a trailer. For pairs that match the criteria, the process(or) 7026 estimates the trailer angle ATA (taken with respect to a line 7240 parallel to the truck bumper) as the angle that bisects the two vectors (outside angles) 7220, 7222 from the truck/trailer hitch point to the opposing outer edges of the two point groups 7210 and 7212.

At extreme relative angles between the truck and trailer, one of the landing gear legs 7110, 7112 can be occluded from the LIDAR sensor's view (e.g. the occluded leg may be in front of the rear bumper due to the extreme angle). This condition is shown by way of example in FIG. 73, in which the landing gear leg 7112 of the trailer 7020 is visible within the maximum sensing fan (cone) 7320 of the LIDAR device 7022, but the opposing leg 7110 is outside the cone (positioned in front of the bumper 7130), and occluded. If no point pairs representative of landing gear legs are found, and if a single group of points is detected (e.g. points corresponding to leg 7112) in the area where the other leg would be expected to be occluded (as that leg is now at an extreme left or right position), then the process(or) 7026 uses a predefined trailer width WTP to estimate the location of the occluded leg 7110. The process(or) 7026 then uses the sensed location of the found leg 7112 and an estimated location for the occluded leg 7110 as an approximated pair for the purposed of the above-described procedure. It then uses this pair to estimate the trailer angle as the angle that bisects the two vectors from the kingpin to the outer edges of the two legs in the approximated pair.

Note that in certain situations, an additional step of providing a linear quadratic estimate (e.g. Kalman filtering) can be employed in order to smooth the output and improve robustness of the trailer angle determination procedure described above.

With reference again to FIG. 70, in a further embodiment, it can be useful to confirm trailer angle ATA, or improve trailer angle accuracy. The procedure can employ the use of the lower outer edges 7070 of the leading edge of the trailer 7020. This procedure can be accomplished by processing the received, upper LIDAR rings to detect the outer edges of the trailer and can be useful in confirming results from the landing gear detection, or in eliminating false positives if the landing-gear detection procedure returns more than one solution.

In another embodiment, and with reference again to FIG. 72, the LIDAR device can be used to detect the trailer wheels 7130 and 7134 by locating corresponding points 7230 and 7234. This data can be used to confirm, and/or refine the accuracy of, the angle determined using detection of the landing gear, or if the landing gear detection is not conclusive, the location of the wheels can be used to independently establish the trailer angle. The (stored) typical width WTW between (e.g.) the inside edges can be compared to sensed width to establish that the groups of points are wheels and angles can be computed in a manner similar to that described above for landing gear.

L. Automated Kingpin Detection

Reference is made to FIGS. 74 and 75 that depicts a system and method to further assist in the retrieval of a trailer by an autonomous truck. In performing this operation, the system and method employs the approximate location of the trailer, which can be obtained by visual sensing and/or other techniques as described herein. The system and method of this embodiment generally allows the truck to be able to back down and connect to the trailer successfully. This embodiment can employ the above-described LIDAR device 7022 (in FIGS. 70-73). Other like reference numbers are also employed in the depiction of FIGS. 74 and 75 where they apply to similar or identical structures/components.

The system and method, more particularly, allows for proper connection of the truck fifth wheel 7410 to the trailer kingpin 7460 in a backing operation. It employs a kingpin location detection and determination process(or) 7420, which can be part of the overall vehicle processor/CPU 7024, and is interconnected to the LIDAR device and any resident processes/ors instantiated thereon (or associated therewith). Using the system-provided trailer location, the truck 7010 is positioned adjacent to the trailer 7020, and the reversing procedure is then initiated to connect the truck and trailer. During this process it is highly desirable to accurately determine the relative position of the trailer kingpin 7060. While the kingpin 7060 is a relatively small structure on the overall trailer underside 7040, using a LIDAR device 7022 mounted on a truck's back bumper 7030, it is uniquely identifiable as an image feature set produced by the beams 7430 of the LIDAR device 7022.

According to an embodiment, and with further reference to FIG. 76 and the flow diagram of FIG. 77, a procedure 7700 for accurately determining the location of the trailer kingpin 7060 is shown. The procedure 7700 processes (e.g. using the process(or) 7420) each of the LIDAR rings independently and segregates the found points into groups (step 7710). The procedure 7700 then searches for three discrete groups of points 7610, 7612 and 7620 that are separate, but relatively adjacent (within a predetermined threshold), and where the middle group 7620 is closer to the sensor 7022 than the other two (flanking) groups 7610 and 7612 (step 7720).

Step 7720 of the procedure 7700 then further eliminates trios of groups where the flanking groups 7610 and 7612 are not relatively flat and at roughly the same height, and/or where the middle group is significantly wider or taller than the expected width/height of a kingpin. If a trio of groups matches all criteria (decision step 7730), then the procedure 7700 estimates the x, y (or another coordinate system) position of the kingpin as the average of all the point hits in the middle group 7620 (step 7740). The procedure 7700 also reports the kingpin plate height (minimum height of the flanking groups 7610, 7612) HK (FIG. 74) so that the system will have a metric as to how high to raise the fifth wheel 74 (step 7750). The procedure 7700 then transforms the x, y position from the sensor coordinate space to the navigation/vehicle coordinate space (step 7760). The procedure 7760 then compares the x, y position with the coordinates of any previous detections (step 7770). If there is no match (decision step 7780), then the new x, y position is appended to the list of previous detections (step 7782), and the procedure 7700 continues to search (via steps 7710-7770). However, if there is a match (decision step 7780), then the confidence in the matched detection is incremented to increase its value (step 7784). Based upon incrementing of the confidence value in step 7784, the procedure 7700 prioritizes the list of previous detections using the accumulated confidence, as well as proximity to the vehicle (step 7790). After prioritizing in step 7790, the procedure 7700 outputs detection that has the highest priority for use to guide the backing operation of the truck onto the trailer via the navigation coordinate space.

In an alternate, related embodiment, the system and method employs the above-described trailer angle determination procedure (FIGS. 70-73) which detects the location of the trailer landing gear legs 7110 and 7112. Once both of the landing gear legs have been identified and located, the location of the kingpin 7060 can be estimated based on known/standard trailer geometry, typically expressed in terms of an x, y coordinate relationship between (e.g. centroids). This estimated location is translated into the vehicle/navigation coordinate space. As shown in FIG. 76, the outer edges 7650, 7652, 7660 and 7662 are identified in related point groups that span the width of the trailer underside/sides, and can also be the basis of a trailer angle determination.

V. Machine Vision Glad Hand Recognition and Manipulator Guidance

A. System Overview

Reference is made to FIG. 78, which shows a generalized overview of a machine vision system 7800 for guiding a robot manipulator 7810 of any appropriate type and operating arrangement for use in manipulating and/or connecting a trailer glad hand 7812 using one or more end effector tools 7814. As described above, the robotic arrangement can include additional arms or components that are adapted to rotate a retractable/rotatable glad hand—such as that shown mounted on the side 7816 of the exemplary trailer. The robot manipulator 7810 operate in an appropriate 3D coordinate space 7820 established by the system relative to the glad hand and surrounding scene—for example, defined by x, y and z orthogonal axes and corresponding angular orientation/rotation Ox, Oy, and Oz about each axis (thereby representing six (6) degrees of freedom (DOF). Other coordinate representations can be employed—for example, a polar coordinate system. The robot manipulator 7810 can include appropriate motion control and tracking processors/mechanisms—for example encoders and/or stepper motors that provide feedback (motion data 7822) as each component of the (multi-axis) arm moves in 3D space. This allows the system to track and adjust end effector motion as described further below. Note that the robotic arrangement can include additional arms or manipulators—for example, a glad hand grasping/rotation mechanism as shown in FIGS. 38A and 38B above.

The scene of interest is imaged by a camera assembly 7824 that, in this example, can generate a 3D image data 7823 (e.g., a 3D point cloud) using any appropriate 3D imaging technology—for example, the depicted stereo camera arrangement consisting a two cameras (and associated image sensors/sensor regions S1 and S2) with spaced-apart optical axes that image overlapping fields of view (FOV1 and FOV2) from differing perspectives. Other appropriate imaging technologies—e.g. LIDAR, time-of-flight cameras, etc. can be employed in alternate implementations.

The image data 7823 is transmitted to a vision process(or) 7830 that can be part of a general purpose computing system (e.g. PC, laptop, tablet and/or server), or can be a custom processor—such as a microcontroller, ASIC, FPGA, etc. The process(or) 7830 includes a plurality of functional processes (ors) and/or modules, including, but not limited to, a recognition process(or) 7832, which uses the image data 7823 to determine a type of glad hand (e.g. fixed, rotatable, enclosed, etc.) so that an appropriate connection process and/or mechanism can be employed, and a pose determination process(or) 7834 that employs the image data 7823 to generate a 3D pose for the glad hand. This pose is used to guide the gross and fine motions of the robot manipulator(s) 7810 to (where applicable), rotate the glad hand 7812 and then attach an appropriate connection tool thereto. The process(or) further includes a robot position controller module 7836, which provides appropriate motion control data 7840, via an interface module 7838, to the manipulator(s) 7810. The motion control data 7840 can be coded in a format that is native to the manipulator 7810. The motion controller can map between the manipulator(s) native coordinates and the overall 3D coordinate space 7820 of the scene. The motion data 7832 provides feedback as to motion by the manipulator(s) in that scene via the mapping.

The vision process(or) 7830 can communicate with a local or networked (via an appropriate link) data store 7840 that includes various models for glad hand types, dimensions, etc., as well as poses thereof. These are used by the recognition and determination processes 7832 and 7234 to generate results used by the controller module 7836. The process(or) 7830 also communicates with other local and/or remote processors and associated processes 7850 that monitor and operate the vehicle and peripherals. For example, such processes can direct the connection to occur after hitching is completed and confirm a successful airline circuit is completed. The or In order to complete a connection between the trailer and truck cab, the robotic system must perceive the glad hand 7812 and understand its position and orientation. This operation is generally characterized as 6DOF pose estimation, B. Pose Estimation:

The pose of the 3D-imaged glad hand 7812 can be is represented by a 4×4 matrix that includes the six degrees of freedom in the coordinate space 7820, namely position (x,y,z) and angular orientation, in terms of corresponding roll, pitch, yaw ($\theta_x$, $\theta_y$, and $\theta_z$) of the object of interest. This amount of spatial information is sufficient to allow the robotic manipulator(s) 7810 to perform the specified connection operation.

One technique for determining pose is by using fiducial markers as described generally above. To again summarize, by detecting individual corners on markers, and recognizing the unique ID (e.g. 3D barcode) of each marker a 2D-to-3D correspondence map can be derived. This is possible as each marker's 3D position is known a-priori. After this correspondence is determined, then the perspective-n-point (PnP) problem can be solved to calculate the position and orientation of the object in relation to the camera. A disadvantage to this approach can be the need to apply fiducials to a glad hand or other structure, entailing additional, and often manual, tasks.

Another technique that that is used herein to determine pose is known as 3D point cloud registration. A well-known technique for such registration involves use of the iterative closest point method. In summary, this technique implicates the following steps: (a) for each point in the source point cloud, match the closest point in the reference point cloud (or a selected set); (b) estimate the combination of rotation and translation using (e.g.) a root mean square point to point distance metric minimization technique (or similar statistical technique), which best aligns each source point to its match found in the previous step, and which can also involve weighting points and rejecting outlier points prior to alignment; (c) transform the source points using the obtained transformation; and (d) iterate steps (a)-(c) while re-associating the points. Thus, in the iterative closest point technique a target and input point cloud are registered by calculating a translation and rotation that optimally aligns the two point clouds.

By way of illustrative example, in FIG. 79, a representation of a 3D point could 7900 is shown. The representation particularly defines a point cloud registration of a darker central shape 7910 is first shown out of alignment with the lighter, surrounding reference shape 7920. In FIG. 80, the point cloud representation 8000 is shown again, in a state in which alignment has been achieved. Thus the darker shape 8010 is largely overlapped by the lighter shape 8020. By performing this registration, the system is able to calculate the six-degrees-of-freedom (6DOF) pose of the imaged object with respect to the camera coordinate space.

As described above, due to operational limitations, it is not typically practical to affix fiducial markers to every native glad hand at a distribution yard. However, with supervised machine learning methods, a deep learning model can be trained to predict unique keypoints using glad hand imagery. Hence, FIG. 81 shows an exemplary image 8100 of a trailer front face 8110, in which a pair of rotating glad hands 8120 and 8122 are mounted. The vison system identifies the general shapes of the glad hands 8120, 8122 from associated, stored models and establishes (e.g.) respective bounding boxes 8130, 8132 around their shapes. This imagery can be established using appropriate 2D and/or 3D cameras. The model(s) define predicted locations of keypoints, which are typically features that have defines edges and/or other shapes. Exemplary keypoints 8140, 8142 (respectively) are shown in FIG. 81 for each glad hand 8120, 8122. Once the keypoints are predicted, 2D-3D correspondences can be used to solve the perspective problem to estimate the pose of the glad hand. That is, the keypoints represent a particular 3D position within a stored model. Thus, a 2D image can be used to generate a 3D representation in the coordinate space used by the manipulator based upon stored knowledge of a glad hand's geometry.

Based upon one or more acquired images of the scene (e.g. such as image 8100), deep/machine learning methods (e.g. a convolutional neural network (CNN)) can be used to classify the features of the object residing in the image. In this example, the classification model can be trained, during a training procedure, to predict the type of glad hand present in that image. Such training can be used in runtime operation to classify a given glad hand in an acquired image.

C. Hybrid Procedure

The illustrative embodiment herein employs a hybrid technique for classifying glad hand types and estimating pose thereof. This technique combines the above-described keypoint prediction and point cloud registration processes.

As shown in the flow diagram of FIG. 82, a generalized procedure 8200 for employing machine learning models of glad hands is provides, which allows for detection of predetermined keypoints on an imaged glad hand, and concurrent estimation of other properties, such as the glad hand type/classification from a known set of candidates. The camera(s) 7826 and 7828 generate both a color (typically RGB, but potentially grayscale) image of the object (block 8210), along with a (3D) depth image (i.e. based upon the stereoscopic functionality of the camera assembly 7824). Based upon this image data, the process(or) 7830 applies appropriate deep learning processes 8820 to the input (e.g.) RGB image(s) 8210 to predict (via detection and regression) the keypoint locations (step 8222) and recognize the type/classification of the glad hand (step 8224). The procedure 8200 then employs the keypoint prediction/detection results to calculate glad hand pose by solving (e.g.) a PnP problem (step 8230). This PnP result is used to generate an initial pose estimate (step 8232). The deep learning classification step 8223, likewise, uses the classification result to retrieve a correct glad hand 3D CAD model from the store 7840 (step 8234). This retrieved model is used as an input, (block 8236) along with the pose estimate 8232 to the point cloud registration process/module 8240, which is initialized with the classified glad hand type and the initial glad hand pose estimate. The module 8240 then refines by performing point cloud registration in the hybrid manner contemplated herein. The module 8240 thereby outputs a refined 6DOF glad hand pose result (block 8250). Note that this result takes into account the type of glad hand detected so that such can be accounted for in guiding the robotic manipulator to (optionally) rotate and connect to the glad hand using appropriate motion control signals 7830 and feedback 7882. Note that such feedback can include visual feedback using a connection tool and/or end effector with features that are identified and tracked by the vision system (step 8260).

Note that the above-described hybrid technique is one of a variety of techniques that can be used to train a vision system and/or estimate glad hand pose and/or classify glad hand type for guidance of a robot manipulator that performs an airline connection.

D. Other Approaches to Training and/or Glad Hand Guidance

In order to train and evaluate deep learning models for native glad hand pose estimation it is beneficial to have a large dataset of images with known 6DOF poses associated. This dataset is sufficient to train supervised machine learning models.

According to an exemplary embodiment, a ground truth glad hand pose is generated using either human labeling/measurements or a fiducial markerboard (see, for example, FIG. 69J above). Then a robotic arm (while keeping track of arm position via generated motion/encoder data) is moved to an infinite number of possible positions. By tracking the relative motion of the arm and the original glad hand pose a large dataset of pose information can be generated. Referring, more particularly, to the procedure 8300 of FIG. 83, the glad hand pose is initially determined in step 8310. The object pose P{object} and arm pose P{arm} are stored in step 8312. Based upon this ground truth data, in step 8320 the arm is moved (e.g.) in a rasterized path throughout a hemisphere of possible positions. As the arm moves to each position, the (e.g.) encoders and the kinematic arm model are used to generate data on the current position. The position data for each is acquired and P{arm}_i is calculated for that position in step 8322. Since the transformation from the arm's current position to the reference position is known, the system can transform the object's coordinates into the current arm coordinate space, and therefore calculate P{object}_i (step 8324).

Another option for generating a corpus of color-depth (RGBD)/Pose ground truth is to use simulation engines. In a simulation, the position/orientation (Pose) of the camera is programmatically adjusted and then the engine renders a photorealistic view of the object. FIG. 84 is a screen display of a generalized simulation environment (for example a typical gaming engine) 8400 in which there resides a multiplicity of images of an exemplary glad hand 8410-8490, each rendered in this exemplary virtual world. For each glad hand 8410-8490 the pose can be implicitly surmised, as that information is used to render the asset in the virtual world. Once a dataset that includes thousands of RGB+Depth (RGBD) images exist that are each aligned with the ground truth object pose information then end-to-end machine learning approaches can be trained that directly predict the pose of a novel RGBD image.

It should be clear to those of skill that a variety of methods, techniques and/or algorithms can be implemented, alone or in combination with others, to determine the 6DOF pose of a glad hand for use in guiding a connection via a robotic manipulator. FIG. 85 depicts one such relatively straightforward example. The depicted flow diagram 8500 describes a procedure 8500, involving object detection with use of an autoencoder approach. In operation, the camera assembly acquires one or more (e.g.) RGB images of the scene containing the glad hand (block 8510). A 2D bounding box is established with respect to glad hand candidates and positions are detected in 2D using various vision system tools to find features (e.g. pattern recognition tools, blob analyzers, contrast/edge detectors, etc.) in step 8520. The overall acquired 2D image is cropped based upon the bounding box(es) established therein in step 8530. The cropped image data containing the glad hand(s) is provided as an input (block 8540) to a prediction process(or) the operates in step 8550 to discretize possible glad hand rotations and there by predicts the prevailing orientation with the greatest probability. This can be based upon ground truths and/or models, which can be represented as (e.g.) a heat map of possible orientations. Based upon the predictions, the determined (probable) position and orientation are combined to generate a glad hand pose (step 8560). This pose is used by the process(or) to guide the manipulator in performing appropriate glad hand connection tasks (step 8570).

It should be clear to those of skill that additional approaches to deriving 6DOF pose information using (e.g.) RGBD sensors exist, and can be applied in whole or part to the vision system 7800 herein. A variety of techniques are described, by way of background information, in the 6th International Workshop on Recovering 6D Object Pose, Organized at ECCV 2020, August 23, Glasgow, Scotland, accessible on the Worldwide Web via URL address http://cmp.felk.cvut.cz/sixd/workshop_2020/. See also URL address http://cmp.felk.cvut.cz/sixd/workshop_2019/.

VI. Conclusion

It should be clear that the above-described system and method of handling and managing trailers within a shipping yard and the associated devices and operational techniques for autonomous AV yard trucks provides an effective way to reduce human intervention, thereby lowering costs, potentially increasing safety and reducing downtime. The systems and methods herein are practically applicable to a wide range of both electric and fuel-powered trucks and any commercially available trailer arrangement. More particularly, the systems and methods herein effectively enable automation of critical yard operations, such as connection of one or more pneumatic and electrical lines between truck and trailer, unlatching and opening of trailer doors, safe hitching, navigation and docking of trailers with loading bays and docks, maintaining security at the dock and within the vehicle against unauthorized operations and/or users, and other aspects of autonomous vehicle operation. Such systems also enhance operations in container yards, and in other busy yard environments where reverse direction may be a concern and ensuring safety of parked vehicles is a consideration. These novel systems, methods and operations, while adapted to use on AV yard trucks can also benefit other types of automated transport vehicles, and it is contemplated that, using skill in the art, such can be extended to a wide range of non-yard-based and/or OTR vehicles.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow fort a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A device for locating a glad hand connector on a front face of a trailer comprising:
    a gross sensor that acquires at least one of a 2D and a 3D image of the front face and searches for glad hand-related image features, the sensor communicating with a robotic manipulator that removably attaches a service line connection on a truck to the glad hand based upon a determined location of the glad hand.

2. The device of claim 1, further comprising a processor, operatively connected to the robotic manipulator, that uses the at least one of the 2D and the 3D image to determine the glad hand location.

3. The device of claim 2, wherein the processor uses the at least one of the 2D and the 3D image(s) to identify glad hand mating features and determine if the glad hand is a rotational glad hand.

4. The device of claim 3, wherein the processor further determines a rotational axis of the rotational glad hand.

5. The device of claim 2, the gross sensor further comprising at least one camera, wherein the processor is adapted to control exposure parameters, contrast, or brightness for the at least one camera to offset environmental factors to improve accuracy of connector detection.

6. The device of claim 1, further comprising a processor that uses the at least one of the 2D and the 3D image to scan a surrounding environment with respect to the trailer, for trailer features and other constraints in the environment to prevent collision of the robotic manipulator with objects in the environment.

7. The device of claim 5, wherein the processor stores scanned information in a database, and is constructed and arranged to use the scanned information to improve future connections.

8. The device of claim 1, further comprising a processor that uses the at least one of the 2D and the 3D image that contain at least one fiducial marker to verify a position of a tool that connects to the gladhand handled by the robotic manipulator.

9. The device of claim 1, wherein the gross sensor further comprises at least one sensor having a sensor lens, wherein the sensor lens has a hydrophobic surfactant coating to mitigate the accumulation of distorting water droplets and other precipitate.

10. The device of claim 1, wherein the gross sensor is constructed and arranged to image at least one fiducial marker, wherein the fiducial marker has a hydrophobic surfactant coating to mitigate the accumulation of distorting water droplets and other precipitate.

11. The device of claim 5, wherein the environmental factors include at least one of direct sunlight incident on the at least one camera, and extreme exposure deltas across a 2D image.

12. The device of claim 1 wherein the glad hand includes a receiver on the trailer that is permanently or temporarily affixed thereto, the receiver interconnected with at least one of a pneumatic line and an electrical line, and
    a coupling that is manipulated by an end effector of the robotic manipulator to find and engage the receiver when the trailer is brought into proximity with, or hitched to, the truck.

13. The device of claim 12, further comprising a pose and recognition process that determines a six-degree-of-freedom (6DOF) pose of the glad hand based upon a combination of stored classes of glad hands of differing types and orientations and identified keypoint features, and a position control process that maps the 6DOF pose information into motion control data to move the robotic manipulator with respect to the glad hand.

14. The device of claim 13, wherein the pose and recognition process employs a deep learning process.

15. The device of claim 13, wherein the sensor comprises a camera assembly mounted on a chassis of the truck.

16. The device of claim 15, wherein the camera assembly comprises a stereoscopic RGBD camera assembly constructed and arranged to generate both depth images and RGB images.

17. The device of claim 13, wherein the sensor includes a LIDAR sensor mounted on a chassis of the truck.

18. The device of claim 13, further comprising a fine control process that acquires an image of the glad hand based upon the pose and guides the manipulator to connect the service line to the glad hand.

19. The device of claim 18, further comprising a camera mounted on an end effector of the manipulator that acquired the image used by the fine control process.

20. The device of claim 18, wherein the manipulator includes, on an end effector thereof, a connection tool that removably attaches to the glad hand to complete a connection of the service line to the glad hand.

* * * * *